Oct. 24, 1939.  C. SMITH  2,176,930
CALCULATING AND ACCOUNTING MACHINE
Filed Sept. 18, 1931  63 Sheets-Sheet 2

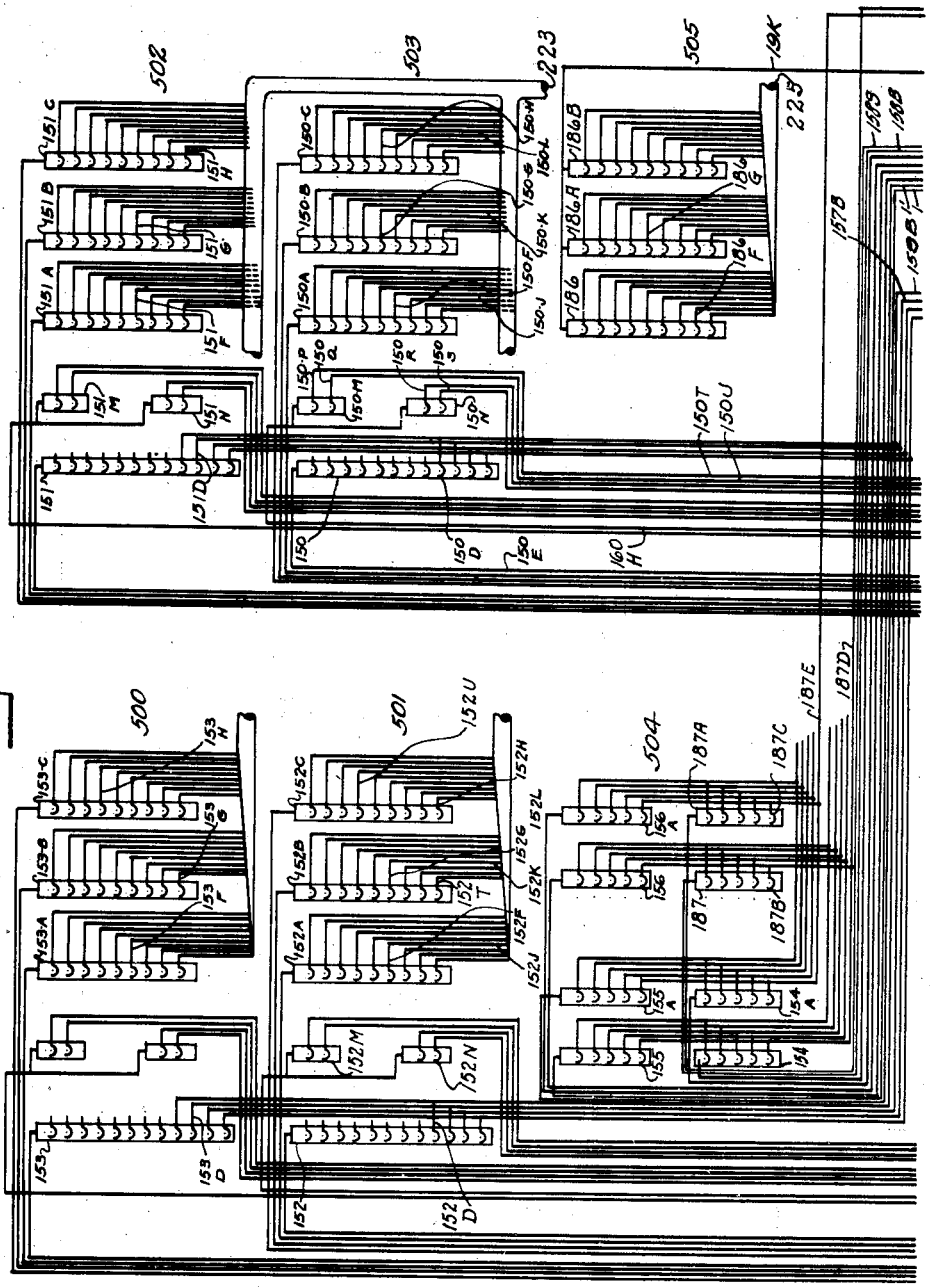

INVENTOR.
Clyde Smith

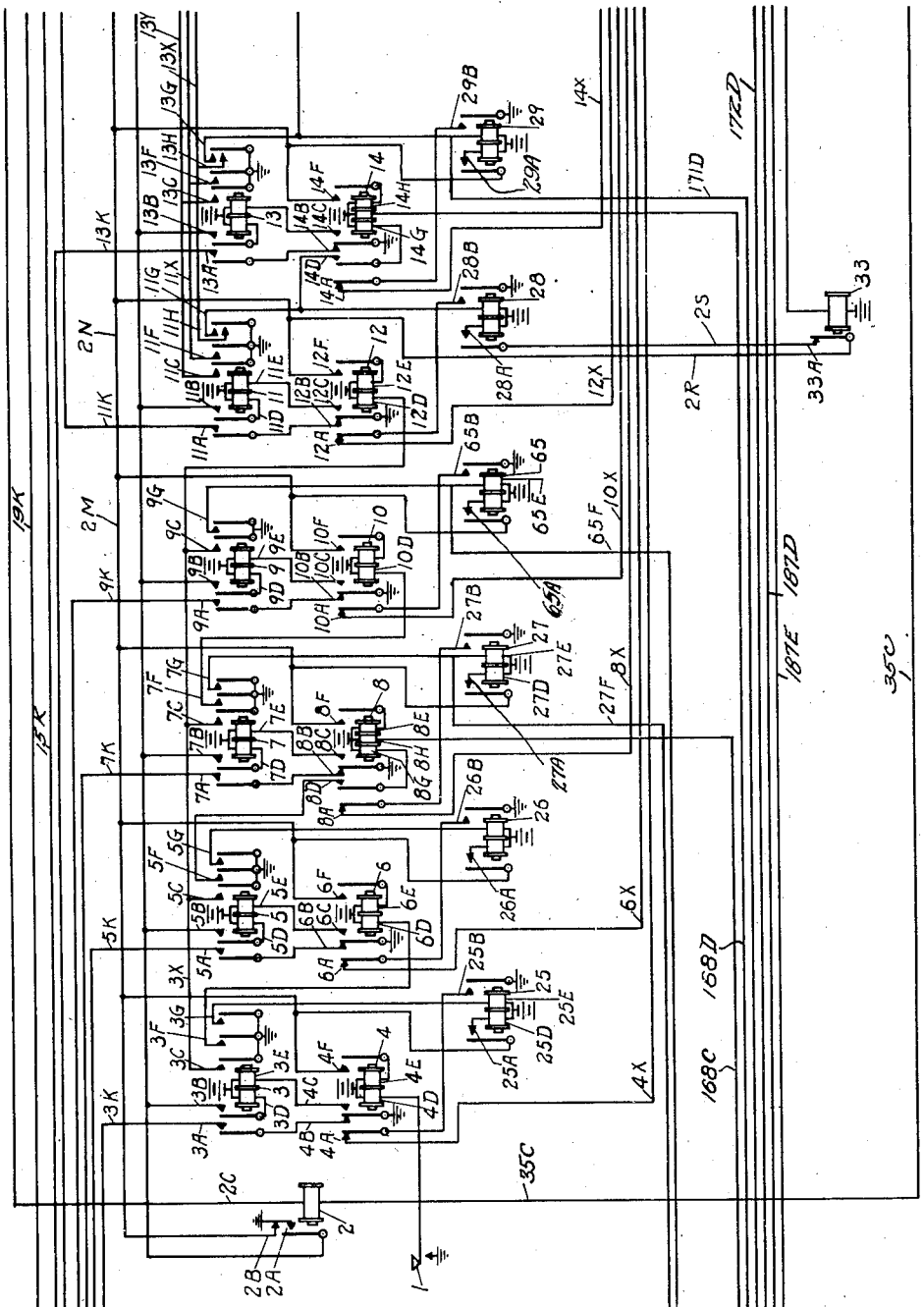

Oct. 24, 1939.  C. SMITH  2,176,930
CALCULATING AND ACCOUNTING MACHINE
Filed Sept. 18, 1931   63 Sheets-Sheet 4

Fig. 2A.

INVENTOR.
Clyde Smith

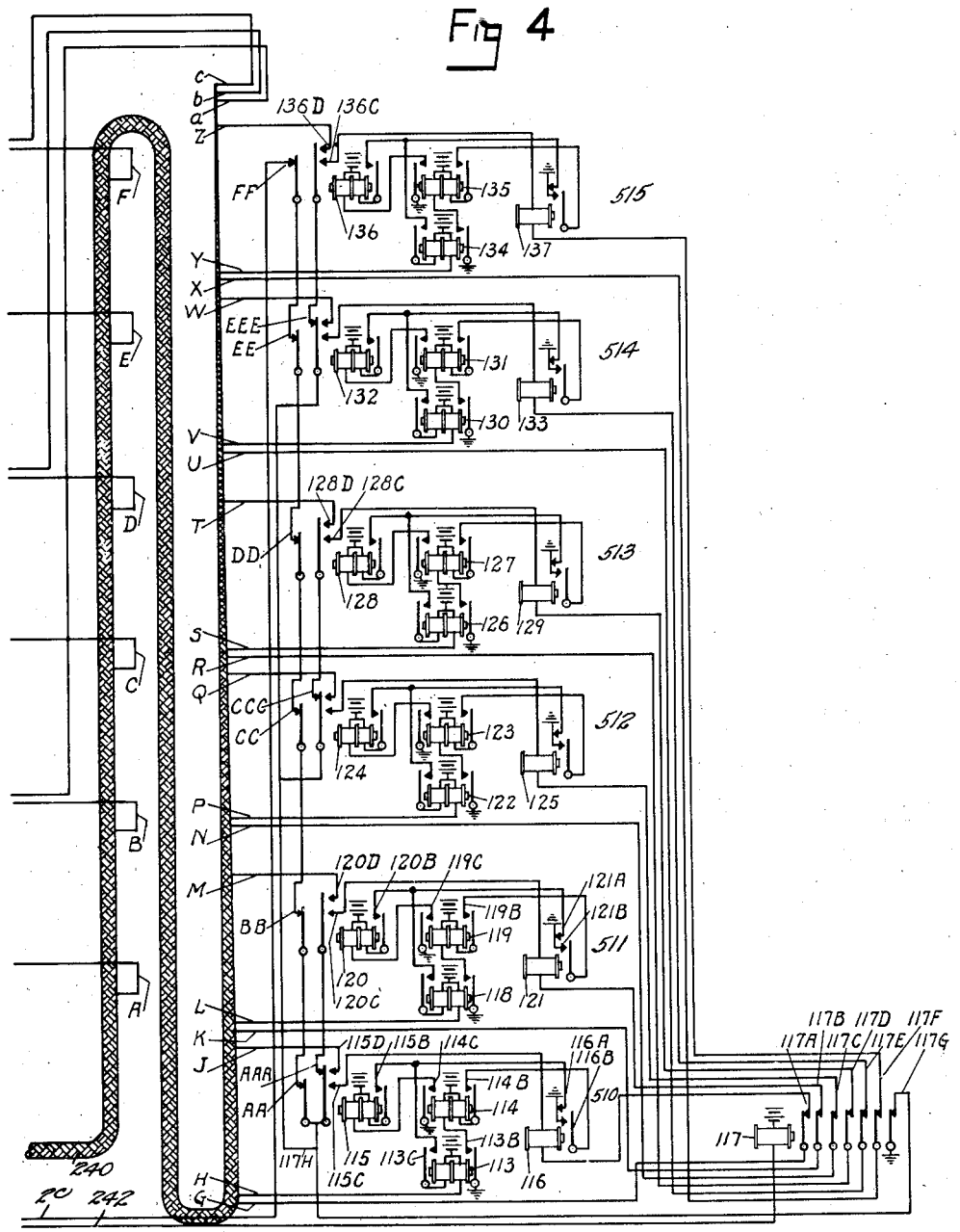

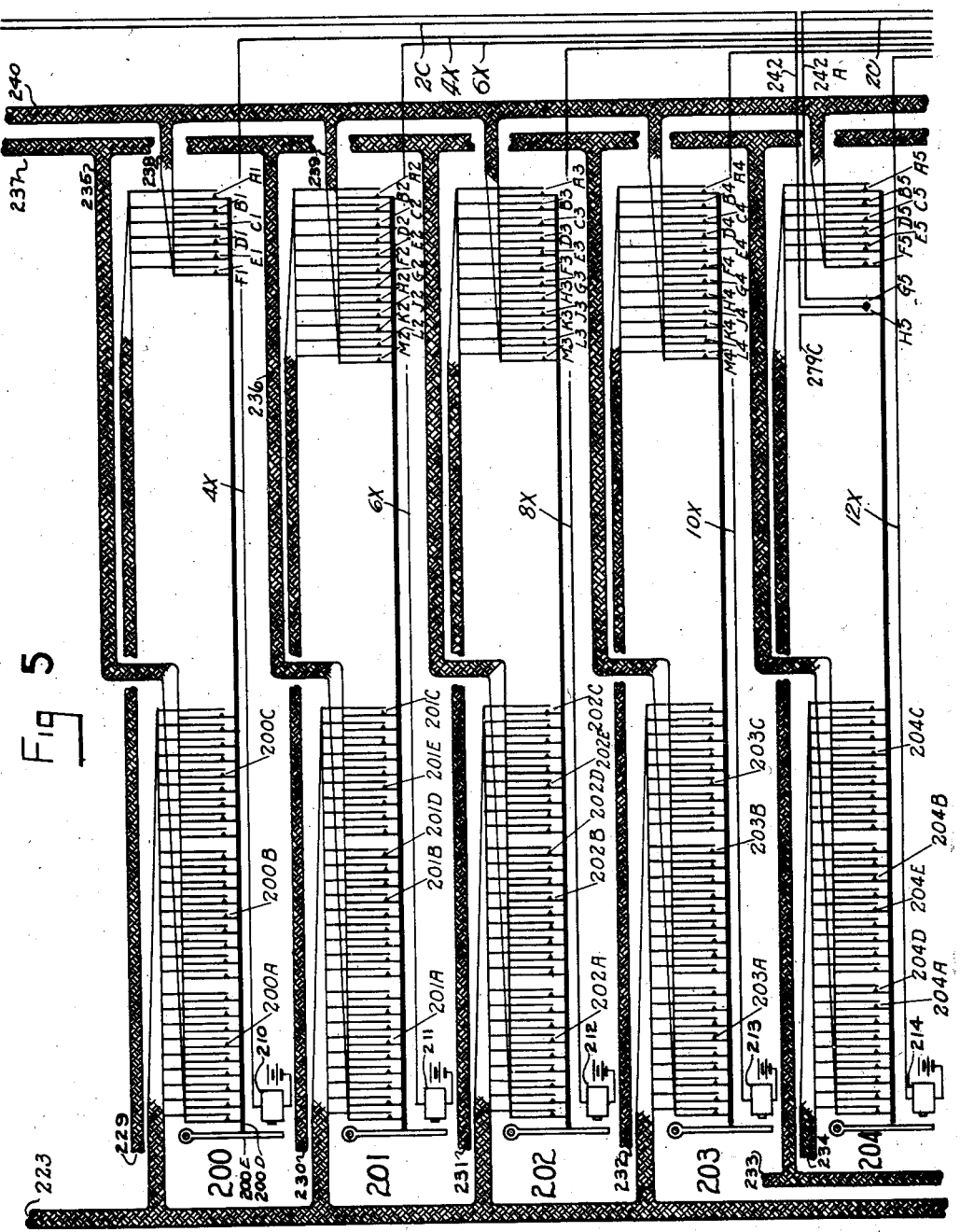

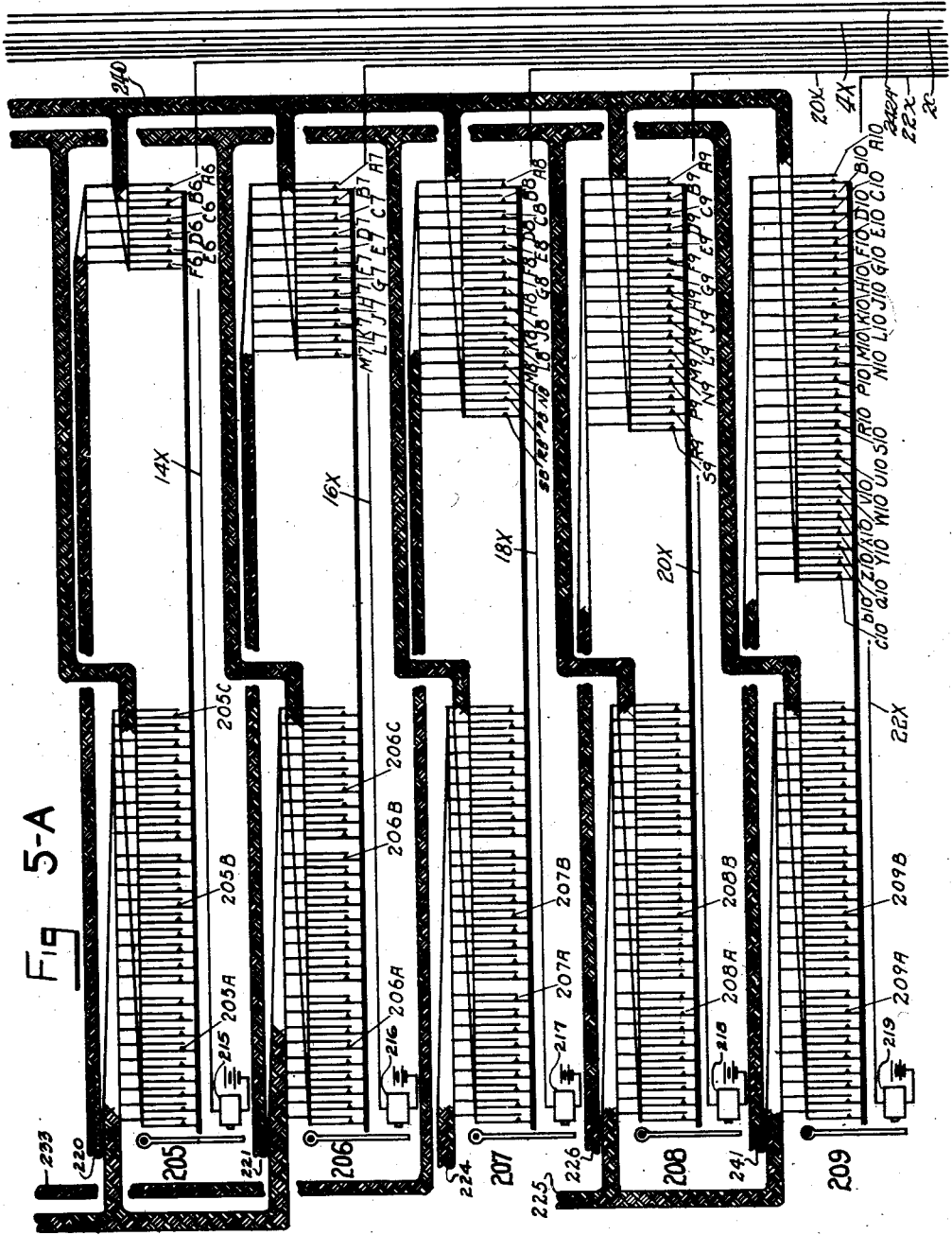

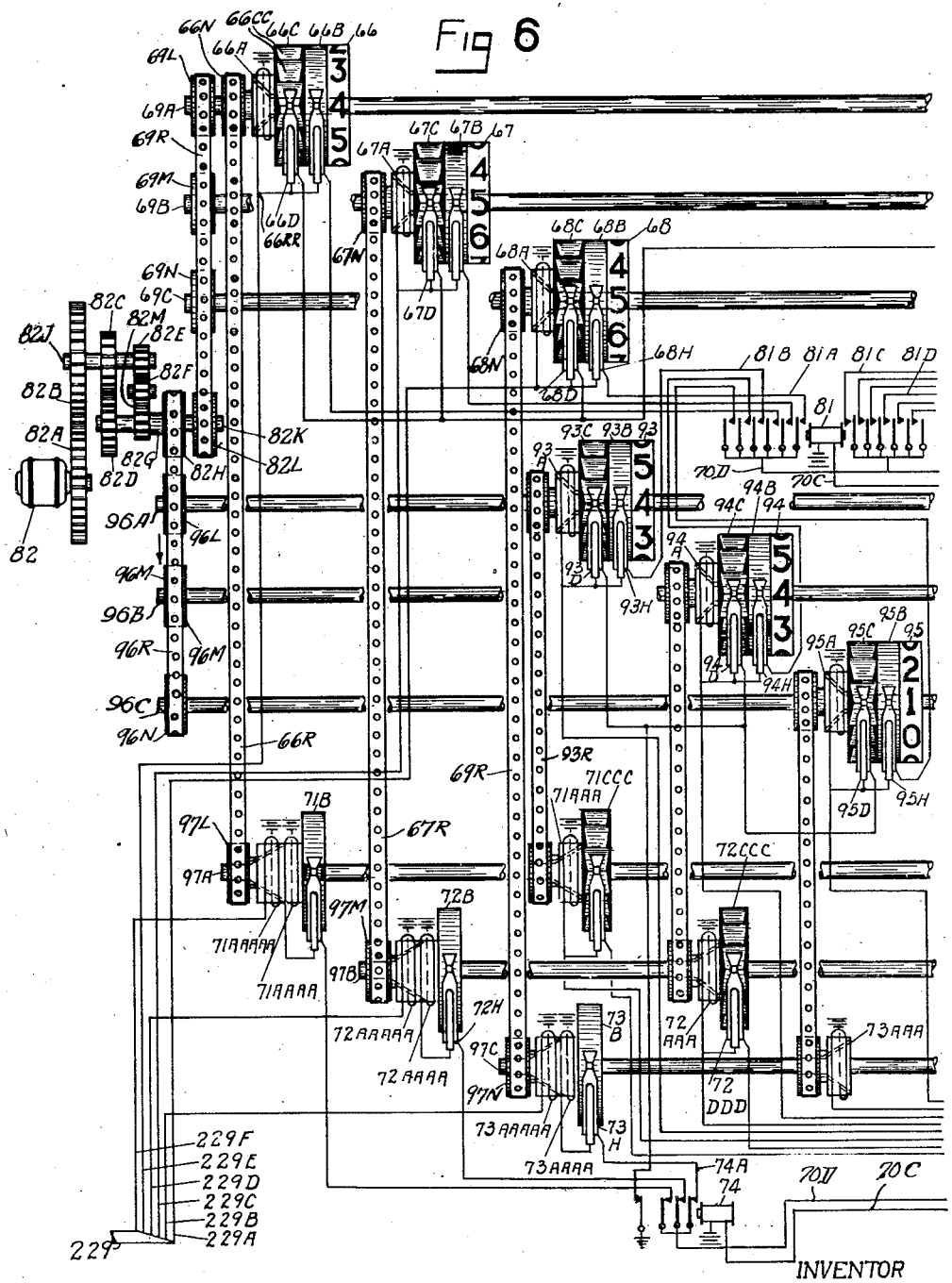

Oct. 24, 1939.   C. SMITH   2,176,930
CALCULATING AND ACCOUNTING MACHINE
Filed Sept. 18, 1931   63 Sheets-Sheet 10

INVENTOR.
Clyde Smith

Oct. 24, 1939.   C. SMITH   2,176,930
CALCULATING AND ACCOUNTING MACHINE
Filed Sept. 18, 1931   63 Sheets-Sheet 11
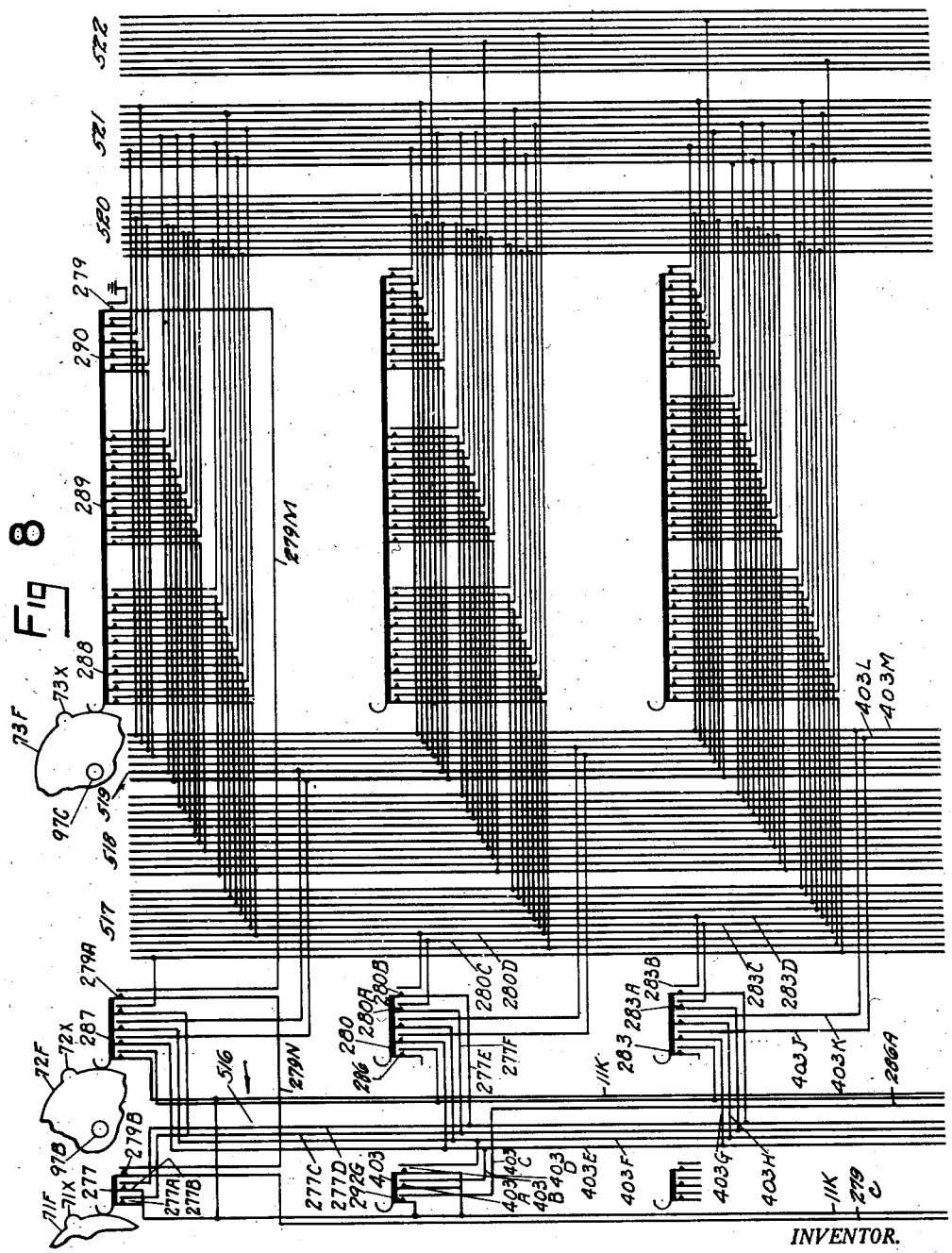
INVENTOR.
Clyde Smith Oct. 24, 1939.  C. SMITH  2,176,930
CALCULATING AND ACCOUNTING MACHINE
Filed Sept. 18, 1931    63 Sheets-Sheet 12

INVENTOR.
Clyde Smith

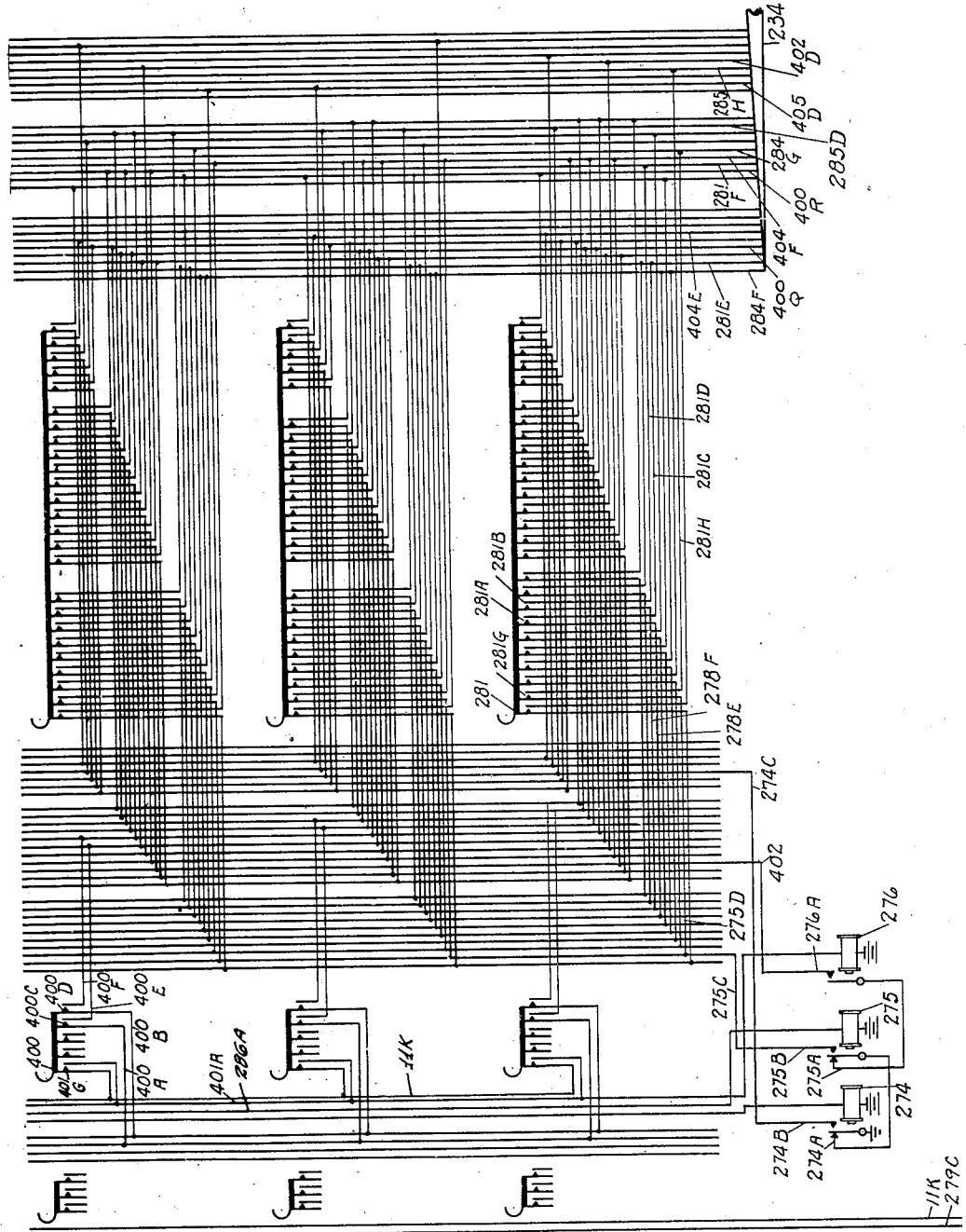

Oct. 24, 1939.  C. SMITH  2,176,930
CALCULATING AND ACCOUNTING MACHINE
Filed Sept. 18, 1931  63 Sheets-Sheet 14

INVENTOR.
Clyde Smith

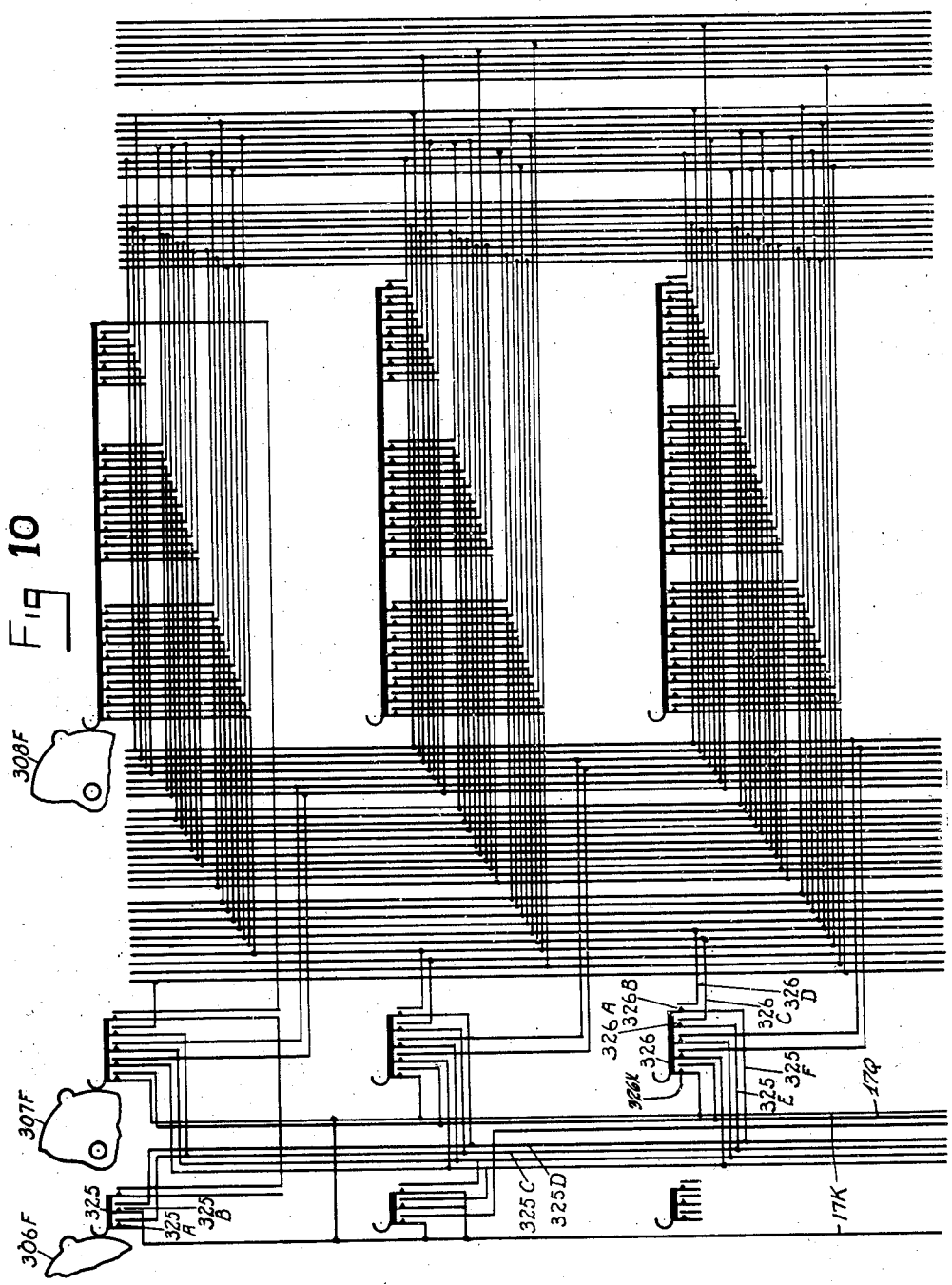

Oct. 24, 1939.  C. SMITH  2,176,930
CALCULATING AND ACCOUNTING MACHINE
Filed Sept. 18, 1931  63 Sheets-Sheet 16

INVENTOR
Clyde Smith

Oct. 24, 1939.  C. SMITH  2,176,930
CALCULATING AND ACCOUNTING MACHINE
Filed Sept. 18, 1931  63 Sheets-Sheet 17

INVENTOR
Clyde Smith

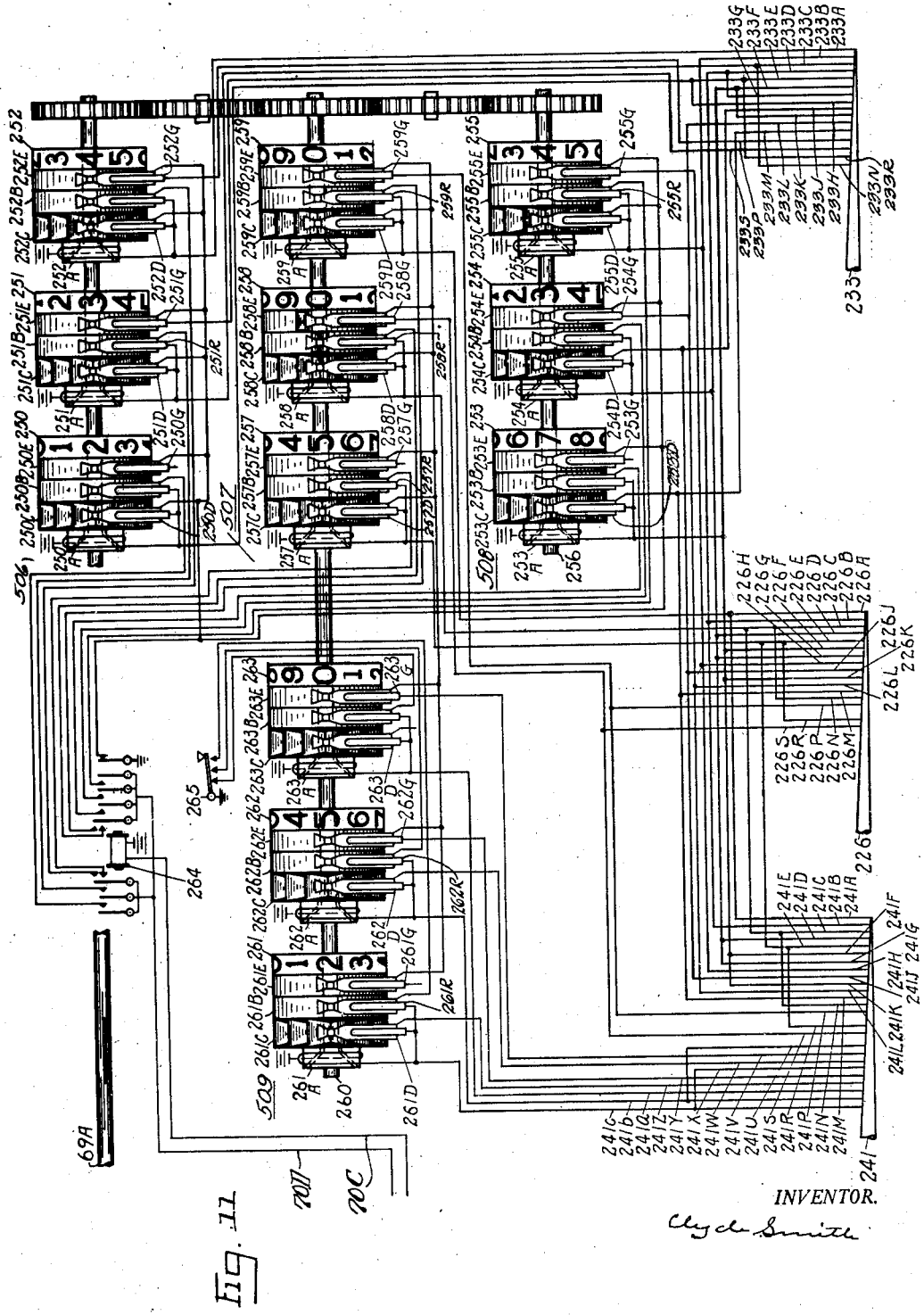

Oct. 24, 1939.  C. SMITH  2,176,930
CALCULATING AND ACCOUNTING MACHINE
Filed Sept. 18, 1931  63 Sheets-Sheet 19
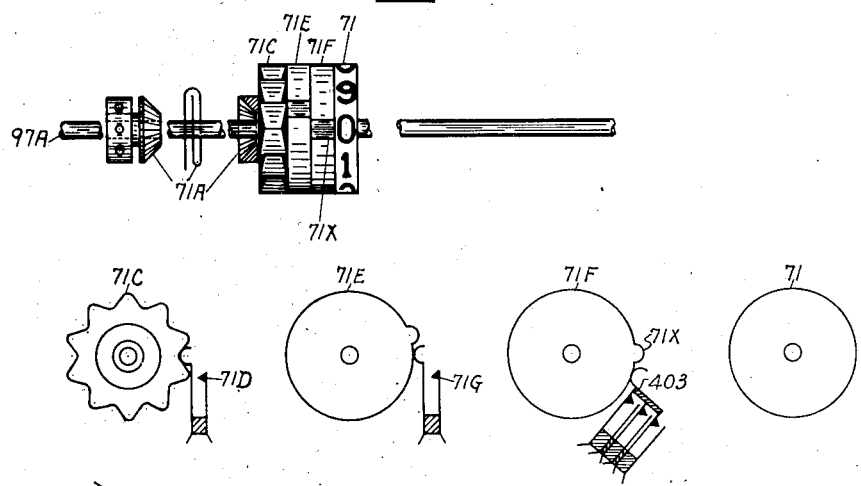
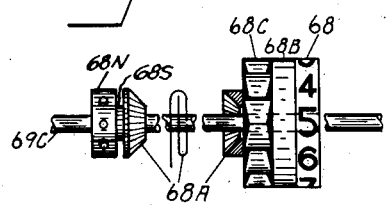
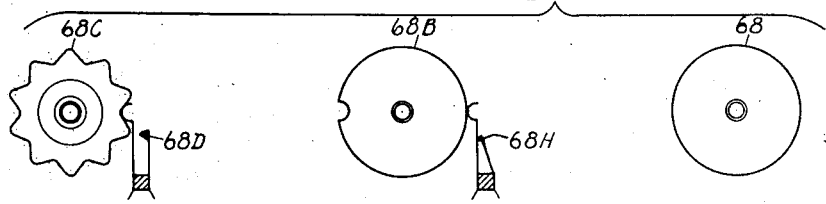
INVENTOR
Clyde Smith Oct. 24, 1939.  C. SMITH  2,176,930

CALCULATING AND ACCOUNTING MACHINE

Filed Sept. 18, 1931   63 Sheets-Sheet 20

INVENTOR.

Oct. 24, 1939.  C. SMITH  2,176,930
CALCULATING AND ACCOUNTING MACHINE
Filed Sept. 18, 1931   63 Sheets-Sheet 21

INVENTOR.
Clyde Smith

Oct. 24, 1939.　　　　　C. SMITH　　　　2,176,930
CALCULATING AND ACCOUNTING MACHINE
Filed Sept. 18, 1931　　63 Sheets-Sheet 24

Inventor:
Clyde Smith
By Belt and Wallace
Attorneys.

Oct. 24, 1939.  C. SMITH  2,176,930
CALCULATING AND ACCOUNTING MACHINE
Filed Sept. 18, 1931    63 Sheets-Sheet 25

Oct. 24, 1939.      C. SMITH      2,176,930
CALCULATING AND ACCOUNTING MACHINE
Filed Sept. 18, 1931      63 Sheets-Sheet 26

Fig. 21.

INVENTOR
Clyde Smith
BY Belt and Wallace
ATTORNEYS

Oct. 24, 1939.         C. SMITH         2,176,930
CALCULATING AND ACCOUNTING MACHINE
Filed Sept. 18, 1931      63 Sheets-Sheet 28

INVENTOR
Clyde Smith
BY Belt & Wallace
ATTORNEYS

Oct. 24, 1939.          C. SMITH                    2,176,930
                CALCULATING AND ACCOUNTING MACHINE
                Filed Sept. 18, 1931      63 Sheets-Sheet 29

INVENTOR
Clyde Smith
BY Belt and Wallace
ATTORNEYS

Oct. 24, 1939.　　　　C. SMITH　　　　2,176,930
CALCULATING AND ACCOUNTING MACHINE
Filed Sept. 18, 1931　　63 Sheets-Sheet 30

INVENTOR
Clyde Smith
BY Belt and Wallace
ATTORNEYS

Oct. 24, 1939.　　　　C. SMITH　　　　2,176,930
CALCULATING AND ACCOUNTING MACHINE
Filed Sept. 18, 1931　　　63 Sheets-Sheet 31

INVENTOR
Clyde Smith
BY
Belt and Wallace
ATTORNEYS

Oct. 24, 1939.                    C. SMITH                    2,176,930
                    CALCULATING AND ACCOUNTING MACHINE
                    Filed Sept. 18, 1931    63 Sheets—Sheet 32

INVENTOR
Clyde Smith
BY Belt and Wallace
ATTORNEYS

Oct. 24, 1939.  C. SMITH  2,176,930
CALCULATING AND ACCOUNTING MACHINE
Filed Sept. 18, 1931   63 Sheets-Sheet 34

INVENTOR
Clyde Smith
BY Belt and Wallace
ATTORNEYS

Oct. 24, 1939.    C. SMITH    2,176,930
CALCULATING AND ACCOUNTING MACHINE
Filed Sept. 18, 1931    63 Sheets-Sheet 35

INVENTOR
Clyde Smith
BY Belt and Wallace
ATTORNEYS

Oct. 24, 1939.  C. SMITH  2,176,930
CALCULATING AND ACCOUNTING MACHINE
Filed Sept. 18, 1931   63 Sheets-Sheet 37

INVENTOR
Clyde Smith
BY Belt & Wallace
ATTORNEYS

Oct. 24, 1939.　　　　C. SMITH　　　　2,176,930
CALCULATING AND ACCOUNTING MACHINE
Filed Sept. 18, 1931　　　63 Sheets-Sheet 38

INVENTOR
Clyde Smith
BY Belt and Wallace
ATTORNEYS

Oct. 24, 1939.   C. SMITH.   2,176,930
CALCULATING AND ACCOUNTING MACHINE
Filed Sept. 18, 1931   63 Sheets-Sheet 39

INVENTOR
Clyde Smith
BY Belt & Wallace
ATTORNEYS

Oct. 24, 1939.    C. SMITH    2,176,930

CALCULATING AND ACCOUNTING MACHINE

Filed Sept. 18, 1931    63 Sheets-Sheet 40

INVENTOR
Clyde Smith
BY Belt and Wallace
ATTORNEYS

Oct. 24, 1939.    C. SMITH    2,176,930
CALCULATING AND ACCOUNTING MACHINE
Filed Sept. 18, 1931    63 Sheets-Sheet 43

INVENTOR
Clyde Smith
BY Belt and Wallace
ATTORNEYS

Oct. 24, 1939.   C. SMITH   2,176,930
CALCULATING AND ACCOUNTING MACHINE
Filed Sept. 18, 1931    63 Sheets-Sheet 44

INVENTOR
Clyde Smith
BY
Belt and Wallace
ATTORNEYS

Oct. 24, 1939.  C. SMITH  2,176,930
CALCULATING AND ACCOUNTING MACHINE
Filed Sept. 18, 1931   63 Sheets-Sheet 47

INVENTOR
Clyde Smith
BY Belt & Wallace
ATTORNEYS

Oct. 24, 1939.　　　　　　C. SMITH　　　　　　2,176,930

CALCULATING AND ACCOUNTING MACHINE

Filed Sept. 18, 1931　　　63 Sheets-Sheet 48

INVENTOR
Clyde Smith
BY Belt and Wallace
ATTORNEYS

Oct. 24, 1939.   C. SMITH   2,176,930
CALCULATING AND ACCOUNTING MACHINE
Filed Sept. 18, 1931   63 Sheets-Sheet 49

INVENTOR
Clyde Smith
BY Belt and Wallace
ATTORNEYS

Oct. 24, 1939.                C. SMITH                2,176,930
            CALCULATING AND ACCOUNTING MACHINE
                   Filed Sept. 18, 1931      63 Sheets-Sheet 50

INVENTOR
Clyde Smith
BY Belt and Wallace
ATTORNEYS

Oct. 24, 1939.    C. SMITH    2,176,930
CALCULATING AND ACCOUNTING MACHINE
Filed Sept. 18, 1931    63 Sheets-Sheet 52

INVENTOR
Clyde Smith
BY Belt and Wallace
ATTORNEYS

Oct. 24, 1939.  C. SMITH  2,176,930
CALCULATING AND ACCOUNTING MACHINE
Filed Sept. 18, 1931  63 Sheets-Sheet 53

INVENTOR
Clyde Smith
BY Belt and Wallace
ATTORNEYS

Oct. 24, 1939.  C. SMITH  2,176,930
CALCULATING AND ACCOUNTING MACHINE
Filed Sept. 18, 1931   63 Sheets-Sheet 54

INVENTOR
Clyde Smith
BY Belt and Wallace
ATTORNEYS

Oct. 24, 1939.  C. SMITH  2,176,930
CALCULATING AND ACCOUNTING MACHINE
Filed Sept. 18, 1931    63 Sheets-Sheet 55

INVENTOR
Clyde Smith
BY Belt and Wallace
ATTORNEYS

Oct. 24, 1939. C. SMITH 2,176,930
CALCULATING AND ACCOUNTING MACHINE
Filed Sept. 18, 1931 63 Sheets-Sheet 56

INVENTOR
Clyde Smith
BY Belt and Wallace
ATTORNEYS

Oct. 24, 1939.   C. SMITH   2,176,930
CALCULATING AND ACCOUNTING MACHINE
Filed Sept. 18, 1931   63 Sheets-Sheet 58

INVENTOR
Clyde Smith
BY Belt and Wallace
ATTORNEYS

Oct. 24, 1939.   C. SMITH   2,176,930
CALCULATING AND ACCOUNTING MACHINE
Filed Sept. 18, 1931   63 Sheets-Sheet 59

INVENTOR
Clyde Smith
BY Belt and Wallace
ATTORNEYS

Oct. 24, 1939.                C. SMITH                 2,176,930
              CALCULATING AND ACCOUNTING MACHINE
                  Filed Sept. 18, 1931     63 Sheets-Sheet 60

INVENTOR
Clyde Smith
BY Belt and Wallace
ATTORNEYS

Oct. 24, 1939. C. SMITH 2,176,930
CALCULATING AND ACCOUNTING MACHINE
Filed Sept. 18, 1931 63 Sheets-Sheet 63

INVENTOR
Clyde Smith
BY Belt and Wallace
ATTORNEYS

Patented Oct. 24, 1939

2,176,930

UNITED STATES PATENT OFFICE 2,176,930

CALCULATING AND ACCOUNTING MACHINE

Clyde Smith, near Hopkinsville, Ky., assignor to Addressograph-Multigraph Corporation, Cleveland, Ohio, a corporation of Delaware Application September 18, 1931, Serial No. 563,572

18 Claims. (Cl. 235—61.6)

The objects of the invention are certain improvements in the calculating and accounting machine for which I filed application for patent on March 23, 1928, to which was assigned Serial Number 264,078, and of which this application is a continuation in part, and additional application on May 4, 1931, to which was assigned Serial Number 535,069. The machine described as a whole is for the primary purpose of automatically computing amounts to be billed, with registration of the essential bases of computation, for commodities registered by meter, as gas, electricity, and water, especially under sliding scales of rates, together with occasional additional charges for merchandise and for unpaid accounts. The operations are described as governed by perforated cards and the results are registered on number wheels.

The present specification includes much that is contained in the previous specifications, for the purpose of illustrating the connections of the new mechanisms and circuits with the old, and of illustrating herein a completely operative machine.

An object of the invention is to provide for the computation of a single bill for a customer who has had a change of meter (because of his own moving or of company substitution) within the billing period. Four meter readings will be involved: the last and previous readings of the old meter, and the last and previous readings of the new. Provision is made for registering equipment in duplicate, so that all the meter readings may be set up for simultaneous inspection. Special switching apparatus, controlled by perforations related to the perforations for the readings of the latest meter, sets in operation the extra registering equipment. The two subtractions for the aggregate consumption quantity are effected separately but are accumulated on one register; the amount computed as the charge for such an accumulated quantity will be different (usually less) under many rate schedules from the sum of the charges if computed separately from the quantities consumed through the two meters.

An object of the invention is to provide selective apparatus through which registration may be effected of special amounts chargeable, as for merchandise, in addition to the charge for the metered commodity, and the several charges totaled. It has become an extensive practice for gas and electric companies to sell on installment payments, for household and other use, appliances which increase the consumption of gas or electricity. I have illustrated an instance of a charge of the sort, with perforations for successive months, each to be automatically added to the bill in due turn.

Allied objects of the invention are to provide means for automatically adding to an instant bill the charge or charges of the previous month's bill for such merchandise and/or the charge for the metered commodity if payments are in arrears. The selection for the merchandise charge for the past month may be effective whether there is a charge for this month or not.

With the variations in successive customers' bills, which may or may not include two meters, merchandise, and one or more past-due charges, objects of the invention are to make the switching apparatus fully selective and to make the means governing the sequence of operations fully selective as to the operations to be included without loss of time or idling movements. Such selections are effected through perforations in a card which is given a stationary position in the machine, with any of its (normally) twelve divisions selectable as relating to any calendar month or to an extra meter.

It is an object of the invention to arrange relays governing the sequence of operations so that those which are regularly operative are energized for every bill, while those that may or may not be required are selected for energization for each bill through special card perforations. Specially selected operations of the kind may be interposed between regular operations.

It is an object of the invention to provide means for the totalization, for a run of bills, say through a day or month, of a selected class of figures as may or may not be included in particular bills. Illustrated herein for a single class, like means in adequate plurality would provide complete analysis of the run of bills according to the various charges as accumulated on totalizing registers.

It is an object of the invention to make all selections for operations through card perforations, letting the cards run as they may come, without previous sorting.

It is an object of the invention also to provide means for the registration of the due charge for each possible consumption quantity within the capacity of the machine directly from the position taken by the wheels registering the consumption quantity. Circuits are illustrated herein for this purpose and are based on a sliding scale of rates in three steps.

The various objects of the invention are effected by the mechanisms and circuits illustrated in the accompanying drawings.

Figure 1 shows the contact bars and associated fingers, between which are placed cards effecting physical contacts at once through all numerically and selectively positioned perforations.

At 500, 501, 502, 503, are four sets each of three meter reading bars accompanied by three selector bars. Through the latter and the switches of Figure 1A, selections may be made for applying the meter reading of any bar as the last or previous for any month, and for so applying four readings representative of two meters used within a month, and/or so applying three readings in such wise as to bring forward for the present bill the overdue charges of the past month.

At 504 are merchandise classification bars for five items for four months, two bars for each month.

At 505 is one set of merchandise money bars for a month's charge for one article or class. Through the bars at 504 and 505 selections may be made of amounts to be charged regularly in predetermined months, and also of an amount to be brought forward from a month past.

Figures 2 and 2A show the sequence relays, which according to preselection through card perforations govern in immediate succession the complete or abridged sequence of operations.

Figure 3:
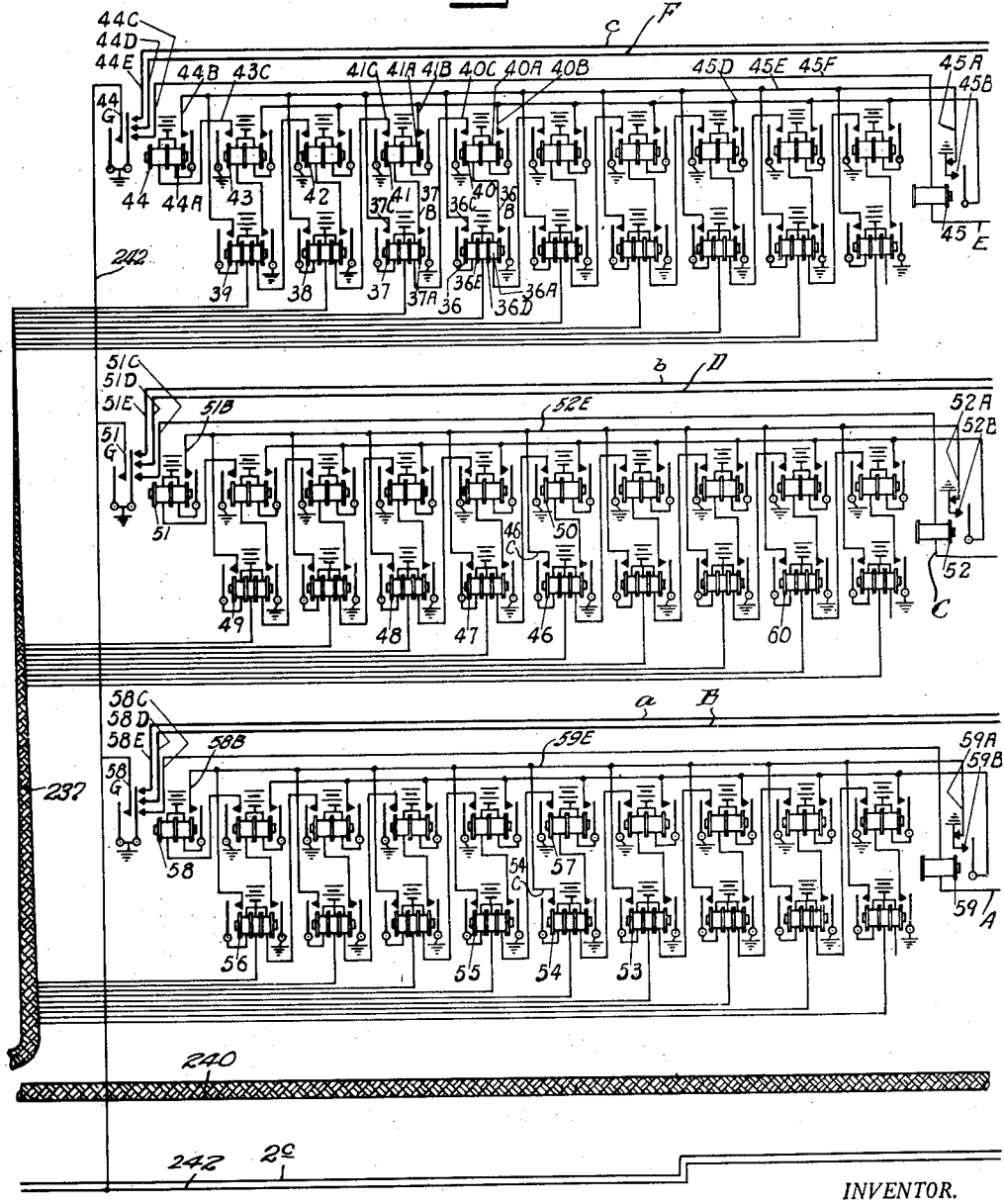

Figure 3 shows the three groups of counting relays, for hundreds, tens, and units, and their associated stepping relays. According to the numerical selection of counting relays by effective contact fingers or numerical contact-closing wheels, these three groups of counting relays operate in combination with their stepping relays to position them in full or several sets of number wheel registers and with them certain subtractive and totalizing registers.

Figure 4 shows three sets of carry-over relays, effective for tens and hundreds number wheels in six sets of registers on which carry-overs may be required.

Figures 5 and 5A show ten shift relays, which serve for connecting the contact fingers to counting relays and carry-over relays to complete operating circuits to the members of sundry registers.

Figure 6 is a plan view of two meter reading registers, respectively for the present month's last and previous readings of a single meter or the last and previous readings of a new meter for a customer within the month; also zero-setting and carry-over shunting wheels of the associated consumption quantity register for the present month.

Figure 7:
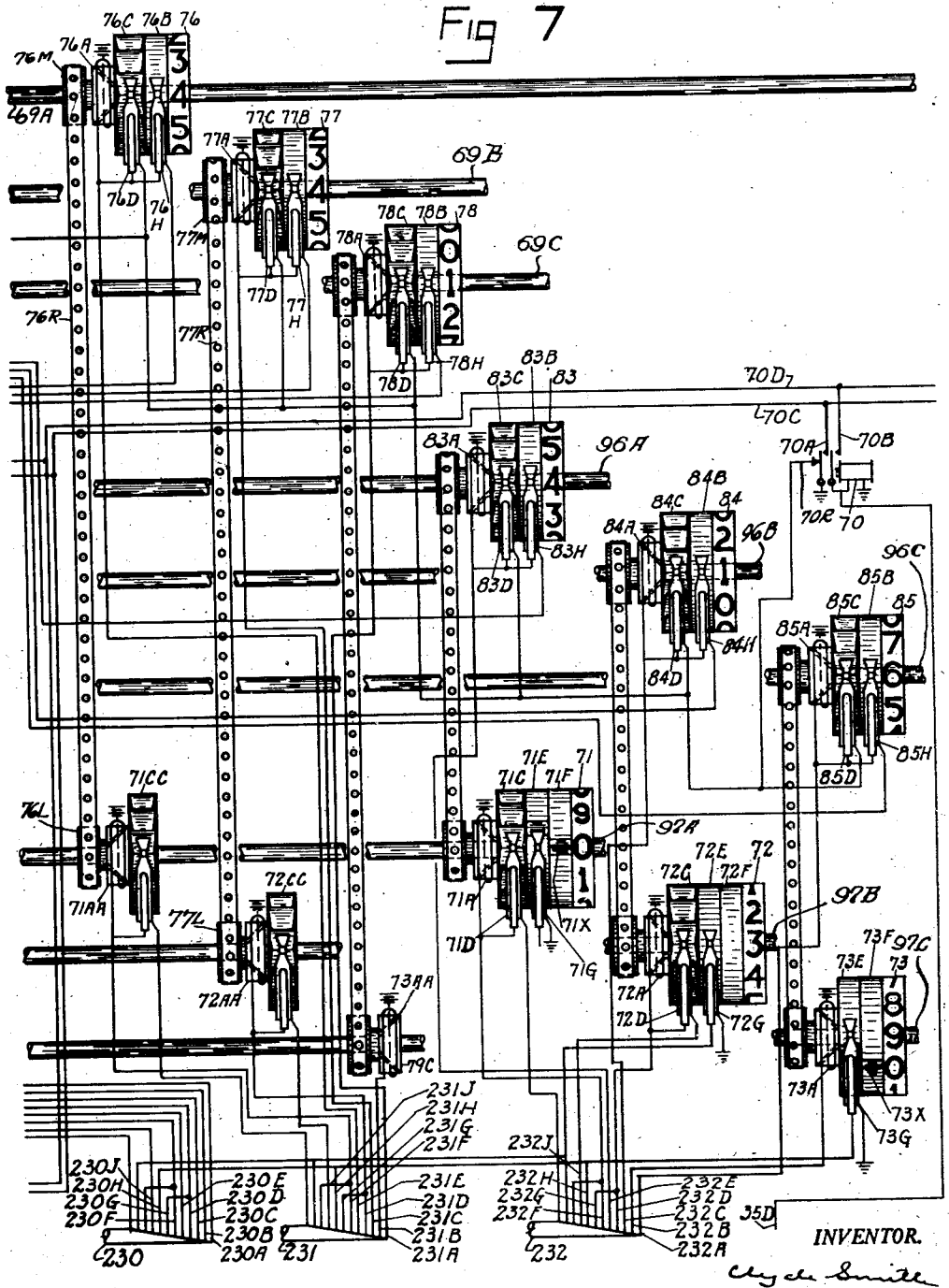

Figure 7 is a plan view of like meter reading registers, respectively for the present month's last and previous readings of a meter superseded for a customer within the month; also number and contact-closing wheels and other members of the associated consumption quantity register. The latter may accumulate the two quantities of consumption registered on two meters, as the basis for a single charge.

Figure 8A:
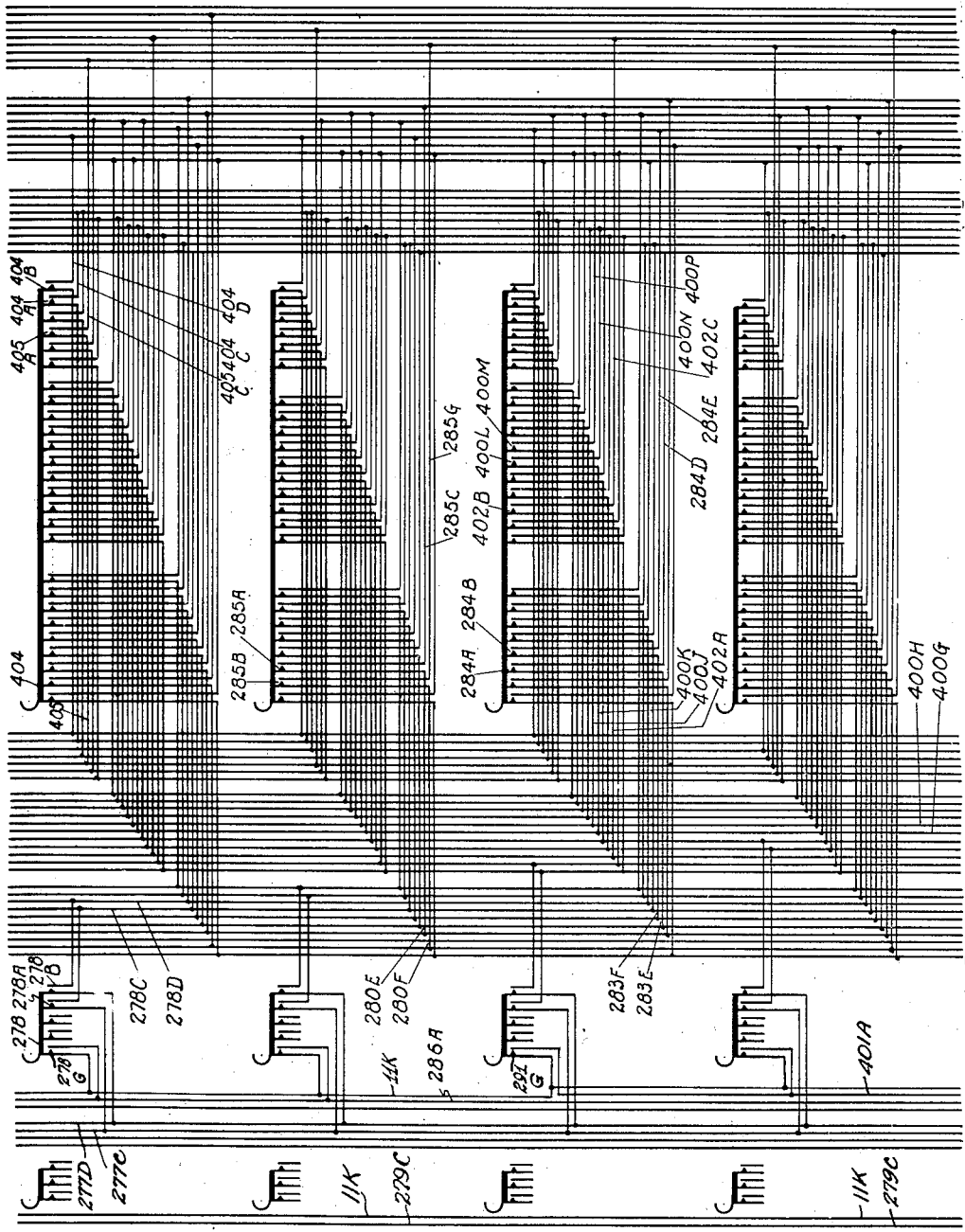

Figures 8, 8A, 8B show the arrangement of contacts and conductors through which the "break-down" money charge due under a particular sliding scale of rates for any numerical position taken by the consumption quantity wheels of Figure 7 is registered upon money wheels through the medium of counting relays.

Figure 9:
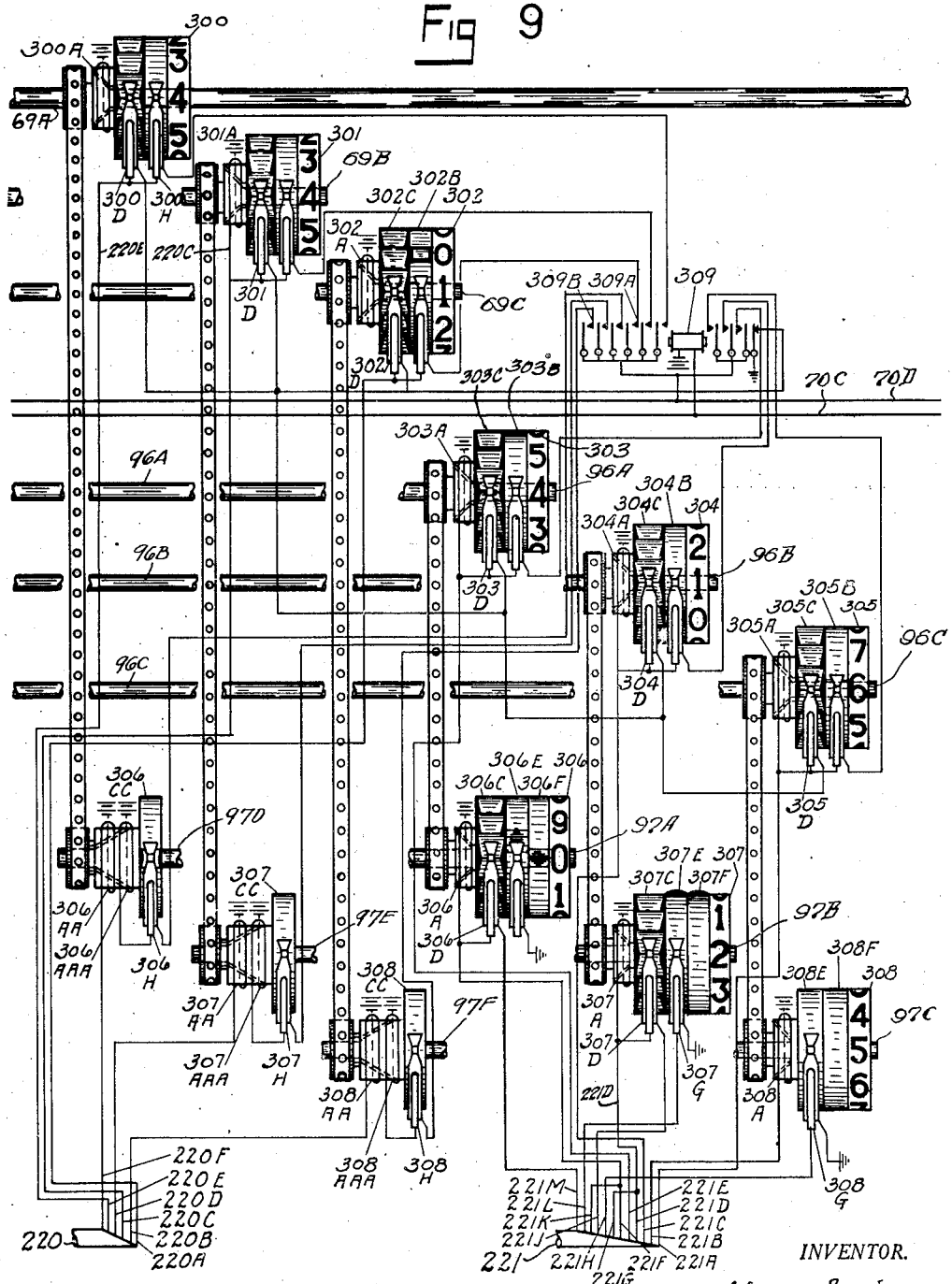

Figure 9 shows two meter reading registers, respectively for the past month's last and previous readings of a customer's regular meter, together with the consumption quantity wheels on which the difference between these readings is registered. From this consumption quantity, the charge must be determined independently of that for the present month.

Figure 10A:
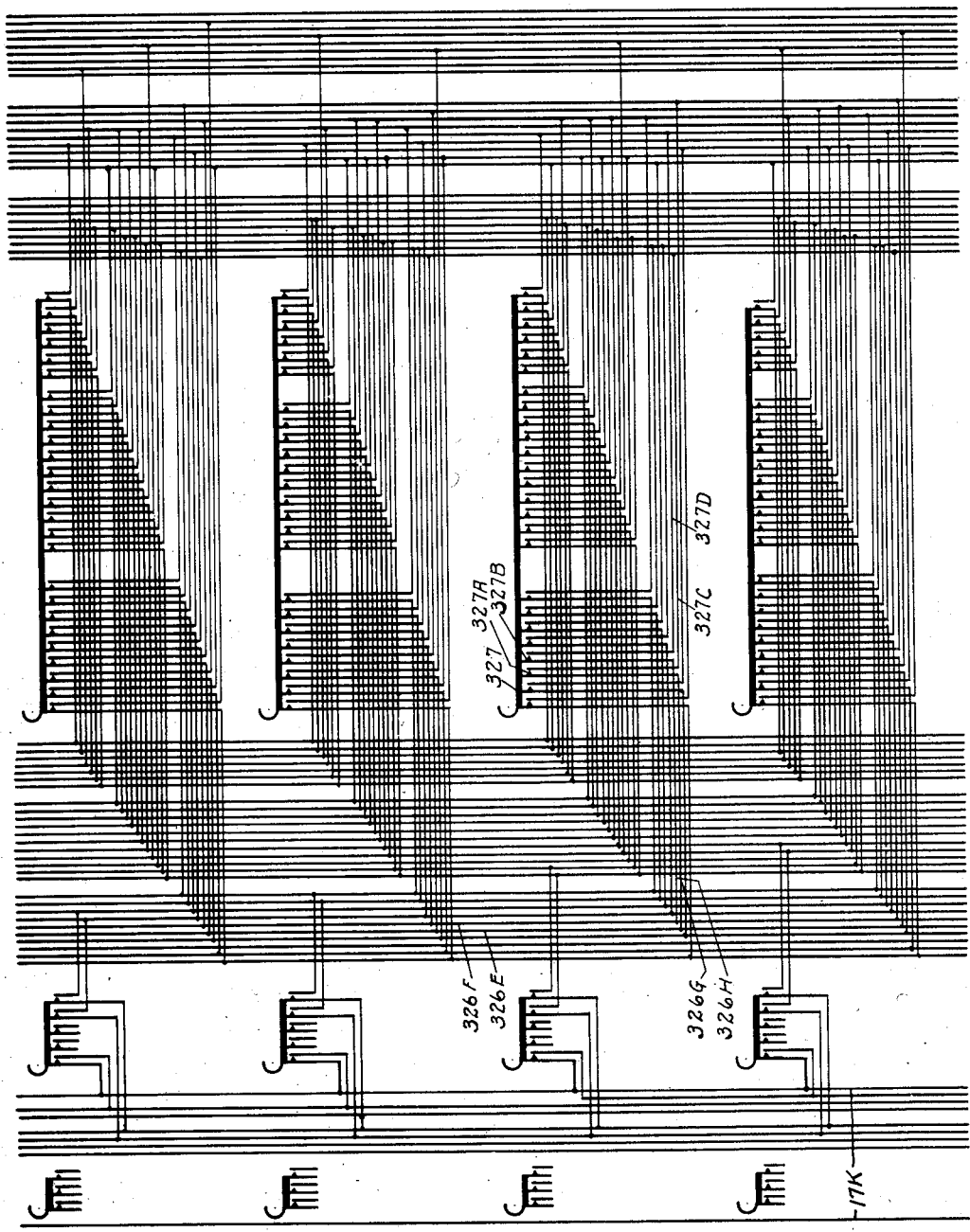
Figure 10B:
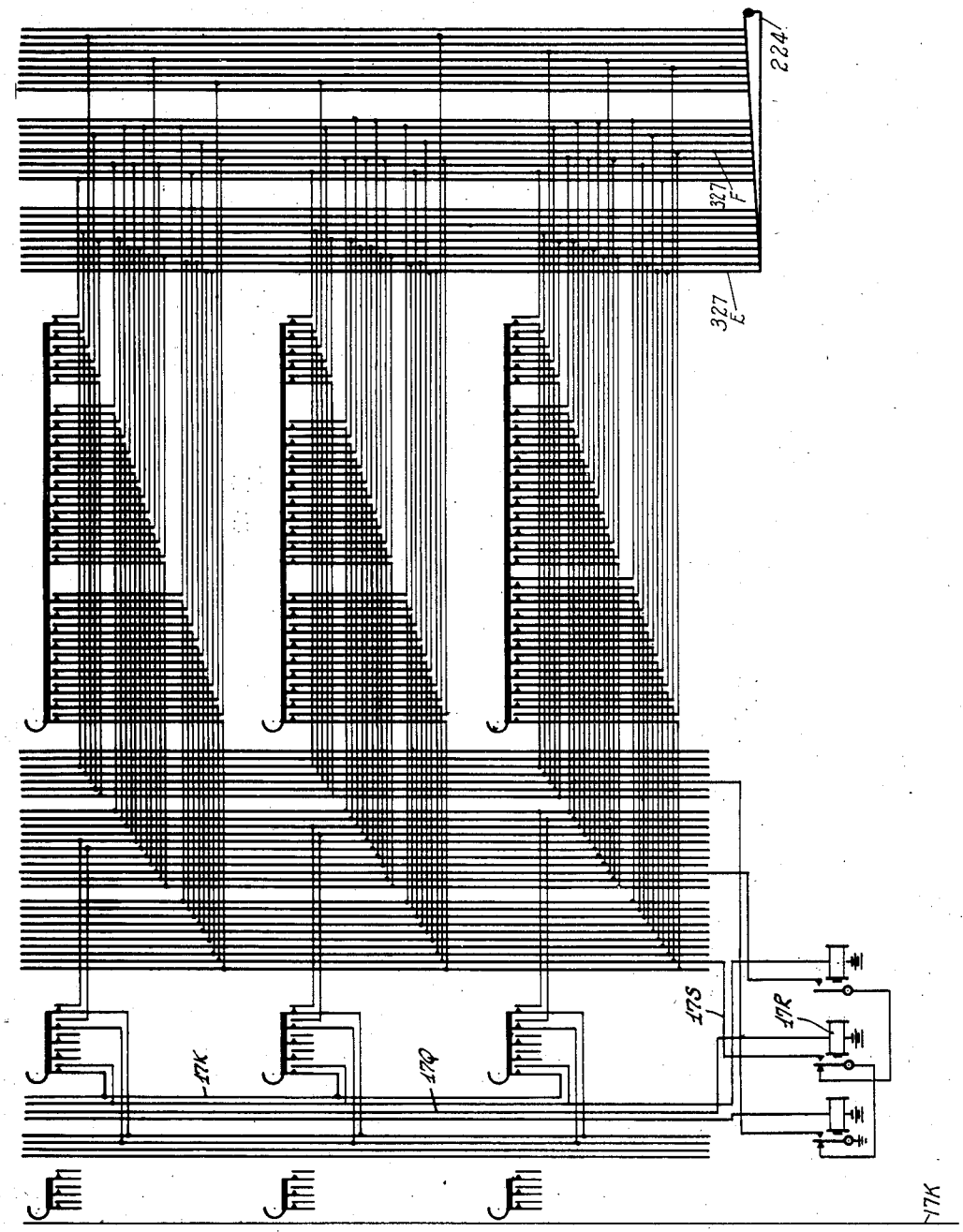

Figures 10, 10A, 10B, show an arrangement of circuits identical with that of Figures 8, 8A, 8B, but in operating connection with the consumption quantity register of Figure 9.

Figure 11 is a plan view of four money registers:

At 506, for registering the consumption charge, or accumulating a plurality of such charges—operated from counting relays set up by the circuits of Figures 8, 8A, 8B, and 10, 10A, 10B.

At 507, for registering the merchandise charge, or accumulating a plurality of such charges—operated from counting relays set up by bars as at 505 selected from bars as at 504 of Figure 1.

At 508, for accumulating for the billings of a day or month such charges as may be for merchandise in arrears—operated selectively, in connection with the wheels at 507—and illustrative of selective classified totalizing.

At 509, for totalizing the several charges for a given bill—operated always with the wheels at 506 and 507.

Figure 12 is an elevational view of a typical consumption register wheel assembly showing the parts separated.

Figure 12A is an exploded side elevational view of the wheels of the wheel assembly shown in Figure 12.

Figure 16:
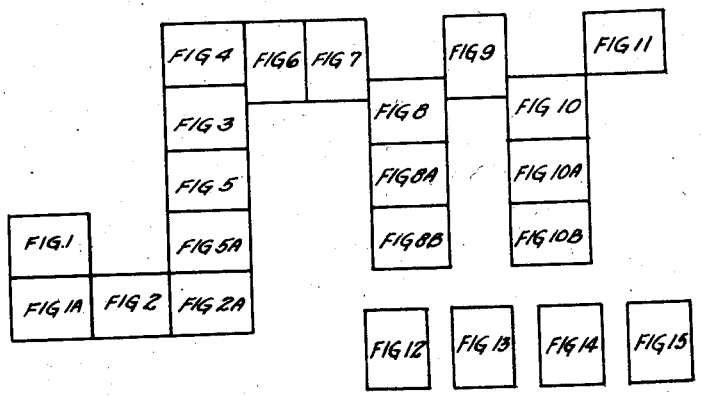

Figure 12B is a view similar to Figure 16 and showing a typical meter reading wheel assembly.

Figure 12C is a view similar to Figure 12A of the wheel shown in Figure 12B.

Figure 13:
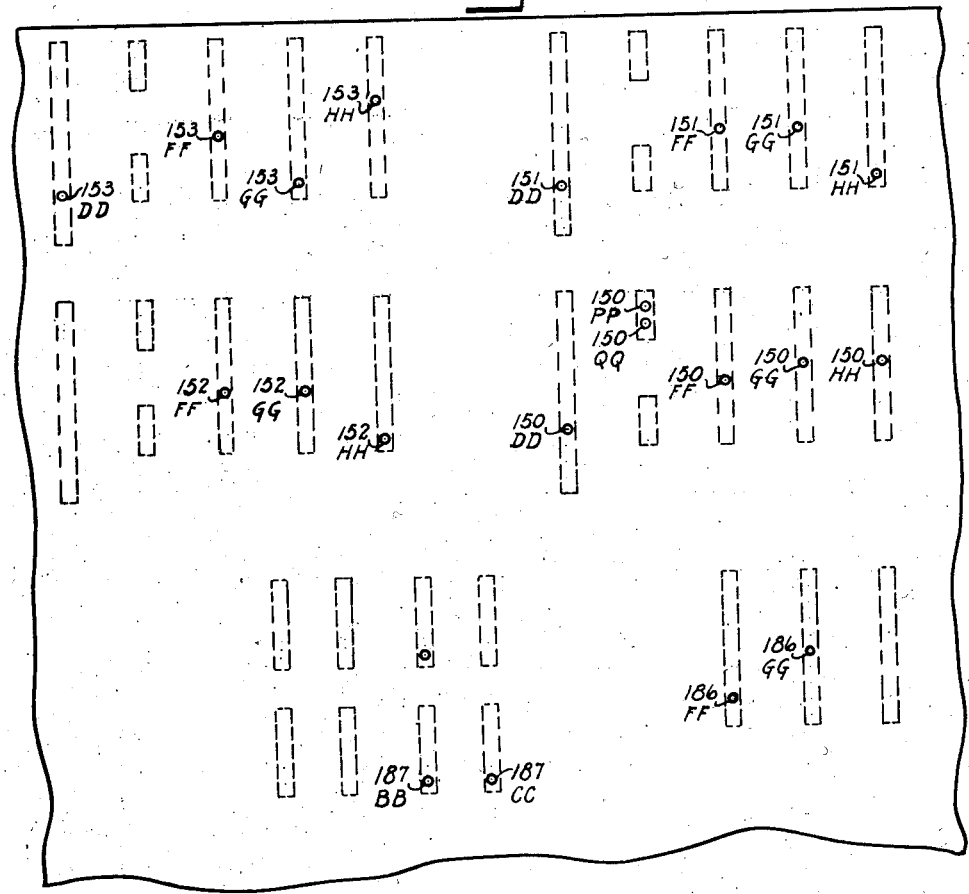

Figure 13 shows a card with perforations positioned according to the first example of operation to be described below—with two meters and present and preceding months' installment charges for merchandise.

Figure 14:
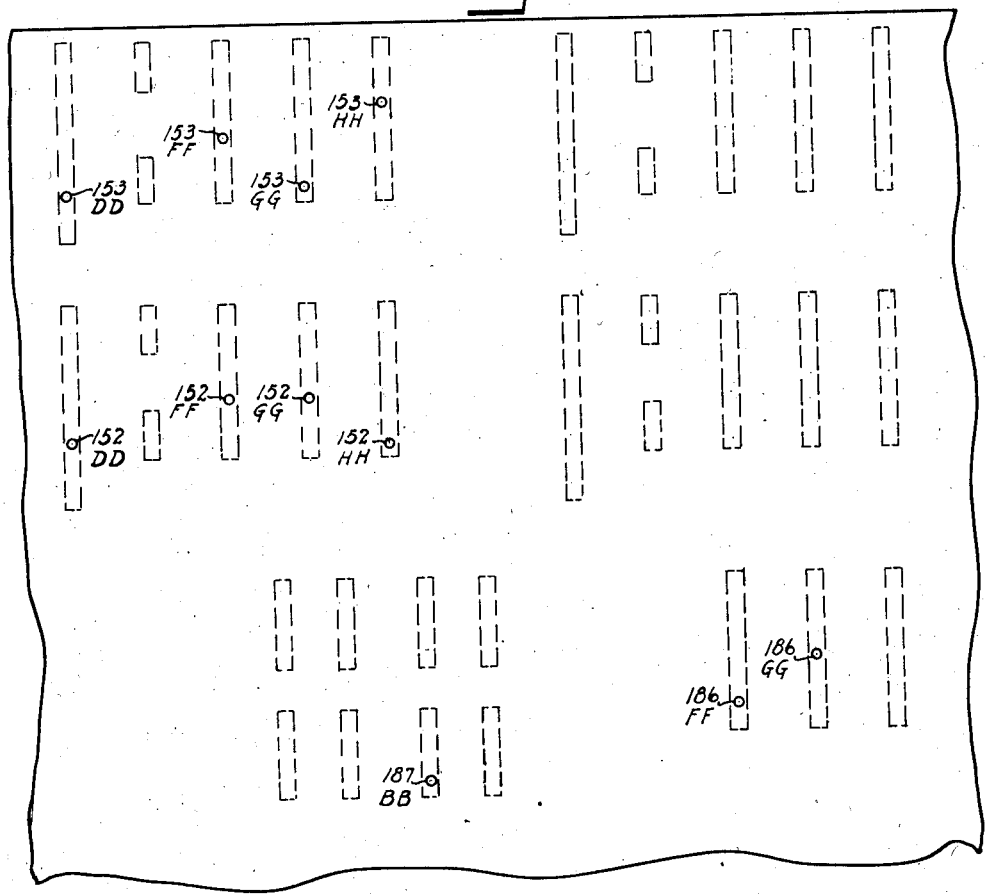

Figure 14 shows a card with perforations positioned according to the second example of operation to be described below—with one meter and one merchandise charge.

Figure 15:
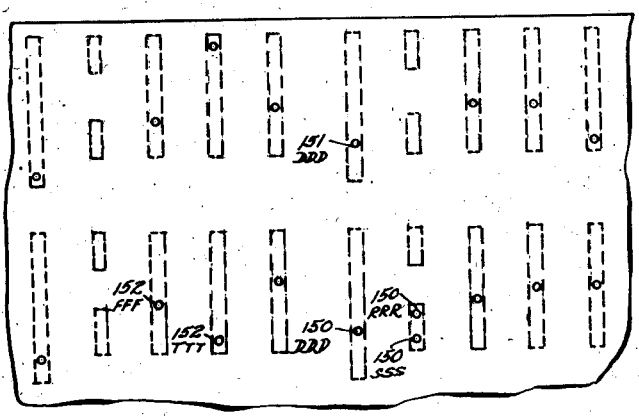

Figure 15 shows a card with perforations positioned according to the third example of operation to be described below—with one meter and present and past months' charges for electricity only.

Figure 16 is a schematic diagram showing the manner in which the several sheets of drawings should be joined.

Figure 17:
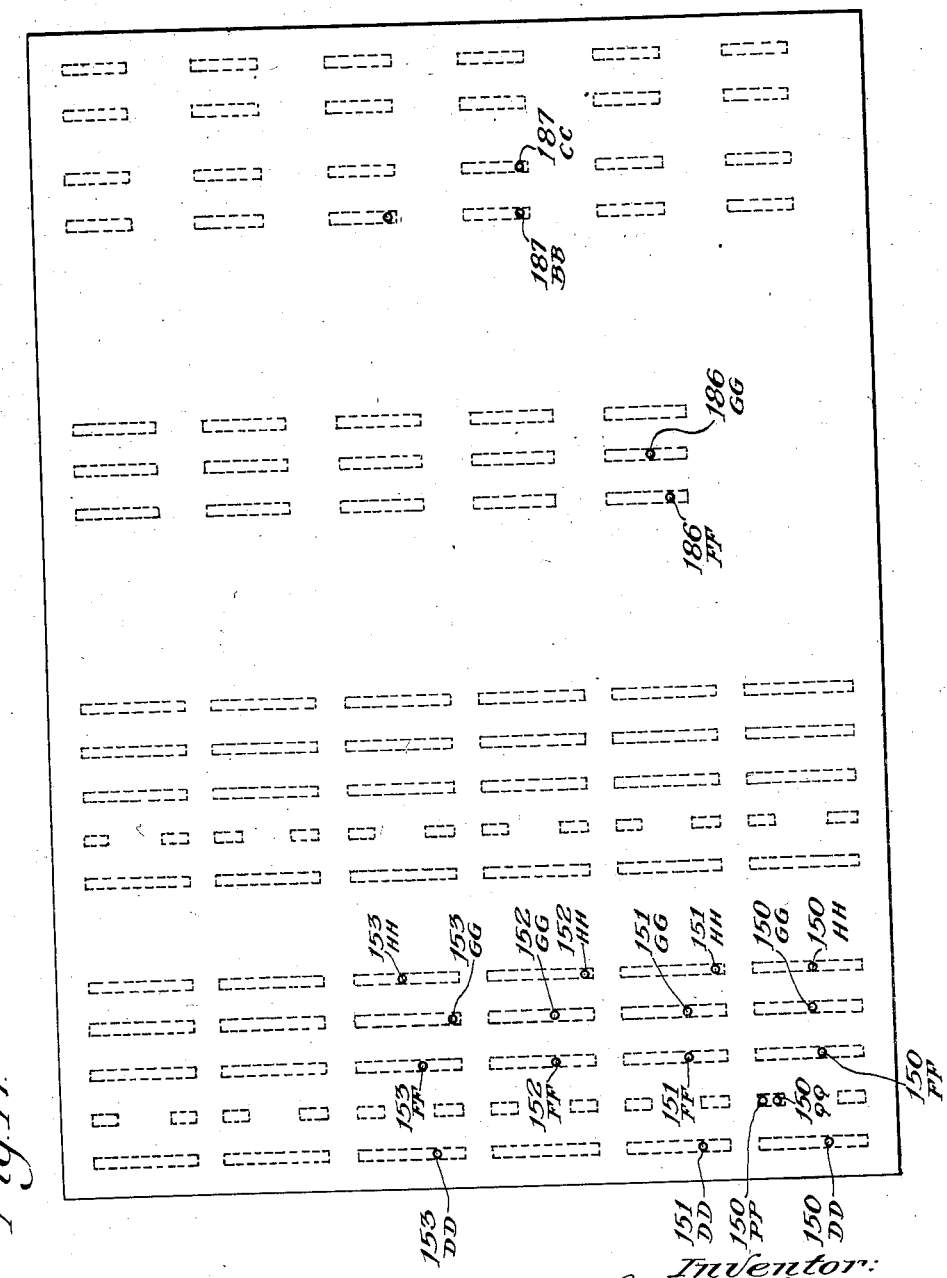

Figure 17 is an elevational view of a card as it would be actually arranged for use in this machine and wherein the arrangement of the various sets of bars is depicted by the showing of these bars in broken lines.

Figure 18:
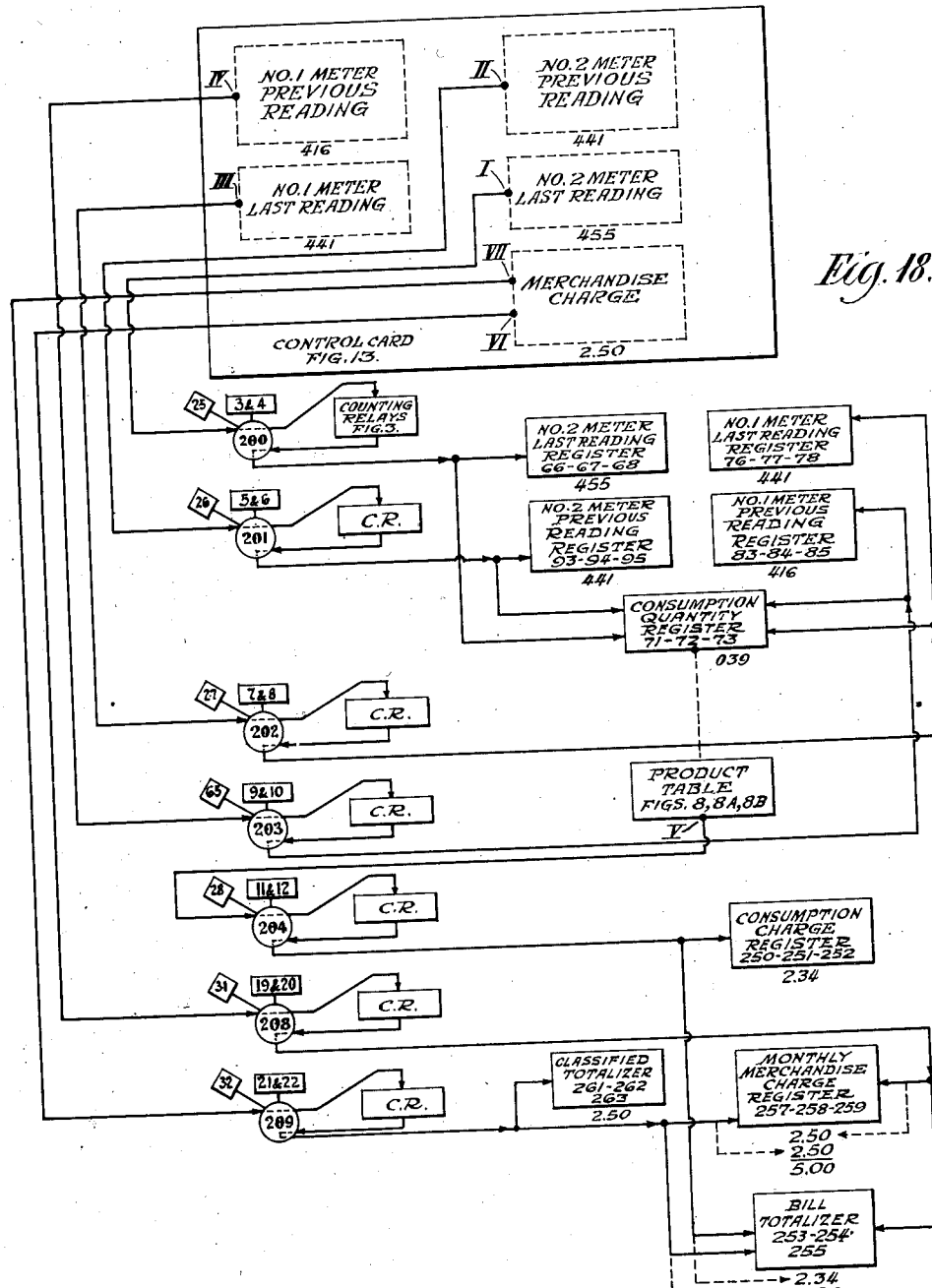

Figure 18 is a flow chart schematically illustrating the hereinafter first described typical operation of the machine.

Figure 19:
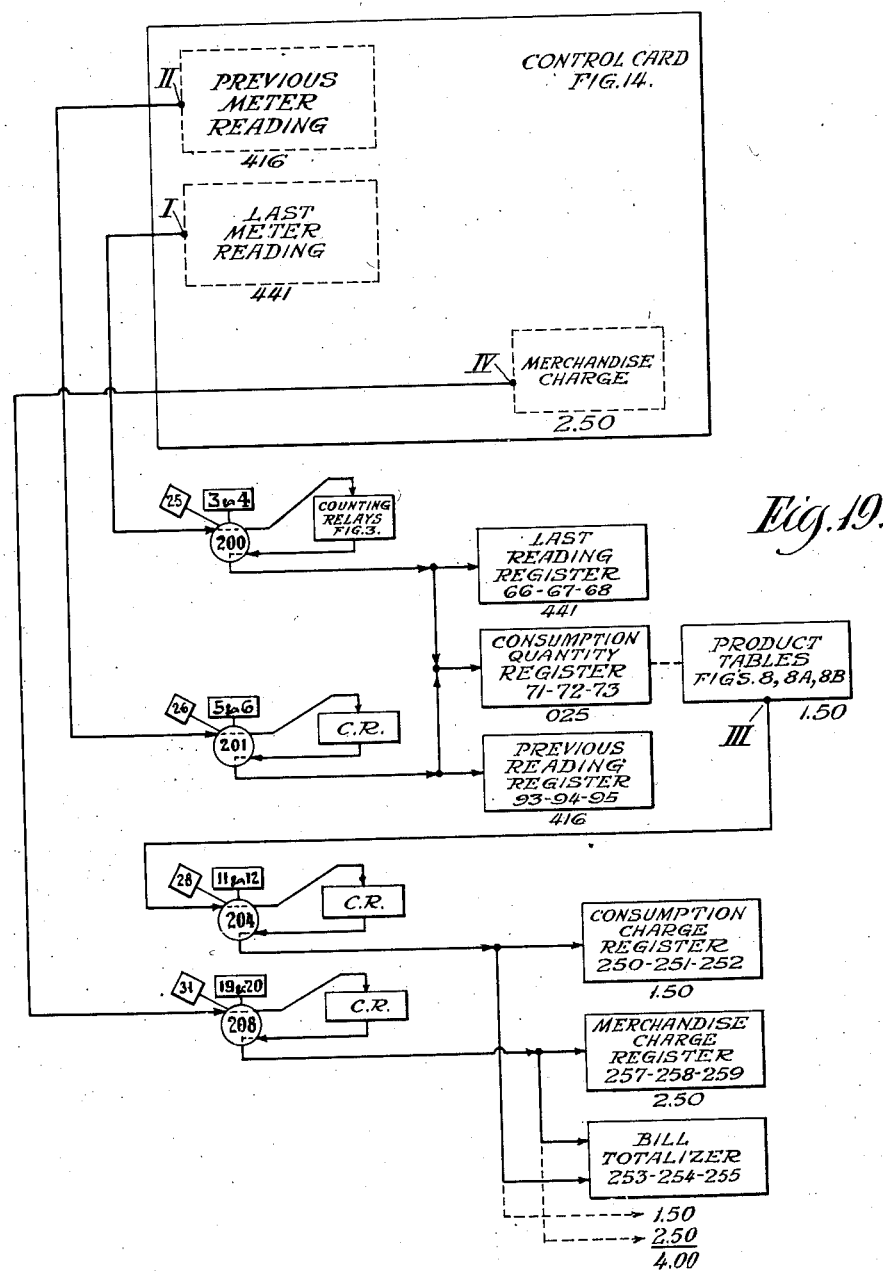

Figure 19 is a view similar to Figure 18 but illustrating the second described typical operation of the machine.

Figure 20:
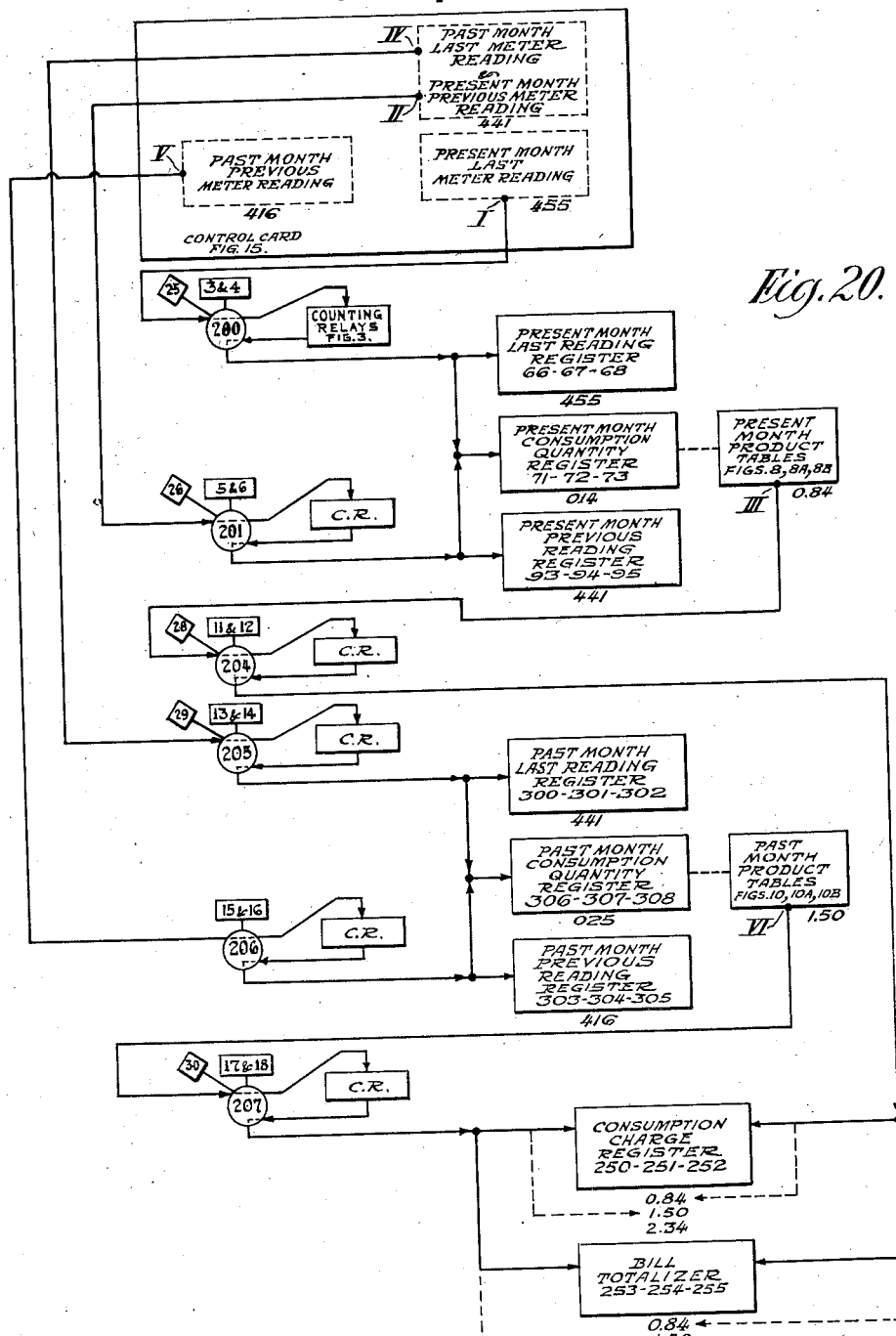
Figure 22:
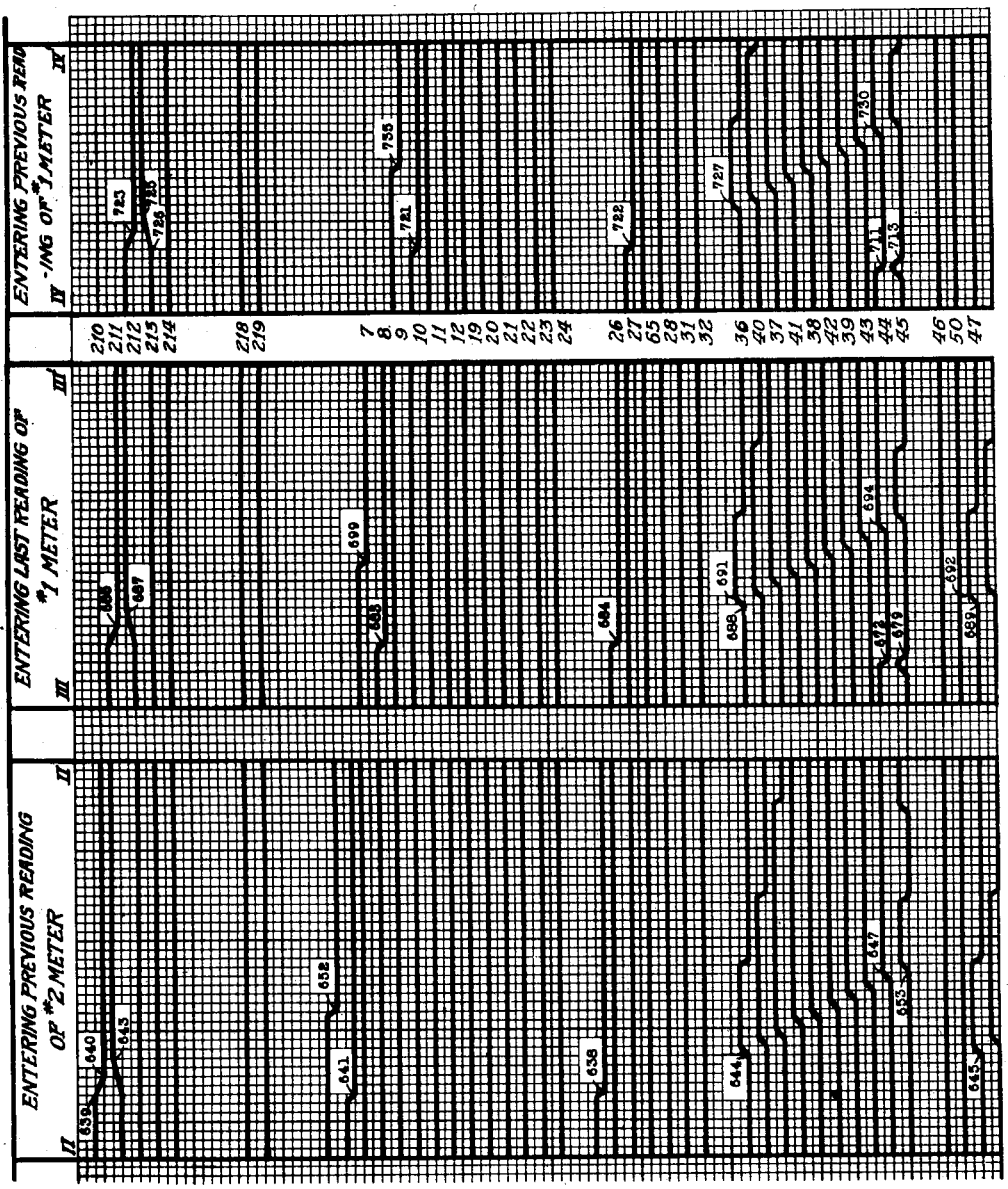
Figure 23:
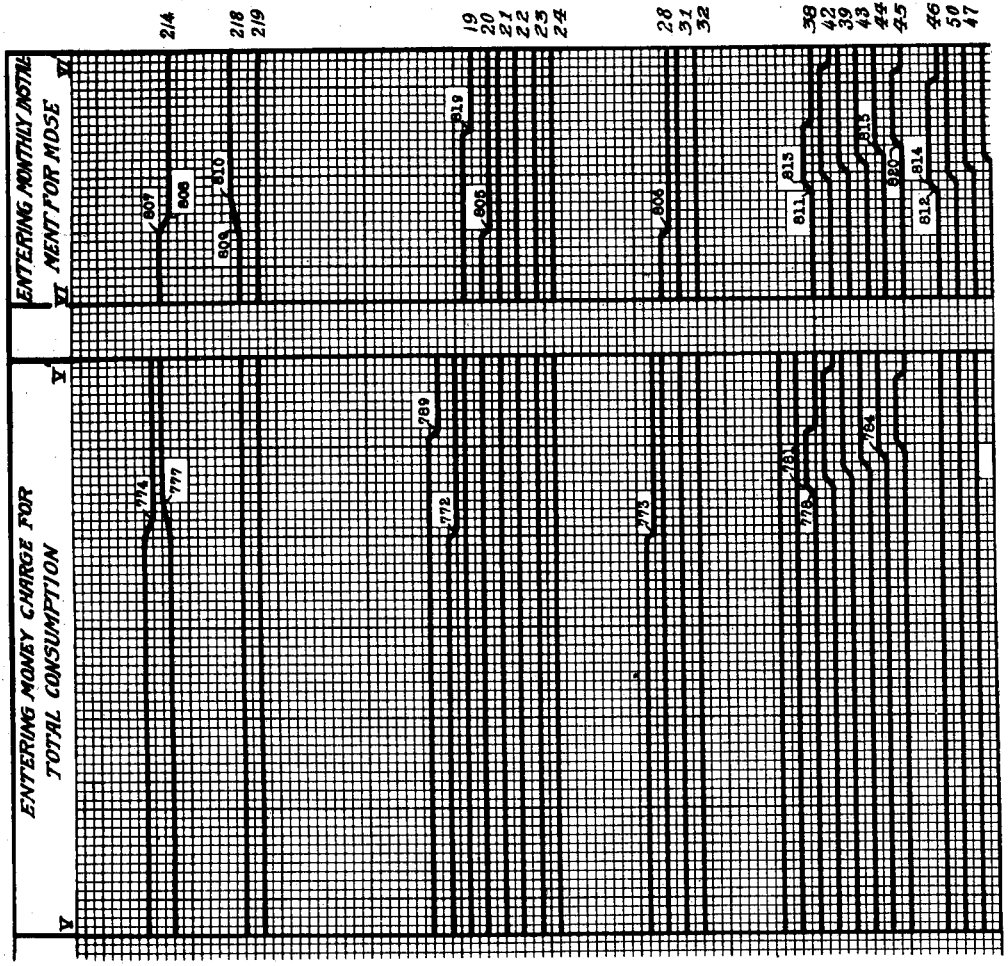
Figure 24:
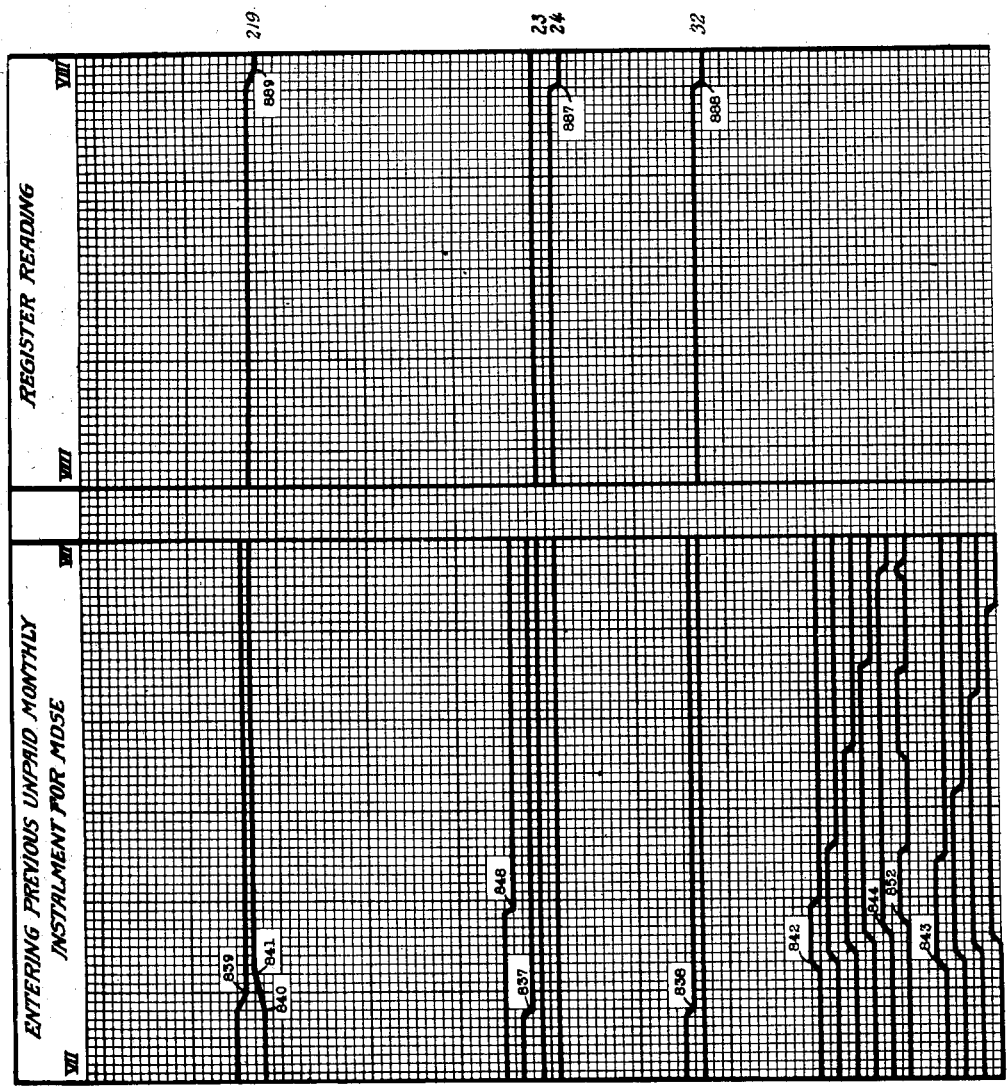
Figure 25:
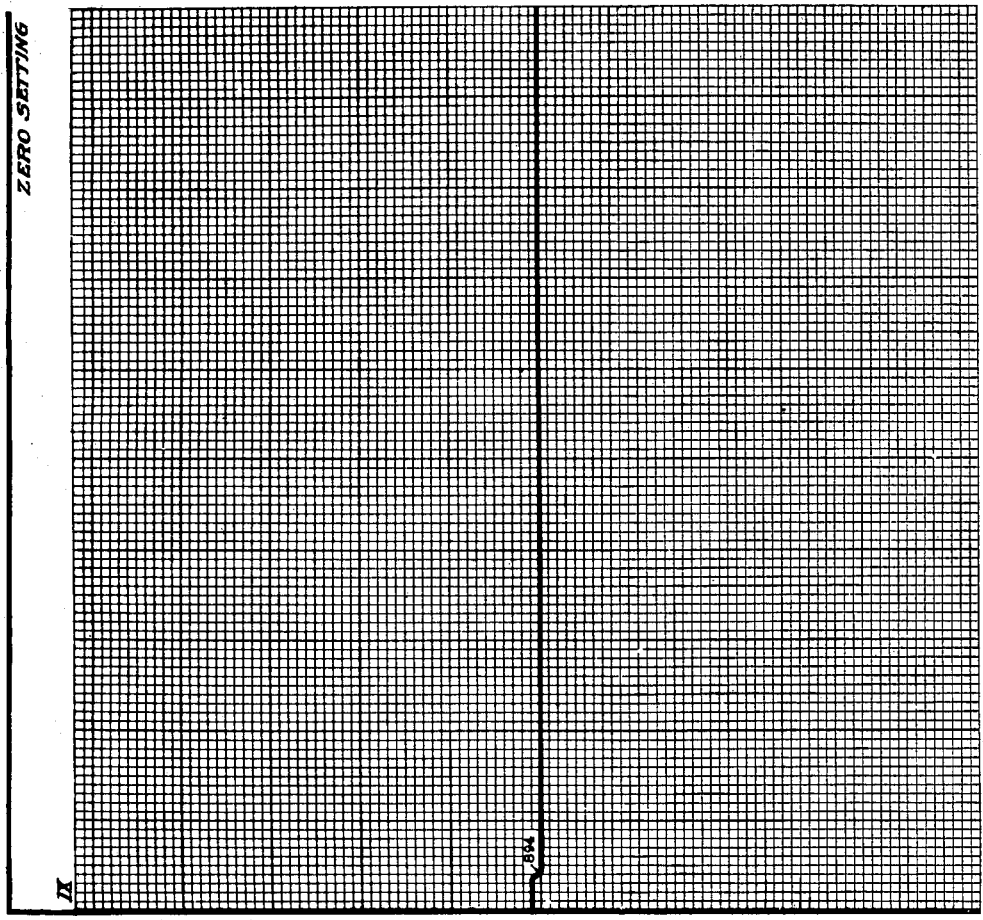
Figure 26:
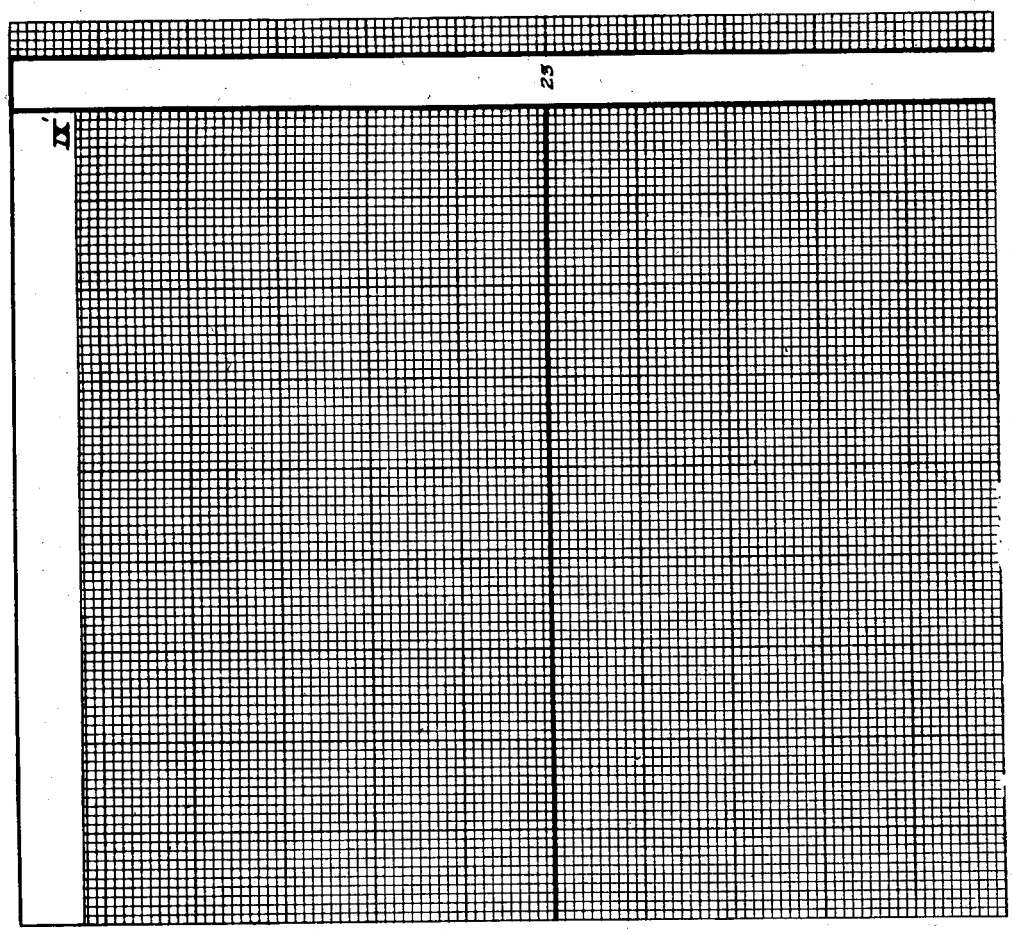
Figure 27:
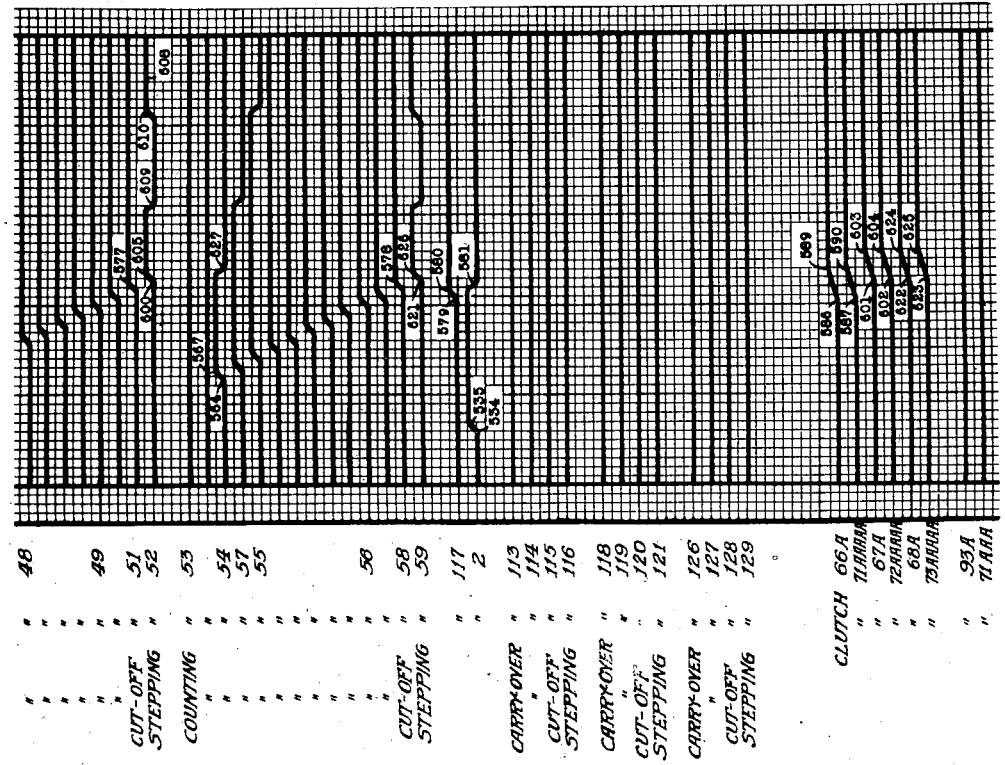
Figure 28:
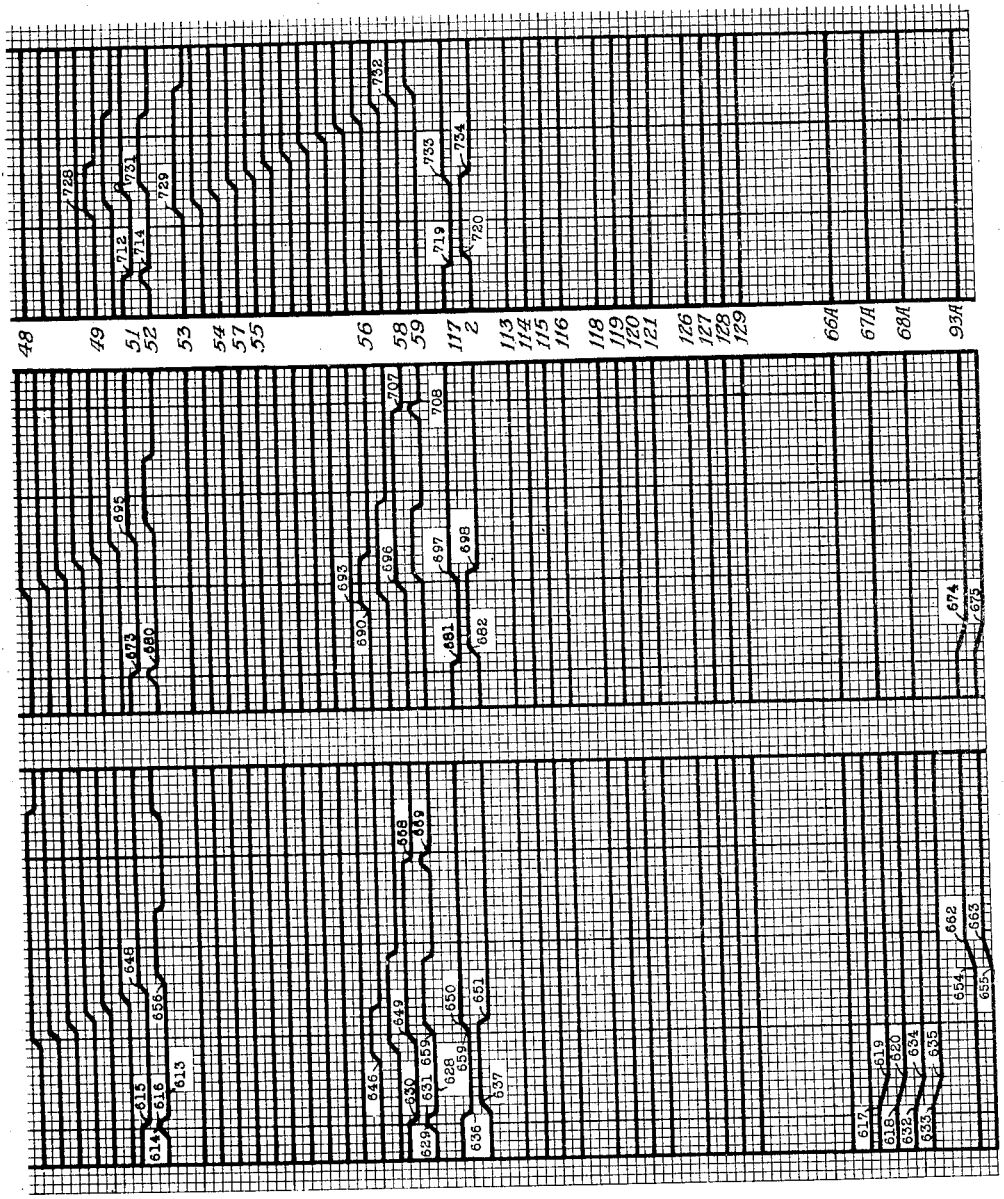
Figure 29:
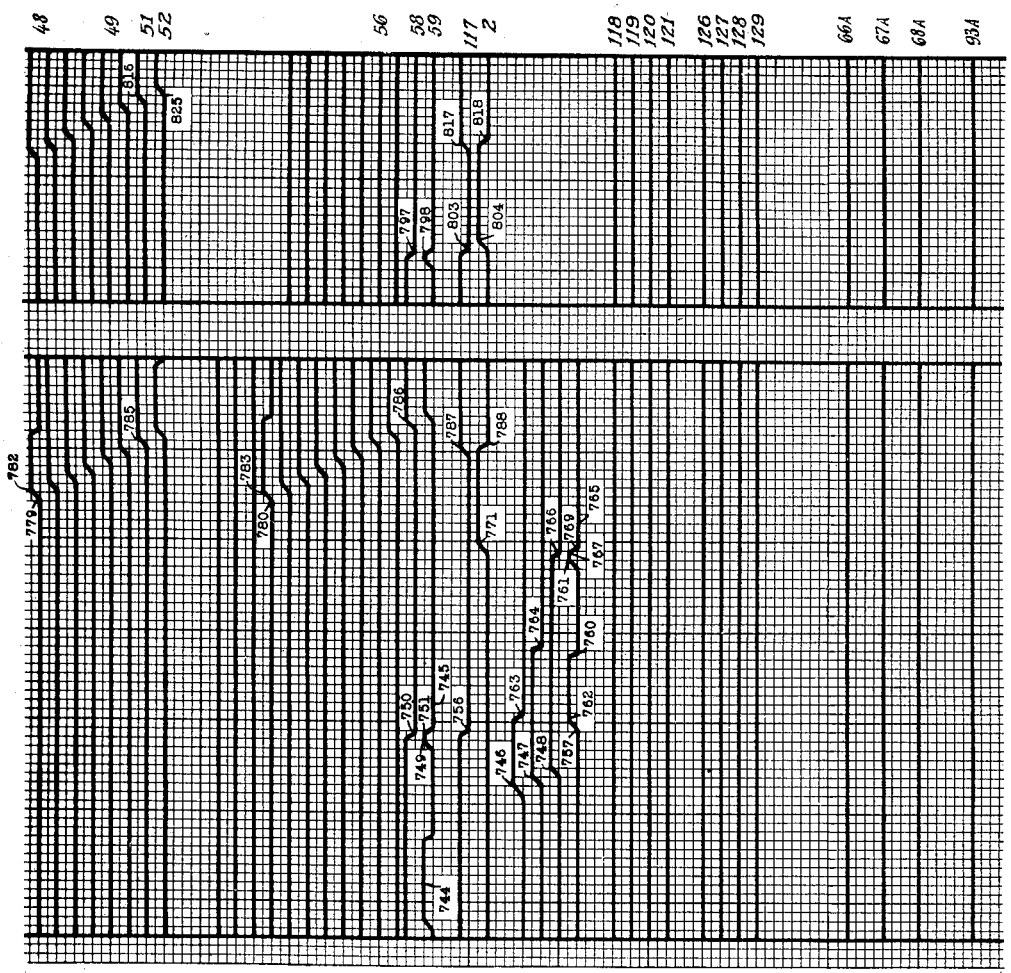
Figure 30:
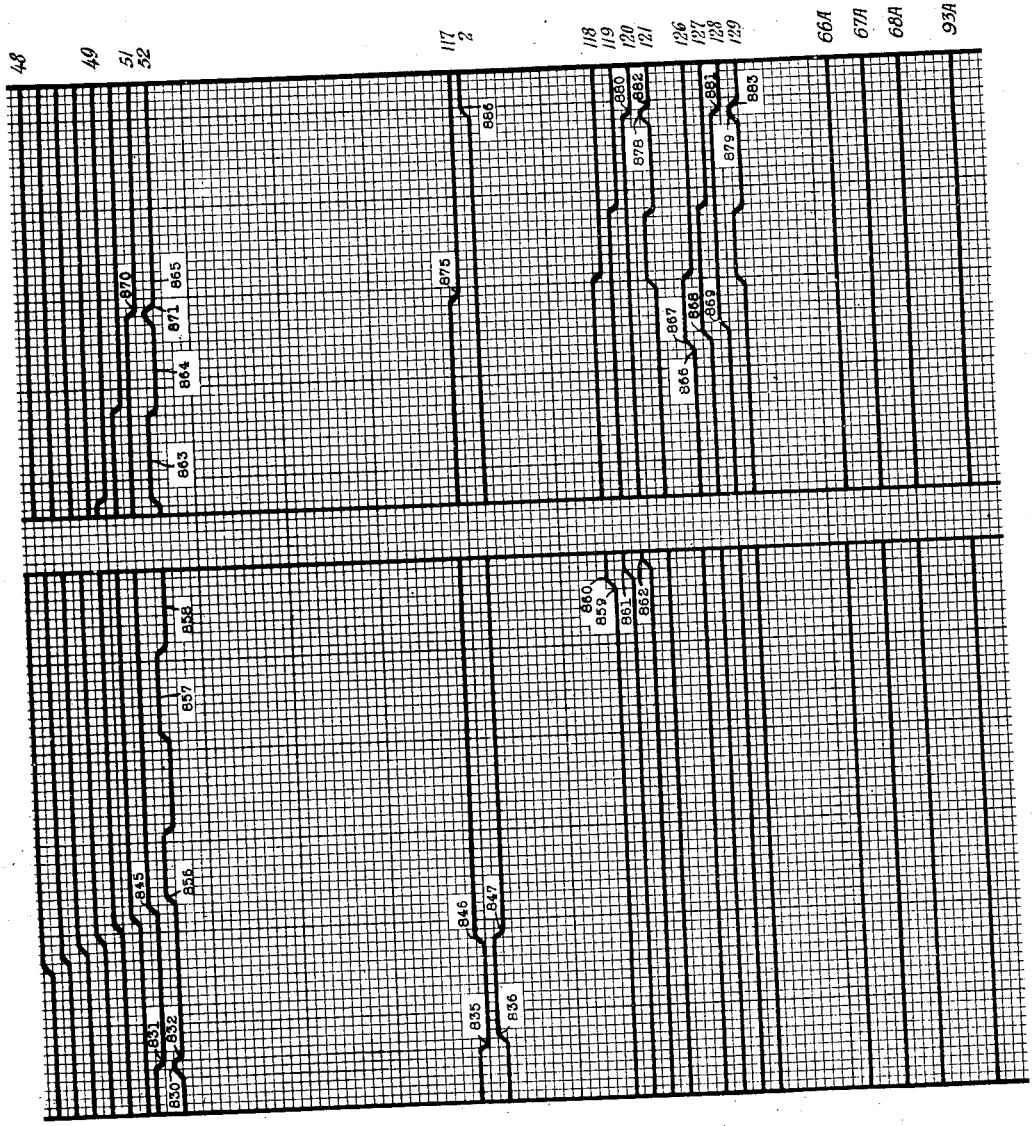
Figure 31:
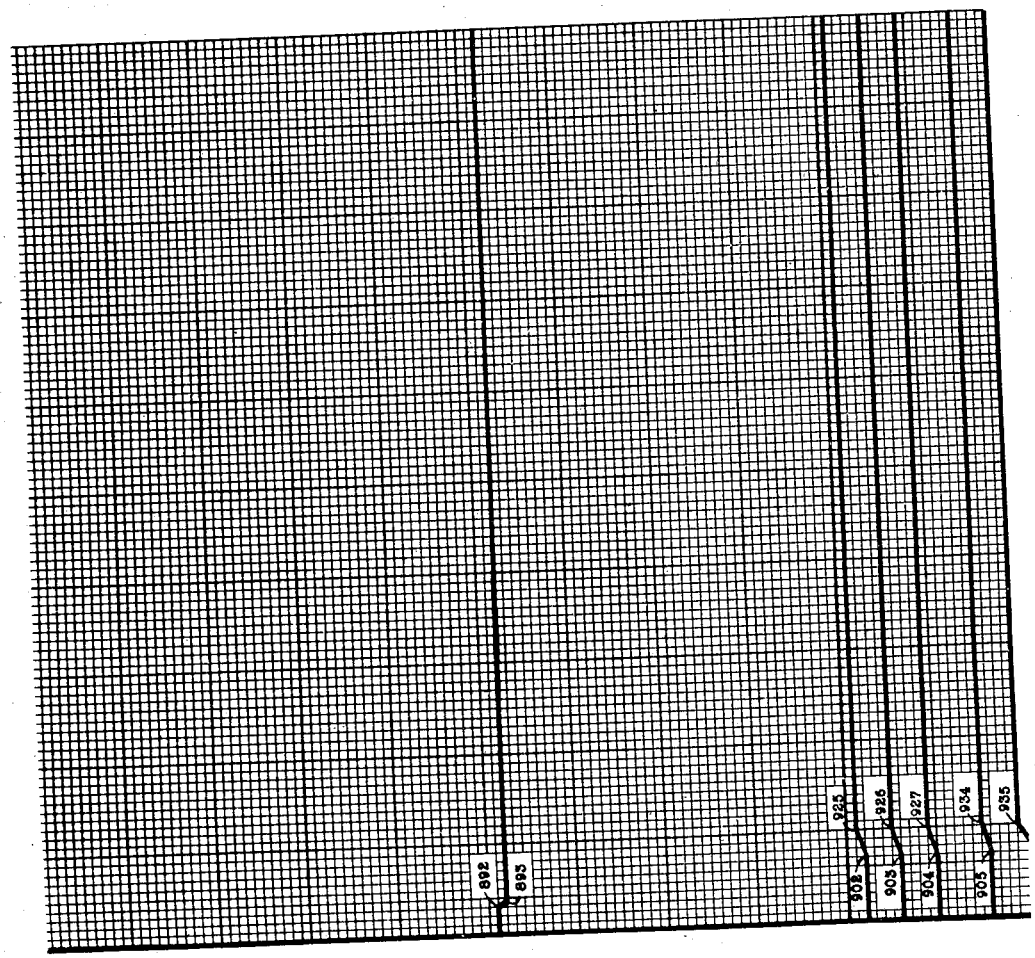
Figure 32:
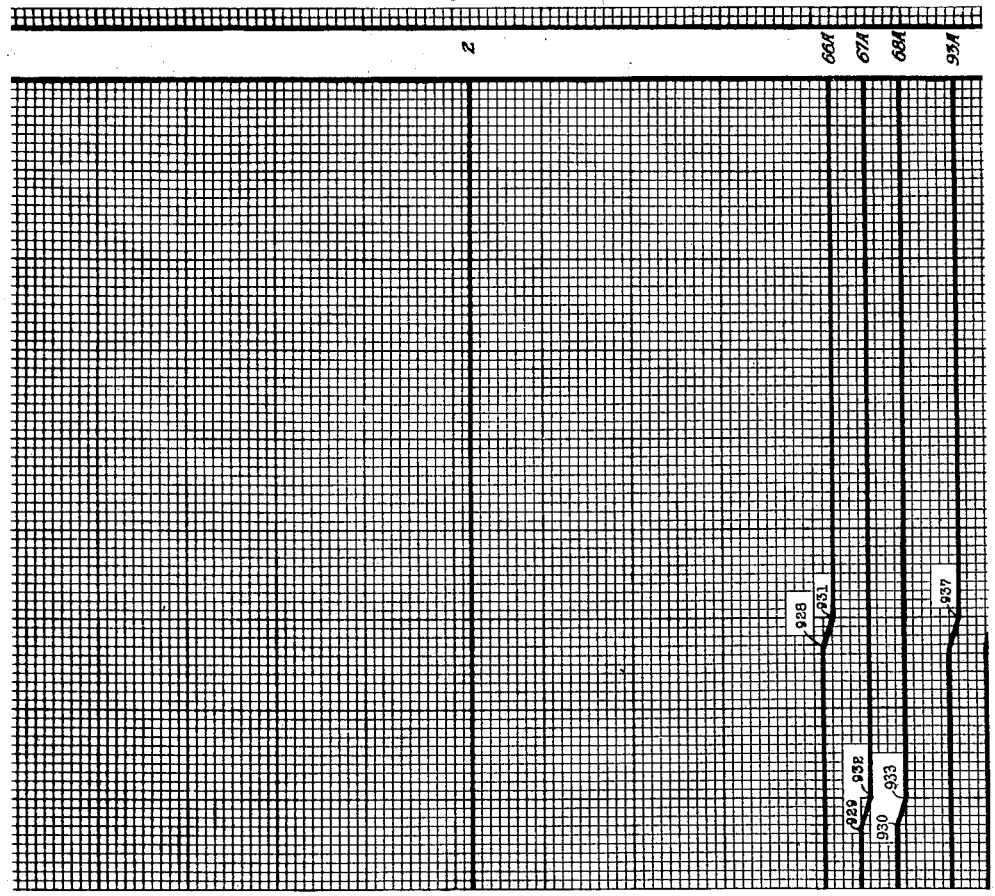
Figure 33:
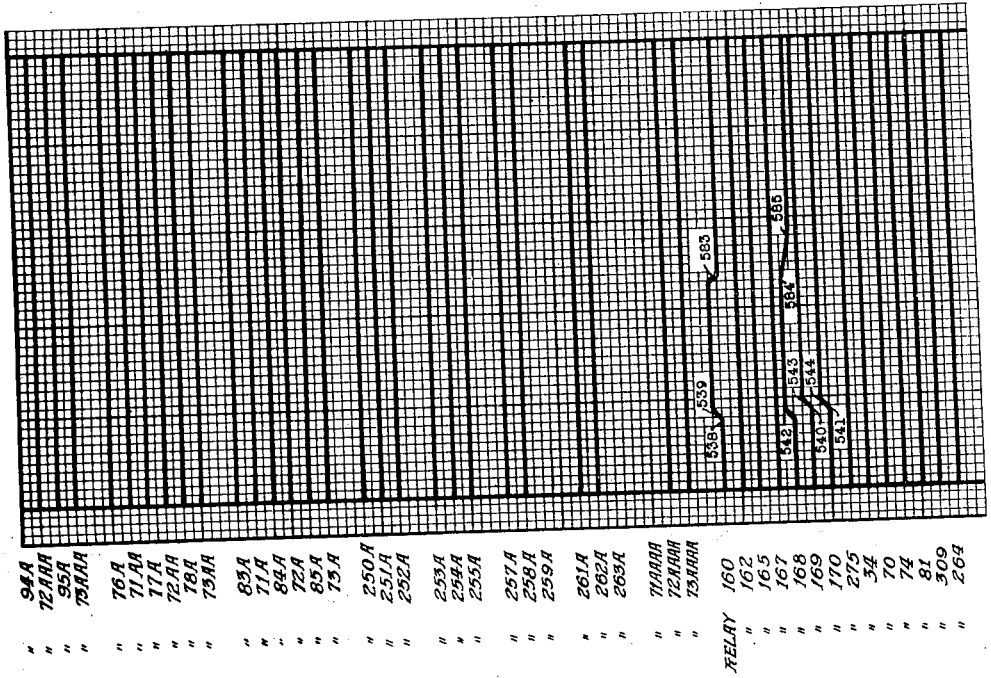
Figure 34:
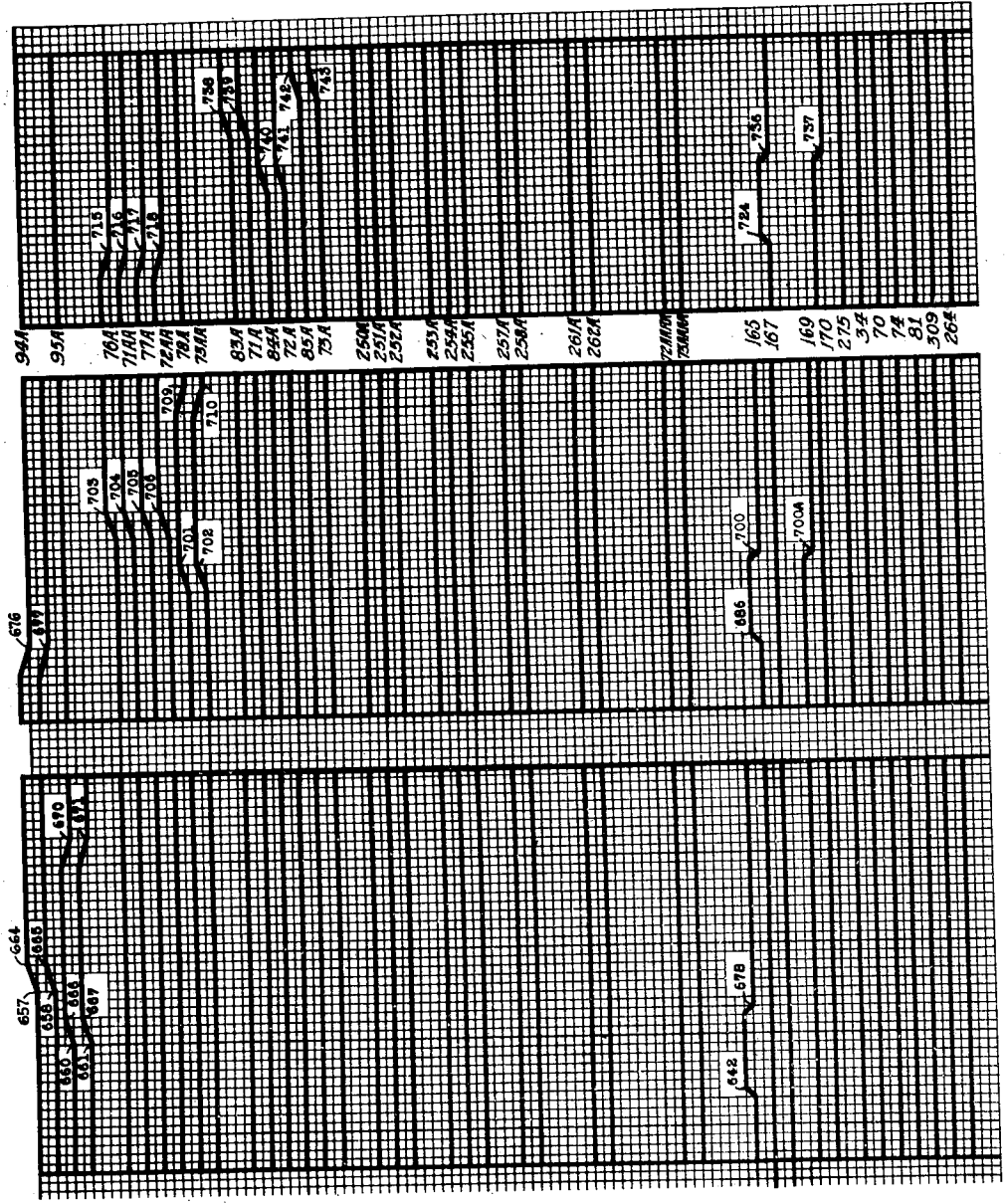
Figure 35:
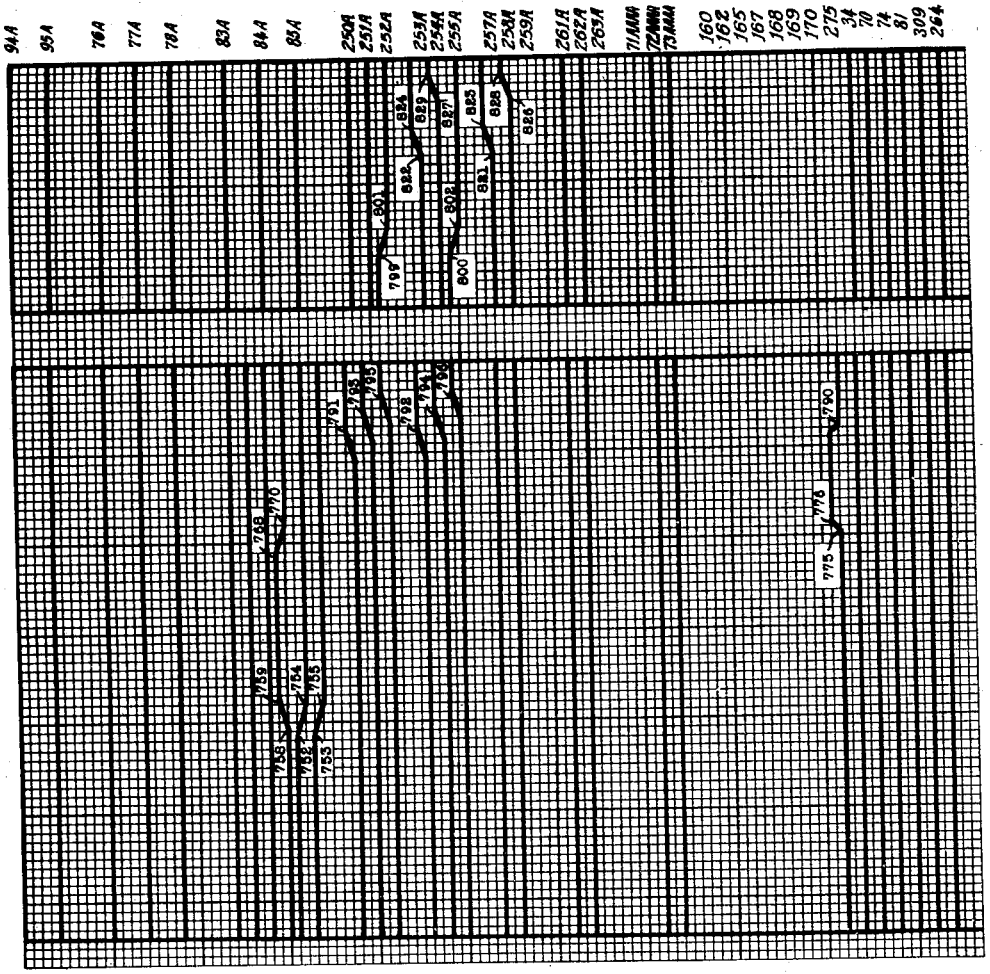
Figure 36:
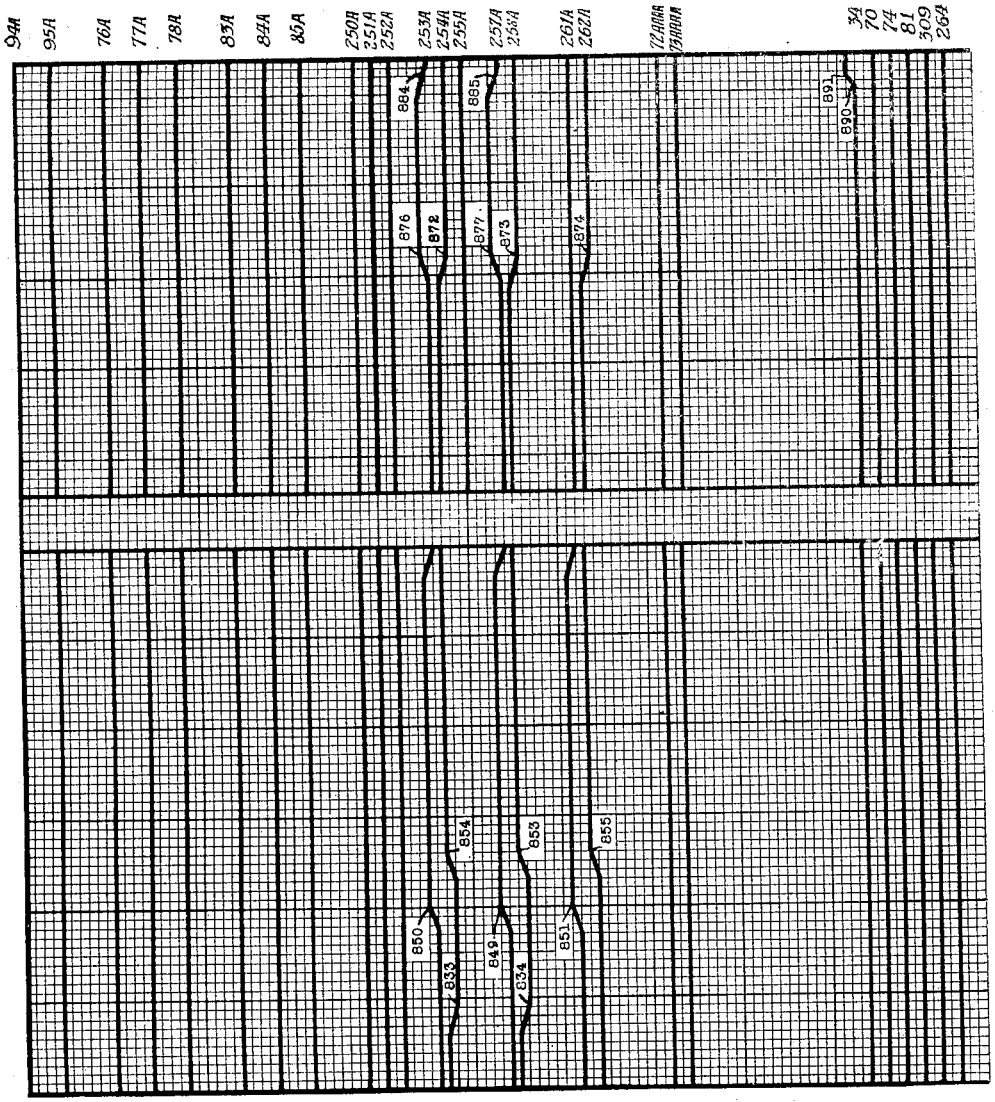
Figure 37:
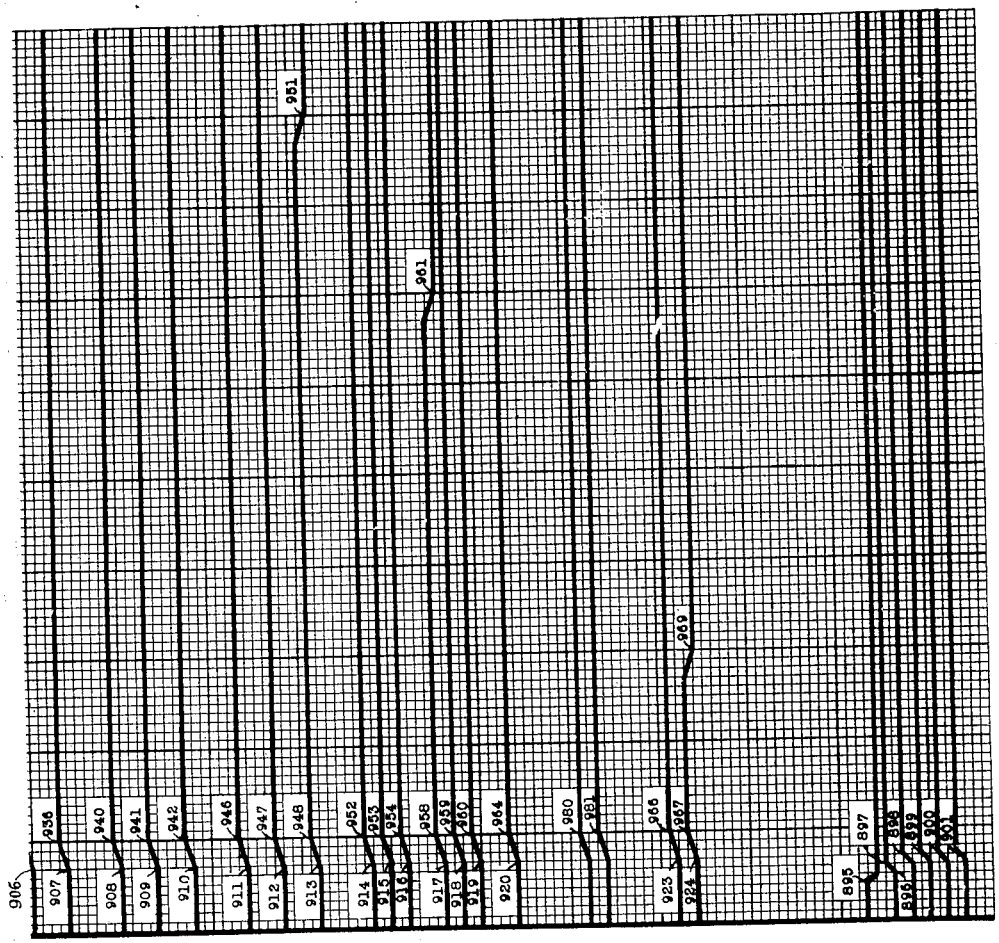
Figure 38:
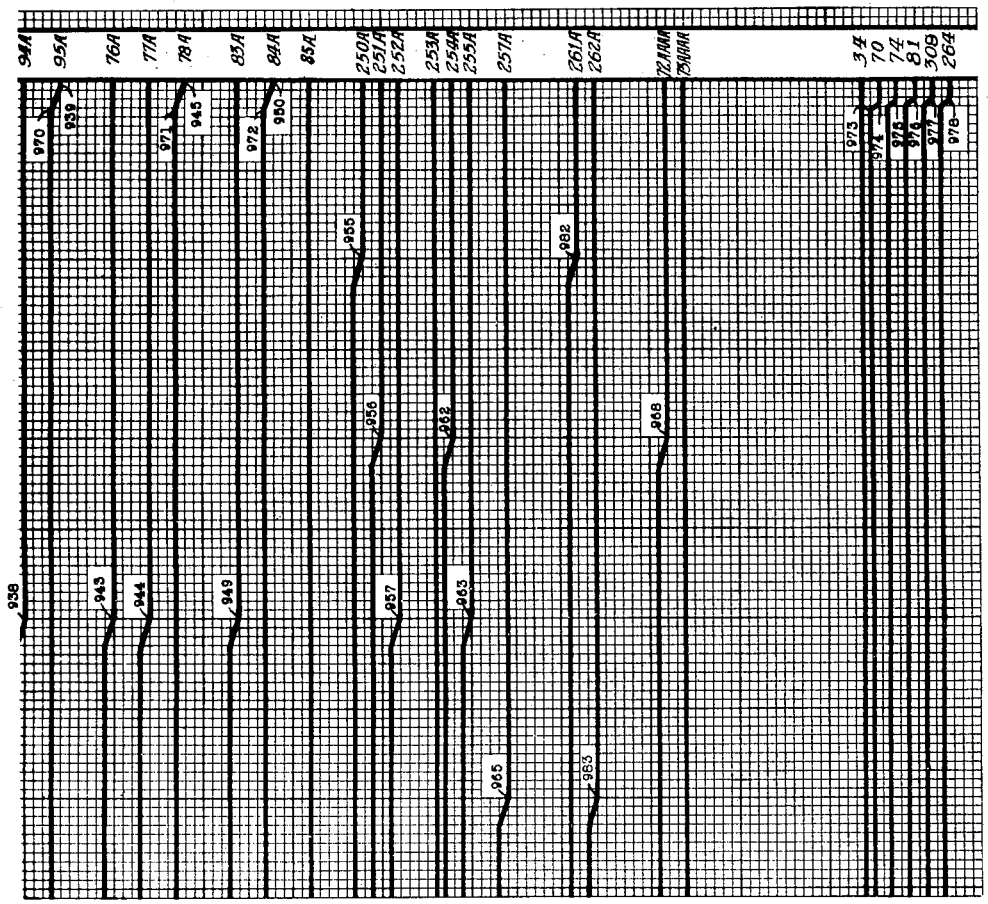

Figure 20 is a view similar to Figures 18 and 19 but illustrating the third described typical operation of the machine.

Figures 21 to 38 when joined are a timing chart illustrating the first described typical operation of the machine, Figures 21 to 26 forming the upper section of said chart when placed end to end from left to right in the order named, Figures 27 to 32 forming the central section of said chart when placed respectively under Figures 21 to 26, and Figures 33 to 38 forming the lower section of said chart when placed respectively under Figures 27 to 32.

Figure 39:
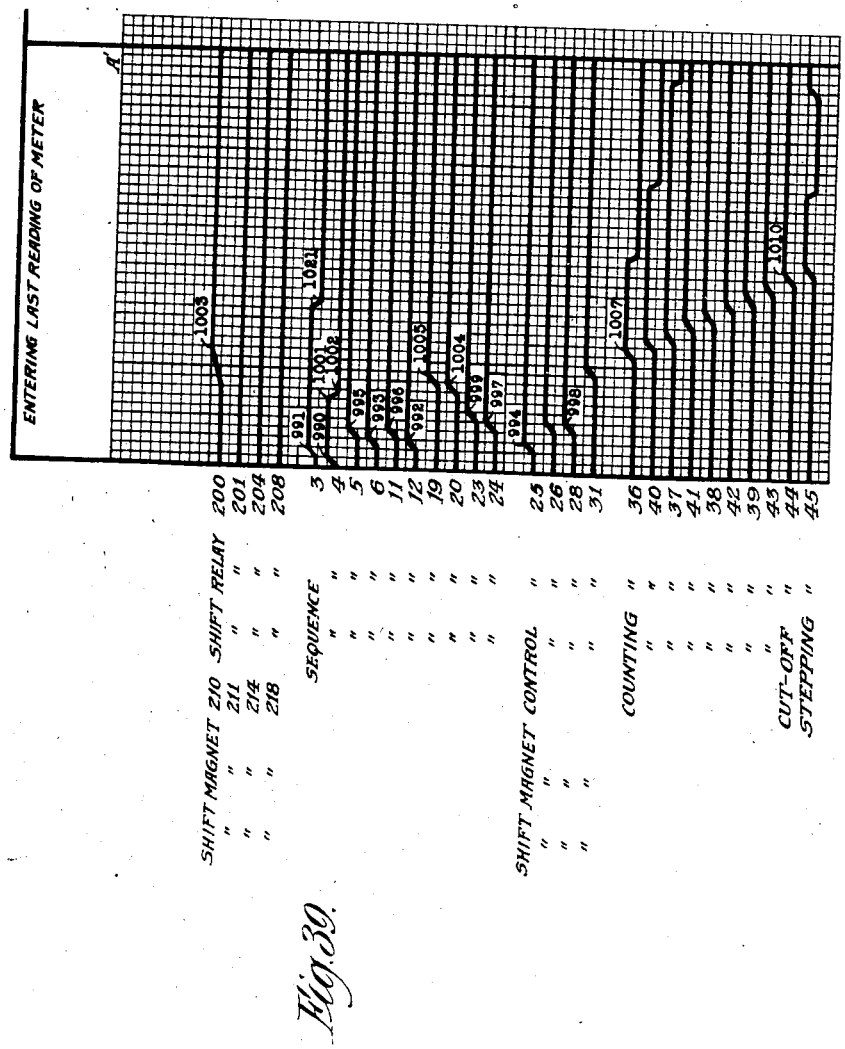
Figure 40:
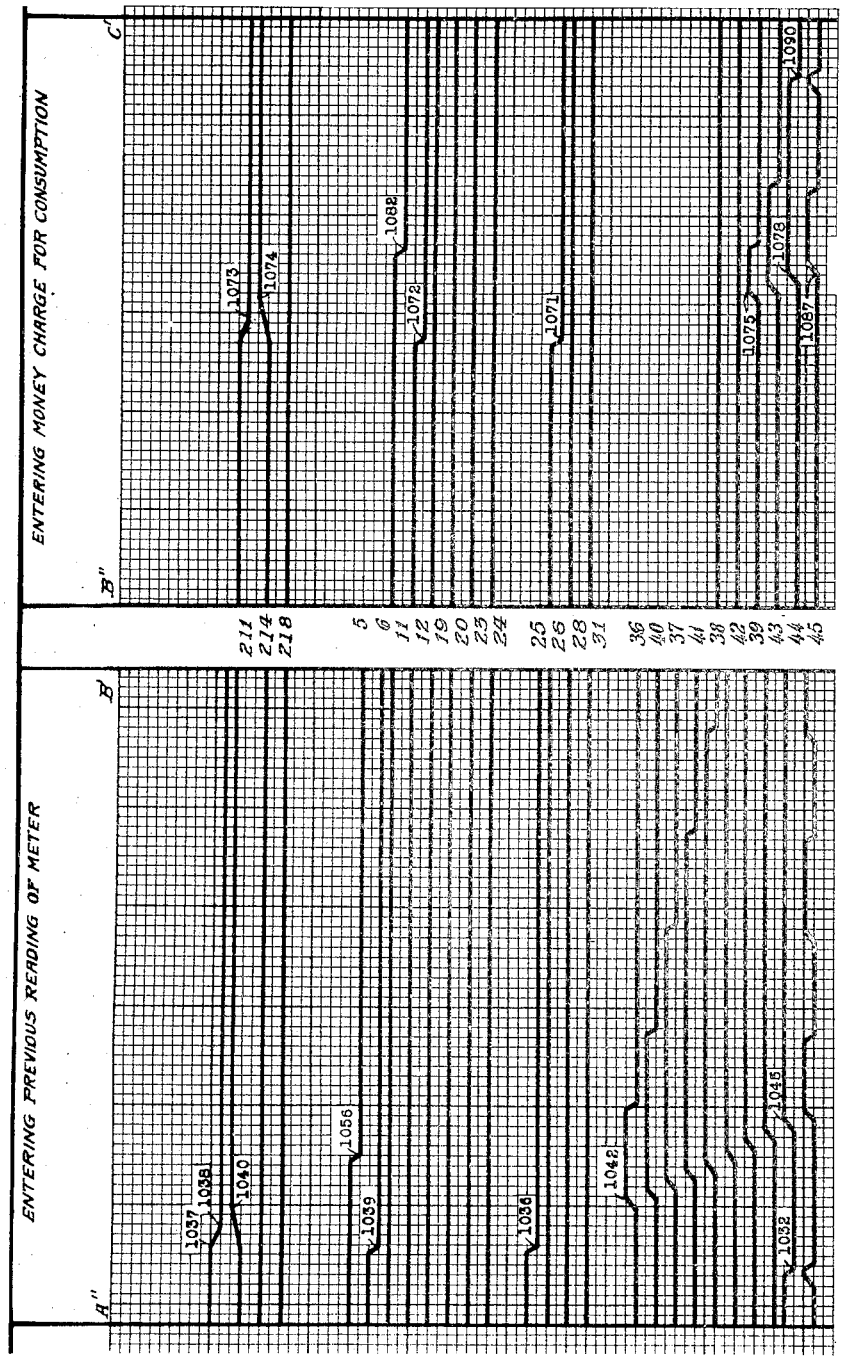
Figure 41:
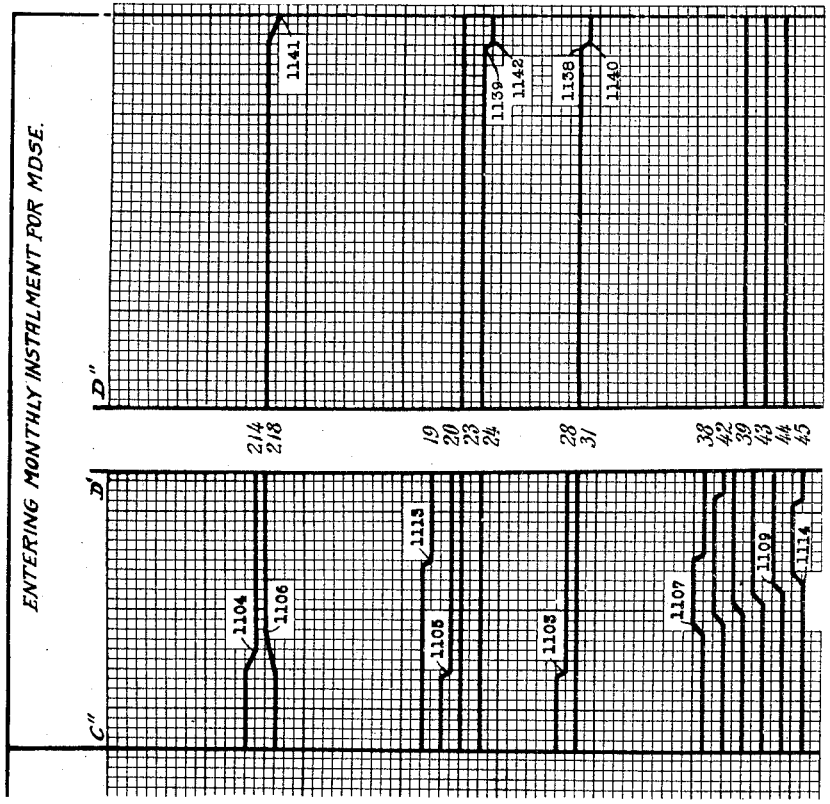
Figure 42:
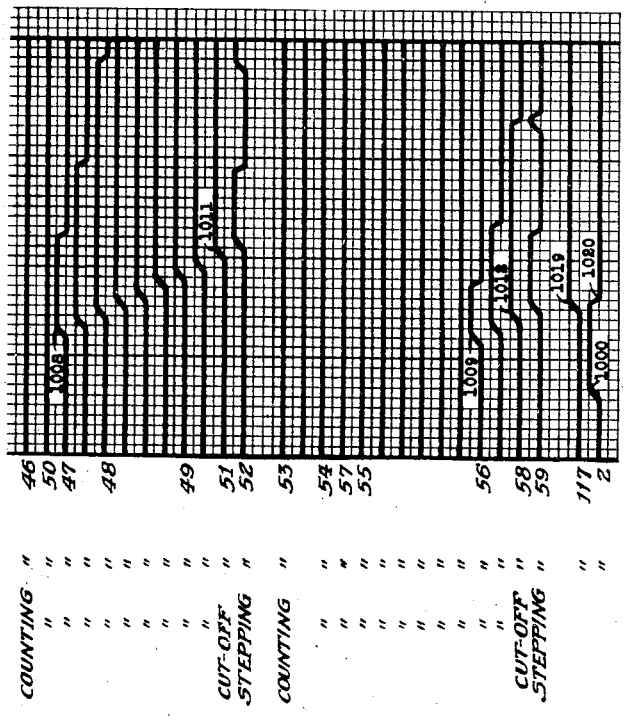
Figure 43:
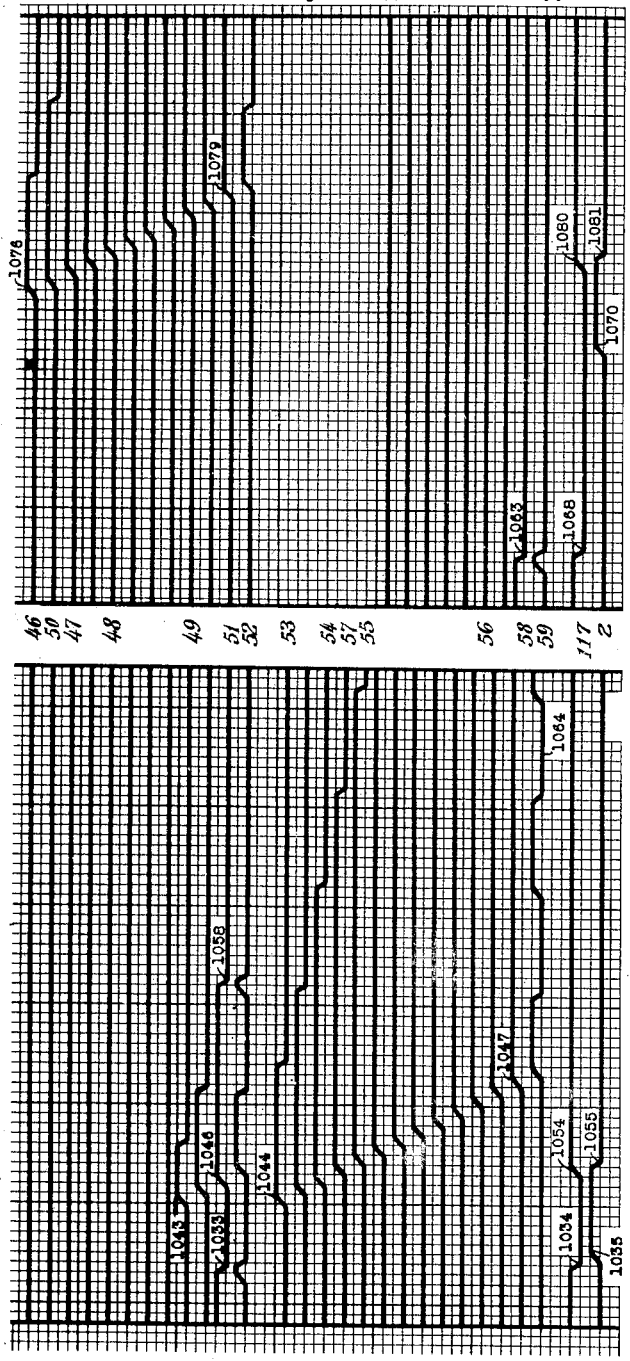
Figure 44:
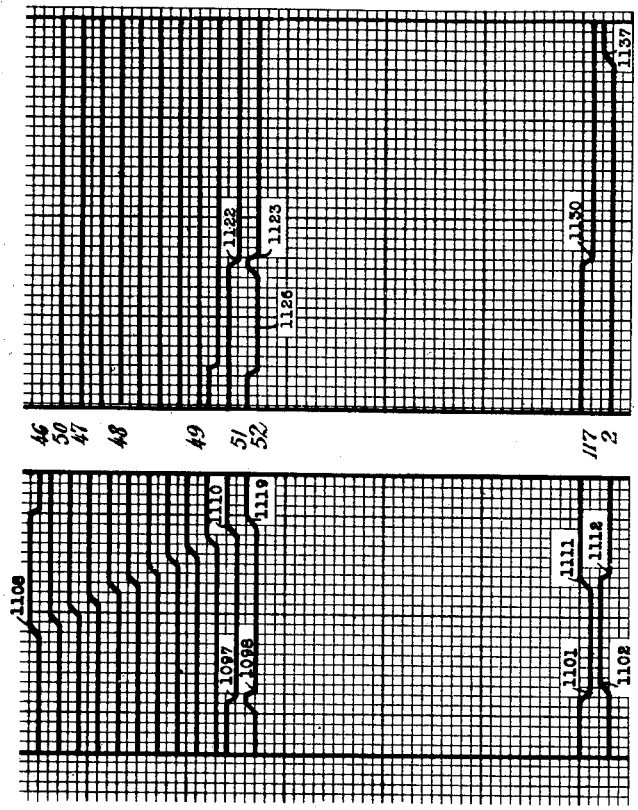
Figure 45:
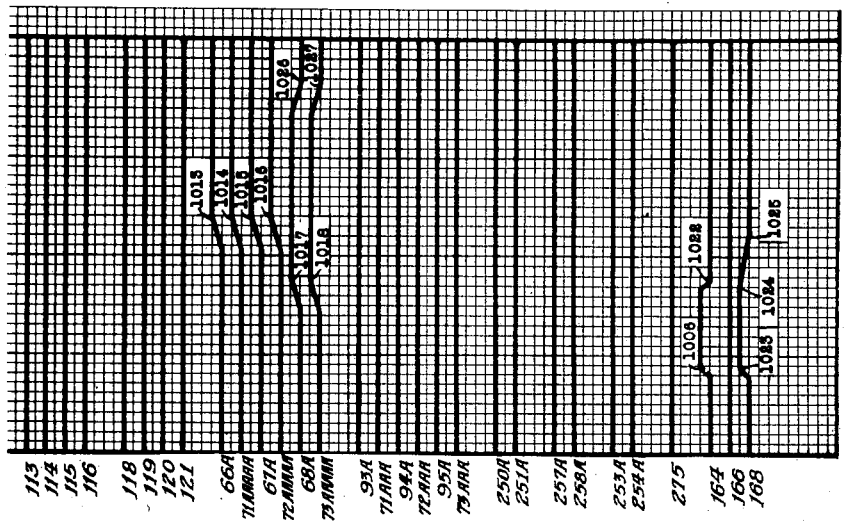
Figure 46:
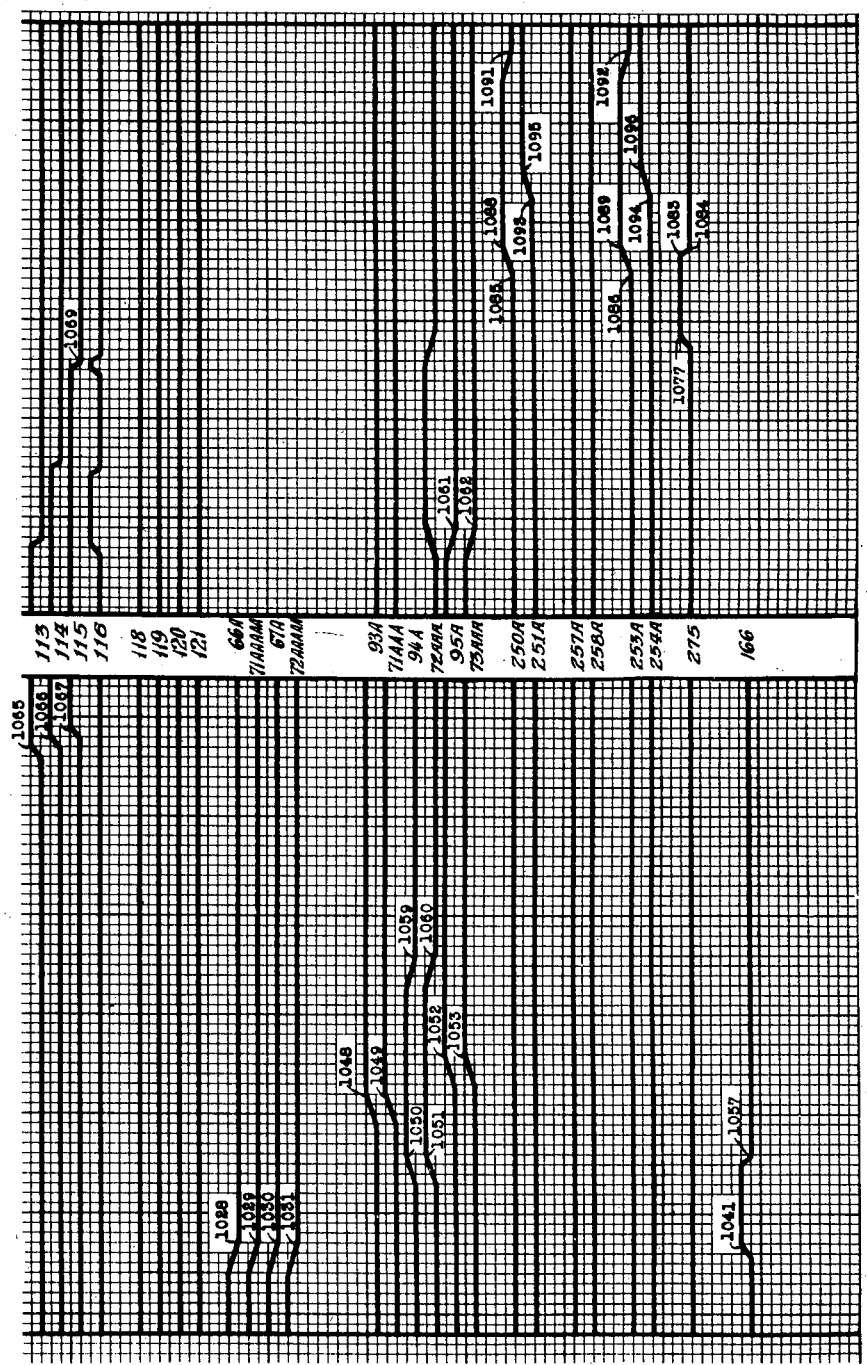
Figure 47:
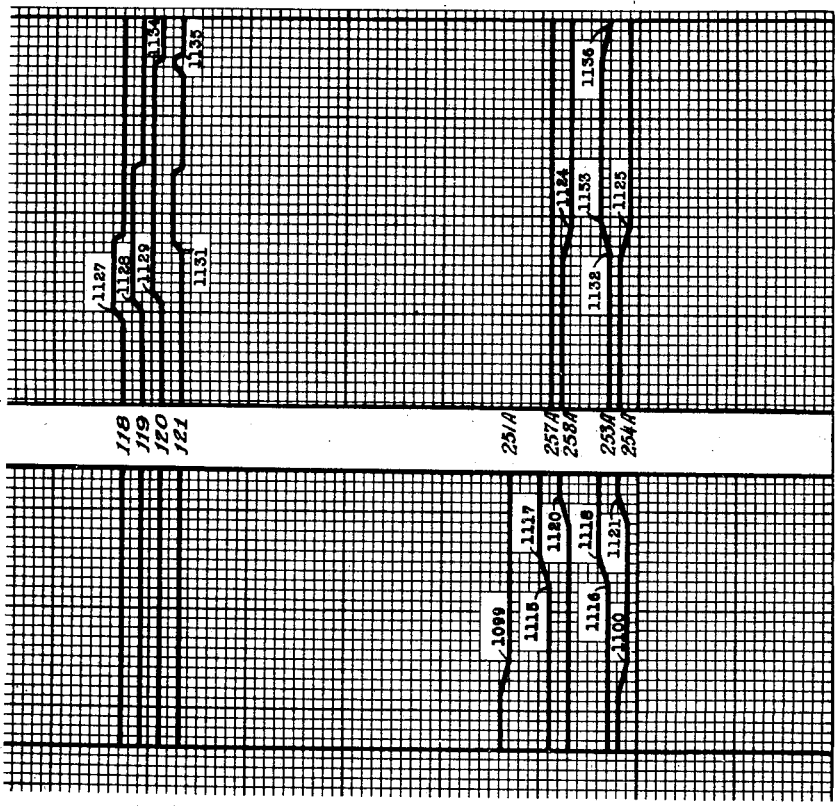

Figures 39 to 47 when joined are a timing chart illustrating the second described typical operation of the machine, Figures 39 to 41 forming the upper section of said chart when placed end to end from left to right in the order named, Figures 42 to 44 forming the central section of said chart when placed respectively under Figures 39 to 41, and Figures 45 to 47 forming the lower section of said chart when placed respectively under Figures 42 to 44.

Figure 48:
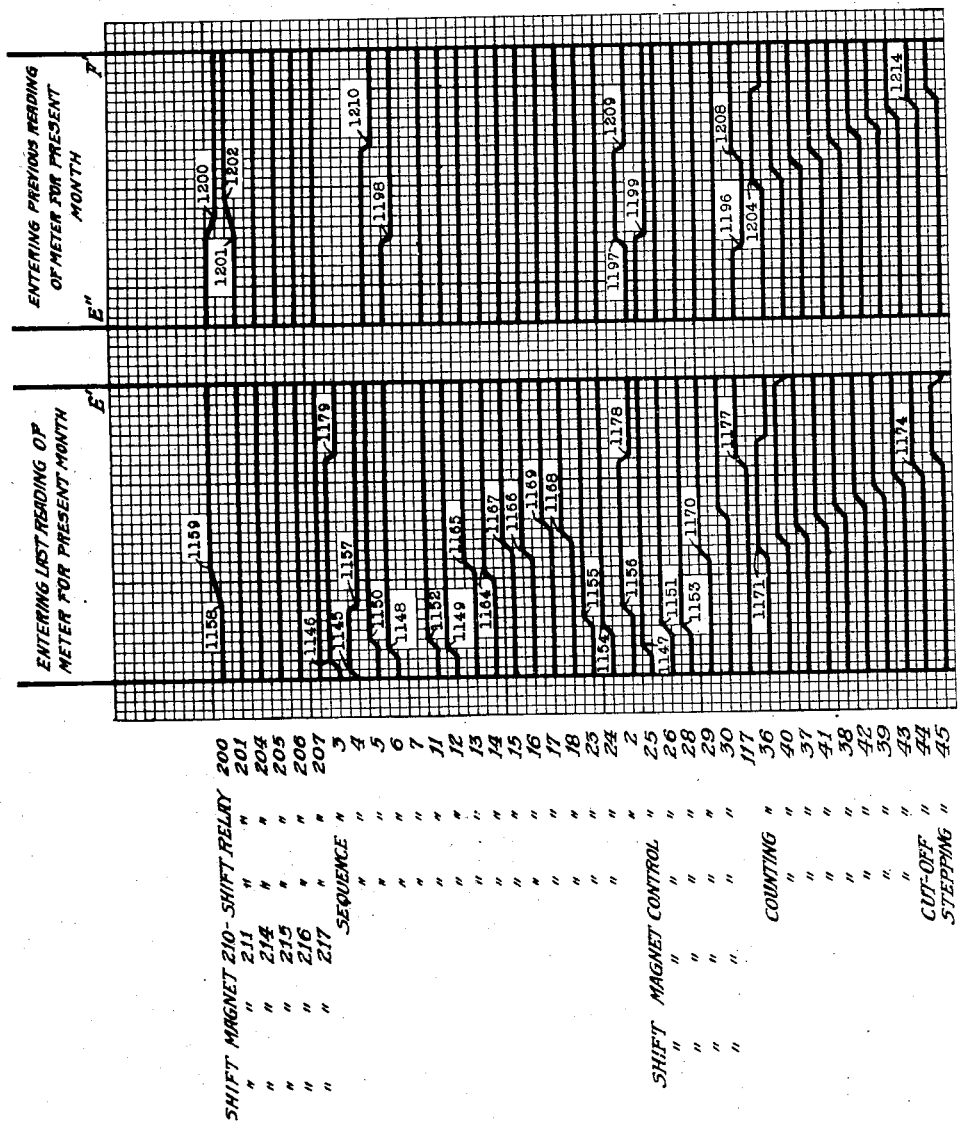
Figure 49:
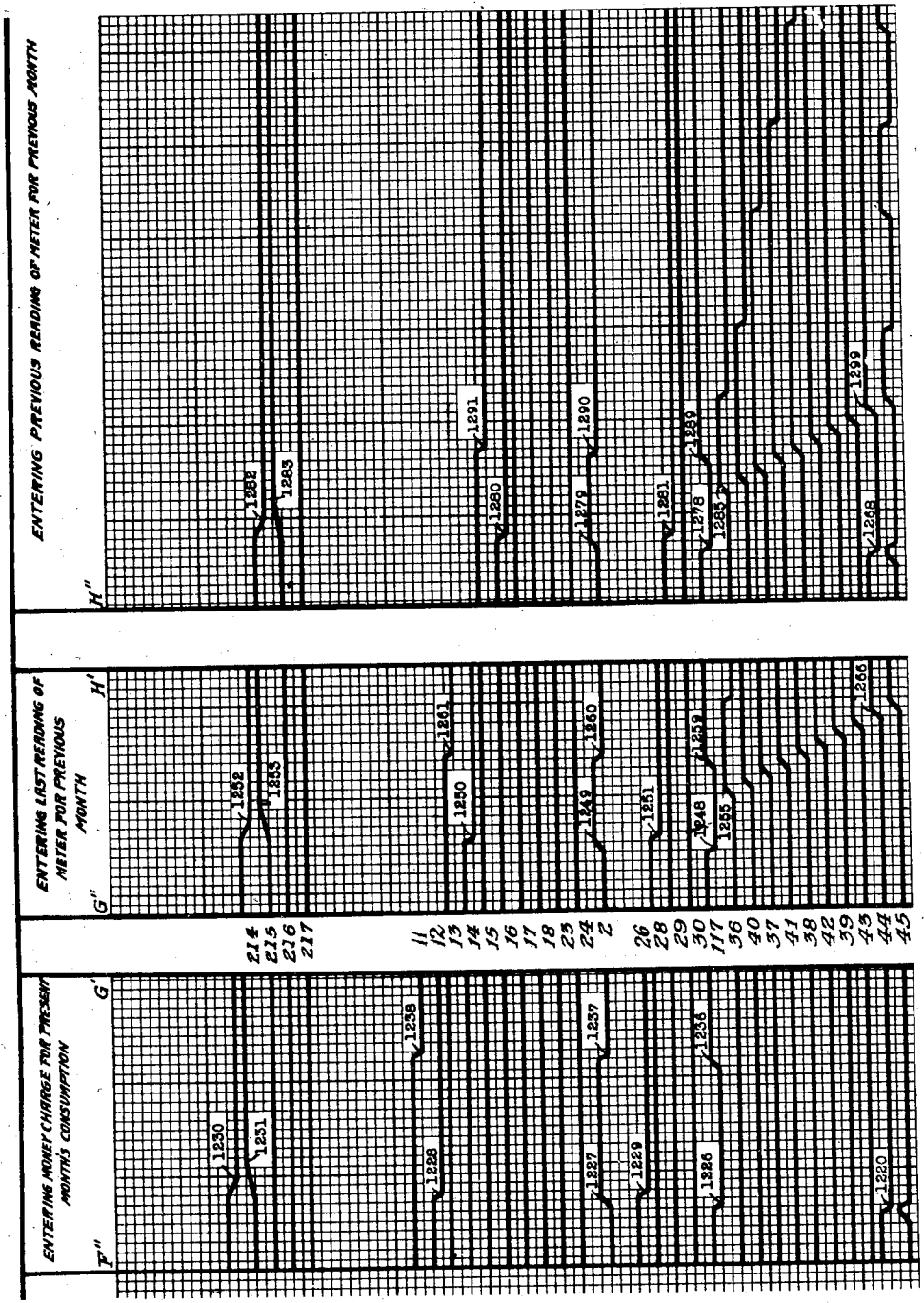
Figure 50:
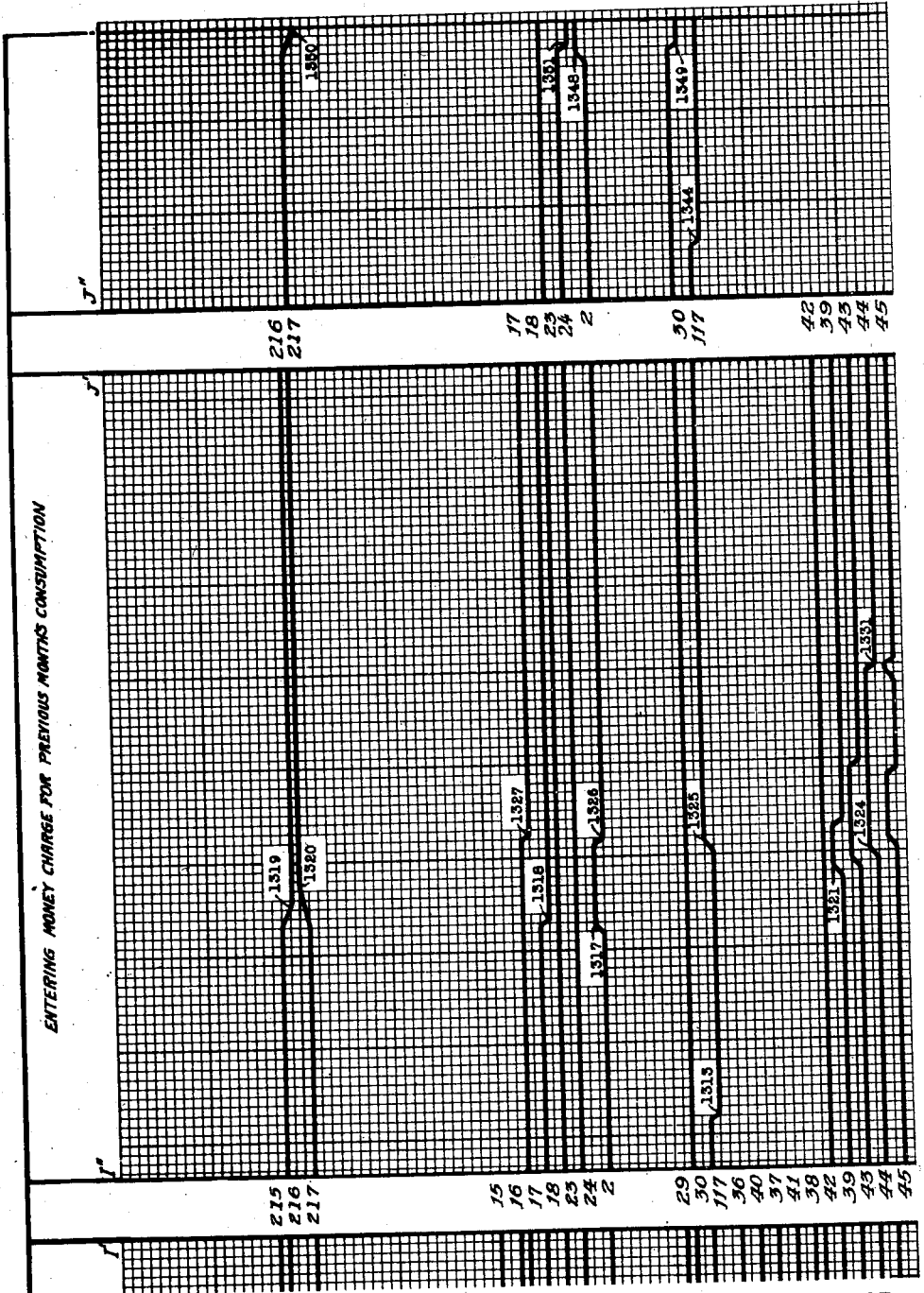
Figure 51:
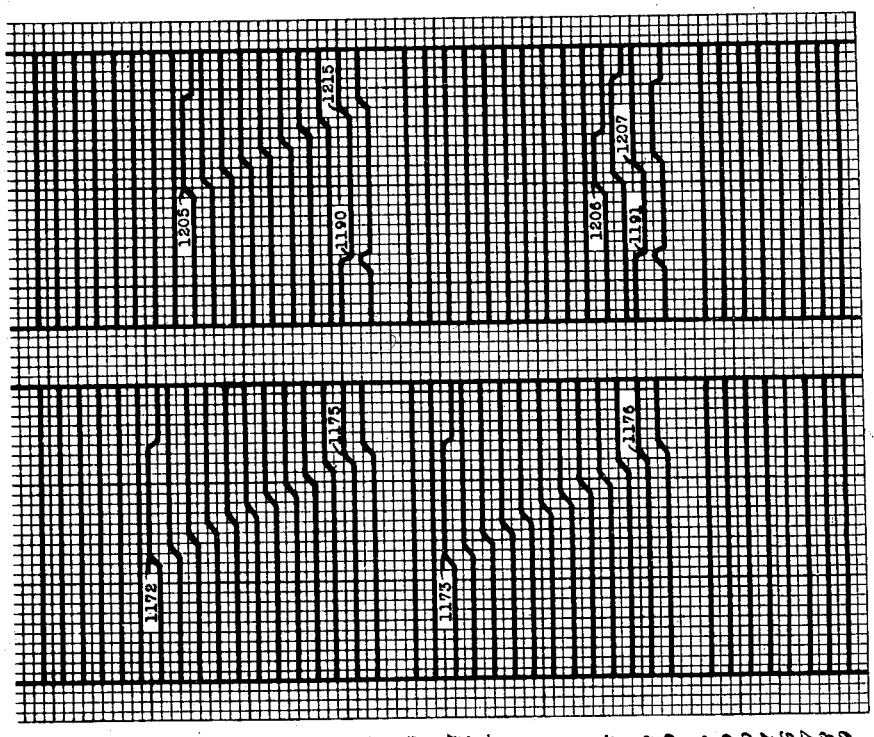
Figure 52:
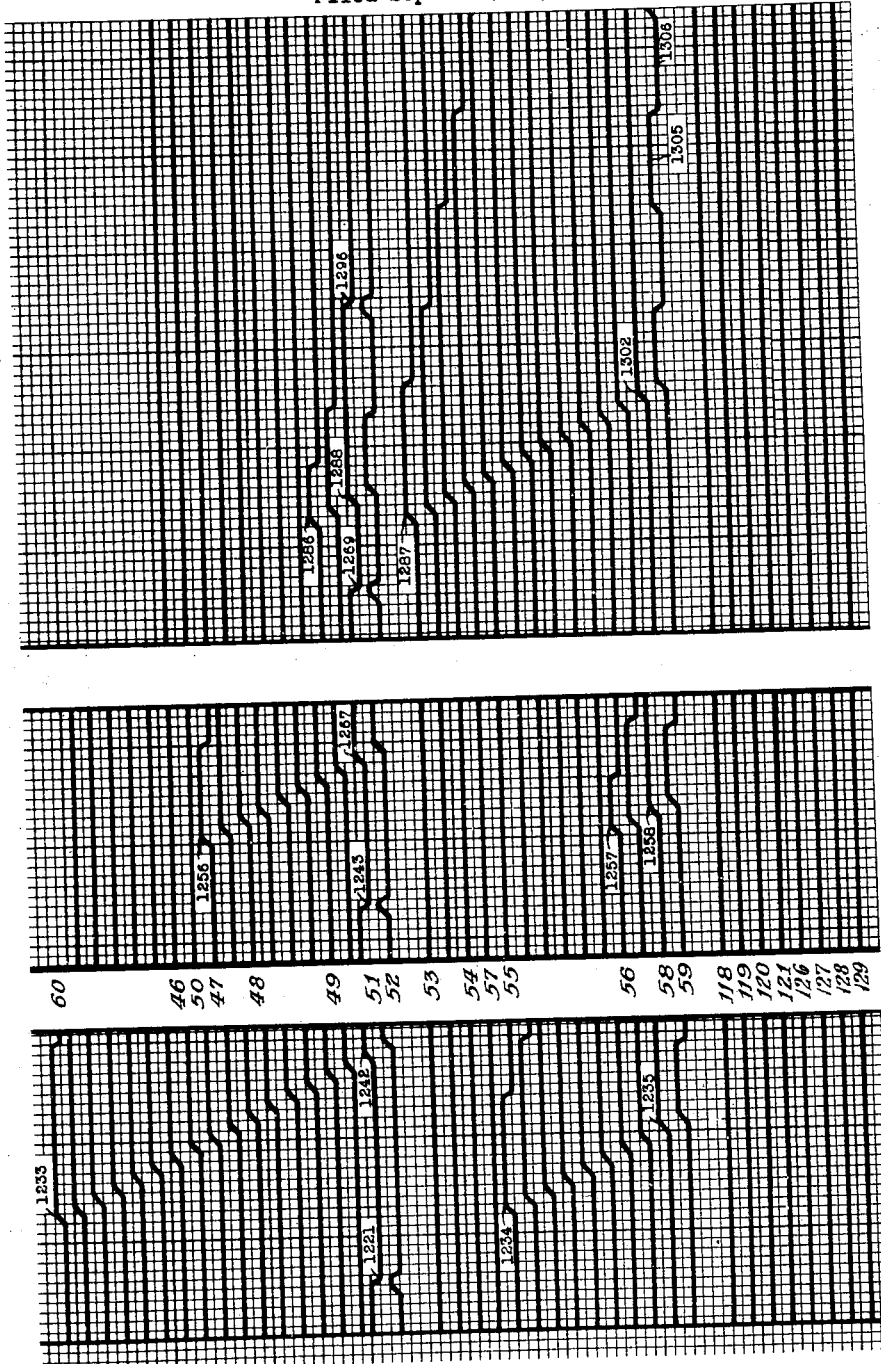
Figure 53:
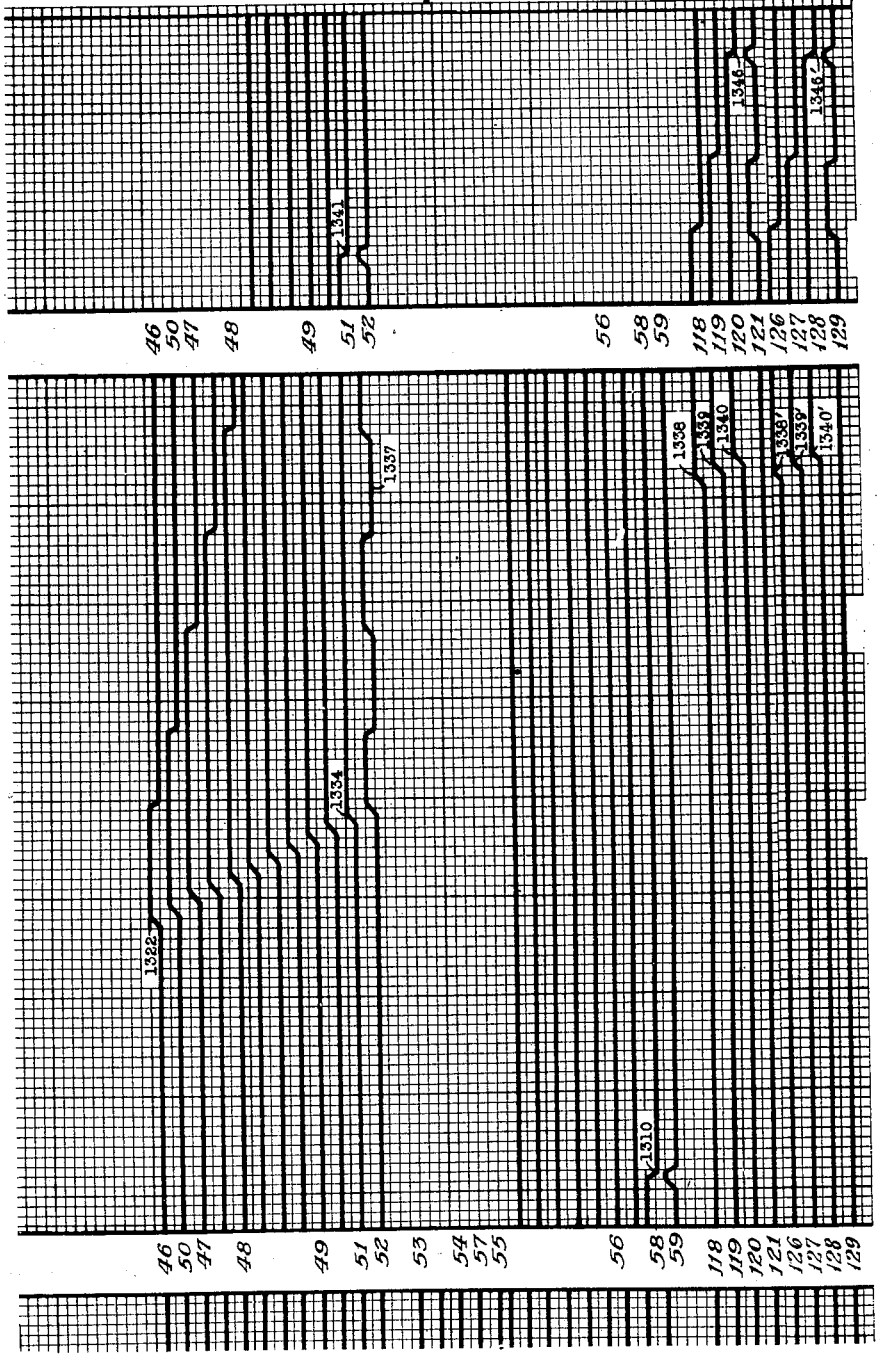
Figure 54:
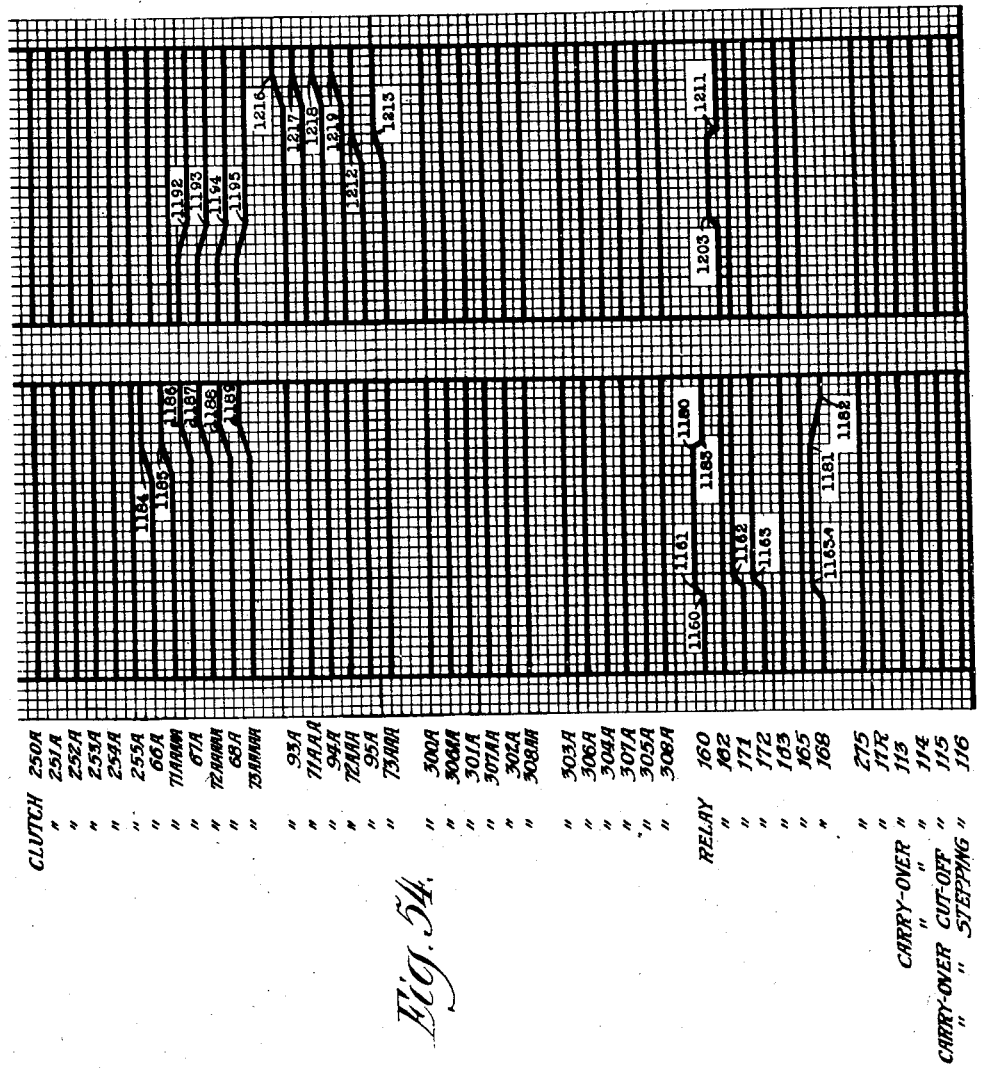
Figure 55:
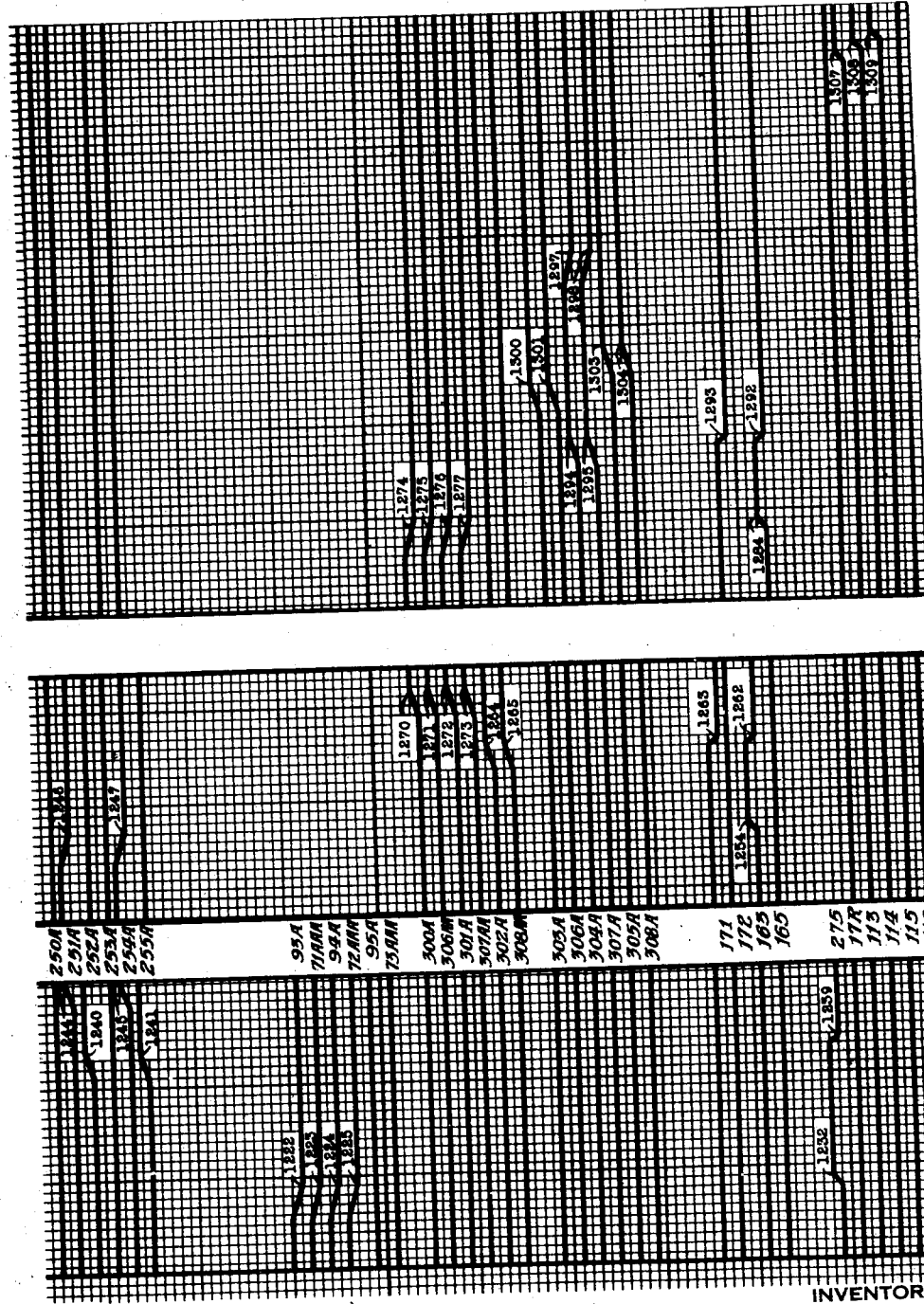
Figure 56:
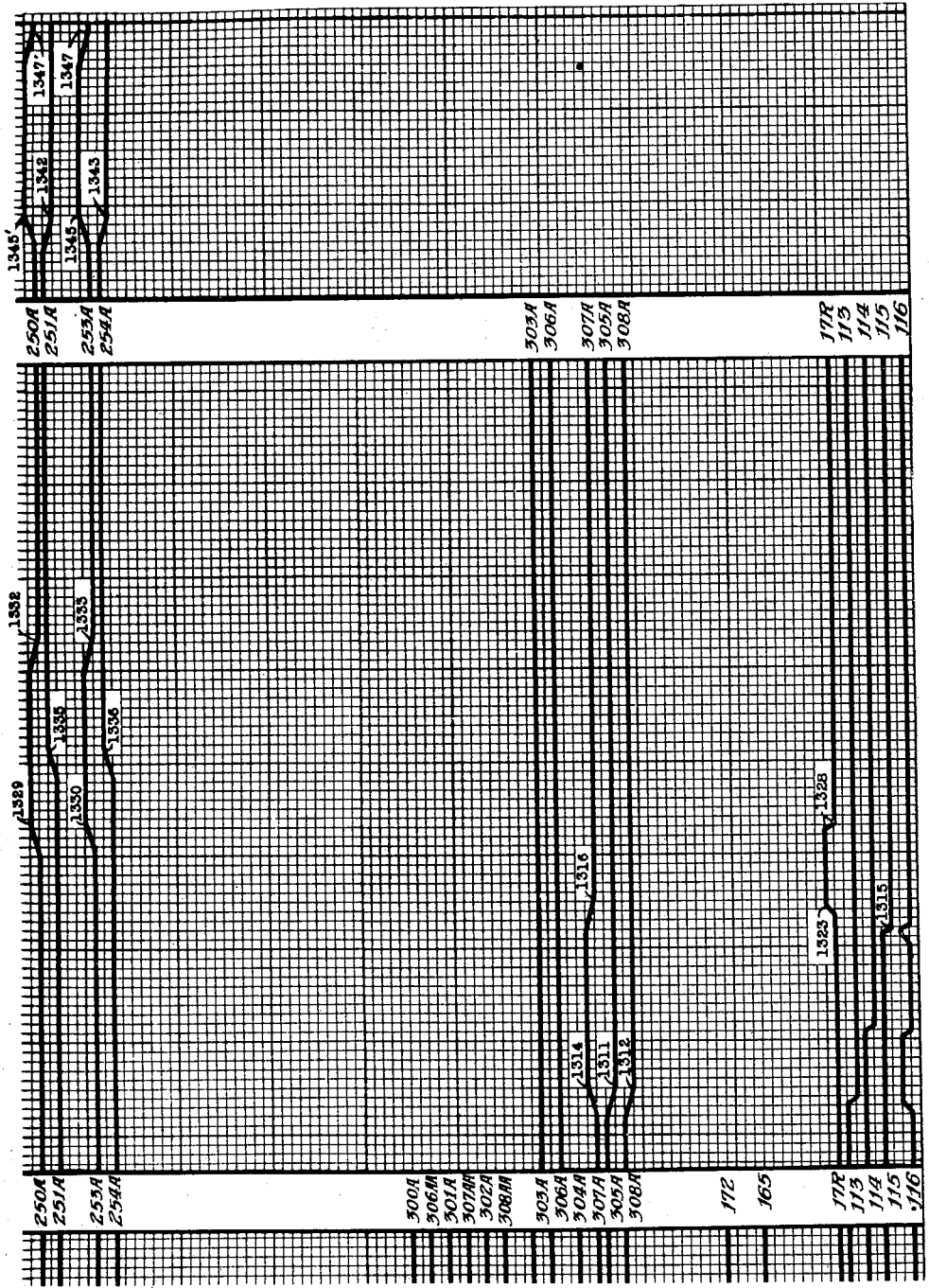

Figures 48 to 56 when joined are a timing chart illustrating the third described typical operation of the machine, Figures 48 to 50 forming the upper section of said chart when placed end to end from left to right in the order named, Figures 51 to 53 forming the central section of said chart when placed respectively under Figures 48 to 50, and Figures 54 to 56 forming the lower section of said chart when placed respectively under Figures 51 to 53.

Figure 57:
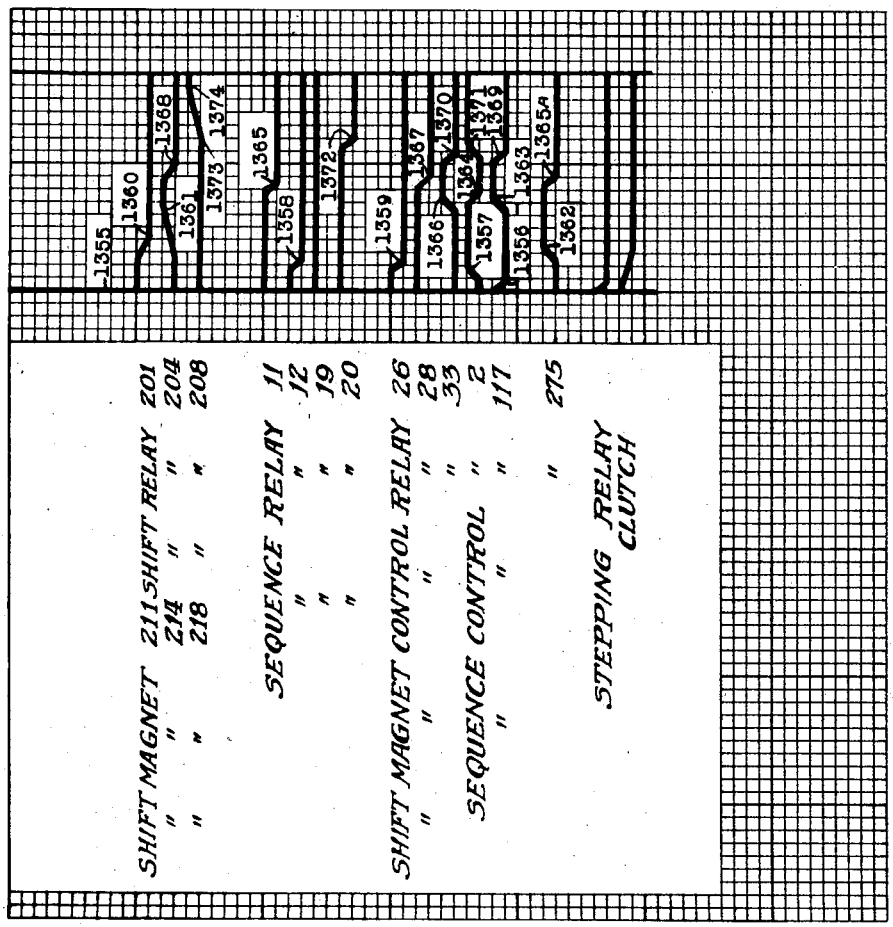

Figure 57 comprises a timing chart illustrating the fourth described typical operation of the machine.

Figure 58:
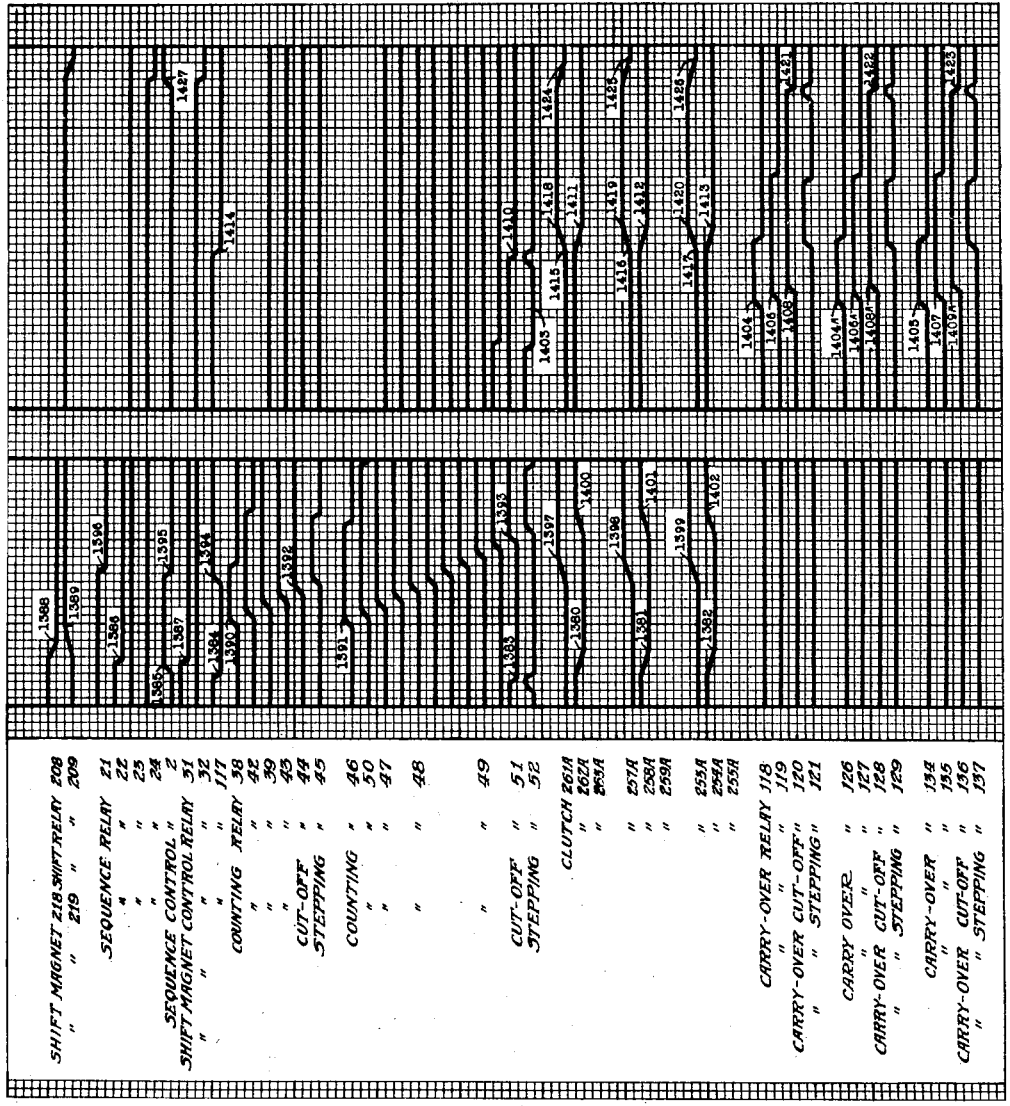

Figure 58 comprises a timing chart illustrating the fifth described typical operation of the machine.

*Preliminary statement*

It is the primary purpose of the several inventions for which this and the preceding applications have been made to provide for fully automatic calculating for metered public utility commodities and associated sales, with the minimum of speed loss and the maximum of flexibility according to varying requirements and rates. The essential features are adaptable to other calculating and accounting purposes.

The invention is illustrated as including cards perforated in numerical positions according to the meter readings and other figures for registration and computation, with the results for billing, as consumption quantities, and charges, displayed on number wheels.

In my application filed October 30, 1931, Serial Number 572,075, the equipment includes means for comparing numbers, so that the quantity of consumption (computed by subtraction of the previous from the last meter reading, and represented by contact-closing wheels) might determine a minimum charge if not more than a set quantity, or might be broken down into several steps each to be multiplied by the respective rates in a sliding scale. The minimum quantity and charge, the step quantities, and the rates, are determinable by positioned perforations for each customer for any figures within the numerical capacity of the machine.

The essential means of addition and multiplication are such as are described in my application filed May 31, 1932, Serial Number 614,411, i. e., paired counting and multiplying relays set up for each figure in number corresponding to the numerical position of a card perforation. For registration or addition, such relays are successively released by the advance of a number wheel from digit to digit, the release of the last relay so to be set up effecting the stoppage of wheel movement.

In my application bearing Serial Number 535,069, though counting relays are retained for effecting registration on number wheels—one set for all registers—, the money charge is cumulated from successive step quantities, not according to a multiplying process, but directly through electrical circuits prearranged for each possible numerical position of the consumption number wheels, in successive steps determinable by perforations. The circuits terminate in counting relays according to the due products of a given rate-multiplier, integral or fractional. Other arrangements of circuits are selectable as may be provided for other multipliers. In the course of the successive steps in these first and second billing machine applications, the consumption quantity in each step, or within the minimum, is registered.

In the present application, the money charge is selected through circuits prearranged according to the total charge due for each possible position of the consumption number wheels, without provision for varying or registering the step quantities. The operation gains in speed, though it loses in flexibility.

To effect continuity of operation, the sequences of the first and second billing machine applications are each governed by chains of paired sequence relays, including sub-chains controlling contingent operations, and operating somewhat as do the counting relays through successive releases. All such relays are locked up in advance, and each pair prepares in advance the circuits for its controlled operation, so that on completion of an operation the controlling pair is released and the next pair immediately starts the operation due to follow. If no operation represented by a sub-chain should be due, the sub-chain is automatically made ineffective, and the operation actually due to follow is immediately started.

In the machine of the present application, the contingent operations due are preselected according to card perforations, and only those sequence relays which are to start the selected operations are locked up and prepare their operating circuits.

The machine procedure is illustrated with certain operations regularly required and others subject to selection and to interposition between regular operations, thus indicating means for complete regularity or complete selectivity should either extreme be useful.

As noted, there is no appreciable lapse of time between operations, while intervening physical movements are confined to single relay armature attractions or releases. There are no cycle-completing or relatively slow selecting switch movements within an operation, as are found in previous electrical calculating machines.

Selectivity is a major feature of this application. The card has twelve divisions for meter reading perforations, normally for the twelve months. It is placed in a stationary position between contact fingers and contact bars. The physical contacts thus resulting through the perforations are selectively effective electrically in preparing circuits to become operative in due course. Fully selective cards may succeed one another without previous assortment. Means for selecting for action certain contacts through perforations, leaving others ineffective, are described in sufficient variety to illustrate the comprehensiveness of the system.

Application Serial Number 535,069 included bars and hand-set switches for selecting the figures for the month's billing from whatever position the due perforations might occupy on the card—whose year might begin with any month in the first monthly card division. The present application goes much further. A month's charge may include an installment due on merchandise. For such are provided bars for the money amount, and bars for selecting the class or classes of articles and the sequence relays for the operations. This and the foregoing selection are the more frequent in billing practice.

Within a billing period, the meter may be changed. For the bill, the charge must be determined from the sum of the differences between two readings on two meters. There are bars for selecting the four readings and the proper sequence relays, and registering equipment for accumulating the consumption quantity.

At the time of preparing a given bill, it may be that the past month's charge for the metered commodity or for the merchandise remains unpaid. The selective system provides for bringing forward either or both of such charges and adding it or them in with the present month's total charge. It should be apparent that the means shown for selecting the perforations for the month next past for repeated action could be applied, through additional like apparatus and circuits, to any month preceding or to several such months, with the effect of accumulating their charges.

In selecting last month's charge for the metered commodity, there is a selection of a group of fingers from among the groups of fingers positioned on the bars of a group of bars, which is done, as noted, without card assortment, without card motion, and without machine action except instantaneous relay armature movement.

There are four sets of money registers: one each for the money charge for the metered commodity for the present month and on occasion for the past month in addition; for the charge for merchandise, likewise for one or two months; for totalizing the amounts of charge on the foregoing registers; and for totalizing, for the day or month, the charges that may be brought forward in the course of billing for merchandise in arrears for the past month.

The register 261, 262, 263, Fig. 11, is for merchandise payments in arrears, and it is representative of a battery of like registers that might be used for numerous classifications, with like selective bars and relays, as for consumption quantities, consumption charges for present or past months, or different articles of merchandise. It should be apparent that other classifications for which in practice there would be a demand, could likewise be segregated and totaled, with additional equipment of the kinds herein illustrated; as, electricity for light and for power, gas for heating and for cooking, customers classified as to business or residence or industrial or as to geographical regions; and that two classifications could be selected for simultaneous operation, as unpaid merchandise and as a stove, in the manner herein shown for simultaneous registration on classified and bill totalizer wheels. Such automatic segregating and totalizing should be serviceable in many fields of accounting.

It should be apparent also that the divisions and sequences herein illustrated for electricity and merchandise combined in a bill could be adapted to include electricity and gas, or electricity and gas and merchandise, as are frequently supplied by one company in a community, with additional equipment of the same kinds as are herein illustrated.

The greater proportion of bills may be expected to be only for the metered commodity for the present month. The charge is then registered directly, without carry-over, on the consumption money wheels, starting from zero. The bill totalizer wheels, also starting from zero, are made to move in unison with these by a clutch-controlling circuit effective through the cut-off relays that control the stoppage of the consumption money wheels. If, however, there is an addition on the latter wheels, due, say, to a change of meter, there may be a carry-over that should be effective alike on both sets of wheels. In this event, the movement prior to carry-over is controlled for both sets as before, and the carry-over movement in unison for both sets is controlled by one set of carry-over relays. Thus the bill totalizer wheels are governed selectively by one or another circuit according to the presence or absence of carry-over action, avoiding loss of time.

With one merchandise operation there is never a carry-over in the present month's charge. With two (say present and last month's) charge, there may be a carry-over on the merchandise wheels, and on the totalizer wheels, and on the wheels herein illustrated for classifying merchandise charges in arrears, each independent of the others, though all due to the same original addition. The three sets of carry-over relays serving for these three sets of wheels suffice for the full four sets, as well as for the two sets of consumption quantity wheels, which never operate at the same time as any others. The three may operate at the same time. Under an operation heading is a description of the simultaneous operation of two.

Description of flow charts

Before describing the typical operations of the machine in detail, a general description of three typical operations will be given with reference to the flow charts shown in Figs. 18, 19 and 20. The first of these operations involves a metered commodity consumption recorded by two meters as where there has been a change of meters during the billing period. This operation also illustrates the performance of the machine in making entries of amounts due and overdue in payment for merchandise.

Referring now to Figure 18, which schematically illustrates the first typical operation hereinafter described, the control card for the machine is shown at the top of the figure. The card fields for control perforations are bounded by dotted lines and designated "No. 1 Meter previous reading", "No. 1 Meter last reading", etc., there being no showing of the individual bars or bar areas within such fields. As an incident to each sequential operation of the machine, energy for effecting the operation incident to such sequences is characterized at the points designated by the numerals I to VII, all of which with the exception of point V appear upon the control card. Numeral V appears adjacent to the schematic representation of the product table near the right hand side of the figure substantially midway between top and bottom.

When the starting key 1 (Fig. 2) is pressed at the beginning of the operation, circuits controlled by the switch 159 (Fig. 1A) and selective card perforations, hereinafter described in detail, cause the counting relays shown in Figure 18 to be energized. Only these relays and relays 23 and 24 (Fig. 2A) are caused to energize, the other sequence relays which are for controlling sequential operations not occurring in the present operation remain unenergized, wherefore no time is wasted in running through idle machine movements.

The first sequential operation takes place following energization of the sequence relays and under control of sequence relays 3 and 4. When sequence relay 4 deenergizes, closing contact 4B, a circuit is completed through contact 3A of sequence relay 3 for indirectly causing the impression of ground on the bars 150A, 150B and 150C which are beneath that section of the control card which has been perforated in accordance with the last reading of the second or No. 2 meter. Thus these card perforations determine which of the contact fingers are effective to energize circuits beginning at point I (Fig. 18) and extending through certain contacts of shift relay 200 to the counting relays, causing energization thereof in an arrangement representative of the meter reading amount represented by said card perforations. The cut-off relays associated with these counting relays establish circuits through other contacts on shift relay 200 to energize the clutches for driving the number wheels of the register 66—67—68 and of the consumption quantity register 71—72—73. Both of these registers are thus driven forwardly to display the last reading (455) of the No. 2 meter. After this entry has been completed in these registers, the previous reading of the No. 2 meter is set up in the proper registers under control of counting relays 5 and 6.

As the machine operation proceeds, sequence relay 6 eventually deenergizes causing the contacts of shift relay 200 to open, the contacts of shift relay 201 to close and causing the impression of ground upon the bars in registry with that section of the card carrying perforations representative of the previous reading of the No. 2 meter. The contact fingers thus permitted to selectively engage these grounded bars ground circuits leading from point II through shift relay 201 to the counting relays which are this time energized in an arrangement representative of the said previous reading, and the cut-off relays associated therewith establish circuits through other contacts of shift relay 201 for energizing the clutches will drive the register 93—94—95 and the consumption quantity register 71—72—73. Register 93—94—95 is driven forwardly in the amount 441, which is the assumed previous reading of the No. 2 meter, while the consumption quantity register is driven backwardly the amount 441 from 455 to 014.

Subsequently, when sequence relay 8 deenergizes, ground is impressed upon the bars beneath that section of the card carrying perforations representative of the last reading 441 in the No. 1 meter; that is, the meter first installed in the customer's premises. Circuits are thus picked up at point III through the contact fingers which are permitted to engage the grounded bars through said card perforations, such circuits being carried through contacts of shift relay 202 to the counting relays which are this time energized in an arrangement representative of the amount 441. And when the cut-off relays are again energized, other contacts on the shift relay 202 complete circuits therefrom to clutches for driving the register 76—77—78 and the consumption quantity register. Both of these registers are moved forwardly the amount of 441. Consequently, at the end of this sequential operation, the consumption quantity register will stand at 455, the sum of 014 and 441.

At the beginning of the next sequential operation sequence relay 10 deenergizes to cause the opening of the contacts on shift relay 202, the closing of the contacts on shift relay 203 and the impression of ground upon the bars 153A, 153B and 153C in registry with that section of the card perforated in accordance with the previous reading of the No. 1 meter. The contact fingers which are thus permitted to engage these bars establish circuits beginning at IV and leading through certain contacts upon the shift relay 203 to the counting relays which are thus set up to represent the previous reading 416 of the No. 1 meter. Circuit is established from the cut-off relays through other contacts of the shift relay 203 to the clutches for driving the register 83—84—85 and the consumption quantity register 71—72—73. Register 83—84—85 is thus advanced by the amount 416 while the consumption quantity register is moved backwardly by the amount 416 from 455 to 039, which amount is the total consumption recorded upon both meters.

Contact closing wheels 71F, 72F and 73F, movable with the number wheels on the consumption quantity register 71—72—73, control the setting of the product table (Figs. 8, 8A and 8B). As explained hereinabove this product table has a sliding scale base factor which is 6 for variable factors (represented by the setting of the contact closing wheels 71F, 72F and 73F) from 1 to 50 inclusive, which is 5 for the variable factors from 51 to 100 inclusive and which is 4 for variable factors of 101 and more. The product tables are complete for variable factors up to 125, inclusive. Since the variable factor 039 is set up in the product table by the consumption quantity register, the base factor 6 applies; the product 234 is recorded pursuant to the succeeding sequential operation.

Said succeeding sequential operation is accompanied by the deenergization of sequence relay 12 which causes opening of the contacts on shift relay 203, the closing of the contacts on shift relay 204 and the impression of ground upon said product table (Figs. 8, 8A and 8B) wherefore circuits emerging therefrom at point V, and representative of the product 234, are energized and lead through contacts of shift relay 204 to the counting relays which are thus caused to be set up in an arrangement representative of said product. Circuits established from the cut-off relays of these counting relays pass through certain other contacts on the shift relay 204 to clutches for driving the consumption charge register 250—251—252 and the bill totalizer register 253—254—255. In this manner the amount 234, having monetary significance of $2.34, is entered in each of these registers.

Sequence relay 20 next deenergizes to cause opening of the contacts on shift relay 204, closing of the contacts on shift relay 208 and impression of ground on the merchandise charge bars 186, 186A and 186B. Card perforations representative of the amount 250, which is the amount due in the current bill for merchandise, are in registry with these bars and permit contact fingers to engage the bars and complete circuits from point VI through contacts of the shift relay 208 to the counting relays whereby these counting relays are caused to energize in an arrangement representative of 250. In turn the cut-off relays are energized and establish circuits through other contacts of the shift relay 208 to clutches for driving the monthly merchandise charge register 257—258—259 and the bill totalizer register 253—254—255. The amount 250 is set up in each of these registers.

Subsequently sequence relay 22 deenergizes to indirectly effect the opening of the contacts on shift relay 208, the closing of the contact on shift relay 209 and the impression of ground for the second time upon the merchandise charge bars 186, 186A and 186B. The sequence relays 21 and 22, for causing this second grounding of the merchandise charge bars, were set up because the customer had failed to pay the previous month's payment for merchandise. This time the ground picked up at the merchandise charge bars 186, 186A and 186B is carried over circuits leading from point VII through contacts on the shift relay 209 to the counting relays which are again set up to represent the amount 250. This time the cut-off relays of the counting relays establish circuits through contacts of the shift relay 209 to the clutches of the classified totalizer register 261—262—263, the monthly merchandise charge register 257—258—259 and the bill totalizer register 253—254—255, causing the amount 250 to be entered in each of these registers. The monthly merchandise charge register will now show the total 500 ($5.00) which is the total amount due for merchandise, whereas the bill totalizer register will display the sum of 234, 250 and 250 or 734 ($7.34) which is the total amount due for both merchandise and the metered commodity.

Following this last described sequential operation, the machine automatically holds the registers for reading and subsequently resets them to zero in the manner hereinafter fully described under the heading "Holding for reading and zero setting (eighth sequence)."

Figure 19 illustrates the second described operation, which proceeds under control of the card shown in Fig. 14. This operation involves last and previous readings taken from a single meter and the entry of a single charge for merchandise. Since this operation employs a fewer number of sequential operations, a fewer number of sequence control relays as 3 and 4 are locked up at the beginning of the operation. Only those sequence relays shown in Figure 19, and sequence relays 23 and 24, are energized or locked up.

When sequence relay 4 deenergizes, following the energization of the energized sequence relays, the contacts of shift relay 200 are closed and ground is impressed upon the meter bars in registry with that section of the card pertaining to the last meter reading. This section of the card is perforated for the last meter reading 441 and therefore permits engagement of these bars by contact fingers representative of said reading, wherefore circuits leading from point I lead through certain contacts of shift relay 200 to the counting relays. Following the energization of these counting relays in an arrangement representative of the last reading 441, the cut-off relays associated therewith establish circuits through other contacts of the shift relay 200 to clutches for driving the last reading register 66—67—68 and the consumption quantity register 71—72—73 wherefore the amount 441 is entered in each of these registers.

At the beginning of the next sequential operation, sequence relay 6 deenergizes causing the opening of contacts on shift relay 200, the closing of the contacts of shift relay 201 and the impression of ground upon the meter reading bars in registry with that section of the control card in which perforations are made to represent the previous meter reading 416. Therefore, contact fingers which are permitted to engage the previous meter reading bars establish circuits from point II through certain contacts of the shift relay 201 to the counting relays which are thus energized to represent said previous meter reading. The cut-off relays again establish circuits, this time through other contacts of shift relay 201 to clutches for driving the previous reading register 93—94—95 and the consumption quantity register. This time the consumption quantity register is driven backwardly instead of forwardly. Consequently the amount 416 is entered in the previous reading register while the consumption quantity register is moved backwardly in the amount 416 from 441 to 025. The product table (Figs. 8, 8A and 8B) which is manipulated by the contact closing wheels in the consumption quantity register, therefore has its variable factor set at 025.

At the beginning of the next sequential operation sequence relay 12 deenergizes causing the opening of the contacts on shift relay 201, the closing of the contacts on shift relay 204 and the impression of ground upon the product table (Figs. 8, 8A and 8B). Thus grounded the product table energizes circuits originating at point III representative of 150 which is the product of 025 and 6, the base factor for variable factor amounts less than 50. These circuits originating at point III are extended through certain contacts of shift relay 204 to the counting relays wherefore said counting relays are also set up or energized to represent the amount 150. The cut-off relays establish circuits through other contacts of the shift relay 204 to clutches for driving the consumption charge register 250—251—252 and the bill totalizer register 253—254—255. Both of these registers are thus driven forwardly in the amount 150.

The succeeding sequential operation is accompanied by the deenergization of sequence relay 20 which causes the opening of the contacts on shift relay 204, the closing of the contacts on shift relay 208 and the impression of ground upon the bars in registry with that section of the control card which is perforated to represent the amount 250 for the merchandise charge. The contact fingers which are permitted to engage the merchandise bars through these card perforations complete circuits from point IV and through contacts of the shift relay 208 to the counting relays which in this manner are energized to represent the amount 250. And the cut-off relays which in turn energize establish circuits through other contacts of the shift relay 208 to clutches for driving the merchandise charge register and the bill totalizer register forwardly the amount 250. At the end of this sequential operation the consumption charge register will stand at 150, the merchandise charge register at 250 and the bill totalizer register at 400.

Following this sequential operation the number wheels of the registers will be held for reading prior to being reset to zero.

Figure 20 illustrates the third described typical operation which involves entries based upon the current month's charge and a metered commodity charge due the previous month but unpaid. The control cards is perforated as illustrated in Fig. 15.

After the sequence relays which are employed during this operation are energized, sequence relay 4 deenergizes causing the closing of contacts on the shift relay 200 and the impression of ground upon the meter reading bars in registry with that section of the control card which is perforated in accordance with the last meter reading 455 for the present month.

The contact fingers permitted to engage the grounded bars through said perforations establish circuits leading from point I through contacts of the shift relay 200 to cause energization of the counting relays in an arrangement representative of said present month last meter reading.

Circuits established by the cut-off relays in association with the counting relays lead through other contacts of shift relay 200 to clutches for driving the present month last reading register 66—67—68 and the present month consumption quantity register 71—72—73 forwardly. The amount 455 is set up in each of these registers.

At the beginning of the next sequential operation sequence relay 6 deenergizes causing the opening of the contacts on shift relay 200, the closing of the contacts on shift relay 201 and the impression of ground upon the meter reading bars in registry with that section of the card which is perforated in accordance with the previous meter reading 441 for the present month.

The contact fingers engaging the meter reading bars establish circuits beginning at point II and leading through contacts of shift relay 201 to the counting relays. This time the cut-off relays are effective for closing circuits through other contacts of the shift relay 201 to the present month previous reading register 93—94—95 and the consumption quantity register 71—72—73. In this manner the amount 441 is set up in the previous reading register and is subtracted from the reading 455 previously standing in the consumption quantity register so that said consumption quantity register finally comes to rest when reading 014.

The product table (Figs. 8, 8A and 8B) is likewise set at 014 in accordance with the reading in the consumption quantity register.

Later, when sequence relay 12 deenergizes, the contacts of shift relay 201 are opened whereas the contacts of shift relay 204 are closed and ground is impressed upon said product table whereby circuits emerging therefrom at point III and representative of the amount 084 (the product of the base factor 6 and the variable factor 014 set up therein) are established and led through contacts of shift relay 204 to the counting relays whereby said counting relays are set up in an arrangement representative of 084. The cut-off relays therefore establish circuits through other contacts of shift relay 204 to the clutches for driving the consumption charge register 250—251—252 and the bill totalizer register 253—254—255 so that the amount 084 is set up in each of these registers.

Next the sequence relay 14 is deenergized causing the opening of the contacts of shift relay 204, the closing of the contacts on shift relay 205 and the second impression of ground on the meter reading bars in registry with that section of the card perforated in accordance with the previous meter reading 441 of the present month. The previous meter reading of the present month is the same as the last meter reading of the past month, and therefore the contact fingers representative of the amount 441 are again permitted to engage these meter reading bars and this time establish circuits from point IV through contacts of shift relay 205 for causing the counting relays to be set up according to the reading 441. This time the cut-off relays establish circuits through other contacts of the shift relay 205 to clutches for driving the number wheels of the past month last reading register 300—301—302 and the past month consumption quantity register 306—307—308, wherefore the amount 441 is set up in each of these registers.

The beginning of the next sequential operation is accompanied by the deenergization of sequence relay 16 whereby the contacts of shift relay 205 are opened, the contacts of shift relay 206 are closed and ground is impressed upon the meter reading bars in registry with that section of the control card which is perforated to represent the previous meter reading 416 for the past month. Therefore, contact fingers representative of 416 are permitted to engage these grounded bars and establish circuits from point V through contacts of the shift relay 206 for energizing the counting relays. The cut-off relays then complete circuits through contacts of shift relay 206 to clutches for driving the number wheels of the past month previous reading register 303—304—305 and the past month consumption quantity register, the last of such registers being driven backwardly. At the end of this sequential operation the past month previous reading register will stand at 416 while the past month consumption quantity register will stand at 025, the difference between 441 and 416. Likewise, the past month product table (Figs. 10, 10A and 10B), which has the variable factor therein set by contact closing wheels movable with the number wheels of said past month consumption quantity register, will be set at 025.

When sequence relay 18 subsequently deenergizes, the contacts of shift relay 206 will be opened, the contacts of shift relay 207 will be closed and ground will be impressed upon the input side of the product table (Figs. 10, 10A and 10B). The fixed factor of the product table for amounts less than 050 is 6, and therefore the factor 025 standing in said product table will result in a product 150 which is represented by energized circuits leaving the product table at point VI and leading through contacts of shift relay 207 to the counting relays which are thus caused to energize in an arrangement representative of said amount 150. The cut-off relays establish circuits through other contacts of shift relay 207 to the consumption charge register 250—251—252 and to the bill totalizer register 253—254—255, wherefore the amount 150 is entered in each of these registers. And at the end of this sequential operation each register will display the total reading 234.

Subsequently in the operation of the machine, after holding of the number wheels sufficient time for reading, the number wheels of all registers will be returned to zero.

DESCRIPTION OF APPARATUS

In describing the apparatus I indicate the functions of many of the parts and circuits. The circuits are traced in detail only in the description of the operation of the machine which follows the description of apparatus.

*Contact bars and fingers. Figure 1*

The contacts bars and fingers in the various sets thereof shown in Figure 1 are alike. Their purpose is to establish electrical paths through the various card perforations.

The wiring of the fingers at 500, 501, 502, 503, is made up to form cables, as 223, 225; the cables are shown as broken off at a nearby point, with the other end broken off near the other terminus—at both places bearing the same reference characters.

The bars illustrated in Figure 1 for this description are: at 500, the bars used for the previous reading of the No. 1, or original, meter; at 501, the bars used for the last reading of the No. 1 meter; at 502, the bars used for the previous reading of the No. 2, or later, meter; at 503, the bars used for the last reading of the No. 2 meter. At 504 are shown merchandise selector bars, for selection of articles or classes of merchandise to be billed; and at 505 merchandise money bars for registering the amount of monthly payment due for one such article.

The merchandise selector bars at 504 represent four months, two for each. They are shown with a capacity for five classes, with a contact finger for each class, multipled to all other like-positioned fingers. Only one finger is shown wired. In the examples of operation, only one class, as a stove, is shown as selected. It should be apparent that other selections, as for a clock and a laundry iron, could be made in like manner with like equipment controlled from a different one of the five contact fingers engageable with the selector bar through a different card perforation. Only a single finger is permitted to engage any of these bars so that if payments for more than one article of merchandise are to be handled a corresponding additional number of bars as 187 will be provided for each month. Each of these additional bars as 187 will have a separate monthly contact associated with switch 158 (Fig. 1A), and the fingers engageable with such bars will be multipled through conductors as 187E with similarly positioned fingers engageable with the other of such bars. Bars as 187 are for the selection of the monthly charge, through switch 158 (Fig. 1A); bars as 187A are for the selection of the previous month's charge if that is to be brought forward as unpaid. The circuit is made effective by a perforation grounding a finger, as 187B, for this month's charge, energizing sequence relays 20 and 19 (Fig. 2A), setting up a circuit through bars 186, 186A, 186B, to register the money charge; for last month's charge repeated, a finger as 187C is grounded, energizing sequence relays 22 and 21, to repeat the operation. Separate monthly contacts for the monthly selection bars as 187 and 187A are provided so that these bars will be disconnected from one another except when the switch 158 is set at the monthly contacts to which said bars pertain. In this manner prevention is had of promiscuous feed back through monthly selector bars not in use to conductors as 187E Bars 186, 186A, 186B, at 505, are such a set as is associated with one finger, as 187B, in one of the class positions on a bar, as 187, and its multipled connections. Perforations for such bars are in terms of money, at $2.50 for a stove, and are effective for the months for which the class selective perforations are made, as at the time of the sale for future installments. Likewise they are associated with finger 187C for the purpose of repeating the change for the month last past if it goes unpaid and a perforation is made for that finger. An illustration of such repetition appears in the description of operation. It should be apparent that with perforations for other articles at other prices, as a clock at $1.25 for predetermined months, and a laundry iron at $1.00, the three amounts on three sets of bars each similar to those shown at 505 could be accumulated on the set of merchandise money wheels, with such additional equipment and in such manner as are herein described for accumulating the present and past months' charges; and so also for totalizing separately the charges for each class for the month, corresponding to the totalizing of charges in arrears.

Included in the 500, 501, 502, 503 sets of bars are selector bars, as 150M and 150N. Bars as 150M are for the purpose of setting up circuits to register the readings of two meters and to combine the readings on one set of consumption wheels, so that the money charge can be duly computed from the sum. Bars as 150N are for the purpose of setting up circuits to complete, through repetition of the past month's operation, the charge for that month if to be brought forward as unpaid. Each such bar has two contact fingers, as 150P and 150Q, which are made effective through card perforations. Bars 150M and 150N are grounded together, and are in effect one bar—here shown as two for convenience of explanation.

For the four groups of meter reading bars, 150A, 150B, 150C; 151A, 151B, 151C; 152A, 152B, 152C; 153A, 153B, 153C, each finger is in a numerical position, and all are wired in multiple according to these positions; as, 150 F, the No. 4 finger in the hundreds order, is wired in multiple by a conductor, as 150J, in cable 223, for fingers at 151F and other No. 4 fingers in the same order; and are thus wired through to a correspondingly positioned contact in a shift relay, as 200 (Fig. 5). Units finger 150H is the fifth finger counting up from the bottom for bar 150C; it is wired to contact 200C, the fifth contact counting from right to left in the left-hand group of 27 contacts of shift relay 200. The fingers for the group of bars 186, 186A, 186B, are likewise wired, singly, to a shift relay. There are as many pairs of contacts in the left-hand section of each shift relay as there are fingers on the bars, nine for units, nine for tens, and nine for hundreds.

The bars enumerated, when selected for use, are momentarily grounded at different stages of operation by the deenergization of the first relay, as 4 (Fig. 2), of a sequence relay pair, and in turn energize the due counting relays (Fig. 3). The ground is removed by the deenergization of the second relay of a sequence relay pair, as 3 (Fig. 2), leaving the counting relays still energized through a local circuit.

For the purpose of selecting a proper set of monthly meter reading bars for use, a system is provided consisting of two switches, 157 and 159 (Fig. 1A), a bar, as 150, and twelve fingers, as 150 D, one for each month. Switches 157 and 159 have a contact for each month— twelve being shown, with four wired. The contacts of one switch are multipled to the like-positioned contacts of the other. Fingers, as 150D, are multipled to the other like-positioned fingers in the several sets of selector bars; these in turn are multipled to other like-positioned contacts in switches 157 and 159. These switches connect conductors 3K and 5K to the last and previous reading wires, so that any reading may be made effective as last or previous.

Figure 1A:
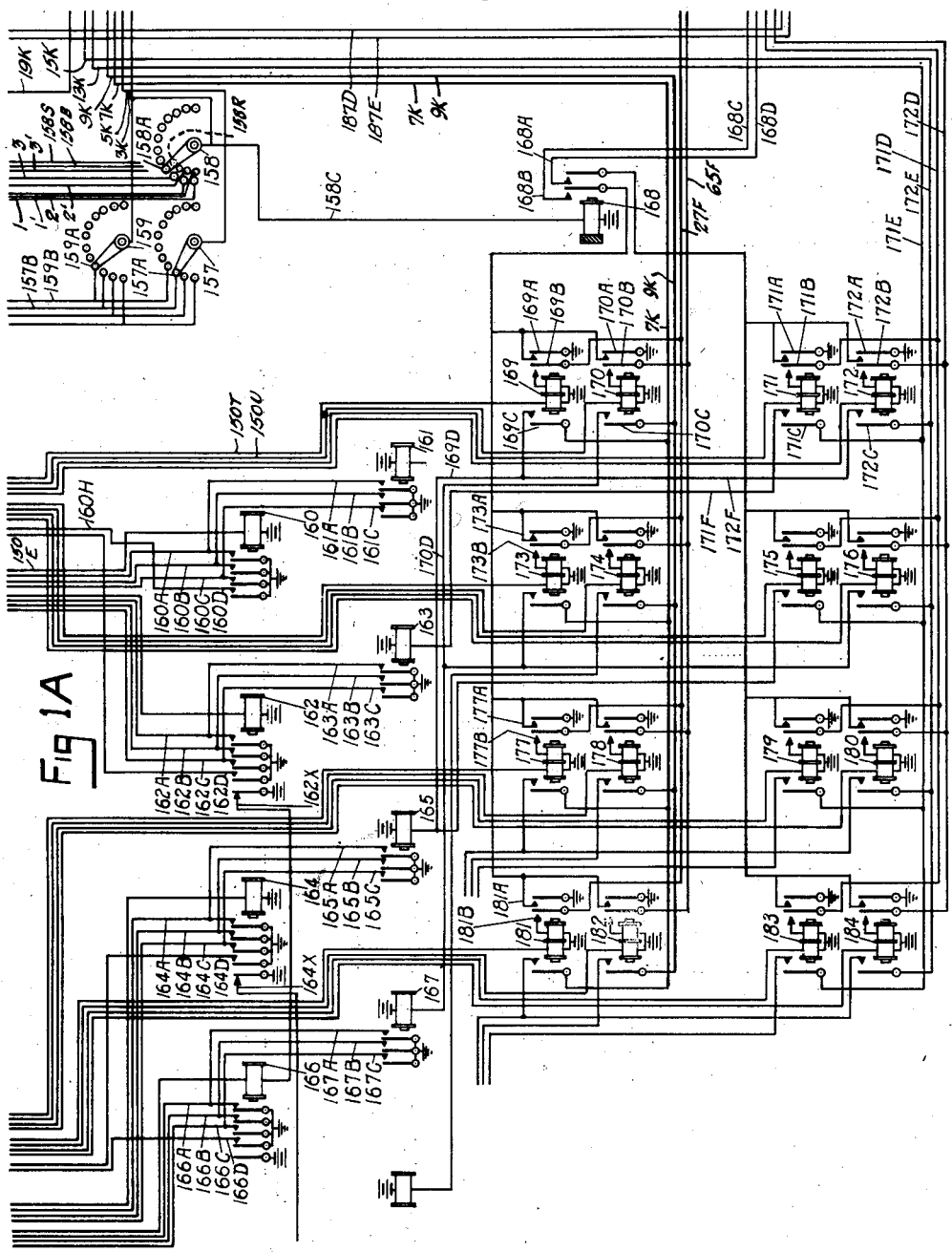
Figure 1A shows the several selector relays related to the selector bars, and the hand switches set monthly, the relays, bars and switches being included in the selector circuits.

Switch 158 is for the purpose of grounding merchandise bars, as 187 and 187A, a pair for each month; this switch has a contact for each month, and is set to correspond to the setting of switch 159. It is multipled to conductor 3K. With this arrangement, when conductor 3K is grounded, with switches 158 and 159 set as shown in Figure 1A, conductors 158B and 159B will be grounded; 159B grounding fingers as 150D; and through perforation 150DD bar 150 is grounded, energizing selector relay 160 (Fig. 1A), grounding through contacts 160A, 160B, 160C, 160D, meter reading bars 150A, 150B, 150C, and selector bars 150M and 150N.

Each set of bars, as at 500 is representative of a month's meter reading; two sets, as at 500 and 501, are required for the computation of a month's consumption. Three sets are required for including last month's billing with this month; four sets, for including consumption through two meters in one bill for the same month. It will be understood that the positions of bars and selective perforations are not constant for the calendar months: the card's year may begin, say, with March, and the space following may be used for a meter change, so as to position the regular April perforations later on.

Selector relays. Figure 1A

Each group of bars has two associated relays, as 164 and 165 for group 501. Relays as 164 are for the purpose of grounding the meter reading bars, as 152A, 152B, 152C, and selector bars, as 152M and 152N, and setting up circuits through such selector bars in registering the two readings of a meter displaced, or the previous reading of this month and the last reading of the past month, for bringing forward the past month's charge. Relays as 165 are for the purpose of grounding only the selected meter reading bars on such double operations. Relays as 164 are energized only from the "last" sequence relays, 4 and 3, conductor 3K, switches 159 and 157, and any one of the several contact fingers, as 152D, bar 152, if a perforation there exists, or from the "previous" sequence relays, 6 and 5, conductor 5K, through a like path, depending on the position of switches 157 and 159.

Relays 166, 164, 162, 160, when energized, ground their respective contacts; as, 160 grounds contacts 160A, 160B, 160C, 160D. Contacts 160A, 160B, 160C, ground meter reading bars 150A, 150B, 150C. Contact 160D grounds selector bars 150M and 150N, and if there are corresponding perforations fingers 150P and 150Q, or 150R and 150S.

For practical service, the first, second, and third relays in the system would be connected to battery, as relays 160, 162, 164, are here shown; relays as 166, the fourth of its kind in the system, are supplied battery from contacts as 162X; the fifth relay would have as a battery supply connection a contact as 164X. This is for the purpose of preventing the operation of relays as 166 on a changed meter operation in case the card for the previous reading of the No. 1 meter should have a perforation (made through lack of knowledge of meter change) in the same position as for the previous reading of the No. 2 meter.

For meter readings in regular order—without change of meter or arrears of payment—two relays, as 160 and 162, 162 and 164, or 164 and 166, will operate; for example, if bars 150A, 150B, 150C, represent the last reading, and bars 151A, 151B, 151C, the previous reading, then relays 160 and 162 will operate, in this order.

Selector relays 167, 165, 163, 161, are so connected as to ground in respective sets of bars only the meter reading bars, leaving the selector bars of the sets ineffective. They are used for the special operations of changed meter and repetitions of the previous month's charge. It may be observed that they exemplify means serviceable for selecting particular bars and columns of perforations for registration or computation on accounting and statistical cards. Each such relay represents a set of bars, as relay 167 represents the set shown at 500. In practice, with a full set of bars, relay 161 would be wired as are other like relays. In the first example of operation to be described below, the several relays operate in the order of 160, 162, 165, 167, i. e., for the last and previous readings of the No. 2 meter and the last and previous readings of the No. 1 meter.

Relays 171 and 172 are also selector relays. They are for the purpose of setting up circuits to register the readings of the month last past and the money charge. They are energized from bars as 150N and fingers as 150R and 150S if there are perforations therefor. Once energized through contacts as 171A, 172A, they ground contact 168A, conductor 168D, and energize winding 14H of sequence relay 14 (Fig. 2), energizing relays 13, 16, 15, 18 and 17. Relays 171 and 172 then lock up through contacts 171B and 172B, and 13G and 15G, to be released later in their due order. Contacts 171C and 172C closing complete circuits from contacts 13A and 15A, and conductors 13K and 15K, contacts 171C and 172C, conductors 171F, 172F, 169D, to relays 163 and 165; 163 grounding in due order the last reading bars, at 502, 151A, 151B, 151C; and 167 likewise grounding the previous reading bars at 501, 152A, 152B, 152C, of the past months record.

With this arrangement, it will be seen that in an operation involving two meters, relays 160, 162, 165, 167, will be operated; in an operation involving the past month's readings, relays 160, 162, 163, 165, will be energized, as bars 150A, 150B, 150C, and 151A, 151B, 151C, are grounded to obtain this month's consumption, and bars 151A, 151B, 151C (again), and 152A, 152B, 152C, are grounded to obtain last month's, the latter bars following the former. Relay 169, through contact 169C, conductor 169D, will close a path to relay 165 for energization on a "last" operation for the No. 1 meter in a meter change operation. On a past month's operation, contact 172C also closes a path through conductors 172F and 169D to energize relay 165 on a "previous" operation.

With the apparatus as illustrated, only two sets of fingers and two selector relays, for two classes of selections, are shown for each set of bars: fingers 150R and 150S, and relays 171 and 172, for the past month, and fingers 150P and 150Q, and relays 169 and 170, for selecting the No. 1 meter bars at 500 and 501 after the operations dependent upon the No. 2 meter bars at 502 and 503. It should be apparent that with additional fingers and relays—a finger and two relays for each two selections, or a finger and one relay for one selection—and with an additional pair of sequence relays for each selection, other desired selections, or any order of selections, could be effected.

Slow relay 168 is for the purpose of momentarily closing contacts 168B and 168A, to complete the energizing circuits between such contacts as 169A, 170A, and sequence relays 8 and 14. Relay 168 is energized from contact 3A.

*Sequence relays. Figures 2 and 2A*

The function of the sequence relays is to govern the succession of operations, with provisions for selections and for immediately passing action from the completion of each due operation to the starting of the next. The circuits and actions of particular sequence relays are detailed in the description of the sequences under Operation headings.

The sequence relays are arranged in part in a chain of pairs, always energized in an operation, in part in sub-chains, and single pairs selectively energized. They are numbered 4 and 3, 6 and 5, successively to 24 and 23. Once energized, they are released one by one on the energization and deenergization of sequence control relay 2, through the make-before-break contacts 2A and 2B. The selectively energized pairs are 8—7 and 10—9, 14—13 and 16—15 and 18—17, in two sub-chains, and 20—19, 22—21, separately selectable, for four special operations; the selection is through card perforations. Pairs 4—3, 6—5, 12—11, 24—23, are invariably energized by the momentary closing of key 1, which directly energizes relay 4, closing contact 4C, energizing relay 3, which grounds contact 3C, conductor 3X, winding 12D of relay 12, which energizes from contact 12C winding 11E of relay 11. The latter energizing grounds contact 11C, energizing through winding 24D relay 24, which energizes its mate 23. Relay 3 also grounds contacts 3G and 3F; contact 3G energizes shift margnet control relay 25; contact 3F energizes winding 6D of relay 6, grounding contact 6C, and energizing relay 5. Relays 5 and 11 energizing ground contacts 5C, 5F, 11G. Relay 23 energizing closes contact 23G, and completes the circuit for the energization of sequence control relay 2.

The special sequence relay pairs enumerated are selectively energized from bars—as, from bar 150M for pairs 8—7 and 10—9; bar 150N for pairs 14—13, 16—15, 18—17; bars as 187 for pair 20—19, and as 187A for pair 22—21—and their fingers, according to perforations.

Relays 8, 10, 14, 16, 18, and their mates, if energized, are energized in a regular order. Relays 8 and 14 are energized through a perforation, energizing the other relays in their respective special lots. Relays 20 and 22 may be energized singly or together through perforations. Relay 22 (for merchandise) is to repeat such a registration as is first effected through pair 20—19.

Odd numbered sequence relays 3, 5, 7, 9, have a contact, as 3C, connected to a common conductor, as 3X. Such contacts are for the purpose of energizing and holding energized through winding 12D relay 12, so long as any of the special contacts remains grounded. With this arrangement, relay 3 energizes relay 12 and holds it energized against the action of sequence control relay 2 so long as relay 3, 5, 7, or 9, is energized.

Relays 11, 13, 15, 17, 19, have like contacts, as 11C, for energizing and holding energized, through conductor 13Y, winding 24D of relay 24, so long as contacts as 11C are grounded. Relays 11, 13, 15, 17, 19, also have contacts as 11F, 11H, for grounding conductors 11X and 13X, to hold energized through contacts 20D and 22D relays 20 and 22 (for merchandise) when once energized These contacts are for the purpose of holding relays 20 and 22 energized so long as any odd-numbered relay of a lower position in this chain is energized. Once freed from this energizing source, they pass under control of sequence control relay 2. Upon the deenergization of the latest of these to be effective in any operation, relays 12 and 24 are released by relay 2 in their order.

Each of the special pairs enumerated, once energized, takes its place and is released in its order. For example, relay 8 is energized from selector relays 169 and 170, which are energized from selector bar 150M, and when energized locks up through contact 8D, winding 8G, and contact 5F, and remains energized so long as relay 5 so remains. While relay 8 is energized, winding 8E is also energized through contact 8F and sequence control contact 2B so long as 2B is closed. In this manner, relays as 8, 14, 20, 22, having been energized, are continued energized so long as any odd-numbered relay of a lower position is energized. On the release of all such odd-numbered relays, such relays as 8 come under control of contact 2B.

Contacts 7G, 9G, 13G, 15G, also control the continued energization of selector relays 169 and 170, 171 and 172, maintaining a closed circuit at contacts as 169C for the energization of relays as 165 by contacts as 7G.

Associated with relay pair 4—3 and other like relays (except 16 and 24 and their mates) are shift magnet control relays, numbered 25 to 32 and 65. These are for the purpose of grounding such contacts as 25B, setting up circuits through contacts as 4A to energize shift magnets as 219, on the deenergization of relays as 4. These relays are energized from contacts as 3G; once energized, they lock up through contacts as 25A, and are released when the next even-numbered relay, as 6, is released by contact 2B. For relay 16, the energizing source for shift magnet 216 is contact 18C of relay 18, since both are necessarily involved in a past month's reading.

On the energization of sequence control relay 2, contact 2B opens, freeing contact 4F from ground, releasing relay 4; and on the deenergization of relay 2 contact 2A is freed from ground, releasing through contact 3B relay 3. In this manner, on each energization and deenergization of the sequence control relay, a pair of sequence relays is released; and on a succeeding energization, shift magnet control relays as 25 are released.

On the energization of relay 23, contact 23G closes, closing a circuit through contact 35A, conductor 35C, sequence control relay 2, conductor 2C, contacts FF, EE, DD, CC, BB, AA, and contact 117G (Fig. 4), energizing relay 2.

For holding the number wheels a sufficient length of time for reading and to start the zero-setting operation, a solenoid 34, is provided, with a predetermined time of action. It is energized by the release of relay 24, and starts its plunger-rod downward. At the end of the stroke, contact 35A is opened, releasing sequence control relay 2, deenergizing sequence relay 23, which deenergizes the solenoid. At the end of the downward stroke, contact 35B is closed, setting up circuits to reset all number wheels to zero.

Each pair of sequence relays governs an operation. For example, relay 2 on energizing opens contact 2B, freeing relay 4 through its contact 4F and winding 4E, grounding contacts 4A and 4B. Contact 4B grounds contact 3A and conductor 3K. Contact 4A energizes shift magnet 210, connecting the circuits from the fingers of the contact bars to the counting relays and from the counting relays to the selected registers. Contact 4B starts the first operation by the grounding of the selected meter reading bars.

The deenergization of relay 4 opens contacts 4C and 4F. Contact 4C frees winding 3E of relay 3 from this source of energization, and places it under control of contacts 2A and 3B, to be deenergized at the beginning of the operation when sequence control relay 2 is deenergized.

Sequence control contact 117G (Fig. 4) of relay 117 is opened in the course of each counting relay action (except for carry-over) and at any one of the sequence control contacts FF, EE, DD, CC, BB, AA (Fig. 4), on a carry-over action. Any opening of contact 117G deenergizes control relay 2, and deenergizes the odd-numbered sequence relay (in this example, 3), which at the due stage opens the starting circuit. It requires the closure of all such control contacts to energize again the control relay, deenergize the next even-numbered sequence relay, and start the next operation.

Relay 33 is a special relay and is only rendered operative when the consumption is nil in the present month's billing, that is, when all of the wheel assemblies of which the number wheels 71, 72 and 73 are a part stand at zero.

As is explained hereinafter, the positioning of the wheel assemblies of which the number wheels 71, 72 and 73 are a part determines the amount of the money charge and the operation of determining the amount of the money charge proceeds when the shift relay 204, explained more fully hereinafter, is energized, that is to say, when the various normally separated contacts therein are engaged. Obviously if the aforesaid wheel assemblies all stand at zero no money charge is to be made. In such a circumstance where the wheel assemblies all stand at zero the contacts 279, 279A and 279B (Fig. 8) are closed.

When these contacts are all closed ground is found at 279L and circuit from ground is established through closed contact 279, conductor 279M, closed contact 279A, conductor 279N, closed contact 279B through conductor 279C (Figs. 8, 8A and 8B). This circuit terminates in Fig. 8B and re-appears in Fig. 5 where it leads to the contact H5. As explained, shift relay 204 will be energized at this time wherefore contact H5 is closed. Contact G5 will likewise be closed at this time. Thus circuit is continued from conductor 279C through closed contacts H5 and G5 to the conductors 242 and 242A. Conductor 242 (Figs. 5, 3 and 4) leads to control relay 117 (Fig. 4) which, it will be noted, is connected to battery and thus when shift relay 204 is energized and contacts 279, 279A and 279B are closed, control relay 117 is energized for a purpose which will be explained presently.

The above described grounding of conductor 279C through closed contacts H5 and G5 also grounds conductor 242A (Figs. 5, 5A, 2A and 2) which applies ground to relay 33 (Fig. 2) and thereupon relay 33 energizes, opening contact 33A thereof.

As explained more fully hereinafter, relay 28 (Fig. 2) is energized at this time and the contacts 28A and 28B thereof are closed. Furthermore at this time control relay 2 (Fig. 2) is energized whereby contact 2A thereof is closed but contact 2B is open. Upon this energization of relay 2 and the opening of contact 2B, relay 2 released, closing contact 2A thereof whereby from ground at contact 28B through now closed contact 2A and conductor 12X, ground was applied to magnet 214 (Fig. 5), which magnet brought about the closing of the shift relay 204 (Fig. 5) and the above described closing of contacts H5 and G5.

When relay 117 (Fig. 4) was grounded from conductor 279C, as above described, contact 117G thereof opened which, in the manner described more fully hereinafter, and more particularly through the conductor 2C, frees the control relay 2 from ground whereupon this relay starts to deenergize to close contact 2B and open contact 2A. Upon such deenergization of relay 2 and the closing of contact 2B a stick or holding circuit would be established for relay 28 from contact 2B through conductor 2M, conductor 2N, conductor 2R, contact 33A, conductor 2S, closed contact 28A through the left-hand winding of relay 28 to battery, whereby relay 28 would be maintained energized holding contact 28B thereof closed to maintain shift magnet 214 energized.

However, as explained above, when conductor 279C is grounded to thereby apply ground to conductor 242A and therefore relay 33, relay 33 energizes, as stated above, and opens contact 33A thereof. Thus the just traced stick or holding circuit for relay 28 is opened at contact 33A wherefore relay 28 releases and thereafter shift magnet 214 releases to thus separate the normally separated contacts of relay 204, and hence instead of a charge-computing operation proceeding as would normally occur if relay 204 remained closed, the machine will proceed on to a succeeding cycle of operations, as described more fully hereinafter.

*Counting relays. Figure 3*

These relays, all of which are shown in Figure 3, are for the purpose of positioning the several sets of number wheels (Figs. 6, 7, 9, 11) directly or indirectly. There are three groups illustrated, respectively for the hundreds, tens, and units orders, with nine pairs in each group for the digits 1 to 9.

These relays are arranged in a chain of two rows for each order of numbers. Relays 36 and 40 as a pair represent 4 in the hundreds order; 46 and 50, 5 in the tens; 54 and 57, 5 in the units. Each relay in the lower row, as 36, 37, 38, has three windings, as 36A, 36D, 36E. The first relay in the row to be energized will be energized from a like-positioned contact finger, as 150F (Fig. 1 at 503), through a winding as 36D. This energization is momentary; once energized, relays as 36 lock up through windings as 36E, contacts as 36C and 45A, so long as contact 45A is closed.

On energization of such a relay as 36 from the fourth finger, as 150F, on the associated contact bar, as 150A, its mate, 40, is energized through contact 36B; relay 40 in its turn energizes relay 37 through contact 40C; and in like manner all relays representing lower numerical values in the chain are energized. Relay 44, designated a cut-off relay, is in addition to the paired relays; it is first energized by contact 43C of the No. 1 pair, and remains energized so long as contact 43C is closed. On deenergization of relay 43, control of relay 44 passes to contact 45A, through contact 44B and winding 44A. On energization of relays as 44, contacts as 44G are grounded, energizing through conductor 242 relay 117 (Fig. 4), opening sequence control contact 117G, deenergizing sequence control relay 2 (Fig. 2). This removes ground from all the associated contact bars, 150A, 150B, 150C, and frees relays as 36, 46, 54, from this source of energization. When these latter relays become energized, they are locked up through contacts as 36C and 45A, and hold their mates, as 40, energized through contacts as 36B.

Here, as elsewhere, it may be noted that the operation prepared for through the card perforations becomes, through the removal of ground from bars, independent of the perforations and the bars.

In Figure 3 for each group of counting relays is shown one steping relay: 45 for the hundreds, 52 for the tens, 59 for the units. These are for the purpose of releasing one pair of counting relays for each advance of one digit place on a number wheel.

On energization of a cut-off relay, as 44, contacts as 44C, 44D, 44E, are grounded. Contact 44C completes a circuit to energize stepping relay 45, closing contact 45B and opening contact 45A with a make-before-break effect. On the opening of contact 45A, relay 36 is deenergized, through contact 36C and winding 36E; and on the closing of contact 45B relay 40 is held energized through contact 40B and winding 40A so long as relay 45 is energized.

The energization of relay 45 is effected through a clutch coil, as 66A, of a number wheel, as 66 (Fig. 6), and the deenergization of said relay is effected by the movement of the related contact-closing wheel, 66C, from digit to digit, closing and opening a shunting contact, as 66D, on each digit movement. The result is to count the number represented by the position of the effective finger on the contact bar and of the first-energized counting relay, and to advance the number wheel accordingly. This one lot of counting relays suffices for all number wheels so advanced.

The counting relays are shown wired to a common cable, 237; their respective conductors lead to like-positioned contacts in the left-hand group of contacts of shift relays (Figs. 5 and 5A). The contacts of the several relays, as 44D and 44E, and one side of the stepping relays, as 45, are wired by means of conductors, as F, C, and E, to cable 240, and are multipled to the contacts in the right-hand group of the shift relays. Such conductors are lettered A, B, C, D, E, F, a, b, c, each occupies a position in the shift relays corresponding to its letter, beginning with A as the first right-hand pair.

*Carry-over relays. Figure 4*

The carry-over relays are essentially of the same design and operation as the counting relays. They are for the purpose of effecting arithmetical carry-overs in either direction of movement of number wheels, in addition or subtraction. Like sets of these relays, in Figure 4, are illustrated as operating in addition and subtraction.

These relays are arranged in three sets of two groups each, as at 510, 511, and 512, 513, and 514, 515. The 510 group of one set includes a pair of relays, 113 and 114, corresponding to a counting relay pair (there being no need of provision here for more than one digit movement); a cut-off relay, 115, and a stepping relay, 116; these are for carry-overs from units to tens. The 511 and all other groups have corresponding relays; the 511 group is for carry-overs from tens to hundreds.

Relays of the 510, 511, set are selectively used to effect carrying operations between the wheels of the consumption quantity wheels, 71, 72, 73 (Fig. 7), and 306, 307, 308 (Fig. 9), which never operate at the same time, and the consumption money wheels 250, 251, 252 (Fig. 11), and of the bill totalizer wheels, 253, 254, 255, which never operate at the same time as the quantity wheels, and which in operating together are always in numerical agreement.

The carry-over relays are connected with the register wheels through contacts of the several shift relays (Figs. 5 and 5A). 510 group is energized, for example, by the momentary closing of contacts as 73G (Fig. 7) of the units consumption quantity wheel 73, grounding conductor 232H, shift contact H4, cables 239 and 240, conductor H, energizing carry-over relay 113, which energizes its mate 114, which in turn energizes cut-off relay 115, setting up a circuit from contact 115C, stepping relay 116, contact 117A, conductor G, shift contact G4, conductor 232G (Fig. 7), to energize clutch 72A of the tens wheel; also contact 115D, conductor J, shift contact J4, conductor 232J, to shunting contact 72D, with the effect of advancing wheel 72 one digit place, in the manner described for the action of counting relays.

In a later cycle of operation, if there is an additive charge involving a carry-over to the tens, of the consumption wheel 251 of Fig. 11, contact 252G momentarily grounds conductor 233H, shift contact H8, conductor H, energizing relay 113. Relay 115 is energized, grounding contacts 115C and 115D. Contact 115D closes a circuit to stepping relay 116, contact 117A, conductor G, shift contact G8, conductor 233G, energizing clutch 251A.

For effecting movement of bill totalizer wheel 254 (at 508, Fig. 11), the circuit is, contact 115D, conductor J, shift contact J8, conductor 233J, clutch 254A.

The relay sets at 512, 513, and 514, 515, respectively serve a like purpose for the merchandise and classified totalizer wheels (Fig. 11). As will be illustrated in the description of the money wheels, the three sets of carry-over relays related to the three sets of wheels at 507, 508, and 509, of Figure 11, may, while these are operating together, be receiving independent carry-over impulses; as, from carry-over contacts 259G, 263G, 255G, energizing relays 113, 122, 130. Relays of the next higher order may also be so energized.

When energized, cut-off relays as 115 open contacts as AA and AAA, for the purpose of opening the sequence control circuit and the operating circuit to the next higher order of relays in the same set, to prevent their premature operation before the carry-over in the lower order is completed.

Relay 117 is for the purpose of opening the sequence control circuit at contact 117G, and the circuits of the carry-over stepping relays, as 116, at contact 117A, to prevent energization of carry-over stepping relays until the original movement of number wheels under control of stepping relays of Figure 3 is completed. Contact 117G also grounds on deenergization of relay 117 contacts as 115C and 115D of the three sets of carry-over relays, if cut-off relay 115 is energized, conditioning each set to effect its carry-over on the de-energization of relay 117. If relays 115 and 120 are both energized, contacts AAA are open, withholding ground from contacts 120C and 120D until relay 115 is deenergized.

*Shift relays. Figures 5 and 5A*

The ten shift relays, 200 to 209, are for the purpose of momentarily connecting, in the due order of use, the several groups of fingers to energize the counting relays and the carry-over relays, and to connect the operating circuits of the counting relays to the several clutches and other members of the various registers.

There is one multi-contact shift relay for each of the ten regular and special operations governed by counting relays: viz.: last reading, and previous reading, of a regular meter; last reading, and previous reading, of a changed meter; money charge as computed; last reading, and previous reading, and money charge, for the past month, if in arrears; money charge for merchandise; past month's money charge for merchandise if in arrears.

The shift relays are alike in construction and use, except that the number of contacts in the right-hand portion varies with the number of circuits to be established.

Each shift relay, as 200, consists of an operating magnet, as 210, an armature, as 200E, an insulated member, as 200D, for tying together all of the hammer springs (the anvil springs being stationary), and two groups of normally open contacts. The left-hand group contains a pair of contacts for each counting relay, arranged in three sub-groups of nine pairs each. The right-hand group contains a pair from each branch of the circuit from the operating contacts of the counting relays to the clutches and other members of the registers.

The shift relays are controlled from the sequence relays (Figs. 2 and 2A) through shift magnet control relays, as 25. Each in turn is energized so long as its operation is in progress; when energized, armatures, as 200E, close all contacts by means of members as 200D. The right-hand contact of each pair of contacts in the left-hand group is wired to a cable, as 223, which terminates in a live-numbered cable in Figure 1. A like contact in the right-hand group is wired to a cable, as 229, which also terminates in a like-numbered cable in Figure 6. Other like relays have other like cables terminating near their connecting apparatus. The left-hand contact of each pair of contacts of the right-hand group, as A1, is wired to cable 240, through branches, as 238, to stepping relays 45, 52, 59 (Fig. 3), and 137, 133, 129, 125, 121, 116 (Fig. 4); and each such contact of each pair in each shift relay is likewise multiplied to each other in cable 240.

The right-hand contact of the left-hand group of contacts of shift relays 200, 201, 202, 203, 205, 206, is multipled in cable 223, as the meter reading bars at 500, 501, 502, 503 (Fig. 1) and the merchandise bars at 505 (Fig. 1) have access to the counting relays. The right-hand contact of the right-hand group of contacts of the shift relays is wired to like-numbered cables in the various figures. The contacts of relays 204 and 207 are multipled in cable 233 in order to register one money charge for two meters on occasion. The contacts of relays 208 and 209 are multipled in cable 205 to register merchandise money charges.

The shift relay for each operation is energized at the beginning of the operation through the regular and special sequence relays. The shift relays operate in their order as here numbered: 200 to 204, 208 and 209, if there is a full round of operations including two meters and a merchandise charge repeated; if but one meter, one consumption charge, and no merchandise charge, only shift relays 200, 201, 204; if one meter, two consumption charges, and no merchandise charge, shift relays 200, 201, 204 to 207.

Contacts G5 and H5, of relay 204, are for energizing relays 117 (Fig. 4) and 33 (Fig. 2) to advance the operation of sequence relays if there should be no consumption recorded by the meter.

For convenience of tracing, all contacts of the right-hand group have reference characters.

*Meter reading and consumption registers. Figures 6, 7, 9*

There are registers for two purposes: some to display the several meter readings, and others to display consumption quantities, which are the differences between last and previous readings on a given meter. Three sets of number wheels are provided to display the last readings, 66, 67, 68 (Fig. 6), 76, 77, 78 (Fig. 7), and 300, 301, 302 (Fig. 9). There are three sets also for the previous readings, 93, 94, 95 (Fig. 6), 83, 84, 85 (Fig. 7), and 303, 304, 305 (Fig. 9). Two sets of consumption wheels suffice, 71, 72, 73 (Fig. 7), and 306, 307, 308 (Fig. 9).

If there is no change of meter within the billing period, wheels 66, 67, 68, and 93, 94, 95, are utilized respectively for the last and previous meter readings. If there is a meter change, wheels 76, 77, 78, and 83, 84, 85, are utilized also, for the respective readings on the meter displaced. The difference between the last and previous readings in either event is registered on wheels 71, 72, 73; if two meters are involved, the differences are accumulated on these wheels. A single consumption-quantity sum is the necessary basis for the correct money charge under such a sliding scale of rates as is herein illustrated.

The mechanism in Figure 9 is for the purpose of registering the meter readings for the past month if unpaid, and also for setting up circuits to compute the proper money charge separately from the present month's charge. As illustrated, the consumption quantity for such past month is displayed separately, on wheels 306, 307, 308, while the money charge is accumulated with the later charge on the same money wheels (Fig. 11). It will be apparent that the display of such a money charge separately as arrears would involve merely additional mechanism and circuits of the same character as those illustrated.

The last and previous meter readings for a past month's account in arrears are registered respectively on wheels 300, 301, 302, and 303, 304, 305.

With the system of selection shown in Figures 1 and 1A, there may be selected for action wheels 66, 67, 68, and 93, 94, 95 (Fig. 6), representing the present month for a single meter; or, the same and wheels 300, 301, 302, and 303, 304, 305, representing the present month and the month last past for a single meter; or, wheels 66, 67, 68, and 93, 94, 95, representing a new meter placed within the month, and wheels 76, 77, 78, and 83, 84, 85, representing a meter superseded, and wheels 300, 301, 302, and 303, 304, 305, representing the meter readings for the past month.

The wheels thus enumerated are alike in construction and operation, though they do not all move in the same direction. The several parts of the various wheels serving a like purpose bear the same reference letter or letters on the drawings.

Figs. 6 and 7 should be considered together and by referring thereto it will be seen that three sets of three shafts each are provided and that these shafts extend in parallel relation with each other. The shafts 69A, 69B and 69C are the first set, the shafts 96A, 96B and 96C are the second set and the shafts 97A, 97B and 97C are the third set.

When the machine is in operation the shafts 69A, 69B and 69C and the shafts 96A, 96B and 96C are rotated continuously and are driven by the motor 82, on the shaft of which motor there is a gear 86A that meshes with a gear 82B fast on the shaft 82J. A gear 82C fast on the shaft 82J meshes with a gear 82D fast on the shaft 82K, a sprocket 82L also being fast on this shaft. A gear 82E fast on the shaft 82J meshes with an idler gear 82M mounted on the sleeve 82G rotatably mounted on the shaft 82K, a sprocket 82H rotatable on the shaft 82K being connected to the sleeve 82G to rotate therewith. Thus when the motor 82 is in operation the sprocket 82H rotates in one direction and the sprocket 82L rotates in the opposite direction.

Sprockets 69L, 69M and 69N are respectively fast on the shafts 69A, 69B and 69C and mesh with a chain 69R with which the sprocket 82L meshes, and when the motor 82 is in operation these sprockets and therefore the shafts 69A, 69B and 69C rotate clockwise as viewed from the right (Fig. 6). Sprockets 96L, 96M and 96N are respectively fast on the shafts 96A, 96B and 96C and mesh with a chain 96R, which chain also meshes with the sprocket 82H so that when the motor 82 is in operation the shafts 96A, 96B and 96C rotate clockwise, as viewed from the left in Fig. 6.

The wheel assemblies of which the number wheels 66, 67 and 68, and 76, 77 and 78 are a part are for registering last meter readings while the wheel assemblies of which the number wheels 93, 94 and 95, and 83, 84 and 85 are a part are for registering previous meter readings. Each of these wheel assemblies is similar to that illustrated in Figs. 12B and 12C and as there shown the wheel assembly includes a number wheel 68, a zero-setting wheel 68B and a shunting wheel 68C. The digits 0 to 9 are provided on the periphery of the number wheel 68 while the zero-setting wheel 68B is provided with a notch into which the rider of the contact 68H is adapted to seat when the zero on the wheel 68 is displayed to thereby separate the separable portions of the contact 68H. So long as the wheel assembly is off zero position the rider of the contact 68H is disengaged from the notch in the wheel 68B and the separable portions of the contact 68H remain engaged. The shunting wheel 68C has a notch in alignment with each of the digits on the number wheel 68 and a lobe intermediate each of these digital positions. The rider of the contact 68D seats in a notch whenever a digit is in display position and as the wheel assembly moves, the lobes on the shunting wheel 68C successively engage the rider of the contact 68D to engage the separable portions of this contact during a predetermined portion of the advance of the wheel assembly from one digital position to another.

The wheels 68B and 68C and the female portion of a clutch 68A are connected together as a unit and are mounted for rotation on the shaft 69C. The male portion of the clutch 68A is fast to the shaft 69C while the field of this clutch is stationary. Energization of the field of the clutch 68A causes the male and female portions of this clutch to be engaged whereupon the wheel assembly takes motion with the shaft 69C, and so long as the male and female portions of the clutch 68A are engaged the wheel assembly rotates with the shaft. A sleeve 68S connects the male portion of the clutch 68A to a sprocket 68N which is therefore fast to the shaft 69C to rotate therewith.

The wheel assemblies of which the number wheels 71, 72 and 73 are a part are for registering a consumption quantity and each of these wheel assemblies is similar to that illustrated in Figs. 12 and 12A. As shown in these views each of these wheel assemblies includes a number wheel as 71 on the periphery of which the digits 0 to 9 are provided. A contact closing wheel as 71F includes a lobe 71X at its zero position. A plurality of contacts as 403 are provided about the periphery of this wheel so that when the lobe 71X is disposed in any digital position it engages a contact as 403 to close the separable portions of this contact for a purpose explained more fully hereinafter. The wheel assembly also includes a wheel as 71E which has a lobe thereon intermediate its 9 and 0 digital positions (see Fig. 12) so that each time the wheel assembly passes from 9 to 0 this lobe causes the separable portions of the contact 71G to be closed and opened to thereby so arrange apparatus described hereinafter that a carry-over will be made onto the wheel pertaining to the next higher order to that in which the carry-over originated. In the present instance, where the wheel assembly shown in Fig. 2 pertains to the hundreds order, a carry-over would be made into a similar wheel assembly (not shown) for the thousands order. The wheel assembly also includes a shunting wheel as 71C adapted to operate a contact 71D in a manner similar to that in which the shunting wheel 68C operates the shunting contact 68D. The shunting wheel 71C however is utilized only for purposes of entering a carry-over, and hence no such shunting wheel is provided in the wheel assembly of which the number wheel 73 is a part since this wheel assembly pertains to the units order into which no carry need be made. The wheels 71, 71F, 71E and 71C and the female portion of a clutch 71A are fast to the shaft 97A. The male portion of the clutch 71A and the sprocket to which it is attached are in this instance rotatable on the shaft 97A. The field of the clutch 71A is stationary and when it is potentialized it brings about engagement of the male and female portions of the clutch 71A so that as long as these portions are engaged the wheel assembly and the shaft 97A will rotate with the male portion of the clutch 71A and the sprocket to which it is attached.

Sprockets 97L, 97M and 97N are rotatably mounted on the shafts 97A, 97B and 97C, respectively. The male portions of clutches 71AAAAAA, 72AAAAA and 73AAAAA are respectively fast on the shafts 97A, 97B and 97C so that when the stationary fields of these clutches are energized the male portions of these clutches are engaged with the female portions thereof that respectively are a part of the sprockets 97L, 97M and 97N. Chains 66R, 67R and 69R respectively mesh with the sprockets 97L, 97M and 97N, the chain 66R also meshing with the sprocket 66N associated with the clutch 66A, the chain 67R also meshing with the sprocket 67N associated with the clutch 67A and the chain 68R also meshing with the sprocket 68N associated with the clutch 68A as described. Thus since the sprockets 66N, 67N and 68N rotate when the shafts 69A, 69B and 69C are rotating, it is manifest that the sprockets 97L, 97M and 97N also rotate with the aforesaid shafts. Furthermore, simultaneous energization of the clutches 66A and 71AAAAA, 67A and 72AAAAA and 68A and 73AAAAA will cause the wheel assemblies of which the number wheels 66, 67 and 68 are a part to rotate with the shafts 69A, 69B and 69C as well as the wheel assemblies of which the number wheels 71, 72 and 73 are a part. Therefore the wheel assemblies of which the number wheels 66 and 71 are a part may be advanced in similar amounts as well as the wheel assemblies of which the number wheels 67 and 72 and 68 and 73 are a part. Thus any meter reading entered on the wheels 66, 67 and 68 will also be entered on the wheels 71, 72 and 73. Furthermore, in such an operation as this the wheels 71, 72 and 73 will rotate clockwise, as viewed from the right in Fig. 7.

In addition to the foregoing arrangement an interconnection is established between the shafts 96A, 96B and 96C and the shafts 97A, 97B and 97C through a sprocket and chain arrangement similar to that described above. This arrangement is such that upon simultaneous energization of the clutches 93A and 71AAA, the shaft 97A and the wheel assembly of which the wheel 71 is a part rotate with the shaft 96A as does the wheel assembly 93 in this instance. Furthermore, when the clutches 94A and 72AAA are simultaneously energized the wheel assemblies of which the number wheels 94 and 72 are a part operate simultaneously and likewise when the clutches 95A and 73AAA are simultaneously energized the wheel assemblies of which the number wheels 95 and 73 are a part operate simultaneously.

When the wheel assemblies of which the number wheels 71, 72 and 73 are a part operate with the wheel assemblies of which the number wheels 93, 94 and 95 are a part, the number wheels 71, 72 and 73 rotate in a direction opposite to that in which they rotated when these number wheels rotate with the wheel assemblies of which the number wheels 66, 67 and 68 are a part. Thus if a last meter reading is entered on the number wheels 71, 72 and 73 when they rotate with the wheels 66, 67 and 68 and if a previous meter reading is entered on the wheels 71, 72 and 73 when they rotate with the wheels 93, 94 and 95 and cause the wheels to rotate in opposite directions as these different readings are entered thereon, it follows that the wheels 71, 72 and 73 display the difference in the two meter readings after such opposite rotation provided no carry-overs are required in connection with such opposite rotation. Such difference including any carry-overs which are entered on the wheels by means to be explained presently represents the consumption quantity.

When a carry-over arises in the subtraction of one meter reading from another, as just explained, the value of such carry-over is entered in apparatus explained hereinafter which, through a clutch as 71AAA and a shunting wheel as 71CC, effect the entry of the carry-over in the wheel assembly to receive the same. As will be understood, carry-overs will not be entered into the units order. Hence, shunting wheels as 71CCC and 72CCC are only associated with the shafts 97A and 97B and therefore the wheel assemblies which pertain to the tens, hundreds and higher orders. Thus the clutch 73AAA differs from the clutches 71AAA and 72AAA in that it does not have a shunting wheel associated therewith since the shaft 97C pertains to the units order.

When a carry-over arises in the subtraction of one meter reading from another, in the manner above described, it is manifest that the consumption wheel assemblies must be driven in a subtractive direction and to this end power is derived from the shaft 96A or 96B, depending upon the order, to receive the carry-over for insofar as the present apparatus is concerned with reference to the consumption wheels the shafts 96A, 96B and 96C rotate in a subtractive direction. Thus clutches as 71AAA, 72AAA and 73AAA are utilized whenever the wheel assemblies of which the number wheels 71, 72 and 73 are a part are to be driven in a subtractive direction either in a normal entry operation or in a carry-over operation.

It should be noted that in a normal entry operation the shunting wheels 71CCC and 72CCC are ineffective inasmuch as circuit to the contacts under control thereof is broken, as will be explained hereinafter. It will also be understood that the shunting wheels 71CCC and 72CCC are similar to the shunting wheels 71C and 68C, previously described, and that they operate contacts corresponding to the contacts 71D and 68D, one of such contacts being indicated by 72DDD.

The present apparatus is so arranged that if meters are changed intermediate billing periods the consumption quantities represented by the difference in readings on the two meters are registered on the consumption wheels 71, 72 and 73, as many of these wheels being utilized as the magnitude of the consumption requires. In normal operation where only one meter is required the last meter reading is entered on number wheels 66, 67 and 68 and the previous meter reading is entered on the number wheels 93, 94 and 95. Where, however, there is a change in meters so that four meter readings in all are entailed in determining consumption quantity, the last meter reading on the first of the two meters is entered on the number wheels 76, 77 and 78 while the previous meter reading on the other of the two meters is entered on the number wheels 83, 84 and 85. The last meter reading of the new or second meter is entered on the number wheels 66, 67 and 68 while the previous reading of this meter is entered on the number wheels 93, 94 and 95. The foregoing is effected in a manner explained in detail hereinafter.

Thus since the wheel assemblies of which the number wheels 76, 77 and 78 are a part are to receive a meter reading corresponding to that entered in the wheel assemblies of which the number wheels 66, 67 and 68 are a part and inasmuch as this is also true in so far as the wheel assemblies of which the number wheels 83, 84 and 85 and 93, 94 and 95 are a part, the wheel assemblies of which the number wheels 76, 77 and 78 are a part are constructed similarly to the wheel assemblies of which the number wheels 66, 67 and 68 are a part, and these wheel assemblies are respectively mounted on the shafts 69A, 69B and 69C, and likewise the wheel assemblies of which the number wheels 83, 84 and 85 are a part are similar to the wheel assemblies of which the number wheels 93, 94 and 95 are a part and all of these wheel assemblies are mounted on the shafts 96A, 96B and 96C. Furthermore, the wheel assemblies of which the number wheels 76, 77 and 78 and the number wheels 83, 84 and 85 are a part are arranged to be connected to the shafts 97A, 97B and 97C, and the wheel assemblies of which the number wheels 71, 72 and 73 are a part, in the same manner as that in which the wheel assemblies of which the number wheels 66, 67 and 68 and 93, 94 and 95 are a part, are connected to these shafts 97A, 97B and 97C. Furthermore, as explained above, shunting wheels as 71C and 72C are provided for taking care of any carry-overs which may arise in the course of ascertaining a consumption quantity represented by the difference between the readings on the wheels 76, 77 and 78, and 83, 84 and 85.

When a consumption quantity dependent upon four meter readings is entered in the wheel assemblies 71, 72 and 73, the consumption quantity represented by the difference between the meter readings on the wheels 76, 77 and 78, and 83, 84 and 85 is first entered on the wheels 71, 72 and 73 and thereafter the consumption quantity represented by the difference between the readings on the wheels 66, 67 and 68, and 93, 94 and 95 is entered. In this entry there may be an additive carry-over when the second consumption quantity is added to the first already standing on the wheels 71, 72 and 73.

Hence shunting wheels 71C and 72CC are fast to the shafts 97A and 97B, said shafts, as explained above, being for the hundreds and tens orders, respectively, into which orders carries may need be entered. Sprockets 76L and 77L are rotatably mounted on the shafts 97A and 97B, respectively, and include as parts thereof the female portions of clutches 71AA and 72AA, the male portions of these clutches being connected to the shunting wheels 71CC and 72CC. A chain 76R meshes with the sprocket 76L and a sprocket 76M that is a part of the clutch 76A and which therefore rotates with the shaft 69A. Thus when the clutch 71AA is energized motion is derived from the shaft 69A and imparted to the shaft 97A. Likewise a chain 77R meshes with the sprocket 77L and a sprocket 77M associated with the clutch 77A on the shaft 69B so that when the clutch 72AA is energized motion is derived from the shaft 69B and imparted to the shaft 97B. The motion thus imparted to the shafts 97A and 97B is utilized to enter carry-overs in the wheel assemblies of which the number wheels 71 and 72 are a part.

The apparatus as thus far described enables a consumption quantity derived from either two or four meter readings to be registered in the wheel assemblies of which the number wheels 71, 72 and 73 are a part and, as explained herein, this arrangement is employed when only one meter is involved in a billing or when two meters are involved in a billing. There is in public utility billing, however, a condition where a bill for a period preceding a particular billing period has not been paid. In order to enable the billing for such a preceding period to be computed when it is unpaid the arrangement of registers shown in Fig. 9 is provided.

The shafts 69A, 69B, 69C, 96A, 96B and 96C continue on across the apparatus, as illustrated in Fig. 7, to the apparatus illustrated in Fig. 9. Hence, last meter reading wheel assemblies similar to the wheel assemblies to which the number wheels 66, 67 and 68 are a part are mounted on the shafts 69A, 69B and 69C respectively, such wheel assemblies being those of which the number wheels 300, 301 and 302 are a part. Likewise wheel assemblies of which the number wheels 303, 304 and 305 are a part, and which are similar to the wheel assemblies of which the number wheels 93, 94 and 95 are a part, are mounted on the shafts 96A, 96B and 96C, respectively, and these wheel assemblies of which the number wheels 303, 304 and 305 are a part are for registering a previous meter reading. Instead, however, of continuing the shafts 97A, 97B and 97C on over to the mechanism illustrated in Fig. 9, three other shafts 97D, 97E and 97F are provided. Wheel assemblies of which the number wheels 306, 307 and 308 are a part are mounted on the shafts 97D, 97E and 97F, respectively, just as the wheel assemblies of which the number wheels 71, 72 and 73 are a part and to which the wheel assemblies of which the number wheels 306, 307 and 308 are a part correspond, are fast on the shafts 97A, 97B and 97C.

A chain and pulley arrangement, similar to that described in connection with the arrangement shown in Fig. 6, is provided for the arrangement shown in Fig. 9 so that the consumption wheel assemblies of which the number wheels 306, 307 and 308 are a part may be operated with the last meter reading wheel assemblies of which the number wheels 300, 301 and 302 are a part as well as with the previous meter reading wheel assemblies of which the number wheels 303, 304 and 305 are a part.

All of the last and previous meter reading wheel assemblies include as a part thereof a zero-setting wheel, as explained above with reference to Figs. 12B and 12C. The consumption wheel assemblies however do not include such zero-setting wheels. Hence zero-setting wheels 71B, 72B and 73B, similar to the zero-setting wheel 68B (Fig. 12C), are provided on the shafts 97A, 97B and 97C and are respectively connectable to these shafts under control of clutches 71AAAA, 72AAAA and 73AAAA. Similarly, zero-setting wheels 306CC, 307CC and 308CC are provided on the shafts 97D, 97E and 97F, and these zero-setting wheels are respectively connectable to these shafts through the clutches 306AAA, 307AAA and 308AAA.

The manner in which meter readings are entered on the above registers and consumption quantities are computed and the manner in which the registers are selected for receiving meter readings is explained in detail hereinafter in connection with the description of the operation of this apparatus.

The wiring of the several clutches and contacts is terminated in cables 229, 230, 231, 232; the other ends of the cables are shown in Figure 5. Each conductor is wired to a correspondingly positioned contact in the right-hand portion of the shift relay, and bears the same reference letter; e. g., conductor 229A also appears in Figure 5 on shift relay 200 as A1. All conductors in cables 220, 221 (Fig. 9), 229, 230, 231, 232 (Fig. 7) bearing the same reference letter serve a like purpose; as, conductor 231A is wired to clutch 78A, conductor 232A is wired to a like clutch, 85A. In all figures except 5 and 5A, the spacing of the conductors is reduced one-half below that of the same conductors at their connection with the shift relays in those figures.

Contacts as 73G for the units consumption quantity wheel, and as 72G for the tens wheel, are for the purpose of energizing a carry-over relay common to the several operations above indicated, to effect due arithmetical carry-overs whether the wheels are moving forwardly or backwardly. These contacts are multiplied in cables 230, 231, 232, by conductors as 232H, 231H, 230H, and are there wired to correspondingly positioned contacts in the shift relays 201, 202, 203, making carry-over relays 113, 114, 115, 116, common to the several carry-over movements in either direction.

Relays 81 and 74 (Fig. 6) and 309 (Fig. 9) are zero-setting relays. Relay 81 is for the meter reading wheels (Figs. 6 and 7), 74 for the consumption quantity wheels (Fig. 7); relay 309 for the meter reading and consumption quantity wheels of Figure 9 as used for bringing forward last month's charge for consumption. Relay 70 (Fig. 7) is for the purpose of energizing the several zero-setting relays, as 81, by grounding contact 70A; once energized, relay 70 locks up through contact 70B and such zero-setting contacts as may be closed until all zero-setting wheels reach their zero positions.

*Money charge circuits. Figures 8, 8A, 8B; 10, 10A, 10B*

The circuits of these two sets of figures are for the purpose of effecting registration on the consumption money wheels of the charge as predetermined for every position (up to 125) that may be taken by consumption quantity wheels. The circuits of Figures 8, 8A, 8B, are related to the consumption quantity wheels of Figure 7, on which may be computed the total consumption quantity for two meters in successive operation within the month for one customer. The circuits of Figures 10, 10A, 10B, are identical with those of Figures 8, 8A, 8B, but they are related to the consumption quantity wheels of Figure 9, which may be used for repeating the registration for the past month and bringing the charge forward on the bill as unpaid. Description of one set will apply to both.

The drawings of Figures 8, 8A, 8B, include a fragmentary side view of the contact-closing wheels, 71F, 72F, 73F, of the consumption quantity register wheels, 71, 72, 73 (Fig. 7), with the contact-closing studs, 71X, 72X, 73X, shown in a neutral position. The various groups of contacts, one for each digit position, are shown in developed view, with the several groups for each order of digits arranged vertically. In practice, they would be arranged in a circle, or closed by multi-contact relays energized through single contacts arranged in such a circle.

The circuits are prearranged for a rate schedule of 6 cents for the first step of 50 units (say, kilowatt hours) of consumption in a sliding scale, 5 cents for the second step of 50, and 4 cents for units from 101 to 125—the highest quantity for which complete wiring is shown. Hundreds contact-closing wheel 71F has ten sets of contacts, as 277, of which only those for 0 and 1 are shown wired; tens wheel 72F has ten sets of contacts, as 287, of which only those for 0, 1, 2 are shown wired for interconnecting to hundreds for numbers 100 to 125, while contacts and wiring are shown complete for 0 to 9 for numbers 10 to 99. Units wheel 73F has three sets of ten each, as 288 for the rate of 6, 289 for the rate of 5, 290 for the rate of 4.

At 516 are the wires for interconnecting the wiring from the hundreds to the tens wheels. At 517 are the wires for interconnecting certain of the contacts of the tens wheel 72F with 6-cent contacts, as 288, of the units wheel. At 518 are the wires for a like purpose in relation to 5-cent contacts, as 289. At 519 are like wires in relation to 4-cent contacts, as 290. At 520, 521, 522, are nine conductors each for connections from such contacts to the counting relays respectively for hundreds, tens, and units.

Whether the group of 6-cent, 5-cent, or 4-cent, contacts in any closure of the three groups by a contact-closing wheel shall be effective, is determined by the selector relays, 274, 275, 276 (Fig. 8B), as one or more of these may be energized by the hundreds or tens contact-closing wheel in the predetermined arrangement of the circuits.

Contacts as 286 are for the purpose of putting into circuit the units of numbers 1 to 50 according to multiplication by 6; they are operative on the 0, 1, 2, 3, 4, positions of the tens wheel, energizing relay 275, which through contact 275B, if relay 274 is deenergized, grounds conductor 275C, conductors as 275D, contacts as 281G if closed, energizing a selected counting relay according to the units of the due product, which may be 6, 2, 8 or 4, besides 0.

Contacts as 291G, when relays 275 and 274 are not energized, serve a like purpose for the quantities in the second step of 50 k. w. h. in excess of the first step of 50. Charges for quantities from 51 to 100 are the result of multiplying the excess above 50 by 5 and adding the product to 50 times 6, or 300, the charge for 100 k. w. h. being 550. Contact 292G, the only one shown, serves a like purpose for the third step, the excess above 100 k. w. h. being multiplied by 4 and the product added to 550 to determine the charge. As 4 is the last rate multiplier, relay 274 is the only one to be effective for numbers from 101 up; relays 275 and 276 may energize but without effect, as contact 274A, their source of ground, is open when relay 276 is energized.

Contacts 279, 279A, 279B, are for the purpose of setting up a circuit through conductor 279C and contacts G5 and H5 (Fig. 5) to continue operations if there is no consumption.

Examples of operation through these circuits as included below under Operation headings are confined to the first step. Two examples follow respectively in the second and third steps.

Assuming a consumption of 75 k. w. h., the due charge is 50 times 6 plus 25 times 5, or 425. Hundreds contact-closing wheel 71F stands at 0, tens wheel 72F at 7, units wheel 73F at 5. For the tens, contacts 400 are closed; for the units, contacts as 284A are closed. Contacts 277A and 277B are grounded, grounding conductors 277C, 277D, 400A, 400B, contacts 400C, 400D, conductors 400E, 400F, 400G, 400H, 400J, 400K, contacts 400L, 400M, conductors 400N, 400P, 400Q— 400Q extending to the counting relays for the hundreds figure (4)—and conductor 400R for the tens figure (2). For the units, contact 401G grounded conductor 401A, energizing relay 276, grounding contact 276A, conductors 402, 402A, contacts, 402B, conductors 402C, 402D, energizing the No. 5 units counting relay. Circuits will be set up as elsewhere described to register 425 on the consumption money wheels 250, 251, 252 (Fig. 11).

For the second example of 123 k. w. h., chargeable at 550 plus 23 times 4, or 642, wheel 71F stands at 1, wheel 72F at 2, wheel 73F at 3. Contacts 403, 283, 404, are closed, grounding contacts 403, 403B, conductors 403C, 403D, 403E, 403F, 403G, 403H, 403J, 403K, 403L, 403M, contacts 404A, 404B, 404C, 404D, 404E, for the hundreds (6), 404F for the tens (4). For the units, contact 292G energized relay 274, grounding contact 274B, conductors 274C, 405, contacts 405A, conductors 405C, 405D, for the units (2). Circuits are set up to register 642.

Money registers. Figure 11

In this figure are shown four sets of number wheels on which money charges are registered, three for the bill and one for office information. At 506 are shown the consumption money wheels, operated directly from the counting relays as set up by the consumption quantity contact-closing wheels; at 507, the merchandise wheels, operated from the counting relays as set up by card perforations; at 508, the bill totalizer wheels, operated in connection with all movements of the sets at 506 and 507; at 509, the classified totalizer wheels, operated only in connection with the merchandise wheels when these are registering a charge in arrears, for accumulating the figures for the day or month.

All wheels, and their several members, that bear the same reference letter are alike in design and operation; all bear reference figures as well as characters. The wheels are of the same general make-up as the quantity wheels shown in Figures 6, 7, and 9, and the same draftsman's conventions are applied.

250, 251, 252, are the consumption money wheels, mounted loosely on and driven from shaft 69A. From this shaft through the several idler gears and shaft 256 are driven simultaneously and to the same numerical extent the bill totalizer wheels 253, 254, 255. Both sets may operate only for the present month, or for this and the past month in addition.

257, 258, 259, are the merchandise wheels, mounted loosely on and driven from shaft 260. Likewise through gears and shaft 256 the bill totalizer wheels are simultaneously driven to the same numerical extent. Both sets may operate only for the present month, or for this and the past month in addition.

261, 262, 263, are the classified totalizer wheels, loosely mounted on shaft 260, which are automatically clutched to the shaft and thus selected to operate to the same numerical extent and at the same time as the merchandise wheels when these are repeating the previous month's charge.

The cables 233, 226, 241, have their respective conductors numbered and lettered. They are connected through the several shift relays to like-lettered conductors in Figure 4.

For the 506 and 507 groups of wheels, clutches as 252A, 259A, are, each in due order, in series with a stepping relay, as 59, whose action has been described. The circuits are established from the counting relays to the clutches through shift relays 204 for consumption, 208 for merchandise, and 209 for merchandise in arrears. The wheels are moved in accordance with the number of counting relays set up by the consumption quantity contact-closing wheels or card perforations, and on occasion in accordance with the setting up of carry-over relays.

Bill and classified totalizer wheels are operated with other wheels and from secondary circuits on all occasions except for carry-over; for example, for the consumption money wheel clutch 252A (Fig. 11) the circuit is, conductor 233A, shift contact A8 (Fig. 5A), conductor A (Fig. 4), stepping relay 59 (Fig. 3), contact 58C (Fig. 3). For bill totalizer wheel 255, operating with a consumption money wheel, the circuit is, clutch 255A (Fig. 11), conductor 233B, shift contact B8 (Fig. 5A), conductor B (Fig. 4), and contact 58D (Fig. 3).

With the operation of three sets of wheels together, at 507, 509, 508, the circuits are: as for merchandise wheel 259, when operating for the past month, clutch 259A (Fig. 11), conductor 241A, cable 241, shift contact A10 (Fig. 5A), conductor A (Fig. 4), stepping relay 59 (Fig. 3), contact 58C (Fig. 3); as for classified totalizer wheel 263, clutch 263A (Fig. 11), conductor 241a, cable 241, shift contact a10 (Fig. 5A), conductor a (Fig. 4), and contact 58E (Fig. 3); as for bill totalizer wheel 255, operating in connection with a classified totalizer wheel, clutch 255A (Fig. 11), conductor 241B, shift contact B10 (Fig. 5A), conductor B (Fig. 4), and contact 58D (Fig. 3).

If the merchandise wheels are operating for the present month's charge, the circuit for wheel 259 is, clutch 259A (Fig. 11), conductor 226A, cable 226, shift contact A9 (Fig. 5A), conductor A (Fig. 4), stepping relay 59 (Fig. 3), contact 59C; and for bill totalizer wheel 255, clutch 255A (Fig. 11), conductor 226B, shift contact B9 (Fig. 5A), conductor B (Fig. 4), contact 58D (Fig. 3).

It will be observed that there are four sets of money wheels, three cables, three shift relays, and one set of counting relays shown as involved. Two of the sets of wheels operate in due order under control of stepping relays, and in due turn operate the bill and classified totalizer wheels through a secondary circuit. Certain of the wheel members are multipled in the several cables with a single source of control.

The bill totalizer wheels are included in all the foregoing operations. Certain wires of their several members, as for clutch 255A, are multipled in the three cables involved; as, conductor 233B is multipled to conductors 226B and 241B, forming a circuit for the energization of clutch 255A from a single source, i. e., contact 58D (Fig. 3), conductor B (Fig. 4), and the several shift contacts. Cable 233 serves two sets of wheels, at 506 and 508, consumption money wheels and bill totalizer wheels. On the first operation for a bill, the two sets alike move from zero to the same predetermined position, and never require a carry-over. If the next operation is additive on the same wheels, a carry-over may be required for both sets, and the carry-over relays necessary for the totalizer wheels, at 510 (Fig. 4) for tens and at 511 for hundreds, suffice for both. For this purpose, certain conductors are in multiple within their own cable; as, conductor 233C is multipled to conductor 233G. Conductor 233C is for energizing clutch 251A; its circuit is, shift contact C8 (Fig. 5A), conductor C (Fig. 4), stepping relay 52 (Fig. 3), contact 51C (Fig. 3). For a carry-over operation, the circuit is, conductor 233G (Fig. 11), shift contact G8 (Fig. 5A), conductor G (Fig. 4), contact 117A, stepping relay 116, contact 115C.

Two sets of wheels, at 507 and 508, are controlled through cable 226, in the same manner as described for cable 233, except that separate sets, at 510, 511, and 512, 513 (Fig. 4), of carry-over relays are provided. For the wheels at C, conductors 226G to 226M establish circuits to carry-over relays at 510 and 511. For the wheels at 507, conductors 226N to 226S establish circuits to carry-over relays at 512 and 513. Cable 241 serves three sets of wheels, at 507, 509, 508, and provision is made for three sets of carry-over relays as described.

Key 265 is for the purpose of zero-setting the classified totalizer wheels 261, 262, 263, at the end of any period, by grounding their several zero-setting contacts, as described.

Register wheel details. Figure 12

In Figure 12 are shown front views of the assemblies of meter reading wheel 68 and consumption quantity wheel 71, with side views of their several members. These bear the same reference characters as in other figures. Each is typical of the several orders of numbers in their respective registers and in other like registers.

71 is the number wheel; 71F, the contact-closing wheel with stud; 71E, the carry-over contact-closing wheel; 71C, the shunting wheel. 71A refers to the members of the clutch which serves to bind the assembly to shaft 97A.

68 is the number wheel; 68B, the zero-setting wheel; 68C, the shunting wheel. 68A refers to the clutch, related to shaft 69C.

Perforated cards—Figures 13, 14, 15

The cards are shown in outline with their perforations indicated as on bars illustrated in dotted lines. The reference figures used for perforations are the same as the reference figures for the corresponding bars and fingers in Figure 1, though the associated letters differ. The perforations are in numerical positions for meter readings and for amounts of merchandise charges, and in special positions for various selections. As explained, contact fingers effect physical contacts with their bars through the perforations in the card as soon as it is placed in its stationary position. These contacts become electrically effective in due sequence of operation, locking up relays that become independent of the contacts in their control of machine action according to the perforation positions. The card can be removed as soon as the last operation which it controls is started.

The card of Figure 13 shows the perforations for the first operation described below under Operation headings—with two meters and last and this month's installment charges for merchandise. Perforation 150DD, in the No. 4 position on a 12-position bar, selects the 150 set of bars as effective in the card division for the last reading of the later meter, while perforations 150PP and 150QQ select the 152 and 153 sets of bars to become effective to register the last and previous readings respectively of the meter displaced. Perforations 150FF, 150GG, 150HH, represent the figures 455. Perforation 151DD, in the No. 3 position, selects the 151 set of bars as effective for the previous reading of the later meter; perforations 151FF, 151GG, 151HH, represent the figures 441. Perforations 152FF, 152GG, 152HH, represent the figures 441; perforations 153FF, 153GG, 153HH, the figures 416, of the old meter. (It is assumed for convenience of description that the new meter is set to read the same as the old when the change is made.) Perforation 153DD was effective in the previous month's billing to select the 153 set of bars as representing the last reading; it is ineffective in the present operation, since selector relay 167, energized indirectly through perforation 150QQ, grounds only the three meter reading bars of this set.

The card of Figure 13 also contains perforations 186FF in position No. 2 and 186GG in position No. 5 for the registration of a merchandise installment charge of $2.50, related to perforation 187BB for the present month and 187CC for repeating the charge for last month which it is assumed is unpaid. The position of perforations 187BB and 187CC at the lowest point on the bar is indicative of a selection among classes, each of which, in full illustration, would be related to another set of bars with their perforations for the money charge.

In Figure 14 such perforations as appear are the same as in Figure 13, except that 152DD in position No. 4 is added to make the 152 set of bars effective for the last reading, and perforation 153DD in position No. 3 now becomes effective for the 153 set of bars as the previous reading. They control the operation as described below for one meter and one merchandise charge.

In Figure 15 are shown the perforations relating to the operation with one meter and two months' charges as described below. Three sets of bars are involved, since this month's previous reading is last month's last reading. Perforation 150DDD in the No. 4 position selects the 150 set of bars for the last reading, and 151DDD in the No. 3 position the 151 set for the previous reading. 150RRR and 150SSS respectively select the 151 and 152 sets of bars for the last and previous readings for the preceding month. In this figure, while the 150 and 151 sets have perforations corresponding to those of Figure 13, the 152 set has perforations corresponding to the 153 set of Figure 13.

DESCRIPTION OF OPERATION

The operation first described relates to the readings of two meters for a single charge and to a monthly installment charge for merchandise with the previous month's unpaid installment brought forward. The total charge as registered thus includes in one final sum a charge for the metered commodity (illustrated as electric current) computed from the sum of the differences between the last and previous readings of the two meters, a charge for this month's installment on the merchandise, and a charge for last month's installment on the same.

Other operations described are: with one meter and one merchandise charge; with one meter and consumption charges for the present month and for the past month; and with one meter and no registered consumption.

Operation with two meters and present and preceding months' installment charges for merchandise

*Card.*—The card (Fig. 13) to be inserted in stationary position between the contact fingers and bars is perforated according to meter readings (455 and 441 k. w. h. for the later meter and 441 and 416 for the earlier) and the installment merchandise charge ($2.50), and also according to the selections to be made for operation. These selections represent four meter readings, a class of merchandise (as a stove), the monthly amount of charge for such merchandise, and present and past months' merchandise charges.

Regular sequence relay preparations, and registration of last reading of meter No. 2 (first sequence)

With the card (Fig. 13) in place between the bars and the contact fingers associated therewith (Fig. 1), the operation of the machine will be commenced by momentarily pressing the starting key 1 (Fig. 2). The operation now to be described is shown graphically in the first of the timing charts (Figs. 21 to 38), and as the description proceeds reference will be had to points on this timing chart which indicate the time when particular actions of machine parts take place.

When key 1 is pressed, ground is placed upon the left-hand winding 4D of sequence relay 4, the relay being thus potentialized at the time indicated by the point 520 (Fig. 21) on the operation indicating line relating to this relay. Relay 4 later energizes at point 521 and in so doing opens contacts 4A and 4B and closes contacts 4C and 4F. This closing of contact 4F provides a holding circuit for relay 4 from contact 2B of unenergized sequence control relay 2. Closed contact 4C potentializes sequence relay 3 at point 522 wherefore such relay later energizes at point 523, closing all of its contacts.

Contact 3G in closing potentializes the right-hand winding of shift magnet control relay 25 at point 524 whereupon this relay is caused to energize at point 525, closing its contacts 25A and 25B. Contact 25A provides a holding circuit for the left-hand winding 25D from contact 2B. Contact 3F places ground upon sequence relay 6 whereupon this relay is caused to energize at point 526. Contact 3C in closing impresses ground upon the left-hand winding of sequence relay 12 which immediately thereafter energizes at point 527. Contact 3B prepares a holding circuit through the left-hand winding of relay 3, such holding circuit becoming later effective upon the energization of sequence control relay 2 and the closing of contact 2A.

Relay 6 upon energizing closes contacts 6C and 6F and opens contacts 6A and 6B. Contact 6F provides a holding circuit through contact 2B during the time that sequence control relay 2 is deenergized. Contact 6C impresses ground upon sequence relay 5 thereby causing energization of said relay 5 at point 530. Contact 5G closes impressing ground upon and causing energization of shift magnet control relay 26 at point 531. Contact 26A of relay 26 upon closing provides a holding circuit for the relay through its left-hand winding while contact 2B is closed. Contact 5C supplements the ground of contact 3C impressed upon winding 12D of sequence relay 12 which was energized at point 527.

Relay 12 when energized, closes contacts 12C and 12F and opens contacts 12A and 12B. Contact 12F provides a holding circuit through winding 12E and contact 2B so long as sequence control relay 2 remains unenergized. This holding circuit supplements the energization of relay 12 through its left-hand winding 12D so long as contacts as 3C of any of the relays 3, 5, 7 and 9 are closed. Contact 12C in closing potentializes relay 11 which thereafter energizes at point 528. Energized relay 11 closes contact 11G potentializing shift magnet control relay 28 which thereafter energizes at point 529. Relay 28 upon energizing closes contacts 28A and 28B, contact 28A providing a holding circuit which includes contact 33A of unenergized relay 33 and contact 2B of relay 2. Contact 11B in closing prepares a holding circuit through the left-hand winding of relay 11, which holding circuit is later completed when contact 2A is closed. Contact 11C extends ground through conductor 13Y to the left-hand winding 24D of sequence relay 24 whereupon this relay is caused to energize at point 532. Contact 24F closes preparing a holding circuit through contact 2B. Contact 24C in closing potentializes sequence relay 23 which immediately thereafter energizes at point 533.

Contact 23G closes thereby completing a circuit from battery through contact 35A, conductor 35C (Figs. 2A and 2), sequence control relay 2, conductor 2C (Figs. 2, 2A, 5A, 5, 3 and 4), contacts FF, EE, DD, CC, BB and AA and contact 117G to ground. Sequence control relay 2 is thus potentialized at point 534 and later energizes at point 535.

Sequence control relay 2 in energizing first closes contact 2A and then opens contact 2B. This closing of contact 2A enables the holding circuits for sequence relays 3, 5, 11 and 23, which are now energized, through their contacts as 3B. The opening of contact 2B removes ground from contact 4F thereby depotentializing sequence relay 4 at point 536. Such depotentialization of the relay occurs with depotentialization of its right-hand winding since the left-hand winding thereof was deenergized following the release of starting key 1 which was but momentarily manually pressed. Sequence relay 4 therefore deenergizes at point 537. The opening of contact 2B also removes ground from contacts as 25A of shift magnet control relays 25, 26 and 28, which are now energized, but without effect since these relays remain energized through their right-hand windings from contacts as 3G of sequence relays 3, 5 and 11.

Contact 4B of deenergized relay 4 closes, completing a circuit from ground through contact 3A, conductor 3K (Figs. 2 and 1A), switch 159, contact 159A of said switch, conductor 159B (Figs. 1A and 1), contact finger 150D, bar 150 which is engaged by the finger 150D through card perforation 150DD, conductor 150E and selector relay 160 (Fig. 1A) to battery. Relay 160 is therefore potentialized at point 538 upon the deenergization of sequence relay 4 and later energizes at point 539 closing its several contacts.

Contact 160D establishes a circuit through conductor 160H (Figs. 1A and 1), selector bar 150M, contact fingers 150P and 150Q which are permitted to engage the bar 150M through card perforations 150PP and 150QQ, conductors 150T and 150U (Figs. 1 and 1A) and relays 169 and 170 to battery. Relays 169 and 170 are thus potentialized simultaneously at points 540 and 541. The circuit leading from contact 3A of sequence relay 3 through conductor 3K divided in Fig. 1A, one branch of the circuit leading to the arm of switch 158 where the circuit further divides into circuit legs. One circuit leg, as will be described later, is carried through the arm of switch 158. The other circuit leg extends through conductor 158C and slow-to-release relay 168 to battery causing energization of the relay 168 at point 542. Contacts 168A and 168B therefore close so that upon the energization of relays 169 and 170 at points 543 and 544 and the closing of contacts 169A and 170A a circuit is completed through contact 168B and conductor 168C to the central winding of sequence relay 8 which is thus caused to energize at point 545.

Sequence relay 8 when energized closes contacts 8D, 8C and 8F and opens contacts 8A and 8B. Contact 8F provides a holding circuit similarly to that previously described with reference to contact 4F of sequence relay 4. Contact 8C impresses ground upon sequence relay 7 which then potentializes at point 546 and later energizes at point 547.

Contact 7G impresses ground upon shift magnet control relay 27 which thereafter energizes at point 548. Contact 7F impresses ground upon sequence relay 10 effecting energization thereof at point 549 whereupon contacts 10C and 10F close and contacts 10A and 10B open. Contact 10F prepares a holding circuit for relay 10 at contact 2B, whereas contact 10C impresses ground upon relay 9 which thereafter energizes at point 550. Relay 65 now energizes at point 551 after the closing of contact 9G.

Energized shift magnet control relays 27 and 65 prepare holding circuits through contacts 27A and 65A to contact 2B. Relays 7 and 9 complete holding circuits through contacts 7B and 9B to contact 2A. Contacts 7C and 9C of the sequence relays 7 and 9 supplement the ground previously impressed upon the left-hand winding of sequence relay 12 from contact 3C.

Paired sequence relays 4 and 3 and paired sequence relays 6 and 5 respectively control operations for sensing and arithmetically entering the last and previous readings of the customer's present meter in the consumption quantity register 71—72—73 (Fig. 7). These two pairs of sequence control relays therefore are always to be energized pursuant to a machine operation, and consequently are so inter-connected that successive energization thereof will occur after energization of sequence relay 4 by the pressing of the starting key 1. Paired relays 12 and 11, as will be subsequently explained in detail, control that part of the machine operation for entering in the register 250—251—252 (Fig. 11) the cost of the consumption quantity displayed upon the register 71—72—73 (Fig. 7). Therefore, the relays 12 and 11 will function during every operation of the machine and are accordingly so connected that they will be energized during each setting up of the machine, following the energization of sequence relay 3 and the closing of contact 3F.

In every operation of the machine where relays 12 and 11 are energized or locked up for controlling an entry of momentary significance in the consumption charge register 250—251—252 (Fig. 11), means for holding the number wheels for reading and subsequently resetting the number wheels to 0 must be brought into operation. It is the function of sequence relays 24 and 23 to control this holding and reset part of the operation. Therefore, when relays 12 and 11 are set up it will be necessary that relays 24 and 23 be set up and accordingly contact 11C is provided to effect energization of sequence relay 24 and indirectly the energization of sequence relay 23 in the manner above described.

Setting up or energizing the remaining sequence control relays (Figs. 2 and 2A), and the shift magnet control relays as 27 associated therewith, is effected under control of circuits established by the contact of selected contact fingers with selector bars as 150M, 150N, 187 and 187A (Fig. 1). For example, when the customer's commodity consumption is computable from last and previous readings of each of two meters as where the meter originally installed has been replaced by a new one, the present machine is adapted to effect the proper computation, summation and register entries by predetermined sequentially occurring steps. The step for controlling entry of the last reading for the first of the meters in such an instance is controlled by sequence relays 8 and 7, and the step for controlling entry of the previous reading of said first meter is controlled by sequence relays 10 and 9. Whether the relays 8, 7, 10 and 9 are set up is determined by card perforations in registration with the selector bar 150M (Fig. 1). Since the present operation is for effecting computation and entries resulting from a consumption recorded upon successive meters, it will be necessary for sequence relays 8, 7, 10 and 9 to be energized. and therefore the control card (Fig. 13) is perforated at 150PP and 150QQ so that upon the energization of relay 160 at point 539 and the consequent impression of ground upon bar 150M, the relays 169 and 170 will be energized as above described to complete a circuit through contact 168B for initiating the successive energization of sequence relays 8, 7, 10 and 9.

A further selection is made at this time to condition certain sequence relays so they will be operative later at the proper sequential time in the operation of the machine, for effecting entry in proper registers of the amount to be charged on account of an unpaid last month's bill and on account of an article of merchandise upon which the present monthly payment is due. Relays 22 and 21 are for controlling a sequence in the operation of the machine for sensing from the control card (Fig. 13), through perforations as 186FF and 186GG, an amount unpaid on last month's bill, and causing the entry of such amount in the proper register as an incident to the preparation of the current month's bill. Sequence relays 20 and 19 are for controlling a sequence in the operation of the machine for sensing from the control card (Fig. 13) the amount, represented by card perforations as 186FF and 186GG, which is currently due as a monthly charge for merchandise and for effecting an entry of such amount in the proper register. Relays 22 and 21 are set up because of the card perforation 187CC (Fig. 13), whereas sequence relays 20 and 19 are set up because of card perforation 187BB. These card perforations register with contact fingers 187B and 187C (Fig. 1), permitting these fingers to engage the bars 187 and 187A.

As has been previously stated, grounded conductor 3K is connected with the arm of switch 158 (Fig. 1A). Said switch arm is set for the fourth month thereby making electrical contact with both the contacts 158A and 158R which are connected respectively with conductors 158B and 158S through which circuits are carried to bars 187 and 187A, thence through contact fingers 187B and 187C, conductors 187D and 187E (Figs. 1, 1A, 2 and 2A) and the central windings of sequence relays 20 and 22 to battery. In this manner sequence relays 20 and 22 are potentialized at points 552 and 553 upon the deenergization of sequence relay 4 and the closing of contact 4B.

Sequence relay 20 energizes at point 554, closing contact 20C thereby causing energization of sequence relay 19 at point 555. Sequence relay 22 energizes at point 556, closing contact 22C and thus effecting energization of sequence relay 21 at point 557. Relays 19 and 21 close contacts 19C and 21C, supplementing the ground on the left-hand winding of sequence relay 24 thereby holding the relay 24 energized so long as relays 19 or 21 are energized. Contacts 19B and 21B provide holding circuits for the relays 19 and 21 from contact 2A. Contacts 19G and 21G, upon closing, energize shift magnet control relays 31 and 32 at points 558 and 559.

The sequence relays and the shift magnet control relays (Figs. 2 and 2A) are now energized in an arrangement for sequentially controlling the desired machine action for computing and entering in the proper registers the various amounts involved in the present operation. Those sequence relays and shift magnet control relays pertaining to sequences of operation not involved in the present operation are not energized, thus minimizing the machine operating time by permitting the necessary sequential operations to take place successively one after the other without pause for intervening unused sequential operations.

Selector relay 160 (Fig. 1A) which was energized by the circuit extending through conductor 3K, monthly switch 159 and monthly bar 150 (Fig. 1), upon its energization at point 539, closed contacts 160A, 160B and 160C in addition to the contact 160D. The effect of closing contact 160D is described hereinabove. Contacts 160A, 160B and 160C impress ground upon the bars 150A, 150B and 150C (Fig. 1A). The control card (Fig. 13) is perforated at 150FF, 150GG and 150HH thereby permitting the contact fingers 150F, 150G and 150H, which are representative of the numerical amount of 455, to respectively engage the bars 150A, 150B and 150C. The circuits through these fingers are continued through conductors 150J, 150K and 150L, cable 223 (Figs. 1 and 5) to contacts 200A, 200B and 200C of shift relay 200 (Fig. 5). Contact 200A is fourth from the right in the hundreds order group of contacts on shift relay 200, whereas contacts 200B and 200C are fifth from the right contacts respectively in the tens order and units order groups of contacts on said shift relay. These contacts have numerical significance corresponding to their numerical positions upon the shift relay. When the contacts of shift relay 200 are closed in the manner now to be described, the circuit will be completed through the contacts 200A, 200B and 200C and conductors leading therefrom through cable 237 (Figs. 5 and 3) to the central windings of counting relays 36, 46 and 54 to effect energization of these counting relays.

Sequence relay 4 when deenergizing at point 537 closed contact 4A thereby completing the circuit from ground at contact 25B of shift magnet control relay 25 and leading through conductor 4X (Figs. 2, 2A, 5A and 5) and the shift magnet 210 to battery. Shift magnet 210 is thus potentialized at point 560, and upon energization of this shift magnet at point 561 the contacts of shift relay 200 are closed, completing said circuits through cable 237 for potentializing the central windings of counting relays 36, 46 and 54 at points 562, 563 and 564. These counting relays subsequently energize at points 565, 566 and 567 closing contacts 36C, 46C and 54C, preparing holding circuits for said relays through conductors 45E, 52E and 59E to ground at contacts 45A, 52A and 59A of unenergized stepping relay 45, 52 and 59. Each of these counting relays when so locked up or energized is instrumental in effecting successive energization of the counting relays associated therewith of lower numerical value. For example, energized counting relay 36 closes contact 36B, impressing ground upon the left-hand winding of counting relay 40 and potentializing said relay at point 568. When relay 40 later energizes at point 569, contact 40B closes preparing a holding circuit through conductor 45D. This holding circuit is at present ineffective but later becomes effective when stepping relay 45 is energized to close contact 45B. Contact 40C also closes, impressing ground upon the right-hand winding of counting relay 37 which is thus caused to energize at point 570. When relay 37 is thus energized, contact 37B closes, impressing ground upon the left-hand winding of counting relay 41 which is thus caused to energize at point 571. This process continues as a result of which relays 38, 42, 39 and 43 lock up successively as indicated at points 572, 573, 574 and 575.

Cut-off relay 44, although shown in line with the upper row of the double row of counting relays pertaining to the hundreds order, corresponds to and is controlled similarly to the counting relays in the lower row of said double row of relays. Consequently, upon the energization of relay 43 at point 575 the closing of contact 43C impresses ground upon the left-hand winding of cut-off relay 44 to energize said relay at point 576. So long as stepping relay 45 remains unenergized contact 45A is closed providing a holding circuit for cut-off relay 44 and each of the locked up counting relays in said lower row through contacts as 44B and 36C. Later during the operation of the machine when stepping relay 45 is energized, contact 45B is closed prior to the opening of contact 45A. At such time the ground at contact 45B will be a source of energization for the holding circuits including contacts as 40B of the counting relays locked up in the upper row.

In the tens order, after energization of counting relay 46 at point 566, the counting relays of lower numerical value successively lock up and eventually effect energization of cut-off relay 51 at point 577. In the units order, after energization of counting relay 54 at point 567, the counting relays of lower numerical value successively lock up and as a result of which the cut-off relay 58 eventually locks up at point 578. Since the same number of counting relays were locked up in the tens and units orders, cut-off relays 51 and 58 are energized simultaneously.

Only four pairs of counting relays were locked up in the hundreds order and so cut-off relay 44 is the first of the cut-off relays to energize. This energization of cut-off relay 44 closes contact 44G, impressing ground upon conductor 242 (Figs. 3 and 4) to control relay 117 and battery. Control relay 117 is thus potentialized at point 579 and later energizes at point 580, opening all of its contacts including contact 117G.

This opening of contacts 117G breaks the energization circuit through conductor 2C for sequence control relay 2, this latter relay immediately thereafter deenergizing at point 581, opening contact 2A and breaking the holding circuit through contact 3B for sequence relay 3 whereupon this sequence relay is caused to deenergize at point 582. Contact 3A opens, breaking the circuit leading through conductor 3K to selector relay 160 (Fig. 1A) which immediately thereafter deenergizes at point 583 to open contacts 160A, 160B and 160C. Thus ground is removed from the contact fingers 150F, 150G and 150H (Fig. 1), contacts 200A, 200B, and 200C of shift relay 200 (Fig. 5) and the central windings of counting relays 36, 46 and 54. In this manner the original source of energization for these counting relays is removed. Contact 160D opens to remove the original energy source for relays 169 and 170 (Fig. 1A) which remain energized from ground at contacts 7G and 9G of sequence relays 7 and 9. The opening of contact 3A also interrupts the energization circuit for relay 168 (Fig. 1A) which at point 584 begins deenergization later completed at point 585. Contact 168B opens, removing ground from conductor 168C and the central winding of sequence relay 8 which is then free to be deenergized in the normal course of the machine operation.

When cut-off relay 44 energized at point 576 contact 44C closed a circuit beginning with ground and leading through stepping relay 45 and conductor E (Figs. 3 and 4). Contact 44D closed a circuit leading from ground through conductor F (Figs. 3 and 4). In Fig. 4 conductors E and F lead into cable 240. Such conductors emerge from the cable 240 in Fig. 5 where they are connected respectively with contacts E1 and F1 of shift relay 200. The circuit is continued through conductors in cable 229 (Figs. 5 and 6), conductors 229E and 229F (Fig. 6) to clutches 66A and 71AAAAA and battery. Clutches 66A and 71AAAAA, therefore, are potentialized at points 586 and 587 upon the energization of cut-off relay 44. Stepping relay 45 which is in series with the clutch 66A is simultaneously potentialized at point 588.

When clutch 66A energizes at point 589 the number wheel 66, the zero setting wheel 66B and the shunting wheel 66C associated therewith are connected to constantly rotating shaft 69A for forward rotation therewith. Pulley 66N is fixed to shaft 69A and through the belt 66R drives the pulley 97L and one element of the clutch 71AAAAA which is freely rotatable upon the shaft 97A. A mating part of the clutch 71AAAAA is secured to the shaft 97A so that upon energization of said clutch 71AAAAA the shaft 97A will be driven forwardly by the belt 66R. Number wheels 71, 72 and 73 of the consumption quantity register (Fig. 7) are fixed respectively to the shafts 97A, 97B and 97C. Therefore, when the clutch 71AAAAA energizes at point 590 the number wheel 71 will take motion; that is, number wheels 66 and 71 take motion simultaneously and are driven forwardly at the same speed.

When stepping relay 45 energizes at point 591, contact 45A opens breaking the holding circuit for counting relay 36 through contact 36C and the left-hand winding of said relay. Therefore, upon the subsequent deenergization of control relay 160 at point 583 and the opening of contact 160A, counting relay 36 began deenergization at point 592 with its central winding. Counting relay 36 deenergizes at point 593, opening contact 36B and leaving sequence relay 40 energized through the holding circuit including its contact 40B and contact 45B of now energized stepping relay 45. Shortly after the number wheels 66 and 71 take motion, the shunting wheel 66C carries a lobe 66CC thereon into position for closing shunting contact 66D, which is then effective for impressing ground upon conductor 229E at point 66RR adjacent to the clutch 66A and between the battery at said clutch and stepping relay 45 (Fig. 3). The ground for the other side of contact 66D is obtained at contact 70R of zero setting relay 70 (Fig. 7).

This application of ground to conductor 229E at point 66RR merely supplements the ground already impressed upon the clutch 66A from contact 44C of cut-off relay 44 (Fig. 3) wherefore the clutch 66A remains energized for holding the number wheel 66 coupled with the shaft 69A. Such impression of ground, however, at point 66RR shunts out the battery at clutch 66A so far as concerns stepping relay 45 which thereupon begins deenergization at point 594.

Stepping relay 45 thereafter deenergizes at point 595, opening contact 45B after the closing of contact 45A. This opening of contact 45B breaks the holding circuit for counting relay 40 which is thus caused to deenergize at point 596.

The first digit 1 is entered on the number wheels 66 and 71 at the time indicated by point 597 on the line pertaining to stepping relay 45, and shortly prior to this time the lobe on shunting wheel 66C is removed from the position in registry with shunting contact 66D whereupon such shunting contact opens, removing the shunt from stepping relay 45 which consequently thereafter energizes at point 598. This energization of stepping relay 45 opens contact 45A, breaking the holding circuit for counting relay 37 which as a consequence deenergizes at point 599. The right-hand winding of counting relay 37 was previously deenergized upon the deenergization of counting relay 40 and the opening of contact 40C. Deenergized counting relay 37 opens contact 37B, leaving counting relay 41 energized through its right-hand winding and contacts 41B and 45B so long as stepping relay 45 remains energized.

As rotation of number wheels 66 and 71 proceeds, the shunting wheel 66C, shortly after these number wheels are advanced from each digital position toward the next, closes contact 66D, shunting out stepping relay 45. And shortly prior to the number wheels reaching each succeeding digital position, contact 66D is permitted to open, removing the shunt from stepping relay 45 and permitting its reenergization. In this manner, stepping relay 45 is alternately deenergized and energized for successively deenergizing the locked-up counting relays in the hundreds order. Eventually, during that period of time represented by the space between the vertical lines I' and II, after all of the counting relays have been deenergized and shortly prior to the entry of the fourth digit 4 on each of the number wheels 66 and 71, contact 66D will open permitting reenergization of stepping relay 45 and the opening of contact 45A to break the holding circuit for cut-off relay 44 which will then deenergize. This deenergization of the cut-off relay 44 effects opening of contacts 44C and 44D, thus breaking the energization circuits for stepping relay 45 and clutches 66A and 71AAAAA. The clutches 66A and 71AAAAA thereafter deenergize at such time as to release the driving connections for number wheels 66 and 71 when said number wheels reach the digital position 4.

In the tens order, when cut-off relay 51 energizes at point 577, contact 51C closes completing a circuit from ground through stepping relay 52 and conductor C (Figs. 3 and 4). Contact 51D also closes completing a circuit from ground to conductor D (Figs. 3 and 4). These circuits are extended through conductors C and D, cable 240, (Figs. 4 and 5) contacts C1 and D1 of shift relay 200, cable 229 (Figs. 5 and 6) and through conductors 229C and 229D to clutches 67A and 72AAAAA to battery. Stepping relay 52 and clutches 67A and 72AAAAA upon the closing of these circuits are potentialized simultaneously at point 600, 601 and 602. When clutch 67A energizes at point 603, it is effective for connecting the number wheel 67 with the constantly rotating shaft 69B for forward rotation. One element of the clutch 72AAAAA is rotated forwardly by the belt 67R. The other element of said clutch is connected with the shaft 79B so that upon energization of this clutch at point 604 a driving connection is established between the pulley 97M and the shaft 97B. Number wheel 72 which is secured to the shaft 97B will then be driven forwardly at the same speed as number wheel 67.

Following the deenergization of control relay 160 at point 583 for deenergizing the central windings of the initially energized of the counting relays, counting relay 46 was left energized through its left-hand winding from contact 52A of unenergized stepping relay 52. Therefore, when stepping relay 52 energizes at point 605 and opens contact 52A, counting relay 46 is depotentialized at point 606. When counting relay 46 deenergizes at point 607, the right-hand contact thereof opens, deenergizing the left-hand winding of counting relay 50 and leaving relay 50 energized through its right-hand contact and contact 52B of now energized stepping relay 52.

When number wheels 67 and 72 take motion upon the energization of clutches 67A and 72AAAAA, the shunting wheel 67C is operative in the manner described above with reference to shunting wheel 66C. That is, shunting wheel 67C, each time the number wheels 67 and 72 move a short distance from a digital position, functions to close shunting contact 67D and shortly prior to these number wheels reaching the next digital position permits shunting contact 67D to open. Thus stepping relay 52 is alternately deenergized and energized as an incident to the entry of each digit upon the number wheels to successively deenergize the locked up counting relays and their associated cut-off relay 51. Two counting relays, therefore, are deenergized as an incident to movement of the number wheels to each succeeding digital position, with the exception of the movement to the final digital position pursuant to which the last counting relay and the associated cut-off relay are deenergized.

The first digit 1 is entered upon number wheels 67 and 72 at the time indicated by point 608 on the line pertaining to stepping relay 52. Shortly after these number wheels took motion and moved off zero the shunting contact 67D was closed effecting deenergization of stepping relay 52 at point 609, and shortly prior to the entry of the digit 1 on each of such number wheels the shunt was removed permitting reenergization of stepping relay 52 at point 610. When stepping relay 52 deenergized at point 609, opening contact 52B, counting relay 50 deenergized at point 611, and after the reenergization of stepping relay 52 at point 610 to open contact 52A, counting relay 47 deenergized at point 612. This action of the shunting contact 67D and of the stepping relay 52 continues with the deenergization of two counting relays pursuant to the entry of each digit upon the number wheels 67 and 72 until eventually, when all the counting relays have been deenergized and shortly prior to the entry of the fifth digit 5 at point 613, as indicated on the line relating to stepping relay 52, said stepping relay is permitted to reenergize at point 614 to open contact 52A thereby effecting deenergization of the cut-off relay 51 at point 615. Cut-off relay 51 then opens contacts 51C and 51D, breaking the energization circuits for stepping relay 52 and clutches 67A and 72AAAAA, which parts then depotentialize at points 616, 617, and 618. Clutches 67A and 72AAAAA later deenergize at points 619 and 620 concurrently with the digits 5 being entered upon the number wheels 67 and 72. It will be noted that five digits were entered upon the number wheels 67 and 72 because five pair of counting relays were locked up in the tens order.

Since five pair of counting relays were also locked up in the units order, five digits are caused to be entered on the units order wheels 68 and 73 respectively of the last reading register 66—67—68 and of the consumption quantity register 71—72—73. When cut-off relay 58 energized at point 578, contacts 58C and 58D were closed. Contact 58C completed a circuit through stepping relay 59, conductor A, contact A1 of shift relay 200, and conductor 229A (Fig. 6) to clutch 68A and battery. Contact 58D completed a circuit through conductor B (Fig. 4) shift contact B1 of shift relay 200 and conductor 229B to clutch 73AAAAA. Therefore, stepping relay 59 and the clutches 68A and 73AAAAA are potentialized simultaneously at points 621, 622 and 623.

When clutches 68A and 73AAAAA energize at points 624 and 625, the number wheel 68 is connected for rotation with the shaft 69C whereas the shaft 97C is connected for forward rotation with the driving element of the clutch 73AAAAA. Number wheel 73 is permanently connected to the shaft 97C and therefore takes forward motion with said shaft at the same speed as number wheel 68. When stepping relay 59 energizes at point 626, contact 59A opens after the closing of contact 59B thereby deenergizing counting relay 54 at point 627. The central winding of counting relay 54 was previously deenergized when control relay 160 deenergized at point 583, opening contact 160C. The action of the shunting contact 68D is the same as that already described with respect to contact 67D, and since the same number of digits are entered on number wheels 68 and 73 as entered on the number wheels 67 and 72, contacts 67D and 68D operate in unison. The entry of the fifth digit 5 on number wheels 68 and 73 occurs at the time indicated by point 628 on the line pertaining to stepping relay 59, which point also signifies the time when the fifth digit 5 is entered on number wheels 67 and 72.

Shortly prior to the entry of the digit 5 on number wheels 68 and 73, shunting contact 68D is permitted to open whereupon stepping relay 59 reenergizes at point 629. Contact 59A opens prior to the closing of contact 59B, the holding circuit for cut-off relay 58 being thus broken so that said cut-off relay thereafter deenergizes at point 630. Contacts 58C and 58D open, breaking the energization circuits for stepping relay 59 and clutches 68A and 73AAAAA wherefore these parts are depotentialized at points 631, 632 and 633. Clutches 68A and 73AAAAA later deenergize at points 634 and 635 concurrently with the digits 5 standing on the number wheels 68 and 73.

The last reading register 66—67—68 now reads 455 as does the consumption quantity register 71—72—73.

*Registration of previous reading of meter No. 2 (second sequence)*

Cut-off relays 51 and 58 deenergized simultaneously at points 615 and 630, opening contacts 51G and 58G and breaking the energization circuit for control relay 117 (Fig. 4). Control relay 117 thereupon deenergizes at point 636, closing contact 117G and establishing the energization circuit for sequence control relay 2 which thereafter energizes at points 637. Contact 2B opens after the closing of contact 2A. This closing of contact 2A provides a holding circuit for the energized ones of the odd-numbered sequence relays in the upper row of such relays (Figs. 2 and 2A) through their contacts as 5B. Contact 2B in opening deenergized shift magnet control relay 25 through its left-hand winding. The right-hand winding of shift magnet control relay 25 was deenergized when sequence relay 3 deenergized at point 582 and opened contact 3G. This deenergization of relay 25 opens contact 25B, breaking the circuit from ground through contact 4A and conductor 4X to shift magnet 210 (Fig. 5). Relay 25 deenergized at point 638 and magnet 210 was therefore depotentialized at point 639. The contacts of shift relay 200 open when magnet 210 deenergizes at point 640.

Energized relay 2 also, in opening contact 2B, depotentializes sequence relay 6 through contact 6F, the left-hand winding of relay 6 having previously deenergized following deenergization of sequence relay 3 and the opening of contact 3F. Relay 6 completes deenergization at point 641, opening contact 6C thereby leaving sequence relay 5 energized through its left-hand winding and contact 5B so long as relay 2 remains energized. Contact 6B closes, establishing a circuit from ground through contact 5A, conductor 5K, switch 157 (Fig. 1A), switch contact 157A pertaining to the third month, conductor 157B, contact finger 151D (Fig. 1), contact bar 151, and selector relay 162 (Fig. 1A) to battery. Relay 162 is, therefore, caused to energize at point 642. Contact 162D in closing establishes a circuit to selector bars 151M and 151N (Fig. 1) but without effect since the card contains no perforations permitting the contact fingers to engage these bars. Contacts 162A, 162B and 162C complete circuits from ground through contact bars 151A, 151B and 151C, contact fingers 151F, 151G, 151H (which during the present operation are permitted to engage the associated contact bars through card perforations representative of the previous reading 441 of the number 2 meter), conductors in cable 223 and to contacts 201A, 201B and 201C of shift relay 201 (Fig. 5). When shift relay 201 is actuated to close its contacts in the manner now to be described, these circuits to contacts 201A, 201B and 201C will be extended through conductors in cable 237 to the central windings of counting relays 36, 47 and 56 (Fig. 3).

Sequence relay 6 when deenergizing at point 641 also closed contact 6A thereby completing the circuit from contact 26B and through conductor 6X to shift magnet 211, causing energization of said magnet and the closing of the contacts upon shift relay 201 at point 643. Thereupon, through the circuits previously traced, the counting relays 36, 47 and 56 are potentialized at points 644, 645 and 646.

The counting relays of lower numerical value then successively lock up in an arrangement representative of the No. 2 meter previous reading 441, there being four pairs of counting relays locking up in the hundreds and tens orders and one pair of such relays locking up in the units order. Since the same number of counting relays lock up in the hundreds and tens orders, the cutoff relays 44 and 51 will ultimately simultaneously lock up at points 647 and 648. There are fewer counting relays locked up in the units order and, therefore, cut-off relay 58 energizes first at point 649, closing contact 58G to complete the energization circuit for control relay 117 (Fig. 4), which relay immediately thereafter energizes at point 650. Contact 117G opens, breaking the energization circuit for sequence control relay 2 which immediately thereafter deenergizes at point 651, opening contact 2A and freeing sequence relay 5 of ground through contact 5B whereby this relay is caused to deenergize at point 652. Contact 2B closed prior to the opening of contact 2A thereby providing a holding circuit for those of the even-numbered sequence relays as 8 which are energized and for those of the shift magnet control relays as 27 which are energized. Contacts 5F and 5G open, leaving sequence relay 8 and shift magnet control relay 26 energized through their contacts 8F and 26A so long as relay 2 remains unenergized and contact 2B closed. Contact 5A opens, deenergizing control relay 162 at point 678 and thus removing (at contacts 168A, 168B and 168C) the initial source of ground for energizing the counting relays.

With the contacts of shift relay 201 closed and the contacts of each of the other shift relays open, circuits now to be described extend from contacts of cut-off relays 44, 51 and 58 through certain of the closed contacts of said shift relay to the clutches of different registers in which the reading represented by the locked-up counting relays is to be entered. The reading 441 represented by the now energized counting relays is to be entered in the register 93—94—95 (Fig. 6) for receiving the previous reading of the No. 2 meter, and is to be subtractively entered in the register 71—72—73 (Fig. 7).

When cut-off relay 44 energizes at point 647, contacts 44C and 44D close, respectively completing a circuit leading through stepping relay 45 and contact E2 of shift relay 201 to clutch 93A (Fig. 6) and a circuit leading through conductor F, contact F2 of shift relay 201 and clutch 71AAA (Fig. 6) to battery. Therefore, with the energization of cut-off relay 44 at point 647, stepping relay 45 and clutches 93A and 71AAA are potentialized at points 653, 654 and 655.

When cut-off relay 51 energizes at point 648, contacts 51C and 51D close to respectively establish a circuit leading through stepping relay 52, contact C2 of shift relay 201 and clutch 94A (Fig. 6), and a circuit leading through conductor D and contact D 2 of shift relay 201 to clutch 72AAA and battery. Stepping relay 52 and clutches 94A and 72AAA are thus simultaneously potentialized at points 656, 657 and 658.

When cut-off relay 58 energizes at point 649, contacts 58C and 58D close to respectively complete a circuit leading through stepping relay 59, conductor A, contact A2 of shift relay 201 to clutch 95A and battery, and a circuit leading through conductor B, contact B2 of shift relay 201 to clutch 73AAA and battery. Stepping relay 59 and clutches 95A and 73AAA are thus simultaneously potentialized at points 659, 660 and 661 upon the energization of cut-off relay 58.

Clutches 93A, 94A and 95A are adapted to connect the number wheels associated therewith for forward rotation with the constantly rotating shafts 96A 96B and 96C. It will be observed that the shafts upon which the number wheels 93, 94 and 95 are mounted rotate in a direction opposite to that of the shafts upon which the number wheels 66, 67 and 68 are mounted. However, the digits are so arranged around the peripheries of number wheels 93, 94 and 95 that said number wheels will be advanced forwardly when connected to their respective shafts. Since shafts 96A, 96B and 96C rotate oppositely to the shafts 69A, 69B and 69C, the belts as 93R driven from the pulleys on said shafts 96A, 96B and 96C drive the driving elements of the clutches 71AAA, 72AAA and 73AAA in the opposite direction to which the driving elements of the clutches 71AAAAA, 72AAAAA, and 73AAAAA are driven.

When clutches 93A and 71AAA energize at points 662 and 663, the number wheel 93 will be connected for forward rotation with the shaft 96A, whereas the number wheel 71, which is secured to the shaft 97A, will be connected for backward rotation. Similarly, when clutches 94A and 72AAA energize at points 664 and 665, the number wheel 94 will be connected for forward rotation while the shaft 97B and the number wheel 72 will be connected for reverse rotation; and when clutches 95A and 73AAA energize at points 666 and 667, the number wheel 95 will be connected for forward rotation while the shaft 97C and number wheel 73 will be connected for backward rotation.

Since but a single pair of counting relays are locked up in the units order, the units order number wheels 95 and 73 will be rotated but a single digital position. Number wheels 93, 94, 71 and 72 will all be rotated four digital positions since four pairs of counting relays are locked up in the hundreds and tens orders. During rotation of number wheels 93 and 71, the shunting wheel 93C closes and opens shunting contact 93D for alternately deenergizing and permitting reenergization of stepping relay 45 to successively deenergize the counting relays locked up in the hundreds order. Shunting wheel 94C similarly operates shunting contact 94D with respect to stepping relay 52, and the counting relays locked up in the tens order; and shunting wheel 95C operates similarly with respect to shunting contact 95D for causing deenergization of the counting relays locked up in the units order.

Eventually, when the cut-off relay 58 deenergizes at point 668, opening its several contacts, the energization circuits for stepping relay 59 and clutches 95A and 73AAA are broken whereupon these parts deenergize at points 669, 670 and 671. When clutches 95A and 73AAA deenergize, the number wheel 95 will have been advanced one digital position to 1 whereas the number wheel 73 will have been moved backwardly one digital position from 5 to 4.

Number wheels 93 and 94 are each rotated four digital positions, and near the end of such rotation the cut-off relays 44 and 51 deenergize at points 672 and 673, opening their contacts 44C, 44D, 51C and 51D thereby breaking the energization circuits for clutches 93A, 71AAA, 94A and 72AAA whereby these clutches are caused to deenergize at points 674 to 677 concurrently with the number wheels 93 and 94 having been advanced four digital positions and with the number wheels 71 and 72 having been moved backwardly four digital positions. The previous reading 441 of the No. 2 meter will now stand on the register 93—94—95 while the consumption quantity 014 which is the difference between the last and previous readings of the No. 2 meter, will stand on the consumption quantity register 71—72—73. Deenergized cut-off relays 44 and 51 also break the energization circuits for stepping relays 45 and 52 which thereafter deenergize at points 679 and 680.

*Registering the last reading of meter No. 1 (third sequence)*

At the beginning of the current month the No. 1 meter was in service. The last reading taken from the No. 1 meter and as recorded by the card perforations 152FF, 152GG and 152HH (Fig. 13) is set up in the machine in the following manner.

Deenergized cut-off relays 44 and 51 open contacts 44G and 51G, breaking the energization circuit for control relay 117 which thereafter deenergizes at point 681. Contacts 117G closes, energizing relay 2 at point 682. Contact 2B opens effecting simultaneous deenergization of sequence relay 8 and shift magnet control relay 26, at points 683 and 684. The holding circuits for these two relays at contacts 5F and 5G were broken when sequence relay 5 deenergized at point 652. Contact 26B opens, breaking the energization circuit through contact 6A and conductor 6X for shift magnet 211 which thereafter deenergizes at point 685. Contact 8C opens, leaving sequence relay 7 energized through its left-hand winding and contacts 7B and 2A so long as relay 2 remains energized. Contact 8B closes to impress ground through the circuit including contact 7A, conductor 7K, contact 169C, conductor 169D and relay 165 to battery. When relay 165 therefore energizes at point 686 its contacts close impressing ground upon contact bars 152A, 152B and 152C (Fig. 1). The circuit is continued through contact fingers 152F, 152G and 152H which are representative of 441 the amount of the last reading of the No. 1 meter. From contacts 152F, 152G and 152H circuits are extended through cable 223 to contacts 202A, 202B and 202C of shift relay 202 (Fig. 5).

When sequence relay 8 deenergized at point 683, contact 8A also closed impressing ground from contact 27B upon conductor 8X and shift magnet 212 (Fig. 5), resulting in energization of this magnet at point 687 and the closing of the contacts upon shift relay 202. The said circuits from fingers 152F, 152G and 152H are thus continued through contacts 202A, 202B and 202C and through cable 237 to the central windings of counting relays 36, 47 and 56 (Fig. 3). These counting relays thereupon potentialize at points 688, 689 and 690. Subsequent to energization of these counting relays at point 691, 692 and 693 the counting relays of lower numerical value lock up in the regular manner as do cut-off relays 44, 51 and 58 at points 694, 695 and 696.

Cut-off relay 58 locks up first inasmuch as a single pair of counting relays are locked up in the units order. Contact 58G closes, impressing ground upon and effecting energization of control relay 117 at point 697. Contact 117G in opening causes deenergization of sequence control relay 2 at point 698. Contact 2A opens, deenergizing sequence relay 7 at point 699 and thus opening contact 7A which breaks the energization circuit for relay 165. Relay 165 immediately deenergizes at point 700 to open its several contacts and break the initial energization circuit for the counting relays 36, 47 and 56. Contact 7G, in opening, breaks the holding circuit for relay 169 which thereafter deenergizes at point 700A.

With shift relay 202 now actuated to close its several contacts, the conductors leading from contacts at 58C and 58D of the cut-off relays 58, 51 and 44 will be connected for energizing the clutches 76A, 77A and 78A (Fig. 7) of the register for receiving the last reading of the No. 1 meter, and to the clutches 71AA, 72AA and 73AA for driving the number wheels of the consumption quantity register 71—72—73. Contacts 44C and 44D establish circuits through contacts E3 and F3 of shift relay 202 to clutches 76A and 71AA; contacts 51C and 51D close circuits through contacts C3 and D3 of shift relay 202 to clutches 77A and 72AA; whereas contacts 58C and 58D close circuits through contacts A3 and B3 of shift relay 202 to clutches 78A and 73AA. The stepping relays 45, 52 and 59 are in series with the energization circuits respectively for clutches 76A, 77A and 78A so that during rotation of the number wheels the shunting contacts 76D, 77D and 78D are effective for alternately deenergizing and permitting reenergization of said stepping relays.

Since cut-off relay 58 is the first of the cut-off relays to energize, clutches 78A and 73AA are the first to energize at points 701 and 702. Cut-off relays 44 and 51 energize simultaneously at points 694 and 695, and likewise the clutches 76A, 71AA, 77A and 72AA energize simultaneously at points 703 to 706.

Near the end of the entry of a single digit upon the number wheels 78 and 73 cut-off relay 58 deenergizes at point 707, opening contacts 58C and 58D thereby breaking the energization circuits for stepping relay 59 and clutches 78A and 73AA, which parts thereafter deenergize at points 708, 709 and 710. Upon this deenergization of clutches 78A and 73AA the number wheels 78 and 73 will stand respectively at 1 and 5.

Near the end of the fourth digital advance of the number wheels 76, 77, 71 and 72, cut-off relays 44 and 51 deenergize at points 711 and 712, opening contacts 44C, 44D, 51C and 51D thereby depotentializing the stepping relays 45 and 52 and the clutches 76A, 71AA, 77A and 72AA, which parts thereafter deenergize at points 713, 714, 715, 716, 717 and 718. Upon the deenergization of these clutches the number wheels 76 and 77 will each stand at 4 whereas the number wheels 71 and 72 will stand respectively at 4 and 5.

The consumption quantity register 71—72—73 which stood at 014 at the beginning of this sequential operation now stands at 455.

*Registering the previous reading of meter No. 1 (fourth sequence)*

When cut-off relays 44 and 51 deenergize at points 711 and 712, contacts 44G and 51G open effecting deenergization of control relay 117 at points 719, closing contact 117G and causing energization of sequence control relay 2 at point 720. Contact 2B opens, deenergizing sequence relay 10 and shift magnet control relay 27 at points 721 and 722. Contact 27B opens, removing ground from contact 8A, conductor 8X and shift magnet 212 which immediately thereafter deenergizes at point 723 incident to opening the contacts of shift relay 202. Contact 10C opens, deenergizing the right-hand winding of sequence relay 9 and leaving this relay energized through contacts 9B and 2A so long as sequence control relay 2 remains energized. Contact 10B closes, establishing a circuit from ground and through contact 9A, conductor 9K, contact 170C (Fig. 1A), conductor 170D and relay 167 to battery. Relay 167 is thus caused to energize at point 724, closing its several contacts and thereby impressing ground upon the contact bars 153A, 153B and 153C (Fig. 1). The contact fingers 153F, 153G and 153H which are representative of the numercial amount of the previous reading 416 on No. 1 meter, and which are permitted to engage their respective contact bars through card perforations 153FF, 153GG and 153HH (Fig. 13), enable circuits by impressing such ground upon conductors passing through cable 223 (Figs. 1 and 5) to contacts 203A, 203B and 203C of shift relay 203. When contact 10A of sequence relay 10 closed, ground was impressed from contact 65B through contact 10A and conductor 10X to shift magnet 213 which later energizes at point 725 after potentialization at point 726.

When the contacts of shift relay 203 are thus closed the aforedescribed circuits leading to contacts 203A, 203B and 203C are extended through conductors in cable 237 to the central windings of counting relays 36, 49 and 53 which counting relays immediately thereafter energize at points 127, 128 and 129. The counting relays of lower numerical value lock up in the regular manner as do cut-off relays 44, 51 and 58 at points 730, 731 and 732. Cut-off relay 51 energizes first, closing contact 51G thereby causing energization of control relay 117 at point 733, the opening of contact 117G and the deenergization of sequence control relay 2 at point 734. Contact 2A opens deenergizing sequence relay 9 at point 735. Contacts 9C and 9G open, breaking the holding circuits for relays 12 and 65 which relays then remain energized through contacts 12F and 65A so long as relay 2 remains unenergized and contact 2B closed. Contact 9A opens whereupon relay 167 deenergizes at point 736. Contact 9G in opening breaks the holding circuit for relay 170 (Fig. 1A) which deenergizes at point 737. When relay 167 deenergizes, its contacts are opened removing ground as the source for holding the central windings of counting relays 36, 49 and 53 energized, and leaving the counting relays in condition for successive release under the control of their respectively associated stepping relays.

With shift relay 203 now closed, the clutch energization circuits effected by the closing of contacts as 44C and 44D of the cut-off relays 44, 51 and 58 will be connected with a different group of number wheel clutches (Fig. 7). Contacts 44C and 44D establish circuits through contacts E4 and F4 of shift relay 203 and conductors 232E and 232F (Fig. 7) to clutches 83A and 71A which clutches consequently energize at points 738 and 739 whereby the number wheel 83 is caused to take forward motion and the number wheel 71 backward motion. Contacts 51C and 51D close clutch energization circuits extending through contacts C4 and D4 of shift relay 203 and conductors 232C and 232D to clutches 84A and 72A which consequently energize at points 740 and 741 to cause the number wheel 84 to take forward motion and the number wheel 72 backward motion. Contacts 58C and 58D close circuits including contacts A4 and B4 of shift relay 203 and conductors 232A and 232B to clutches 85A and 73A which consequently energize at points 742 and 743 whereupon the number wheels 85 and 73 respectively take forward and backward rotative movement.

Since four pairs of counting relays are locked up in the hundreds order, one pair in the tens order and six pairs in the units order, the hundreds order wheels 83 and 71 will rotate four digital positions, the tens order wheels 84 and 72 one digital position and the units order wheels 85 and 73 six digital positions. The wheels 83, 84 and 85 which stood at zero will eventually be moved to display the reading 416 whereas the number wheels 71, 72 and 73 which stood at 455, and which are moved backwardly, will be stationed to display the reading 049.

*Carry-over in subtraction*

The fifth digit 0 is subtractively entered on number wheel 73 at the time indicated by point 744 on the line pertaining to the stepping relay 59. The sixth digit 9 is entered on this number wheel at the time indicated by point 745. Midway between the points of negative entry of the fifth and sixth digits upon the number wheel 73, or while said number wheel was moving from 0 to 9, the lobe upon the carry-over wheel 73E passed beneath carry-over contact 73G, momentarily closing said contact whereby ground was impressed upon conductor 232H which leads into cable 232 and connects with contact H4 of shift relay 203, the circuit being extended through cable 240 and conductor H (Fig. 4) to carry-over counting relay 113.

Relay 113 is thus energized at point 746 thereby causing successive energization of carry-over counting relay 114 and carry-over cut-off relay 115 at points 747 and 748. Carry-over stepping relay 116 remains unenergized at this time wherefore contact 116A is closed, providing ground at one end of a holding circuit for relays 113 and 115. Contact 114B prepares a holding circuit terminating at contact 116B and which holding circuit becomes effective for the relay 114 upon energization of relay 116.

Shortly prior to the subtractive entry of the sixth digit 9 upon the number wheel 73, shunting contact 85D opens permitting reenergization of stepping relay 59 at point 749 and the opening of contact 59A whereupon cut-off relay 58 begins deenergization which is completed at point 750. Contacts 58C and 58D open, breaking the energization circuits for stepping relay 59 and clutches 85A and 73A all of which are thus simultaneously depotentialized at points 751, 752 and 753. Later, the clutches 85A and 73A deenergize at points 754 and 755 when the number wheels 85 and 73 respectively display the digits 6 and 9. Contact 58G opens, removing ground from control relay 117 which deenergizes at point 756, closing contact 117G, but failing to complete the energization circuit for sequence control relay 2 since carry-over cut-off relay 115, now energized, holds contact AA open. Contact 117A also closes thereby completing a circuit from ground at contact 117G and leading through contact 115C, stepping relay 116, said contact 117A and conductor G. Contact 115D impressed ground from contact 117G onto conductor J. Circuits are completed from conductors G and J through contacts G4 and J4 of shift relay 203 and conductors 232G and 232J respectively to clutch 72A and one side of shunting contact 72D. Therefore, when control relay 117 deenergizes, carry-over stepping relay 116 and the clutch 72A are potentialized simultaneously at points 757 and 758.

When the clutch 72A energizes at point 759 the number wheel 72 is again caused to take backward rotation, and during such rotation the shunting wheel 72C closes and opens shunting contact 72D which thus is effective to apply and remove the ground obtained from contact 117G (through the above traced circuit) upon conductor 232D adjacent to the clutch 72A thereby causing carry-over stepping relay 116 to deenergize at point 760 and to reenergize at point 761. Relay 116 first energized at point 762 after potentialization at point 757. When carry-over stepping relay 116 first energized at point 762 contact 116A opened before the closing of contact 116B causing deenergization of carry-over counting relay 113 at point 763. When relay 116 later deenergized at point 760, closing contact 116A prior to the opening of contact 116B, relay 114 was deenergized at point 764. And shortly prior to the subtractive entry of the single digit upon the number wheel 72 at the time indicated by point 765 on the line pertaining to stepping relay 116 and when said relay energized at point 761, contact 116A opened, depotentializing cut-off relay 115 which immediately thereafter deenergized at point 766. Contacts 115C and 115D open, depotentializing stepping relay 116 and clutch 72A at points 767 and 768 which parts later deenergize at points 769 and 770.

When clutch 72A deenergizes at point 770 the number wheel 72 will have been moved backwardly one digital position from 4 to 3. The consumption quantity register will now read 039 which is the difference between 455 and 416. That is, the amount 455 stood upon the consumption quantity register 71—72—73 prior to the entry of the previous reading 416 of the No. 1 meter into the register 83—84—85 and the subtractive entry of such reading into the consumption quantity register.

*Registration of money charge for electricity consumed through two meters (fifth sequence)*

When the carry-over cut-off relay 115 (Fig. 4) deenergizes at point 766, near the end of the above described carry-over action, contact AA of said relay closes, completing the circuit from contact 117G to the sequence control relay 2 which immediately thereafter energizes at point 771, opening contact 2B and thereby deenergizing sequence relay 12 and shift magnet control relay 65 at points 772 and 773. Contact 65B in opening breaks the energization circuit extending through contact 10A and conductor 10X to shift magnet 213 which therefore deenergizes at point 774, opening the contacts of shift relay 203. Contact 12B closed impressing ground upon a circuit including contact 11A and conductor 11K (Figs. 2, 2A, 8B, 8A and 8).

Conductor 11K supplies ground for the potentialization of circuits in the product table (Figs. 8, 8A and 8B) predetermined by the closing arrangement of circuit switches. Said switches are arranged in three vertical rows, the left-hand row pertaining to the hundreds order, the center row pertaining to the tens order and the right-hand row pertaining to the units order. The switches in each of these rows from top to bottom correspond respectively to the digits 0 to 9. The hundreds order row of switches are adapted to be closed by the lobe 71X on contact closing wheel 71F (Figs. 7 and 8). When the number wheel 71 stands at 0 the lobe 71X will be in position for closing the zero switch in the hundreds order (Fig. 8). When the number wheel 71 stands at any other digital position the lobe 71X closes the switch in the product table hundreds order corresponding to the number at which the number wheel stands. Contact closing wheels 72F and 73F (Figs. 7 and 8) rotate with the number wheels 72 and 73 and have lobes 72X and 73X for closing the multiple contact switches in the tens and units orders of the product table in the same manner as lobe 71X closes the switches in the hundreds order.

Since the consumption quantity register 71—72—73 now stands at 039, the zero or uppermost switch in the hundreds order (Fig. 8) will be closed by contact 71X; the number 3 (fourth from the top) switch in the tens order will be closed by the lobe 72X on contact closing wheel 72F; and the lowermost switch, number 9, in the units order will be closed by the lobe 73X on contact closing wheel 73F.

Therefore, from grounded conductor 11K the following circuits are traceable. Picking up the circuit at contacts 277A and 277B of the zero switch in the hundreds order such circuits lead through conductors 277C and 277D, switch contacts 278A and 278B, conductors 278C and 278D, conductors 278E and 278F, contacts 281A and 281B, conductors 281C and 281D to conductors 281E and 281F which lead into cable 234. Another circuit from conductor 11K is traceable through contact 278G of the number 3 switch in the tens order and conductor 286A to relay 275 and battery (Fig. 8B). Relay 275 is therefore potentialized at point 775 upon the deenergization of sequence relay 12 and the closing of contact 12B. When relay 275 energizes at point 776 contact 275B closes, completing a circuit from ground at contact 274A, through said contact 275B, conductor 275C, conductor 275D, switch contact 281G of the number 9 switch in the units order, conductor 281H and conductor 285H which leads into cable 234.

As has been explained hereinabove, the conductors interconnecting the contacts of the multiple contact switches in the product table (Figs. 8, 8A and 8B) are so arranged as to base this product table upon the fixed factor 6 for performing computations in which the variable factor is 50 or less. That is, when the switches of this product table are closed in an arrangement representative of the consumption amount 039 now standing upon the consumption quantity register 71—72—73 (Fig. 7), and ground is impressed upon conductor 11K, electrical conductor paths are potentialized, as traced in the next preceding paragraph, through the product table so that potentialization will be had of conductors in the three vertical conductor groups 520, 521 and 522 that are representative of the product of said consumption amount and the fixed factor 6. The product of 039 and 6 is 234. The vertical conductor group 520 consists of 9 conductors which are representative from left to right of the digits 1 to 9; the vertical conductor group 521 consists of 9 conductors which from left to right are representative of the digits 1 to 9; and likewise the vertical conductor group 522 consists of 9 conductors which from left to right are representative of the digits 1 to 9. Groups 520, 521 and 522 pertain respectively to the hundreds order, tens order and units order. Conductors 281E, 281F and 285H respectively in the groups 520, 521 and 522 and which are potentialized through the above traced circuits are therefore representative of the product 234.

Conductors 281E, 281F and 285H emerge from cable 234 in Fig. 5 where they are connected respectively with contacts 204A, 204B and 204C of shift relay 204. The contacts of this shift relay are closed in the following manner.

When sequence relay 12 deenergized at point 772, contact 12A closed, impressing ground from contact 28B upon conductor 12X and shift magnet 214 which consequently energized at point 777. Thereupon contacts 204A, 204B and 204C closed effecting circuits through cable 237 to the central windings of counting relays 38, 48 and 55 (Fig. 3), potentializing these relays at points 778, 779 and 780. Upon the energization of these counting relays at points 781, 782 and 783 the counting relays of lower numerical value successively lock up, there being two pairs of such relays to lock up in the hundreds order, three pairs in the tens order and four pairs in the units order to represent the numerical amount of 234.

Cut-off relays 44, 51 and 58 in turn energize at points 784, 785 and 786. Cut-off relay 44 first energizes, closing contact 44G causing energization of control relay 117 at point 787, the opening of contact 117G and the deenergization of sequence control relay 2 at point 788, the deenergization of sequence relay 11 at point 789, the opening of contact 11A and the consequent deenergization of relay 275 (Fig. 8B) at point 790. The opening of contact 11A removed the source of ground for the central windings of counting relays 38 and 48. The opening of contact 275B of relay 275 at point 790 removed the source of ground for the central winding of counting relay 55. Thus the counting relays are conditioned for successive deenergization under control of the stepping relays 45, 52 and 59 in the usual manner.

Contacts 44C and 44D of energized cut-off relay 44 complete energization circuits through conductors E and F (Fig. 4), contacts E5 and F5 of shift relay 204 (the contacts of which are now closed) and conductors 233E and 233F (Fig. 11) to clutches 250A and 253A pertaining to the hundreds order number wheels 250 and 253 of the consumption charge register and the bill totalizer register (Fig. 11). Contacts 51C and 51D of cut-off relay 51 complete circuits including conductors C and D (Fig. 4), contacts C5 and D5 of shift relay 204 and conductors 233C and 233D (Fig. 11) to the clutches 251A and 254A pertaining to the number wheels 251 and 254 in the consumption charge register and in the bill totalizer register. Contacts 58C and 58D of cut-off relay 58 complete circuits including conductors A and B (Fig. 4), contacts A5 and B5 of shift relay 204, conductors 233A and 233B (Fig. 11) and clutches 252A and 255A pertaining to the number wheels in the units order of said consumption charge and bill totalizer registers. The stepping relays 45, 52 and 59 are respectively in series with the circuits leading to clutches 250A, 251A and 252A so that during rotation of the number wheels 250, 251 and 252 and their associated shunting wheels 250C, 251C and 252C the shunting contacts 250D, 251D and 252D will be effective for alternately deenergizing and energizing said stepping relays. In this way the locked up counting relays (Fig. 3) are deenergized in the regular manner.

Since the clutches as 250A and 253A of the consumption charge register and of the bill totalizer register are connected in multiple the same entries will be made upon both registers. And since two pairs of counting relays are locked up in the hundreds order and three pairs of such relays are locked up in the tens order, such relays complete deenergization and the digits 2 and 3 are entered upon number wheels in the hundreds and tens orders of these registers during that interval of time represented by the space between vertical chart lines V' and VI. Clutches 250A and 253A are shown to energize at points 791 and 792, clutches 251A and 154A at point 793 and 794 and clutches 252A and 255A at points 795 and 796 respectively following the energization of cut-off relays 44, 51 and 58 at points 784, 785 and 786.

The cut-off relay 58 is the last of the cut-off relays to deenergize, this deenergization taking place at point 797, whereupon contacts 58C and 58D open depotentializing stepping relay 59 and clutches 252A and 255A at points 798, 799 and 800. Subsequently the clutches 252A and 255A deenergize at points 801 and 802 at the instant the digit 4 is entered upon each of the number wheels 252 and 255. The consumption charge register and the bill totalizer register each now displays the reading 234.

Monthly merchandise charge (sixth sequence)

The deenergization of cut-off relay 58 at point 797 effects the opening of contact 58G, the breaking of the energization circuit for control relay 117 which immediately thereafter deergizes at point 803, closing contact 117G and causing energization of sequence control relay 2 at point 804. Contact 2B is thus opened deenergizing sequence relay 20 and shift magnet control relay 28 at points 805 and 806. Contact 28B opens, breaking the energization circuit through conductor 12X for shift magnet 214 which is thus depotentialized at point 807 and later deenergizes at point 808. Contact 20B closes, impressing ground upon the circuit extending through contact 19A and conductor 19K to merchandise charge bars 186, 186A and 186B (Fig. 1). Contact fingers 186F and 186G which are representative of the monetary amount of $2.50 are permitted to engage the bars 186 and 186A through card perforations 186FF and 186GG (Fig. 13), and hence extend the ground from said bars through conductors in cable 225 to contacts 208A and 208B of shift relay 208 (Fig. 5A). The contacts of shift relay 208 are closed by the energization of shift magnet 218 in the following manner. When sequence relay 20 deenergized at point 805 contact 20A closed impressing ground from contact 31B upon conductor 20X and shift magnet 218 which then potentialized at point 809 and later energized at point 810. At this time the ground is extended through contacts 208A and 208B of said shift relay and through conductors in cable 237 to the central windings of counting relays 38 and 46 which are thus potentialized at points 811 and 812. These counting relays energize at points 813 and 814; the counting relays of lower numerical value successively lock up; and in turn the cut-off relays 44 and 51 lock up or energize at points 815 and 816. When cut-off relay 44 energizes, closing contact 44G, control relay 117 is caused to energize at point 817, opening contact 117G and effecting deenergization of sequence control relay 2 at point 818. Contact 2A opens, deenergizing sequence relay 19 at point 819 opening contact 19A and removing the source of energization for the central windings of counting relays 38 and 46. The counting relays are thus placed under control of their holding circuits at the contacts at 45A and 45B of the stepping relays 45 and 52.

Contacts 44C and 44D upon closing establish circuits including conductors E and F, contacts E9 and F9 of now closed shift relay 208, conductors 226E and 226F (Fig. 11) and clutches 257A and 253A. Stepping relay 45 is in series with the clutch 257A. These parts are thus potentialized at points 820, 821 and 822. The clutches 257A and 253A later energize at points 823 and 824 to cause the number wheels 257 and 253 to take motion from the constantly rotating shafts 260 and 256 upon which they are respectively mounted.

From contacts 51C and 51D of cut-off relay 51 circuits are extended through conductors C and D (Fig. 4), contacts C9 and D9 of shift relay 208 and conductors 226C and 226D to clutches 258A and 254A of the merchandise register and the bill totalizer register (Fig. 11). Stepping relay 52 is in series with the circuit leading to clutch 258A, this stepping relay and the clutches 258A and 254A being simultaneously potentialized at points 825, 826 and 827. When the clutches 258A and 254A later energize at points 828 and 829, the number wheels 258 and 254 will be connected to and for rotation with the shafts 260 and 256.

Since two pairs of counting relays were locked up in the hundreds order and five pairs of counting relays were locked up in the tens order, clutches 257A and 253A will remain energized long enough to cause entry of two digits upon the number wheels 257 and 253, whereas the clutches 258A and 254A will remain energized long enough to permit entry of five digits on the number wheels 258 and 254. Clutches 257A and 253A are deenergized during that interval of time represented by vertical chart lines VI' and VII. Shunting contacts 257D and 258D, during rotation of the number wheels in these two registers, operate to periodically impress ground upon the circuits passing through stepping relays 45 and 52 so that these stepping relays alternately deenergize and energize for successively deenergizing the locked up counting relays.

Shortly prior to entry of the fifth digit 5 upon the number wheels 258 and 254, shunting contact 258D opens permitting reenergization of stepping relay 52 at point 830, the opening of contact 52A and the deenergization of cut-off relay 51 at point 831. Contacts 51C and 51D open, breaking the energization circuits for stepping relay 52 and clutches 258A and 254A which thereafter respectively deenergize at points 832, 834 and 833. With the deenergization of clutches 258A and 254A the merchandise register will read 250, whereas the bill totalizer register will read 484.

Registering last month's unpaid merchandise charge (seventh sequence)

Cut-off relay 51 in deenergizing at point 831 opens contact 51G, deenergizing control relay 117 at point 835 to close contact 117G for energizing sequence control relay 2 at point 836. Contact 2B opens breaking the holding circuits for sequence relay 22 and shift magnet control relay 31 which relays thereafter deenergize at points 837 and 838.

Contact 31B opens, breaking the energization circuit for shift magnet 218, wherefore this shift magnet deenergizes at point 839 and the contacts of shift relay 208 open. Contact 22B closes, impressing ground through a circuit including contact 21A, conductor 21K, conductor 19K and the bars 186, 186A and 186B (Fig. 1). This circuit obviously could lead to a different set of bars than the bars 186, 186A and 186B, but since the monthly merchandise payments for both the current and past months are the same, $2.50, these bars are used during the present sequence and the preceding sequence.

From contact bars 186 and 186A circuits are completed through contact fingers 186F and 186G, conductors in cable 225 (Figs. 1 and 5A) to contacts 209A and 209B on shift relay 209. When sequence relay 22 deenergized, contact 22D also closed, completing a circuit from ground at contact 32B and including conductor 22X and shift magnet 219 and battery. Thereupon shift magnet 219 was potentialized at point 840, and when this magnet energizes at point 841 the contacts of shift relay 209 are closed whereupon the circuits leading to contacts 209A and 209B are extended through conductors in cable 237 to the central windings of counting relays 38 and 46 (Fig. 3). Said counting relays immediately thereafter energize at points 842 and 843. The counting relays of lower numerical value successively lock up as do the cut-off relays 44 and 51 at points 844 and 845.

Cut-off relay 44 first energizes thereby closing contact 44G which provides for energization of control relay 117 at point 846. Contact 117G opens, deenergizing sequence relay 2 at point 847, whereupon contact 2A opens deenergizing sequence relay 21 at point 848. Contact 21A, thus opened, breaks the circuit for initial energization of the counting relays 38 and 46 wherefore the counting relays become free to deenergize under control of the stepping relays 44 and 51.

The amount 250 set up in the counting relays is to be entered in three registers, namely, the class totalizer register 261—262—263, the merchandise register 257—258—259 and the bill totalizer register 253—254—255.

Energized cut-off relay 44 closes contacts 44C, 44D and 44E which complete circuits respectively to conductors E, F and c (Fig. 4). In the tens order energized cut-off relay 51 closes contacts 51C, 51D and 51E completing circuits through conductors C, D and b (Fig. 4). Conductors E, F and c, C, D and b lead into cable 240, the circuits being completed through contacts E10, F10, c10, C10, D10 and b10 of shift relay 209, cable 241 (Figs. 5A and 11), conductor 214E to clutch 257A, conductor 241F to clutch 253A, conductor 241c to clutch 261A, conductor 241C to clutch 258A, conductor 241D to clutch 254A and conductor 241b to clutch 262A. That is, the three circuits originating at ground at contacts 44C, 44D and 44E of cut-off relay 44 energize the clutches 257A, 253A and 261A, pertaining to the hundreds order of the three actuated registers (Fig. 11), at points 840, 850 and 851; and the circuits originating at ground at contacts 51C, 51D and 51E of cut-off relay 51 lead to and energize the clutches 258A, 254A and 262A, relating to the tens order of the three actuated registers, wherefore these clutches energize at points 853, 854 and 855.

Stepping relay 45 which is in series with the circuit for energizing clutch 257A is potentialized simultaneously with this clutch but energizes more quickly at point 852. Stepping relay 52, which is in series with the circuit originating at contact 51C and including the clutch 258A, is potentialized simultaneously with such clutch 258A but energizes more quickly at point 856.

Upon the energization of these clutches the number wheels in the hundreds order of each of the three registers take motion simultaneously, and since there are two pairs of counting relays locked up in the hundreds order these number wheels will be advanced two digital positions. Upon the energization of the clutches as 258A in the tens order of these registers, the tens order number wheels as 258 take forward motion for advancement five digital positions since there are five pairs of counting relays lock up in the tens order. At the beginning of this sequential operation the register 257—258—259 stood at 250 whereas the register 253—254—255 stood at 484. Therefore, when the number wheels 258 and 254 are advanced one digital position at the time indicated by point 857 on the line pertaining to stepping relay 52, these number wheels will read respectively 6 and 9. During the next digital entry upon the number wheel 254, while said number wheel is passing from 9 to 0, and at the time indicated by point 858 on the line pertaining to said relay 52, the carry-over wheel 254E carries the lobe thereon under the carry-over contact 254G for momentarily closing said contact and thereby impressing ground upon conductor 241L. The circuit including conductor 241L is completed through cable 241 (Figs. 11 and 5A), contact L10 of shift relay 209, cable 240 and conductor L (Fig. 4) to carry-over counting relay 118 which is thus potentialized at point 859. Thereafter, in the regular manner, carry-over counting relays 118 and 119 and carry-over cut-off relay 120 successively energize at points 860, 861 and 862 preparatory to effecting the entry of an additional digit upon the number wheel 253 near the end of the present sequential operation.

Subsequent to the lapse of the time period represented by the space between vertical chart lines VII' and VIII, the fourth digit 9 is entered on the number wheel 258 and the fourth digit 2 is entered on the number wheel 254 at the time indicated by point 863 on the line pertaining to stepping relay 52. The final and fifth digits 0 and 3 are entered on the number wheels 258 and 254 at the time indicated by point 865 on the line pertaining to stepping relay 52. During this final digital entry, and at the time indicated by point 864 on said stepping relay line, the carry-over wheel 258E (while the number wheel 258 passed from 9 to 0) closes carry-over contact 258G, impressing ground upon a circuit including conductor 241S which leads into cable 241, contact S10 of shift relay 209, cable 240 and conductor S (Fig. 4) to the carry-over counting relay 126 which is thus potentialized at points 866. Thereafter, carry-over stepping relays 126 and 127 and carry-over cut-off relay 128 successively energize at points 867, 868 and 869 preparatory to effecting entry of an additional digit upon the number wheel 257 near the end of this sequential operation.

Shortly prior to the entry of the fifth digits 0 and 3 on the number wheels 258 and 254 and when the cut-off relay 51 deenergizes at point 870, the several contacts of this cut-off relay open breaking the energization circuits for stepping relay 52 and clutches 254A, 258A and 262A, which parts thereafter deenergize at points 871, 872, 873 and 874. When these clutches complete such deenergization the number wheels 254, 258 and 262 will stand respectively at 3, 0 and 5.

*Carry-over on merchandise and bill totalizer wheels*

Cut-off relay 51 in deenergizing at point 870 is the last of the cut-off relays to deenergize, and in so doing and opening contact 51G, control relay 117 is caused to deenergize at point 875 to close all of its contacts. This closing of contact 117G, however, failed to complete the circuit for energization of sequence control relay 2 because of carry-over cut-off relays 120 and 128 being energized to hold open their contacts BB and DD.

Upon this deenergization of control relay 117, however, a circuit was completed from ground at contact 117G through contacts AAA and 120C, carry-over stepping relay 121, contact 117B and conductor K. Ground from contact 117G was also impressed through contact 120D upon conductor M. Ground from conductor 117G is also impressed upon a circuit including conductor 117H, contacts CCC and 128C, carry-over stepping relay 129, contact 117D and conductor R. The circuits including conductors K, M and R continue through conductors in cable 240, contacts K10, M10 and R10, cable 241 (Figs. 4A and 11), and through conductors 241K, 241M and 241R respectively to the clutch 253A, one side of shunting contact 253D and to the clutch 257A. In this manner the clutches 253A and 257A are caused to energize at points 876 and 877, whereupon the number wheels 253 and 257 take motion from the shafts upon which they are mounted. Since there is a single pair of carry-over counting relays as 118 and 119 associated with each of the clutches 253A and 257A, the number wheels 253 and 257 will be advanced a single digital position. The shunting contact 257D, associated with the number wheel 257 and for alternately deenergizing and permitting reenergization of the carry-over stepping relay 129, obtains ground from the right-hand contact of zero setting relay 264 (Fig. 11). Ground for one side of shunting contact 253D is obtained from contact 117G (Fig. 4) through the above traced circuit including conductor M (Fig. 4).

Near the end of the entry of the additional single digits upon number wheels 253 and 257, shunting contacts 253D and 257D open, permitting reenergization of carry-over stepping relays 121 and 129 at points 878 and 879 wherefore carry-over cut-off relays 120 and 128 deenergize at points 880 and 881, opening their several contacts and breaking the energization circuits for stepping relays 121 and 129 and the clutches 253A and 257A, which parts thereafter in the order named deenergize at points 882, 883, 884 and 885. The number wheels 257, 258 and 259, which at the beginning of this sequential operation displayed the reading 250, now display the reading 500. Number wheels 253, 254 and 255, which stood at 484 now stand at 734. Number wheels 261, 262 and 263, which stood at 000, now stand at 250.

*Holding for reading and zero setting (eighth sequence)*

When carry-over cut-off relays 120 and 128 deenergize at points 880 and 881, contacts BB and DD close, completing the circuit from ground at contact 117G for sequence control relay 2, which immediately thereafter energizes at point 886. Contact 2B opens deenergizing sequence relay 24 and shift magnet control relay 32 at points 887 and 888. Contact 32B in opening breaks the energization circuit including contact 22A and conductor 22X for shift magnet 219 which therefore deenergizes at point 889 to open the contacts of shift relay 209.

Deenergized sequence relay 24 closes contact 24B, impressing ground upon contact 23A and one side of timed delay solenoid 34. The other side of this solenoid is connected with battery so that said solenoid is potentialized at point 890 and later energizes at point 891. During the interval of time represented by the space between vertical chart lines VIII' and IX the readings standing upon the number wheels of the various registers may be noted, or if these number wheels are provided with type characters an impression therefrom may be made therewith. Also during this interval of time the solenoid 34 causes the plunger 34A to descend so that eventually contact 35A is opened breaking the circuit from battery at contact 23G for the sequence control relay 2 which thereupon begins deenergization at point 892. When sequence control relay 2 deenergizes at point 893, contact 2A opens effecting deenergization of sequence relay 23 at point 894, opening contact 23A and depotentializing timed delay solenoid 34 at point 895. But while the plunger rod 34A was in its lowermost position, and shortly after the opening of contact 35A, said plunger rod closed contact 35B thereby impressing battery upon conductor 35D (Figs. 2A and 7) and zero setting relay 70 (Fig. 7). In this manner zero setting relay 70 is potentialized at point 896, and when this relay energizes at point 897 contact 70A thereof closes, impressing ground upon conductor 70C and ancillary zero setting relays 74, 81, 309 and 264 which immediately thereafter energize at points 898 to 901. All except the left-hand contact of zero setting relay 74 (Fig. 6) close when such relay energizes, and since the consumption quantity register 71—72—73 stands at 039, zero setting contacts associated with the zero setting wheels 72B and 73B (Fig. 6) are closed when such relay energizes, and since the consumption quantity register 71—72—73 stands at 039, zero setting contacts associated with the zero setting wheels 72B and 73B (Fig. 6) will be closed. That is, so long as any of the number wheels 71, 72 and 73 of the consumption quantity register are off zero the corresponding zero setting wheels 71B, 72B and 73B will likewise be off zero, removing the notch in the periphery thereof from registry with the zero setting contact mated therewith whereby said contact will be closed. With the contacts 72H and 73H of zero setting wheels 72B and 73B closed, circuit will be completed from battery at clutches 72AAAA and 73AAAA through the two right-hand contacts of relay 74, conductor 170D, contact 70B and the winding of zero setting relay 70 to ground. Therefore, the battery at either of the clutches 72AAAA and 73AAAA, so long as the contacts of their associated zero setting wheels 72B and 73B are closed, provides a source of energization for the zero setting relay 70. A similar holding circuit for the relay 70 through contact 70B is provided so long as any of the number wheels are off zero whereby their associated zero setting wheels withhold the notch in the periphery thereof from registration with their associated zero setting contact.

It will be seen, therefore, that when the relays 74, 81, 309 and 264 energize for establishing connections with one side of all of the zero setting contacts, that the clutches where battery is obtained for said contacts will begin to energize. These clutches upon energizing will cause their associated number wheels to take rotative movement and continue such movement until reaching zero. Shortly prior to the arrival of each number wheel at zero, its associated zero setting contact will be permitted to open, breaking the energization circuit for the associated clutch in time for said clutch to become deenergized and release the number wheel from its driving connection at the time of reaching zero. So long as any number wheel and its associated zero setting wheel is off zero, the battery at the clutch driving said number wheel will provide a source of energy for holding the relay 70 energized, but upon the last number wheel arriving at zero this source of battery will no longer be available whereupon the relay 70 will deenergize, opening contacts 70A and 70B and permitting deenergization of the ancillary zero setting relays 74, 81, 309 and 264.

Since all of the number wheels in registers 66—67—68, 93—94—95, 76—77—78 and 83—84—85 are off zero, the zero setting contacts as 76H associated therewith are closed so that upon the energization of zero setting relay 81 at point 899 and the closing of its several contacts, the clutches 66A, 67A, 68A, 93A, 94A, 95A, 76A, 77A, 78A, 83A, 84A and 85A are potentialized at points 902 to 913 inclusive. The number wheels 72 and 73 of the consumption quantity register are off zero, wherefore the zero setting contacts 72H and 73H are closed so that following the energization of zero setting relay 74 at point 898 the clutches 72AAAA and 73AAAA are potentialized at points 923 and 924. The number wheels of the consumption charge register (Fig. 11) are off zero, wherefore the zero setting contacts as 251R are closed and upon the energization of the zero setting relay 264 at point 901 the clutches 250A, 251A and 252A are potentialized at points 914, 915 and 916. All number wheels of the bill totalizer register are off zero, wherefore the zero setting contacts as 255R are closed and the clutches 253A, 254A and 255A are potentialized at points 917, 918 and 919 when said zero setting relay 264 energizes. Only number wheel 257 of the merchandise register is off zero, wherefore zero setting contacts 258R and 259R are open and so that clutches 258A and 259A are not potentialized when zero setting relay 264 energizes. But zero setting contact 257R is closed and consequently the clutch 257A potentializes at point 920 when said relay 264 energizes.

Class totalizer register 261—262—263 stands at 250, wherefore zero setting contacts 261R and 262R are closed preparatory to the energization of the clutches 261A and 262A upon the manual depression of the key 265 (Fig. 11). This independent means, including the key 265, is provided for resetting only the class totalizer register. The other registers are reset automatically in the course of the machine operation.

The number wheels 66, 67 and 68 which stand at 455 at the beginning of the reset operation take forward movement upon the energization of the clutches 66A, 67A and 68A at points 925, 926 and 927. Subsequently, after these number wheels have been rotated nearly six, five and five digital positions, and specifically at points 928, 929 and 930, the zero setting contacts open, depotentializing said clutches which later deenergize at points 931, 932 and 933 when their respective number wheels reach zero.

When clutches 93A, 94A and 95A energize at points 934, 935 and 936 the number wheels 93, 94 and 95 take forward motion, and after said number wheels have been rotated respectively six, six and nine digital positions, said clutches which have been depotentialized at the proper time by the opening of zero setting contacts 93H, 94H and 95H, deenergize at points 937, 938 and 939.

Clutches 76A, 77A and 78A which potentialize at points 940, 941 and 942 are caused to deenergize at points 943, 944 and 945 subsequent to the opening of their associated zero setting contacts and coincidentally with the number wheels 76, 77 and 78 arriving at zero after respectively advancing six, six and nine digital positions.

Clutches 83A, 84A and 85A energize at points 946, 947 and 948 causing the number wheels 83, 84 and 85 to take forward movement, and shortly prior to these wheels having been rotated six, nine and four digital positions the zero setting contacts associated therewith open, deenergizing said clutches at points 949, 950 and 951 at the time the number wheels reach zero.

Clutches 250A, 251A and 252A of the consumption charge register (Fig. 11) energize at points 952, 953 and 954, and shortly prior to the number wheels 250, 251 and 252 being advanced respectively eight, seven and six digital positions, the zero setting contacts associated therewith open causing deenergization of said clutches at points 955, 956 and 957 at the times their respective number wheels reach zero.

Clutches 253A, 254A and 255A energize at points 958, 959 and 960, and shortly prior to the number wheels 253, 254 and 255 having been advanced three, seven and six digital positions the zero setting contacts associated therewith open causing deenergization of said clutches at points 961, 962 and 963 at the times their associated number wheels reach zero.

Clutch 257A of the merchandise register energizes at point 964, and shortly prior to the number wheel 257 having been advanced five digital positions the zero setting contact 257R opens effecting deenergization of the clutch 257A at point 965 concurrently with the number wheel 257 arriving at zero.

Clutches 72AAAA and 73AAAA energize at points 966 and 967, and shortly prior to the number wheels 72 and 73 of the consumption quantity register having been advanced seven and one digital positions the zero setting contacts 72H and 73H are permitted to open causing deenergization of said clutches at points 968 and 969 concurrently with these number wheels arriving at zero.

It will be assumed that the zero setting key 265 (Fig. 11) is pressed at such time as to cause energization of the clutches 261A and 262A at points 980 and 981, and shortly prior to the number wheels 261 and 262 having been advanced eight and five digital positions the zero setting contacts 261R and 262R open, deenergizing said clutches at points 982 and 983 at the times these number wheels reach zero.

Clutches 95A, 78A and 84A were the last to have their energization circuits broken. Said circuits were broken simultaneously by the opening of zero setting contacts 95H, 78H and 84H, whereupon these clutches were depotentialized at points 970, 971 and 972. Simultaneously with the breaking of these multiple circuits which are in series with the zero setting relay 70 (Fig. 7), said relay 70 was depotentialized at point 973. Later, when zero setting relay 70 deenergizes at point 974 and opens contact 70A, the ancillary zero setting relays 74, 81, 309 and 264 depotentialize and subsequently deenergize at points 975 to 978 inclusive.

All number wheels now stand at zero, and all other parts of the machine have been restored to their proper condition for use incident to a succeeding machine operation.

*Operation of one meter with one merchandise charge*

The card (Fig. 14) is placed between the contact bars and fingers, as before, preparatory to starting the machine operation. The present operation illustrates the action of the machine elements when controlled by a card perforated for a last meter-reading of 441, a previous meter reading of 416 and for a merchandise charge of $2.50, there being card perforations for selecting only the necessary sequential operations to enter such last and previous meter readings, the monetary charge for the metered commodity and such merchandise charge.

The following detailed description of the machine operation is with reference to the second timing chart composed of Figs. 39 to 47.

After the card has been arranged between the contact bars and fingers, key 1 is momentarily pressed causing energization of sequence relay 4 through winding 4D at point 990. Relay 4 locks up through contacts 4F and 2B, closing contact 4C and energizing relay 3 at point 991 through winding 3E. Relay 3 closes contacts 3A, 3B, 3C, 3F and 3G when energized. Contacts 3C, 3F and 3G are now effective, contact 3C closing a circuit for energizing winding 12D of sequence relay 12 at point 992, contact 3F closing a circuit for energizing winding 6D of sequence relay 6 at point 993, and contact 3G closing a circuit for energizing winding 25E of shift magnet control relay 25 at point 994. The closing of contact 6C upon the energization of relay 6 causes energization of sequence relay 5 at point 995. Contact 3B prepares a holding circuit which is later effective when sequence control relay 2 energizes whereby winding 3D will be held energized from ground at contact 2A.

Sequence relay 12 in energizing at point 992 closes contact 12C, energizing sequence relay 11 at point 996, as before. Energized relay 11 closes its several contacts. Contacts 11A and 11B serve the same purpose as in the aforedescribed operation; contact 11C in closing establishes a circuit for energizing winding 24D of sequence relay 24 at point 997; contact 11H in closing grounds conductor 13X and contact 20D, preparing a holding circuit for relay 20, which holding circuit later becomes effective when relay 20 energizes and closes contact 20D. Contact 11G in closing establishes a circuit which causes energization of shift magnet control relay 28 at point 998. Relays 12 and 24 lock up as before from contact 2B. Contact 24C closes a circuit for energizing relay 23 at point 999. Contact 23G of energized relay 23 impresses battery on contact 35A (Fig. 2A), conductor 35C and sequence relay 2 which thereupon energizes at point 1000 in the manner previously described. Contact 2A closes prior to the opening of contact 2B, such opening of contact 2B depotentializing relay 4 at point 1001. When relay 4 deenergizes at point 1002, it closes contact 4A which completes a circuit from ground at contact 25B and through conductor 4X to shift magnet 210 (Fig. 5). Thereafter, the shift magnet 210 energizes at point 1003, closing the contacts of shift relay 200. Contact 4B closes, impressing ground upon contact 3A, conductor 3K, switch 158, switch contacts 158R and 158 A, conductors 158S and 158B, merchandise selector bars 187 and 187A, finger 187B which is permitted to engage selector bar 187 through card perforation 187BB and conductor 187D which leads to and causes energization of sequence relay 20 at point 1004. Contact 20C in closing places ground upon sequence relay 19 which thereafter energizes at point 1005.

Conductor 3K, which is grounded through contacts 4B and 3A, also completes a circuit leading through the last reading switch 159, contact 159A, conductor 159B, finger 152D, selector bar 152, which is engaged by finger 152D through card perforation 152DD, and selector relay 164 which thereupon energizes at point 1006. Contacts 164A, 164B and 164C of energized relay 164 ground meter-reading bars 152A, 152B and 152C and the fingers 152F, 152G and 152H which engage said bars through card perforations 152FF, 152GG and 152HH (Fig. 14). When the contacts of shift relay 200 are closed by the energization of shift magnet 210 at point 1003, circuits are completed from these grounded fingers through conductors in cable 223 (Figs. 1 and 5), contacts on shift relay 200 and conductors in cable 237 respectively to and for potentializing the central windings of counting relays 36 for the hundreds order (4), 47 for the tens order (4) and 56 for the units order (1). These counting relays immediately thereafter energize at points 1007, 1008 and 1009. Following energization of the counting relays of lower numerical value, the cut-off relays 44, 51 and 58 energize at points 1010, 1011 and 1012 to establish circuits from ground at their contacts as 44D and 44C through conductors F, E, D, C, B and A (Fig. 4), shift relay contacts F1, E1, D1, C1, B1, and A1 of shift relay 200 (Fig. 5), cable 229 (Figs. 5 and 6) and through conductors 229F, 229E, 229D, 229C, 229B and 229A to the several clutches respectively connected therewith, causing the last reading wheels 66, 67 and 68 and the consumption quantity wheels 71, 72 and 73 to take forward movement until 441 is displayed on each set of said wheels. Number wheels 66 and 71 take motion when the clutches 66A and 71AAAAA energize at points 1013 and 1014, as do the number wheels 67 and 72 when clutches 67A and 72AAAAA energize at points 1015 and 1016. Number wheels 68 and 73 take forward movement when clutches 68A and 73AAAAA energize at points 1017 and 1018.

The energization of cut-off relay 58 at point 1012 closed contact 58G, causing energization of control relay 117 at point 1019 and the opening of contact 117G, whereupon sequence control relay 2 was caused to deenergize at point 1020. Contact 2A opened deenergizing sequence relay 3 at point 1021. Thereupon contact 3A opens, breaking the source of energization for selector relay 164 which deenergizes at point 1022. The contacts 164A, 164B and 164C of relay 164 are thus opened to remove the source of energization for the central windings of the initially energized counting relays 36, 47 and 56.

Relay 168 energized at point 1023 after the initial closing of contact 4B when relay 4 deenergized at point 1002 but without effect. Later, with the opening of contact 3A of deenergized relay 3, the energization circuit for relay 168 was broken whereupon this relay was depotentialized at point 1024 and subsequently deenergized at point 1025, also without effect in the present operation.

Contact 3F of deenergized relay 3 opens and removes ground from winding 6D, placing relay 6 under control of winding 6E and contacts 6F and 2B.

Clutches 68A and 73AAAAA deenergize at points 1026 and 1027, releasing the number wheels 68 and 73 from their respective driving means concurrently with said number wheels arriving at the digital position 1. Clutches 66A, 71AAAAA, 67A and 72AAAAA deenergize at points 1028 to 1031 concurrently with the number wheels 66, 71, 67 and 72 arriving at 4. During this rotation of the number wheels in the registers 66—67—68 and 71—72—73 the counting relays locked up in the hundreds, tens and units orders were respectively caused to deenergize by the shunting wheels as 66C and shunting contacts as 66D associated with the register 66—67—68.

Registering previous reading

Near the end of the rotation of the number wheels as 66, 71, 67 and 72, which are advanced the farthest, the cut-off relays 44 and 51 deenergize at points 1032 and 1033, opening contacts 44G and 51G, removing ground from control relay 117 which immediately thereafter at point 1034 deenergizes, closing contact 117G and causing energization of sequence control relay 2 at point 1035. Contact 2B of energized relay 2 opens, deenergizing through contact 25A the shift magnet control relay 25 at point 1036, opening contact 25B, freeing contact 4A from ground and depotentializing shift magnet 210 at point 1037. This shift magnet subsequently deenergizes at point 1038 incident to opening the contacts of shift relay 200. Contact 2B, incident to opening, also deenergizes sequence relay 6 at point 1039 through contact 6F, closing contacts 6A and 6B. Contact 6A impresses ground upon conductor 6X from contact 26B thereby energizing shift magnet 211 at point 1040. Contact 6B impresses ground through a circuit including contact 5A, conductor 5K, previous reading switch 157, contact 157A, conductor 157B, contact finger 153D, selector bar 153 which is engaged by said contact finger through card perforation 153DD, and selector relay 166 which is thus caused to energize at point 1041. Contacts 166A, 166B and 166C thereupon ground meter-reading bars 153A, 153B and 153C. When shift magnet 211 energizes at point 1040, closing the contacts of shift relay 201, circuits are completed through contact fingers 153F, 153G and 153H, shift relay contacts 201A, 201D and 201E of shift relay 201 and the central windings of counting relays 36 for the hundreds order (4), 49 for the tens order (1) and 53 for the units order (6). These counting relays immediately thereafter energize at points 1042, 1043 and 1044. Later, when cut-off relays 44, 51 and 58 energize at points 1045, 1046 and 1047, their contacts as 44C and 44D close, completing circuits from ground through shift relay contacts F2, E2, D2, C2, B2 and A2, cable 230 (Figs. 5 and 7) and conductors 230F, 230E, 230D, 230C, 230B and 230A to the several clutches respectively connected therewith for actuating the previous reading register 93—94—95 and the consumption quantity register 71—72—73. The wheels of said last reading register are thus advanced by the amount 416, and the number wheels of the consumption quantity register are moved subtractively a like amount to register the difference between 441 and 416, previous to carry-over.

Number wheels 93 and 71 begin their respective additive and subtractive movement upon the energization of clutches 93A and 71AAA at points 1048 and 1049; number wheels 94 and 72 begin their respective additive and subtractive movement upon the energization of clutches 94A and 72AAA at points 1050 and 1051; whereas, number wheels 95 and 73 begin their respective additive and subtractive movement upon the energization of clutches 95A and 73AAA at points 1052 and 1053. When cut-off relay 51 energizes at point 1046, this being the first of the cut-off relays to energize, contact 51G in closing impresses ground upon control relay 117 which immediately thereafter energizes at point 1054, opening contact 117G and freeing ground from sequence control relay 2 which thereafter deenergizes at point 1055. Contact 2A opens causing deenergization of relay 5 at point 1056 and the opening of contacts 5A and 5C. Contact 5A removes ground from conductor 5K, deenergizing relay 166 at point 1057. This deenergization of relay 166 removes ground from the central windings of the initially energized counting relays, leaving the locked up counting relays conditioned for successive release under control of the alternately energized and deenergized stepping relays associated therewith. Contact 5C in opening removes ground from winding 12D, leaving relay 12 energized through winding 12E and contacts 12F and 2B so long as relay 2 remains unenergized.

Only a single pair of counting relays were locked up in the tens order, so that after the deenergization of these counting relays and the consequent deenergization of cut-off relay 51 at point 1058 to break the energization circuits for the stepping relay 52 and clutches 94A and 72AAA, these clutches deenergize at points 1059 and 1060 concurrently with the number wheels 94 and 72 being rotated respectively forwardly one digital position to 1 and backwardly one digital position to 3. Clutches 93A and 71AAA deenergize during that period of time represented by the space between vertical chart lines B' and B'' at the time number wheel 93 has been advanced forwardly to 4 and at the time the number wheel 71 has been moved backwardly from 4 to 0. Clutches 95A and 73AAA are depotentialized in time to deenergize at points 1061 and 1062 when the number wheel 95 has been advanced six digital positions from 0 to 6 and when the number wheel 73 has been moved backwardly six digital positions from 1 to 5. Clutches 95A and 73AAA were depotentialized upon the deenergization of cut-off relay 58 at point 1063 and the opening of contacts 58C and 58D.

*Carry-over in subtraction*

During the backward movement of the consumption number wheel 73 from 1 to 5, carry-over wheel 73E, in passing from 0 to 9 and at the time indicated by point 1064 on the line pertaining to stepping relay 59, momentarily closes contact 73G, grounding conductor 230H, and thereby energizing carry-over counting relays 113 and 114 at points 1065 and 1066 and carry-over cut-off relay 115 at point 1067. Relay 115 in energizing opens contact AA, delaying energization of sequence control relay 2 until the carry-over operation is complete. That is, when cut-off relay 58 deenergizes at point 1063, effecting deenergization of control relay 117 at point 1068 and the consequent closing of contact 117G, sequence control relay 2 fails to energize because the circuit therefor is open at contact AA.

Contacts 115C and 115D are grounded, and set up circuits as previously described through conductors 230G and 230J (Fig. 7) to clutch 72AAA and shunting contact 72DDD, causing number wheel 72 to take backward rotation one digital position from 3 to 2. The consumption register 71—72—73 then displays 025 which is the difference between the last meter-reading 441 and the previous meter-reading 416.

During this backward rotation of the number wheel 72 the shunting contact 72DDD closes and opens with the aforedescribed effect of deenergizing and permitting reenergization of stepping relay 116 and thus effecting successive deenergization of the locked up carry-over counting relays and carry-over cut-off relay 115, the latter being deenergized at point 1069.

*Registering money charge for electricity consumed*

The charge is assumed to be at the rate of 6¢ per unit of consumption, and since the consumption quantity register now stands at 025 the correct charge will be $1.50. Upon deenergization of cut-off relay 115 at point 1069, contact AA closes permitting energization of sequence control relay 2 at point 1070. Contact 2B opens thereby effecting deenergization of shift magnet control relay 26 at point 1071 and deenergization of sequence relay 12 at point 1072. Relay 26 in opening contact 26B breaks the energization circuit for shift magnet 211 which thereafter deenergizes at point 1073 incident to opening the contacts of shift relay 201. Deenergized relay 12 sets up circuits as previously described, energizing shift magnet 214 at point 1074, and grounding contact 11A, conductor 11K (Figs. 2, 2A, 8B, 8A and 8). Since the number wheels 71, 72 and 73 (Figs. 7 and 8) of the consumption quantity register now stand at 025, the lobes 71X, 72X and 73X of the contact closing wheels 71F, 72F and 73F (Fig. 8) will be in position for closing the number 0 multiple contact switch in the hundreds order, the number 2 multiple contact switch in the tens order and the number 5 multiple contact switch in the hundreds order. Therefore, grounded conductor 11K completes a circuit through contacts 277A and 277B of said number 0 switch, conductors 277C and 277D, contacts 283A and 283B of said number 2 switch, conductors 283C and 283D, conductors 283E and 283F, contacts 284A and 284B of said number 5 switch, conductors 284D and 284E, conductors 284F and 284G, cable 234 (Figs. 8B and 5), shift relay contacts 204D and 204E, cable 237, and counting relays 39 for the hundreds order (1) and 46 for the tens order (5), which relays thereafter energize at points 1075 and 1076. The ground from contact 283 of the number 2 switch in the tens order is impressed upon vertical conductor 286A (Figs. 8, 8A and 8B) and relay 275 (Fig. 8B) which is thus caused to energize at point 1077, but without effect during the present operation for the circuit closed by contact 275B is now dead-ended at conductor 275C. That is, all of the multiple contact switches in the units order are now open with the exception of the number 5 switch and there is no lateral from the vertical conductor 275C to any contact on said number 5 switch.

Eventually when the cut-off relays 44 and 51 energize at points 1078 and 1079 their contacts 44C and 44D, 51C and 51D close and set up circuits as before described through cable 233 (Fig. 11), for advancing the consumption money wheels 250 and 251 and the bill totalizer wheels 253 and 254.

When cut-off relay 44 energizes at point 1078, closing contact 44G, control relay 117 is caused to energize at point 1080, opening contact 117G and thereby effecting deenergization of sequence control relay 2 at point 1081. Contact 2A opens, breaking the holding circuit for sequence relay 11 which thereafter deenergizes at point 1082, opening contact 11A and thus breaking the energization circuit for the initially energized counting relays 39 and 46 and leaving the counting relays in a condition free to deenergize under control of their respectively associated stepping relays 45 and 52. The opening of contact 11A also breaks the energization circuit for relay 275 (Fig. 8B), whereupon this relay is depotentialized at point 1083. Relay 275 energized at point 1077 without effect and likewise deenergizes at point 1084 without effect in the present operation.

Clutches 250A and 253A begin energization at points 1085 and 1086 concurrently with the beginning of energization of stepping relay 45 at point 1087 since the energization circuits for these parts are established by the simultaneous closing of contacts 44C and 44D of cut-off relay 44. When clutches 250A and 253A energize at points 1088 and 1089, the number wheels 250 and 253 take motion. During rotation of the number wheels 250 and 253 the shunting wheel 250C is effective through shunting contact 250D for causing alternate deenergization and energization of stepping relay 45 so that the counting relays locked up in the hundreds order are successively deenergized, and wherefore the cut-off relay 44 subsequently deenergizes at point 1090, opening contacts 44C and 44DD to subsequently cause deenergization of the clutches 250A and 253A at points 1091 and 1092 in time to leave the number wheels 250 and 253 standing at 1.

Clutches 251A and 254A are potentialized at points 1093 and 1094 upon the energization of cut-off relay 51 at point 1079 and the closing of contacts 51C and 51D. These clutches later energize at points 1095 and 1096 to begin the advance of the number wheels 251 and 254. Shunting wheel 251C, during rotation of the number wheels 251 and 254, co-acts with shunting contact 251D for alternately deenergizing and permitting energization of stepping relay 52 whereby the counting relays locked up in the tens order are successively deenergized and followed by deenergization of the cut-off relay 51 at point 1097. This deenergization of cut-off relay 51 opens contacts 51C and 51D, breaking the energization circuits for stepping relay 52 and the clutches 251A and 254A which parts thereafter respectively deenergize at points 1098, 1099 and 1100. With the deenergization of clutches 251A and 254A, the number wheels 251 and 254 will have been advanced five digital positions since five pairs of counting relays were locked up in the tens order.

*Registering merchandise charge*

This charge is assumed to be $2.50. Following the deenergization of cut-off relay 51 at point 1097, control relay 117 depotentializes and later deenergizes at point 1101. Contact 117G closes causing energization of sequence control relay 2 at point 1102 and the consequent opening of contact 2B, whereby relay 28 is deenergized at point 1103 to open contact 28B and thus open the energization circuit for shift magnet 214 which thereafter deenergizes at point 1104 incident to opening the contacts of shift relay 204.

The opening of contact 2B also breaks the energization circuit for sequence relay 20 which thereafter deenergizes at point 1105, closing contacts 20A and 20B. Contact 20A grounds conductor 20X from contact 31B to cause energization of shift magnet 218 at point 1106. Contact 20B grounds contact 19A, conductor 19K, bars 186, 186A and 186B (Fig. 1) and contact fingers 186F and 186G to set up circuits, as before described, through cable 225, shift relay contacts 208A and 208B to the central windings of counting relays 38 and 46 which immediately thereafter energize at points 1107 and 1108. The counting relays of lower numerical value thereafter lock up in the aforedescribed manner so that, in due course, two pairs of counting relays representative of the digit 2 will be locked up in the hundreds order and five pairs of said relays, representative of the digit 5, will be locked up in the tens order.

Cut-off relays 44 and 51 eventually energize at points 1109 and 1110. Such energization of cut-off relay 44, in closing its contact 44G, places ground upon control relay 117 which thereafter energizes at point 1111, opening contact 117G and thereby causing deenergization of sequence control relay 2 at point 1112. Contact 2A opens, breaking the energization circuit for sequence relay 19 which thereafter deenergizes at point 1113, opening contact 19A and breaking the energization circuits for the initially locked up counting relays 38 and 46 whereupon the counting relays are free to deenergize under control of their associated stepping relays.

When cut-off relay 44 energizes at point 1109 contacts 44C and 44D close, establishing energization circuits for stepping relay 45 and for the clutches 257A and 253A (Fig. 11) through contacts E9 and F9 of shift relay 208, whereupon these parts are potentialized at points 1114, 1115 and 1116. Clutches 257A and 253A later energize at points 1117 and 1118 to cause advancement of the number wheels 257 and 253 in unison, these clutches being later deenergized during the period of time represented by the space between vertical chart lines D' and D" subsequent to deenergization of the two pairs of counting relays locked up in the hundreds order and cut-off relay 44, and simultaneously with the number wheels 257 and 253 being each advanced two digital positions respectively to 2 and 3.

When cut-off relay 51 energizes at point 1110 and closes contacts 51C and 51D, circuits are established in the aforedescribed manner through contacts C9 and D9 of shift relay 208 for energizing the stepping relay 52 and clutches 258A and 254A respectively at points 1119, 1120 and 1121. Thereupon the number wheels 258 and 254 are advanced in unison, and shortly prior to these number wheels being advanced five digital positions and after all of the counting relays in the tens order have been deenergized, cut-off relay 51 is deenergized at point 1122, opening contacts 51C and 51D thereby breaking the energization circuits for stepping relay 52 and said clutches 258A and 254A, which parts thereafter deenergize at points 1123, 1124 and 1125. Concurrently with this deenergization of clutches 258A and 254A, the number wheels 258 and 254 will have been each advanced five digital positions respectively to 5 and 0. At this time merchandise register 257—258—259 will read 250 and the bill totalizer register will read 300. The totalizer register at the end of the present cycle of operation is to display a reading of 400 which is the sum of the amount 150 standing in the consumption charge register 250—251—252 and the amount 250 standing in the merchandise register 257—258—259. Such totalizer register is made to display the correct reading by the carry-over operation now to be described.

*Carry-over on totalizer wheels*

With the movement of totalizer wheel 254 from 5 to 0, carry-over wheel 254E while passing from the digital position 9 to the digital position 0, and at the time indicated by point 1126 on the line pertaining to stepping relay 52, momentarily closed carry-over contact 254G, grounding conductor 226L for energizing carry-over counting relay 118 (Fig. 4) with the effect as aforedescribed of causing successive energization of the carry-over counting relays 118 and 119 and carry-over cut-off relay 120 at points 1127, 1128 and 1129. This energization of carry-over cut-off relay 120 opens contact BB thereby breaking the energization circuit for sequence control relay 2 so that said relay 2 remains unenergized when control relay 117 deenergizes at point 1130 following the deenergization of cut-off relay 51 at point 1122. When control relay 117 deenergizes at point 1130 all of its contacts are closed whereby a circuit is established from ground at contact 117G through contact AAA, contact 120C, stepping relay 121, contact 117B, conductor K, contact K9 of shift relay 208 and conductor 226K (Fig. 11) to clutch 253A, whereupon the carry-over stepping relay 121 and said clutch are potentialized at points 1131 and 1132. The ground at contact 117G is also extended through contact AAA, contact 120D, conductor M, contact M9 of shift relay 208 and conductor 226M (Fig. 11) to one side of the shunting contact 253D, so that during rotation of the number wheel 253 upon the energization of clutch 253A at 253 upon the energization of clutch 253A at point 1133, ground will be supplied to said shunting contact 253D for alternately deenergizing and permitting energization of carry-over stepping relay 121. In this manner the carry-over counting relays 118 and 119 and carry-over cut-off relay 120 are successively deenergized in the order named, said cut-off relay deenergizing at point 1134 thereby opening contacts 120C and 120D, removing ground from the shunting contact 253D and breaking the energization circuit for carry-over stepping relay 121 and the clutch 253A wherefore said stepping relay and said clutch are caused to deenergize at points 1135 and 1136. This deenergization of the clutch 253A occurs at the time the number wheel 253 has been advanced one digital position from 3 to 4, whereupon the totalizer register 253—254—255 displays the correct reading 400.

With this deenergization of carry-over cut-off relay 120, contact BB closes, completing the energization circuit from ground at contact 117G for the sequence control relay 2 which immediately thereafter energizes at point 1137, opening contact 2B and thereby depotentializing relays 31 and 24 at points 1138 and 1139. When relay 31 deenergizes at point 1140, contact 31B opens, breaking the energization circuit for shift magnet 218 which subsequently deenergizes at point 1141 concurrently with the opening of the contacts on shift relay 208. Relay 24 upon deenergizing at point 1142 closes contact 24B for initiating the succeeding sequential operation during which the number wheels are held for reading and later reset to zero in the manner hereinabove described.

*Operation with one meter and present and past month's charge for electricity only*

In this operation, the computation for the preceding month is to be repeated and the charge brought forward as in arrears. Three card fields for the recording of commodity consumption or meter readings are involved, such fields (Fig. 15) being perforated for a present month's reading 455, the previous month's reading 441 and the next previous month's reading 416. A charge of 6¢ per commodity unit will be assumed as determined by the circuits shown in Figs. 8, 8A and 8B and Figs. 10, 10A and 10B. The operation is illustrated graphically by the timing chart composed of Figs. 48 to 56.

*Registering last reading for present month*

After the card (Fig. 15) has been placed in position over the contact bars (Fig. 1), the starting key 1 (Fig. 2) is pressed causing energization of sequence relay 4 at point 1145, whereupon contacts 4C and 4F close and contacts 4A and 4B open. Contact 4C, when closing, establishes a circuit from ground for energizing sequence relay 3 at point 1146 which relay then closes contacts 3A, 3B, 3C, 3F and 3G. Contact 3G completes a circuit for energizing shift magnet control relay 25 at point 1147. Contact 3F completes a circuit for energizing sequence relay 6 at point 1148. Contact 3C grounds conductor 3X, energizing sequence relay 12 at point 1149. When relay 6 energizes, contact 6C impresses ground upon sequence relay 5 which thereafter energizes at point 1150. Contact 5G which is thus closed impresses ground upon shift magnet control relay 26 which immediately thereafter energizes at point 1151. Energized sequence relay 12 closes contact 12C whereby relay 11 is energized at point 1152, and upon the energization of relay 11 and the closing of contact 11G shift magnet control relay 28 is caused to energize at point 1153. Contact 11C in closing extends ground through conductor 13Y, effecting energization of sequence relay 24 at point 1154 and the consequent energization of sequence relay 23 at point 1155.

Relay 23 in energizing closes contact 23G to complete the energization circuit for sequence control relay 2 which consequently energizes at point 1156, opening contact 2B and deenergizing sequence relay 4 at point 1157. Contact 4A closes, potentializing shift magnet 210 at point 1158. When this relay later energizes at point 1159 the contacts of shift relay 200 (Fig. 5) are closed. Contact 4B grounds contact 3A, conductor 3K, last reading switch 159, contact 159A, conductor 159B, contact finger 150D, selector bar 150 and conductor 150E whereupon the selector relay 160 is potentialized at point 1160 and later energized at point 1161. Contacts 160A, 160B and 160C of energized relay 160 ground meter-reading bars 150A, 150B and 150C, whereas contact 160D grounds the selector bars 150M and 150N. Card perforations 150RRR and 150SSS (Fig. 15) are provided to permit engagement if fingers 150R and 150S with the bar 150N so that relays 171 and 172 (Fig. 1A) are energized at points 1162 and 1163 to set up certain sequence relays, later designated, for causing the machine to perform the necessary sequential operations for effecting the charge to be brought forward as in arrears.

Conductor 3K also grounded conductor 158C (Fig. 1A) energizing slow relay 168 at point 1163A which closes a circuit from ground at contacts 171A and 172A through contact 168A and conductor 168D to sequence relay 14 which sequence relay therefore energizes at point 1164. Thereafter, in the hereinabove described manner relays 13, 16, 15, 18 and 17 successively lock up or energize in the order named at points 1165 to 1169.

Contact 13G of energized relay 13 establishes a circuit causing energization of shift magnet control relay 29 at point 1170. Said contact 13G also completes a holding circuit through conductor 171D for relay 171 (Fig. 1A). Contact 15G in addition to establishing the energization circuit for sequence relay 18 also provides a holding circuit through conductor 172D for relay 172 (Fig. 1A).

After the grounding of the meter-reading bars 150A, 150B and 150C from contacts 160A, 160B and 160C of relay 160 in the manner above described, and upon the closing of the contacts of shift relay 200 at the time indicated by point 1159, counting relays 36 for the hundreds (4), 46 for the tens (5) and 54 for the units (5) are energized at points 1171, 1172 and 1173. Thereafter all counting relays of lower numerical value successively lock up and in turn the cut-off relay 44, 51 and 58 lock up or energize at points 1174, 1175 and 1176. These cut-off relays, upon energizing, close their contacts as 44C and 44D thereby establishing circuits from ground through conductors as E and F (Fig. 4) and shift relay contacts as E1 and F1 of shift relay 200 (Fig. 5) and conductors as 229E and 229F (Fig. 6) to the clutches 66A, 67A, 68A and 71AAAAA, 72AAAAA and 73AAAAA whereupon the meter-reading wheels 66, 67, 68 and 71, 72 and 73 are advanced until each of the registers 66—67—68 and 71—72—73 displays the reading 455 which corresponds to the reading represented by the perforations in the present month's section of the control card (Fig. 15).

When cut-off relay 44 energized at point 1174, this being the first of the cut-off relays to energize, the closing of contact 44G impressed ground upon control relay 117 which immediately thereafter energized at point 1177, opening contact 117G and thus effecting deenergization of sequence control relay 2 at point 1178. Contact 2A opens, resulting in deenergization of sequence relay 3 at point 1179, the opening of contact 3A and the consequent removal of ground from relays 160 and 168 (Fig. 1A) which relays are thus depotentialized at points 1180 and 1181. Relay 168 later deenergizes at point 1182, opening contact 168A and breaking the circuit for original energization of sequence relay 14, but without effect since relay 14 is now held energized from ground through contacts 11G and 14D. When relay 160 deenergizes at point 1183 contact 160D opens breaking the circuit for initial energization of selector relays 171 and 172, but without effecting such selector relays since they are now held energized through holding circuits respectively from sequence relay contacts 13G and 15G of sequence relays 13 and 15. The opening of contacts 160A, 160B and 160C removes ground from the meter-reading bars 150A, 150B and 150C thereby interrupting the circuits for initial energization of the counting relays (Fig. 4) and leaving these relays free to be deenergized successively under control of their associated stepping relays 45, 52 and 59 in the manner hereinabove described.

Following the energization of cut-off relay 44 at point 1174 the hundreds order clutches 66A and 71AAAAA energized at points 1184 and 1185 for causing the number wheels 66 and 71 to take forward movement. Following the simultaneous energization of cut-off relays 51 and 58 at points 1175 and 1176 the tens order clutches 67A and 72AAAAA and the units order clutches 68A and 73AAAAA energized at points 1186 to 1189. Clutches 66A and 71AAAAA later deenergized during that period of time represented by the space between vertical chart lines E' and E'' at the time the digit 4 is entered upon each of the number wheels 66 and 71.

Cut-off relays 51 and 58, following deenergization of their associated locked up counting relays, in turn deenergize at points 1190 and 1191, opening contacts as 51C and 51D and breaking the energization circuits for the clutches 67A, 72AAAAA, 68A and 73AAAAA which thereafter deenergize at points 1192 to 1195 at the time the digit 5 is displayed upon each of the number wheels 67, 72, 68 and 73.

*Registering previous reading for present month*

With 455 now registered in the registers 66—67—68 and 71—72—73, and upon the deenergization of the cut-off relays 51 and 58 at points 1190 and 1191, contacts 51G and 58G open the circuit for control relay 117 whereupon this relay is caused to deenergize at point 1196. Contact 117G closes effecting energization of sequence control relay 2 at point 1197. Contact 2B opens, breaking the holding circuits for sequence relay 6 and shift magnet control relay 25 which immediately thereafter deenergize at points 1198 and 1199. Deenergized relay 25 opens contact 25B causing deenergization of shift magnet 210 at point 1200 and the opening of the contacts of shift relay 200. Deenergized relay 6 closes contact 6A, impressing ground from contact 26B through conductor 6X upon shift magnet 211, potentializing said magnet at point 1201. Shift magnet 211 subsequently energizes at point 1202 and thus closes the contacts upon shift relay 201. Closed contact 6B grounds contact 5A, conductor 5K, previous reading switch 157, contact 157A, conductor 157B, finger 151D, bar 151 and relay 162 (Fig. 1A) which is thus caused to energize at point 1203. Contact 162D closes, but without effect since there are no perforations in the control card (Fig. 15) at the fields in registry with the selector bars 151M and 151N. Contacts 162A, 162B and 162C impress ground upon the meter-reading bars 151A, 151B and 151 C. Since that field of the control card in registry with the bars 151A, 151B and 151C is perforated for a meter-reading of 441, circuits will be completed from these bars and the contacts engaging the same through said card perforations, through contacts upon shift relay 201 and conductors in cable 237 to counting relay 36 for the hundreds (4), 47 for the tens (4) and 56 for the units (1) with the effect of energizing these counting relays at points 1204, 1205 and 1206.

Following energization of the counting relays in the units order and the succeeding energization of cut-off relay 58 at point 1207, which is the first of the cut-off relays to energize, contact 58G closes causing energization of control relay 117 at point 1208 and the consequent deenergization of sequence control relay 2 at point 1209. Contact 2A opens, deenergizing sequence relay 5 at point 1210. Contact 5A opens, breaking the energization circuit for relay 162 (Fig. 1A) which thereafter deenergizes at point 1211. Upon the deenergization of relay 162 and the opening of its contacts 162A, 162B and 162C, the ground for the circuits extending through the bars 151A, 151B and 151C to the initially energized counting relays are broken, leaving the locked up counting relays conditioned for successive deenergization under control of their respectively associated stepping relays 45, 52 and 59.

Contacts 58C and 58D of energized relay 58 also closed, establishing energization circuits through contacts A2 and B2 of shift relay 201 to clutches 95A and 73AAA which as a consequence are subsequently energized at points 1212 and 1213 for advancing number wheel 95 and moving number wheel 73 backwardly. When cut-off relays 44 and 51 ultimately energize at points 1214 and 1215, contacts as 44C and 44D thereof complete circuits through contacts as E2 and F2 of shift relay 201 for causing energization of clutches 93A, 71AAA, 94A and 72AAA at points 1216 to 1219. In this manner the number wheels 93 and 94 are caused to move forwardly and the number wheels 71 and 72 are caused to move backwardly in the manner hereinabove described.

Since but a single pair of counting relays are locked up in the units order, number wheels 95 and 73 will be respectively rotated forwardly and backwardly but a single digital position and therefore the clutches 95A and 73AAA deenergize during the period of time represented by the space between vertical chart lines F′ and F″. Shortly prior to the number wheels in the hundreds and tens orders of these two registers being moved four digital positions, and after all of the locked up counting relays have been deenergized, the cut-off relays 44 and 51 deenergize at points 1220 and 1221, opening contacts as 44C and 44D whereby the clutches 93A, 71AAA, 94A and 72AAA are caused to deenergize at points 1222 to 1225 simultaneously with the number wheels 93 and 94 having been advanced four digital positions to display 4, and simultaneously with the number wheels 71 and 72 having been moved backwardly four digital positions to respectively display the digits 0 and 1. The consumption register 71—72—73 will now display the reading 014 which is the difference between the last reading 455 and the previous reading 441.

*Registering money charge for present month*

The rate of charge is assumed as 6¢ per metered commodity unit. Near the end of the next preceding machine cycle and upon the deenergization of cut-off relays 44 and 51, contacts as 44G open effecting deenergization of control relay 117 at point 1226. Sequence control relay 2 is thereby caused to energize at point 1227, opening contact 2B and removing ground from relays 12 and 26 which therefore deenergize at points 228 and 1229. Deenergized relay 26 opens contact 26B thereby breaking the energization circuit for shift magnet 211 which thereafter deenergizes at point 1230 incident to opening the contacts of shift relay 201.

Contact 12A of deenergized sequence relay 12 establishes a circuit for energizing shift magnet 214 at point 1231. Contact 12B grounds contact 11A and conductor 11K (Figs. 2, 8B, 8A and 8). With the consumption contact closing wheels 71F, 72F and 73F standing respectively at 0, 1 and 4, conductor 11K grounds contacts 277A and 277B, conductors 277C and 277D, conductors 277E and 277F; contacts 280A and 280B, conductors 280C and 280D, conductor 280E, contact 285A and conductors 285C and 285D. Conductor 285D is significant of the digit 8 in the tens order of conductor group 521. For the units, with contact closing wheel 72F standing at 1, contact 286 is closed, grounding conductor 286A (Figs. 8, 8A and 8B), energizing relay 275 at point 1232, and thereby grounding contact 275B, conductors 275C and 280F, contact 285B and conductors 285G and 285H. Conductor 285H is representative of the digit 4 in the units order group of conductors 522. Conductors 285D and 285H are therefore representative of 84, the product of the consumption quantity 14 and the rate 6. These conductors extend through cable 234 (Figs. 8B and 5), contacts of shift relay 204 and cable 237 to counting relays 60 for the tens (8) and 55 for the units (4), these counting relays energizing at points 1233 and 1234.

Later when cut-off relay 58 energizes at point 1235, control relay 117 will be caused to energize at point 1236, and in succession the sequence control relay 2 will deenergize at point 1237 and sequence relay 11 will deenergize at point 1238. Contact 11A is thus opened to remove the source of original energization for counting relay 60 and control relay 275 (Fig. 8B), this later relay being thus deenergized at point 1239.

Cut-off relay 58 in energizing closes contacts 58C and 58D, establishing circuits through contacts A5 and B5 of shift relay 204 and cable 233 to clutches 252A and 255A of the consumption charge register 250—251—252 and the bill totalizer register 253—254—255. Consequently these clutches energize respectively at points 1240 and 1241 to begin rotation of the number wheels 252 and 255. During rotation of these number wheels the shunting wheel 252C cooperates with the shunting contact 252D for alternately deenergizing and energizing stepping relay 59 for successively deenergizing the locked up counting relays in the units order, the cut-off relay being in turn deenergized shortly prior to the entry of the fourth digit 4 upon each of these number wheels whereby the energization circuits for the clutches 252A and 255A are broken so that these number wheels come to rest while displaying 4. When cut-off relay 51 eventually energizes at point 1242, contacts 51C and 51D close, setting up similar circuits through contacts C5 and D5 of shift relay 204 for energizing clutches 251A and 254A respectively of the consumption charge register and the bill totalizer register. Since there are eight pairs of relays locked up in the tens order, the cut-off relay 51 will deenergize at point 1243 shortly prior to entry of the eighth digit 8 on each of the number wheels 251 and 254. Number wheels 251 and 254 began rotation with the energization of the clutches 251A and 254A at points 1244 and 1245 and cease rotation with the deenergization of said clutches at points 1246 and 1247, which deenergization is initiated upon the deenergization of the cut-off relay 51 at point 1243.

Registering last reading for past month

Near the end of the preceding operating cycle which enters the amount 84 in each of the registers 250—251—252 and 253—254—255, the deenergization of cut-off relay 51 at point 1243 causes deenergization of control relay 117 at point 1248 and the resulting energization of sequence control relay 2 at point 1249. Contact 2B opens, effecting deenergization of sequence relay 14 and shift magnet control relay 28 at points 1250 and 1251. Relay 28 upon deenergization opens contact 28B, removing ground from conductor 12X to effect deenergization of shift magnet 214 at point 1252. Contact 14A closes pressing ground upon conductor 14X whereby shift magnet 215 is energized at point 1253. Contact 14B grounds contact 13A, conductor 13K, conductor 171E (Fig. 1A), contact 171C and conductor 171F thereby energizing selector relay 163 at point 1254. Contacts 163A, 163B and 163C are thereby grounded and impress ground through circuits including the meter-reading bars 151A, 151B and 151C which, as determined by the card perforations (Fig. 15), are engaged by contact fingers representative of the meter-reading 441. The circuit is extended through these contact fingers and contacts 205A, 205B and 205C on shift relay 205 and cable 237 to counting relays 36, 47 and 56, which are representative of 441 and which energize at points 1255, 1256 and 1257.

Thereafter, following the successive energization of the counting relays of lower numerical value in the units order, cut-off relay 58 in energizing at point 1258 causes energization of the control relay 117 at point 1259. Relay 2 is thus deenergized at point 1260, opening contact 2A and deenergizing sequence relay 13 at point 1261. Contact 13A opens, removing ground from the energization circuit for relay 163 which thereafter deenergizes at point 1262 to open its contacts and remove the source of ground for initial energization of the counting relays, whereby these counting relays are conditioned for successive deenergization under control of their associated stepping relays. The opening of contact 13G of deenergized relay 13 breaks the holding circuit for relay 171 (Fig. 1A) which as a consequence deenergizes at point 1263.

Energized cut-off relay 58 closes contacts 58C and 58D to complete energization circuits extending through contacts A6 and B6 of shift relay 205 to clutches 302A and 308AA of last reading register 300—301—302 and consumption quantity register 306—307—308 (Fig. 9) wherefore these clutches energize at points 1264 and 1265. Number wheels 302 and 308 are rotated forwardly, and since a single pair of counting relays are locked up in the units order the clutches 302A and 308AA will be deenergized at such time as to stop the number wheels 302 and 308 when they have been advanced one digital position to diplay 1. Cut-off relays 44 and 51 energize simultaneously at points 1266 and 1267, closing contacts as 44C and 44D to circuits through contacts C6, D6, E6 and F6 of shift relay 205 and cable 220 to the clutches 301A, 307AA, 300A and 306AA for driving the number wheels 301, 307, 300 and 306 forwardly. There are four pairs of counting relays locked up in the hundreds and tens orders, so that shortly prior to the entry of the fourth digit 4 on each of these number wheels the cut-off relays 44 and 51 will deenergize at points 1268 and 1269. Consequently the clutches 300A, 306AA, 301A and 307AA, which energized at points 1270 to 1273, will be deenergized at points 1274 to 1277 concurrently with their respectively associated number wheels stopping while displaying the reading of 4. Register 300—301—302 for the last reading of the previous month and the register 306—307—308 for the previous month's consumption quantity now read 441.

Registering previous reading for past month

Upon the deenergization of cut-off relays 44 and 51 at points 1268 and 1269, ground was removed from control relay 117 which thereafter deenergizes at point 1278, resulting in energization of sequence control relay 2 at point 1279. Contact 2B opens causing deenergization of sequence relay 16 and shift magnet control relay 29 at points 1280 and 1281. Contact 29B opens, removing ground from conductor 14X whereby shift magnet 215 is deenergized at point 1282. Deenergized relay 16 in closing contact 16A impressed ground from contact 18G upon shift magnet 216 which as a consequence energizes at point 1283. Contact 16B grounds contact 15A, conductor 15K, conductor 172E (Fig. 1A), contact 172C and conductors 172F and 169D for energizing selector relay 165 at point 1284. Contacts 165A, 165B and 165C close grounding meter-reading bars 152A, 152B and 152C which are engaged by contact fingers through card perforations (Fig. 15) representative of the meter-reading 416 for the second previous month. Through these contact fingers and cable 223 the grounded circuits are extended through contacts of shift relay 206 to the central windings of counting relays 36, 49 and 53 which therefore energize at points 1285, 1286 and 1287.

When cut-off relay 51 later energizes at point 1288, contact 51G closes, energizing control relay 117 at point 1289 which results in the deenergization of sequence control relay 2 at point 1290 and the consequent deenergization of sequence relay 15 at point 1291. Deenergized sequence relay 15 opens contact 15A which results in deenergization of selector relay 165 at point 1292. Contact 15G, in opening, breaks the holding circuit for relay 172 (Fig. 1A) which deenergizes at point 1293. Deenergized relay 165 opens its contacts to break the circuits for initial energization of the counting relays and leaves these counting relays free to successively deenergize under control of their respectively associated stepping relays.

Energized cut-off relay 51 closes contacts 51C and 51D thereby establishing circuits through contacts C7 and D7 of shift relay 206 and cable 221 (Figs. 5A and 9) to clutches 304A and 307A of the previous reading register 303—304—305 and of the consumption quantity register 306—307—308 whereby the number wheels 304 and 307 take motion when said clutches energize at points 1294 and 1295. Wheel 304 is rotated forwardly whereas wheel 307 is rotated backwardly. When cut-off relay 51 is later deenergized at point 1296, the clutches 304A and 307A are depotentialized and therefore deenergize at points 1297 and 1298. Number wheels 304 and 307 are moved only a single digital position so that the wheel 304 stops at 1 and the wheel 307 stops at 3 since it previously stood at 4.

When cut-off relay 44 energizes at point 1299, contacts 44C and 44D in closing establish circuits through contacts E7 and F7 of shift relay 206 to clutches 303A and 306A (Fig. 9) which clutches energize at points 1300 and 1301 to start the number wheels 303 and 306 moving respectively forwardly and backwardly. Clutches 303A and 306A, following subsequent deenergization of cut-off relay 44, are deenergized when the number wheel 303 has moved forwardly four digital positions to 4 and the number wheel 306 has moved backwardly four digital positions to 0.

The closing of contacts 58C and 58D of cut-off relay 58, when said cut-off relay energizes at point 1302, establishes circuits leading through contacts A7 and B7 of shift relay 206 to clutches 305A and 308A (Fig. 9) which therefore energize at points 1303 and 1304 to start the number wheels 305 and 308 moving respectively forwardly and backwardly. At the beginning of this cycle of the operation number wheel 308 stood at 1 so that upon the first digital movement thereof it was moved backwardly to 0 at the time indicated by point 1305 on the line pertaining to stepping relay 59. During continued backward movement of the number wheel 308, while it is moving from 0 to 9 and at the time indicated by point 1306, the lobe on carry-over wheel 308E passes beneath and momentarily closes carry-over contact 308G whereby ground is impressed upon conductor 221H (Fig. 9), contact 7H of shift relay 206, conductor H (Fig. 4) and carry-over counting relay 113 which is thus energized at point 1307. In succession carry-over counting relay 114 and carry-over cut-off relay 115 are energized at points 1308 and 1309.

Subsequently in the operation of the machine, shortly prior to the movement of the number wheels 305 and 308 six digital positions, cut-off relay 58 is deenergized at point 1310, opening contacts 58C and 58D whereby clutches 305A and 308A deenergize at points 1311 and 1312 to leave the number wheels 305 and 308 respectively displaying the digits 6 and 5. At this time the previous reading register 303—304—305 reads 416 and the consumption quantity register 306—307—308 now reads 035.

With the deenergization of cut-off relay 58 and the consequent deenergization of control relay 117 at point 1313, contacts 117G and 117A close. Contact AA of carry-over cut-off relay 115 is opened so that sequence control relay 2 fails to energize. Ground from closed contact 117G is carried through a circuit including contact 115C, carry-over stepping relay 116, contact 117A, conductor G, contact G7 of shift relay 206, cable 221, conductor 221G and conductor 221D to the clutch 307A, causing energization of this clutch at point 1314. Ground is supplied to one side of the shunting contact 307D from contact 117G by a circuit extending through contact 115D of carry-over cut-off relay 115 and conductor J. Therefore, during backward rotation of the number wheel 307, the shunting contact 307C is effective through the shunting contact 307D for alternately deenergizing and permitting reenergization of the carry-over stepping relay 116 with the effect hereinabove described of successively deenergizing the locked up carry-over counting relays and carry-over cut-off relay 115, the latter deenergizing at point 1315 to open contact 115C to break the energization circuit for the clutch 307A which thereafter deenergizes at point 1316 at the time the number wheel 307 displays the digit 2. The consumption quantity register 306—307—308 now displays the reading 025 which is the true difference between the past month's last reading 441 and the past month's previous reading 416.

*Registering money charge for past month*

When carry-over cut-off relay 115 deenergizes at point 1315, contact AA closes completing the circuit from ground at contact 117G for the energization of sequence control relay 2 at point 1317 whereby sequence relay 18 is deenergized at point 1318. Contact 18G opens, removing ground from shift magnet 216 which thereafter deenergizes at point 1319. Contact 18A closes, impressing ground from contact 30B through conductor 18X to shift magnet 217 which is thus energized at point 1320. Contact 18B in closing grounds contact 17A, conductor 17K (Figs. 2A, 10B, 10A and 10). With contact closing wheels 306F, 307F and 308F of the consumption quantity register 306—307—308 (Fig. 9) standing respectively at 0, 2 and 5, switches 325 in the hundreds order, 326 in the tens order and 327 in the units order (Fig. 10) are closed, enabling conductor 17K to ground contacts 325A and 325B, conductors 325C and 325D, conductors 325E and 325F, contacts 326A and 326B, conductors 326C and 326D, conductors 326E and 326F, conductors 326G and 326H, contacts 327A and 327B, conductors 327C and 327D and vertical conductors 327E and 327F which are representative of the numerical amount 150. From conductors 327E and 327F circuits are extended through contacts 207A and 207B of shift relay 207 (Fig. 5A) to the central windings of counting relays 39 and 46 which are thus energized at points 1321 and 1322.

Contact 326X of the tens order multiple contact switch 326 is closed and impresses ground from conductor 17K through conductor 17Q and control relay 17R to battery causing energization of this relay at point 1323, but without effect since the conductor 17S, thus grounded, has no connection with any of the contacts of the units order multiple contact switch 327, which is the only one of said units order switches closed. Following the successive energization of the hundreds order counting relays of lower numerical value than relay 39, and upon the energization of cut-off relay 44 at point 1324, control relay 75

117 energizes at point 1325 causing deenergization of sequence control relay 2 at point 1326 and the consequent deenergization of sequence relay 17 at point 1327. Contact 17A opens, removing ground from control relay 17R (Fig. 10B) which relay immediately thereafter deenergizes at point 1328. This deenergization of the control relay 17R is without effect. Such opening of contact 17A also breaks the initial energizing circuit for the counting relays leaving said relays free to deenergize under control of their respectively associated stepping relays as 45.

Cut-off relay 44, in energizing at point 1324, closes contacts 44C and 44D, completing circuits through contacts E8 and F8 of shift relay 207 (Fig. 5A) to clutches 250A and 253A of the consumption charge register and of the bill totalizer register (Fig. 11) wherefore these clutches energize at points 1329 and 1330 for advancing the number wheels 250 and 253. Subsequent deenergization of cut-off relay 44 at point 1331 opens contacts 44C and 44D causing deenergization of the clutches 250A and 253A at points 1332 and 1333 at the time the number wheels 250 and 253 have been advanced one digital position from 0 to 1.

When cut-off relay 51 energizes at point 1334 and closes contacts 51C and 51D, circuits are established through contacts C8 and D8 of shift relay 207 (Fig. 5A) and cable 233 to clutches 251A and 254A of the consumption charge register and of the bill totalizer register (Fig. 11), wherefore these clutches energize at points 1335 and 1336. The carry-over contact closing wheel associated with number wheel 254, which at the beginning of this cycle of operation stood at 8, while passing from 9 to 0 during entry of the second additional digit thereon and at the time indicated by point 1337 on the line pertaining to stepping relay 52, momentarily closes carry-over contact 254G for impressing ground upon conductors 233L (Fig. 11), conductor L and carry-over counting relay 118 (Fig. 4) which relay is thus energized at point 1338 and is followed by the successive energization of carry-over counting relay 119 and carry-over cut-off relay 120 at points 1339 and 1340. Since the number wheel 251 also stood at 8 at the beginning of this cycle of operation, the carry-over contact 251G is momentarily closed simultaneously with the closing of carry-over contact 254G, thereby impressing ground on conductor 233S and conductor S (Fig. 4) to cause energization of carry-over counting relay 126 at point 1338' simultaneously with the energization of carry-over counting relay 118. Relays 127 and 128 thereupon successively energize at points 1339' and 1340'. Carry-over relay 126 and the relays which are energized following the energization thereof are for effecting a carry-over addition onto the number wheel 250 of the consumption charge register (Fig. 11).

Shortly prior to entry of the fifth digit 3 on number wheels 251 and 254, and after all of the locked-up counting relays in the tens order have been deenergized, the cut-off relay 51 is deenergized at point 1341 to open contacts 51C and 51D whereby the clutches 251A and 254A are deenergized at points 1342 and 1343 concurrently with the number wheels 251 and 254 each displaying the digit 3.

Deenergized cut-off relay 51 also effects deenergization of control relay 117 at point 1344 whereby contact 117G is closed, but without causing energization of sequence control relay 2 since energized carry-over cut-off relays 120 and 128 are holding contacts BB and DD open. Contact 117G, however, completes a circuit from ground through contact AAA of carry-over cut-off relay 115, contact 120C, stepping relay 121, contact 117B and conductor K in the aforedescribed manner to clutch 253A of the bill totalizer register whereby this clutch is energized at point 1345 to cause advancement of the number wheel 253. During rotation of the number wheel 253 shunting contact 253D is actuated for causing successive deenergization of the locked-up carry-over counting relays and ultimate deenergization of carry-over-cut-off relay 120 at point 1346 whereby contact 120C opens, breaking the energization circuit for clutch 253A which thereafter deenergizes at point 1347 when the number wheel 253 has been advanced from 1 to 2. The bill totalizer register then displays the reading 234 which is the sum of the present month charge 084 for the metered commodity and of the past month's charge 150 for such metered commodity. Ground for the shunting contact 253D is obtained from contact 117G (Fig. 4) through contact 120D, conductor M, shift relay contact M8 and conductor 233M (Fig. 11).

Contact 117G of deenergized relay 117 also completes a circuit from ground through conductor 117H, contact CCC of carry-over cut-off relay 124, contact 128C, carry-over stepping relay 129, contact 117D, conductor R, shift relay contact R8, conductor 233R (Fig. 11) and clutch 250A. Clutch 250A is thus energized at point 1345' concurrently with the energization of clutch 253A whereby the number wheel 250 is advanced from 1 to 2 during like advancement of number wheel 253. Shunting contact 250D operates in unison with shunting contact 253D and causes deenergization of carry-over cut-off relay 128 at point 1346' after deenergization of the relays 126 and 127. Clutch 250A is thus deenergized at point 1347' when the number wheel 250 reaches 2. The consumption charge register 250—251—252 and the totalizer register 253—254—255 now each display the reading 234, which represents the monetary amount $2.34, the charge for consumption of 14 units at 6¢ per unit plus 25 units at 6¢ per unit.

*Holding for reading and releasing*

Relay 117 remains unenergized so that upon the deenergization of carry-over cut-off relays 120 and 128 at points 1346 and 1346' and the closing of contacts BB and DD, sequence control relay 2 is caused to energize at point 1348 for deenergizing relay 30 at point 1349, thereby opening contact 30B and effecting deenergization of shift magnet 217 at point 1350. Energized sequence control relay 2 also causes deenergization of sequence relay 24 as indicated at point 1351 for initiating the hereinabove described cycle during which the number wheels are held for reading and ultimately returned to zero.

*Operation with no consumption registered*

The operation for registering the last and previous readings of one meter proceeds as before described. It is presumed that the last meter-reading and the previous meter-reading are equal so that with the completion of entry of the previous meter-reading the consumption quantity register 71—72—73 (Fig. 7) is returned to zero. It follows that the contact closing wheels 71F, 72F and 73F (Fig. 8) will then be in position for closing the zero multiple contact switches associated therewith (Fig. 8). The remaining portion of this operation will now be described in greater detail and with reference to the timing chart disclosed in Fig. 57.

Near the end of the entry of the previous reading in the consumption quantity register 71—72—73, the last of the cut-off relays as 44 (Fig. 3) will deenergize at the time indicated by the vertical chart line 1355 (Fig. 57). This deenergization of the last of the cut-off relays causes deenergization of the control relay 117 at point 1356 and the consequent energization of sequence control relay 2 at point 1357. Since the present action is at the beginning of the third cycle or sequential operation of the machine, sequence relays 3, 4, 5 and 6 will have already been deenergized. The only other sequence relays energized upon the initiation of operation of the machine will have been 11, 12, 19, 20, 23 and 24. During entry of the previous meter-reading into the consumption quantity register 71—72—73, shift magnet 211 (Fig. 5) was held energized from ground at contact 26B of shift magnet control relay 26 (Fig. 2).

However, when sequence control relay 2 energizes at point 1357, contact 2B opens causing deenergization of sequence relay 12 and shift magnet control relay 26 at points 1358 and 1359. This deenergization of the sequence control relay 26 opens contact 26B, freeing shift magnet 211 from ground whereupon said magnet later deenergizes at point 1360. Contact 12A of deenergized relay 12 is grounded from contact 28B and through conductor 12X impresses such ground upon shift magnet 214. Shift magnet 214 therefore is caused to energize at point 1361 to close the contacts of shift relay 204. Contact 12B grounds contact 11A and conductor 11K (Figs. 2, 2A, 8B, 8A and 8). Since the zero multiple contact switch 287 in the tens order is closed, ground from conductor 11K is carried through the left hand contact of said switch and impressed upon vertical conductor 286A whereby control relay 275 (Fig. 8B) is energized at point 1362, but without effect, inasmuch as the contact 275B and the conductor 275C grounded by such energization of the relay are dead ended snce there are no closed contacts in any of the units order multiple contact switches connected with the conductor 275C.

When the contacts of shift relay 204 were closed at point 1361 a circuit was established from ground at contact 219 of the units order zero multiple contact switch 289 (Fig. 8), this circuit being extended through conductor 219M, contact 279A of the tens order zero multiple contact switch, conductor 279N, contact 279B of the hundreds order zero switch, conductor 279C (Figs. 8, 8A, 8B and 5), contacts G5 and H5 of shift relay 204, conductor 242 and control relay 117 to battery, this relay 117 being thus energized at point 1363, opening contact 117G, deenergizing sequence control relay 2 at point 1364 and consequently deenergizing sequence relay 11 at point 1365. Deenergized relay 11 opens contact 11A thereby removing the source of energization for control relay 275 (Fig. 8B) whereupon this relay deenergizes at point 1365A without effect.

Conductor 242A was also grounded (from contact G5 of shift relay 204) and extended such ground over conductor 242A (Figs. 5, 5A, 2A and 2) to relay 33 and battery, wherefore this relay energizes at point 1366, opening contact 33A and deenergizing through contact 28A the left hand winding of sequence control relay 28 so that said relay later deenergizes at point 1367 with its right-hand winding when sequence relay 11 deenergizes at point 1365 and opens contact 11G. Deenergized relay 28 opens contact 28B, removing ground from shift magnet 214 which as a consequence deenergizes at point 1368. When shift magnet 214 deenergizes and the contacts of shift relay 204 open, the energization circuit beginning with ground at contact 279 (Fig. 8) and including contact H5 of shift relay 204 and the control relay 117 is broken so that said relay is caused to deenergize at point 1369. With the opening of the contacts of shift relay 204, the energization circuit for relay 33 (Fig. 2) is broken at contact G5 so that said relay deenergizes at point 1370.

Deenergized relay 117 closes contact 117G establishing the energization circuit for sequence control relay 2 which therefore energizes at point 1371. This energization of relay 2 deenergizes the next higher even numbered sequence relay that has been prepared for action, and in the present instance it has been assumed that such even numbered relay is relay number 20 which is shown deenergized at point 1372. This deenergization of sequence relay 20 closes contact 20A whereby ground is extended from contact 31B over conductor 20X to shift magnet 218 which begins energization at point 1373, later completed at point 1374, for closing the contacts of shift relay 208. The next sequential operation (as for registration of merchandise charge through action of sequence relay pair 20—19) thereafter proceeds as hereinabove described. In practice, for many companies furnishing electricity or gas, said next operation would be for setting up a minimum charge, such as described in previous applications referred to and obviously adaptable to inclusion among the sequences of operation herein described.

*Simultaneous carry-over operations*

The operation now to be described is shown graphically by the timing chart (Fig. 58). Clutches 262A, 258A and 254A respectively of the class totalizer register, the merchandise register and the bill totalizer register (Fig. 11) are shown deenergizing at points 1380, 1381 and 1382 at the end of a sequential operation for entering the amounts of 250 in each of these registers. It is assumed, therefore, that at the beginning of the cycle or sequential operation now to be described the amount 250 stands in each of the registers 261—262—263, 257—258—259 and 253—254—255.

Near the end of the preceding sequential operation the tens order cut-off relay 51 deenergized in the usual manner at point 1383, opening contact 51G and causing deenergization of control relay 117 at point 1384. Sequence control relay 2 is thus caused to energize at point 1385. To expediently illustrate the present type of operation it will be assumed that the sequence relay pair 21—22 has been energized for controlling the entry of 250 in each of the registers 261—262—263, 257—258—259 and 253—254—255, and that the operation of the machine has proceeded to the stage where such entry is the next in order. Therefore, when relay 2 energizes at point 1385, contact 2B opens deenergizing sequence relay 22 at point 1386. This opening of contact 2B also causes deenergization of shift magnet control relay 31 at point 1387. In this manner contact 31B is opened breaking the energization circuit for shift magnet 218 which is assumed to have been employed during the previous cycle of operation and which is caused to deenergize at point 1388. Contact 22A closes, impressing ground upon and causing energization of shift magnet 219 at point 1389. Contact 22B closes, impressing ground upon contact 21A, conductor 21K, conductor 19K and the bars 186, 186A and 186B (Fig. 1).

The present example assumes the entry of an additional amount of 250 in the above referred to registers in Fig. 11 pursuant to which entry a carry-over will be effected simultaneously from the tens order to the hundreds order in each of the registers. Therefore, with the control card perforated for the amount 250 in the section thereof registering with the bars 186, 186A and 186B, the ground at said bars will be carried through conductors leading into cable 225 and through contacts 209A and 209B of shift relay 209 to counting relays 38 and 46 (Fig. 3). These counting relays are thus energized at points 1390 and 1391, and subsequently in the aforedescribed manner cut-off relays 44 and 51 energize at points 1392 and 1393. The energization of cut-off relay 44 at point 1392 places ground upon control relay 117 which immediately thereafter energizes at point 1394, resulting in deenergization of sequence control relay 2 at point 1395. This deenergization of sequence control relay 2 causes deenergization of sequence relay 21 at point 1396, wherefore contact 21A opens conditioning the counting relays for successive deenergization under control of their associated stepping relays as 52.

Energized cut-off relay 44 closes contacts 44E, 44C and 44D, setting up aforedescribed circuits through contacts c10, E10 and F10 of shift relay 209 to clutches 261A, 257A and 253A (Fig. 11), whereupon these clutches begin energization which is completed at points 1397, 1398 and 1399. The number wheels 261, 257 and 253 thereupon take motion and the shunting contact 257D becomes operative for alternately deenergizing and permitting energization of stepping relay 45 so that in due course the cut-off relay 44 will be deenergized for opening the circuits established by contacts 44E, 44C and 44D and thus causing deenergization of the clutches 261A, 257A and 253A when these number wheels are advanced two digital positions from 2 to 4. Said clutches deenergized during that period of time represented by the space between the vertical lines near the center of the chart.

Similarly, when cut-off relay 51 energizes at point 1393, closing contacts 51E, 51C and 51D, circuits are established through contacts b10, C10 and D10 of shift relay 209 to clutches 262A, 258A and 254A (Fig. 11) whereupon these clutches are potentialized and later energize at points 1400, 1401 and 1402. During the ensuing rotation of the number wheels 262, 258 and 254, the shunting contact 258D is operative for causing successive deenergization of the counting relays locked up in the tens order. Number wheels 262, 258 and 254 stood at 5 at the beginning of the present cycle of operation so that during entry of the fifth digit 0 thereon, at the time indicated by point 1403 on the line pertaining to stepping relay 52, the carry-over wheels 262E, 258E and 254E passed their lobes beneath the carry-over contacts 262G, 258G and 254G, momentarily closing these contacts and impressing ground upon conductors 241Y, 241S and 241L which are part of circuits leading respectively through contacts Y10, S10 and L10 of shift relay 209 and conductors Y, S and L (Fig. 4) to carry-over counting relays 134, 126 and 118. In this manner the relays 118, 126 and 134 simultaneously are energized at points 1404, 1404A and 1405. Consequently the carry-over counting relays 119, 127 and 135 energize at points 1406, 1406A and 1407 and the carry-over cut-off relays 120, 128 and 136 energize at points 1408, 1408A and 1409A.

Near the end of the entry of the fifth digit 0 on each of the number wheels 262, 258 and 254, the cut-off relay 51 deenergizes at point 1410, opening the energization circuits for the clutches 262A, 258A and 254A which are thus caused to deenergize at points 1411, 1412 and 1413 when each of the number wheels 262, 258 and 254 reads zero.

With this deenergization of cut-off relay 51 and the opening of contact 51G, control relay 117 is caused to deenergize at point 1414, closing all of its contacts so that ground is extended from contact 117G through conductor 117H and contact EEE to contact 136C of energized carry-over cut-off relay 136. From this contact the circuit is extended through carry-over stepping relay 137, contact 117F and conductor X (Fig. 4). Ground from conductor 117G is also extended through contact AAA of unenergized carry-over cut-off relay 115, contact 120C of carry-over cut-off relay 120, carry-over stepping relay 121, contact 117B and conductor K. Ground from contact 117G is also impressed upon a circuit including conductor 117H, contacts CCC and 128C, stepping relay 129, contact 117D and conductor R. Contacts 136D, 128D and 120D are also grounded from contact 117G thereby impressing such ground upon conductors Z, T and M. Conductors X, R and K comprise a part of circuits leading through contact X10, R10 and K10 of shift relay 209 to clutches 261A, 257A and 253A. Grounded conductors Z and M comprise part of circuits leading through contacts Z10 and M10 to one side of carry-over contacts 261D and 253D. The grounding of contact 128D and conductor T is without effect since this conductor is connected with no contacts on shift relay 209 (now closed); shunting contact 257D obtains ground from the righthand contact of relay 264 (Fig. 11). The closing of contacts 136C, 128C and 120C causes potentialization of the clutches 261A, 257A and 253A at points 1415, 1416 and 1417 and their subsequent energization at points 1418, 1419 and 1420. The ground supplied to shunting contacts 261D, 257D and 253D over the above traced circuits is periodically applied thereby to conductors 241X, 241R and 241K, during movement of the number wheels 261, 257 and 253, for causing alternate deenergization and reenergization of the carry-over stepping relays 137, 129 and 121.

Eventually the carry-over cut-off relays 120, 128 and 136 are deenergized at points 1421, 1422 and 1423, thereby breaking the energization circuits for the clutches 261A, 257A and 253A which thereafter deenergize at points 1424, 425 and 1426, concurrently with the number wheels 261, 257 and 253 being advanced one digital position from 4 to 5. The class totalizer register, the merchandise register and the bill totalizer register each now displays the reading 500 which is the sum of the successive amounts 250 entered therein.

Near the end of this cycle of operation when carry-over cut-off relays 136, 128 and 120 deenergize, their contacts FF, DD and BB close completing the energization circuit for sequence control relay 2 which as a consequence energizes at point 1427 as an incident to initiating the next sequential operation.

My claims are:
1. In a card controlled electrical calculating machine, a plurality of registers, a plurality of normally ineffective groups of contact bars and fingers for controlling numerical entries in said registers in accordance with perforations in corresponding fields of a card placed in a stationary sensing position, sequence control means normally effective to control selection of a register and of groups of bars and fingers to cause entry of amounts in the selected register under control of selected fields, a plurality of sensing means comprising bars and fingers for sensing control fields on said card, and further sequence control means conditioned under control of said sensing means in accordance with perforated data in said control fields for selecting one of said registers and for selectively enabling one of said groups of contact bars and fingers to control entry in said register, and means controlled by the selected group of contact bars and fingers for operating said selected register in accordance with the perforated data in the selected field of the card following entries under control of the normally effective sequence control means.

2. A machine according to claim 1 wherein a plurality of further sequence control means are provided, and wherein said plurality of further sequence control means are conditioned in accordance with control perforations on a card to select a plurality of registers and a plurality of groups of contact bars and fingers, to cause sequential operation of said registers under control of perforations sensed by the respective selected groups of contact bars and fingers.

3. A machine according to claim 1 wherein a manipulative setting means is provided for rendering the sensing means responsive to predetermined data in the respective control fields of a card.

4. In a record controlled public utility machine a plurality of groups of record sensing devices each group comprising a normally ineffective numerical value sensing section, a normally effective control data sensing section, and a normally ineffective control data sensing section, settable means cooperating with all of said normally effective control data sensing sections to render said sections responsive to a given control value, and means effective when a control data corresponding to said given value is sensed from a card by the normally effective control data sensing section of a given group, for rendering the numerical data sensing section and the other control data sensing section of said group effective.

5. In a machine according to claim 4, a plurality of registers and a plurality of sequence control devices for causing entries into said registers under control of said numerical value sensing sections, and means for controlling said sequence control devices for the normally ineffective control data section rendered effective in response to a given control value.

6. In a card controlled electrical calculating machine, three sensing devices for sensing corresponding numerical fields on a card, a further sensing device for sensing control perforations on a card, a plurality of registers, a plurality of sequence control devices, effective to cause a value entry into one of said registers as a minuend under control of the first sensing device, and a second value entry into said register as a subtrahend under control of the second sensing device, further sequence control devices conditioned under control of said further sensing device, and means controlled by said further sequence control device for causing a value entry to be effected into a second register as a minuend under control of the second sensing device, and a second value entry to be effected into said register as a subtrahend under control of the third sensing device.

7. A record controlled public utility machine comprising in combination a plurality of consumption computing registers, a cost accumulating register, entry effecting means therefor, a plurality of groups of sensing devices for reading numerical data and control data from separate fields of a record card, first and second numerical value determining means prearranged according to a given schedule and respectively controlled by said consumption registers to control value entries in said cost accumulator based on consumption values, a plurality of sequence control devices normally conditioned upon initiation of a machine operation to first cause said entry means to add a value in one of said consumption registers under control of one group of sensing devices, to thereafter subtract a value of said consumption register under control from said consumption register under control of a second group of sensing devices, and to cause said entry means to enter a value into said cost accumulating register under control of the consumption register and the first of said numerical value determining means, additional sequence control devices conditioned by the control data sensing devices, said additional sequence control devices when so conditioned being operative for causing said entry effecting means to add a value in a second consumption register under control of said second group of said sensing devices, to thereafter subtract a value from said second consumption register under control of a third group of said sensing devices, and to cause said entry means to enter a value into said cost accumulating register under control of said second register and the second of said numerical value determining means.

8. A machine according to claim 7 wherein the additional sequence control devices are conditioned by the control data sensing devices upon initiation of the machine operation and wherein the sequential entries controlled thereby are effected following the entries controlled by the normally effective sequence control device.

9. A record controlled public utility machine comprising in combination a consumption computing register, a cost accumulating register, entry effecting means for said registers, a plurality of groups of sensing devices for reading numerical data and control data from separate fields of a record card, numerical value determining means prearranged according to a given schedule and controlled by said consumption register to control value entries in said cost accumulator based on consumption values, a plurality of sequence control devices normally conditioned upon initiation of a machine operation to first cause said entry means to additively enter a value in said consumption register under control of a first group of said sensing devices, and to thereafter subtractively enter a value in said consumption register under control of a second group of said sensing devices, and additional sequence control devices conditioned by the control data sensing devices, said additional sequence control devices when so conditioned being operative for causing said entry effecting means to additively enter a value in said consumption register under control of a third group of said sensing devices, and to thereafter subtractively enter a value in said consumption register under control of a fourth group of said sensing devices, and certain of the initially conditioned of said sequence control devices being thereafter operative to cause said entry means to enter a value into said cost accumulating register under control of said consumption register and said numerical value determining means.

10. In an electrical calculating machine controlled by a card having thereon a plurality of data fields representing periodic readings and which fields each having a section for the recording of numerical data, a section for the recording of control data and a section for the recording of detecting data, a plurality of normally inoperative numerical data sensing devices for sensing the respective numerical data sections of said card, a plurality of normally inoperative control data sensing devices for sensing respective control data sections of said card, a plurality of normally operative detector sensing devices for sensing respective detecting data sections of said card, devices conditionable for sequentially enabling the several numerical data sensing devices to determine the order in which said devices are rendered effective for controlling entries from a card, manipulative means settable to render all of said detecting data sensing devices responsive to predetermined data, means controlled by a detector sensing device upon detecting the predetermined data in a card field to enable the associated control sensing device, and means controlled by said control sensing device for selectively conditioning the sequence means in accordance with control data in the respective card field.

11. In a record controlled public utility machine a plurality of groups of record sensing devices cooperating with separate fields of a card, and adapted to sense numerical data and control data therefrom, a group of sequence control devices normally effective upon operation of the machine to cause reading of numerical data by first and second groups of said sensing devices, a normally ineffective second group of sequence control devices to cause reading of numerical data by third and fourth groups of said sensing devices, and a normally ineffective third group of sequence devices to cause reading of numerical data by said second and third groups of sensing devices, and means controlled by the first group of record sensing devices for selectively enabling said second or third group of sequence control devices in accordance with control data in a corresponding field whereby the enabled group of sequence control devices will cause reading by its corresponding groups of sensing devices after completion of the readings caused by the normally effective group of sequence control devices.

12. A machine according to claim 11 including in plurality of registers and entry effecting means therefor, means controlled by said first group of sequence control devices for causing entries to be effected into one register, means controlled by the second group of sequence control devices for causing entries to be effected into the same register, and means controlled by the third group of sequence control devices for causing entries to be effected into a second register.

13. In an electrical calculating machine, a plurality of registers each comprising denominational order wheels, a driving means for each of said registers, an energizing circuit for controlling each of said driving means, a series of members settable in variable numbers to control the numerical value of entries in said registers, circuit make and break means actuated as a result of the setting up of said members to complete said energizing circuits, and means controlled by the denominational order wheels of one of said registers as an entry is effected therein to successively restore the set-up settable members, said circuit make and break means being operative to break said circuits as a consequence of the restoration of said settable members, whereby the actuation of all registers is terminated under control of said one register.

14. In an electrical calculating machine, a plurality of registers each comprising denominational order wheels, a driving means for each of said registers, an energizing circuit for controlling each of said driving means, a series of counting relays energizable in variable numbers to control the numerical value of entries in said registers, a cut-off relay energizable in sequence following the energization of said series of counting relays and thus conditioned for completing said energizing circuits, and means controlled by the denominational order wheels of one of said registers as an entry is effected therein to successively deenergize the energized counting relays, and said cut-off relay deenergizing following deenergization of the last of said counting relays to interrupt said circuits whereby the actuation of all registers is terminated under control of said one register.

15. In a record controlled public utility machine, a plurality of groups of record sensing devices cooperating with separate fields of a card to sense numerical data and control data therefrom, a group of sequence control devices normally effective upon operation of the machine to cause reading of numerical data by certain groups of said sensing devices, a normally ineffective second group of sequence control devices to cause reading of numerical data by other groups of said sensing devices, and a normally ineffective third group of sequence devices to cause reading of numerical data by still other groups of said sensing devices, and means controlled by one of said certain groups of record sensing devices for selectively enabling said second or third group of sequence control devices in accordance with control data in a corresponding field, whereby the enabled group of sequence control devices will cause reading by its corresponding groups of sensing devices after completion of the readings caused by the normally effective group of sequence control devices.

16. A machine according to claim 15 including a plurality of registers, entry effecting means therefor controlled by said groups of record sensing devices, and means controlled by said groups of sequence control devices for selecting different registers to receive entries.

17. In a record controlled public utility machine, a plurality of groups of record sensing devices cooperating with separate fields of a card in a stationary condition thereof, and to sense numerical data and control data therefrom, a group of sequence control devices normally effective upon operation of the machine to cause reading of numerical data by certain groups of said sensing devices, a normally ineffective second group of sequence control devices to cause reading of numerical data by certain other groups of said sensing devices, and means controlled by one of said certain groups of record sensing devices for enabling said normally ineffective group of sequence control devices in accordance with control data in a corresponding field whereby the enabled group of sequence control devices will cause successive reading by its corresponding groups of sensing devices after completion of the readings caused by the normally effective group of sequence control devices.

18. In a record controlled machine, an amount manifesting device in which a determined numerical value may be entered, amount computing means including a device settable to represent a result of a computation, a plurality of sensing means responsive to the record for controlling said computing means, numerical value determining means prearranged according to a given schedule and controlled by the settable device to yield numerical values based on said schedule and on the setting of said device, a second amount manifesting means, a further sensing means for determining an amount from the record and for controlling entries into the second amount manifesting means, a total manifesting means, entry effecting means common to all of said amount manifesting means on said computing means, and means for selectively placing said entry effecting means under control of the first plurality of sensing means to control computation of an amount or under control of the numerical value determining means to enter a determined numerical value in the numerical value manifesting means and in said total manifesting means or for placing said entry effecting means under control of the further sensing means to effect entry of an amount determined from the record by this sensing means in the second amount manifesting means and in said total manifesting means.

CLYDE SMITH.

---

CERTIFICATE OF CORRECTION.

Patent No. 2,176,930.   October 24, 1939.

CLYDE SMITH.

It is hereby certified that error appears in the printed specification of the above numbered patent requiring correction as follows: Page 2, first column, line 44, for the words "them in full or" read the; page 13, first column, line 73, for "cable 205" read cable 225; and second column, line 19, before "There" insert the following sentence -

In Figs. 6, 7 and 9 registers are shown. ;

and that the said Letters Patent should be read with this correction therein that the same may conform to the record of the case in the Patent Office.

Signed and sealed this 26th day of December, A. D. 1939.

Henry Van Arsdale,
Acting Commissioner of Patents.

(Seal)